US011436290B1

(12) United States Patent
Bernstein et al.

(10) Patent No.: US 11,436,290 B1
(45) Date of Patent: Sep. 6, 2022

(54) SYSTEMS AND METHODS FOR PROCESSING MEDIA WITH GEOGRAPHICAL SEGMENTATION

(71) Applicant: ShotSpotz LLC, Leesburg, VA (US)

(72) Inventors: Harley Bernstein, Milwaukee, WI (US); John Morgan, Falls Church, VA (US); Jeff Frederick, Leesburg, VA (US)

(73) Assignee: ShotSpotz LLC, Leesburg, VA (US)

(*) Notice: Subject to any disclaimer, the term of this patent is extended or adjusted under 35 U.S.C. 154(b) by 0 days.

(21) Appl. No.: 17/200,753

(22) Filed: Mar. 12, 2021

Related U.S. Application Data

(63) Continuation-in-part of application No. 17/105,054, filed on Nov. 25, 2020.

(60) Provisional application No. 62/940,415, filed on Nov. 26, 2019.

(51) Int. Cl.
G06F 16/00 (2019.01)
G06F 16/9536 (2019.01)
G06F 16/587 (2019.01)
G06F 16/55 (2019.01)

(52) U.S. Cl.
CPC ......... *G06F 16/9536* (2019.01); *G06F 16/55* (2019.01); *G06F 16/587* (2019.01)

(58) Field of Classification Search
CPC ..... G06F 16/9536; G06F 16/55; G06F 16/587
See application file for complete search history.

(56) References Cited

U.S. PATENT DOCUMENTS

| | | |
|---|---|---|
| 6,459,388 B1 | 10/2002 | Baron |
| 6,583,811 B2 | 6/2003 | Kinjo |
| 7,082,365 B2 | 7/2006 | Sheha |
| 7,258,614 B1 | 8/2007 | Kates |
| 7,474,959 B2 | 1/2009 | Singh |
| 7,663,671 B2 | 2/2010 | Gallagher |
| 7,848,765 B2 | 12/2010 | Phillips |
| 7,991,283 B2 | 8/2011 | Chen |
| 8,073,461 B2 | 12/2011 | Altman |
| 8,295,589 B2 | 10/2012 | Ofek |
| 8,405,740 B2 | 3/2013 | Nichols |

(Continued)

FOREIGN PATENT DOCUMENTS

| | | |
|---|---|---|
| EP | 2393056 | 12/2011 |
| EP | 2581703 | 4/2013 |
| KR | 100997874 | 12/2010 |

*Primary Examiner* — Jared M Bibbee
(74) *Attorney, Agent, or Firm* — Kenealy Vaidya LLP

(57) ABSTRACT

Systems and methods are provided to process a digital photo and other media. An apparatus to process digital photos can include a tangibly embodied computer processor (CP) and a tangibly embodied database. The CP can perform processing including: (a) inputting a photo from a user device, and the photo including geographic data that represents a photo location at which the photo was generated; (b) comparing at least one area with the photo location and associating an area identifier to the photo as part of photo data; and (c) performing processing based on the area identifier and the photo data. Processing can provide for (a) processing media with geographical segmentation; (b) processing media in a geographical area, based on media density; (c) crowd based censorship of media; and (d) filtering media content based on user perspective, that can be for comparison, validation and voting, for example.

18 Claims, 67 Drawing Sheets

(56) References Cited

U.S. PATENT DOCUMENTS

| | | |
|---|---|---|
| 8,407,225 B2 | 3/2013 | Lahcanski |
| 8,543,586 B2 | 9/2013 | Glachant |
| 8,581,997 B2 | 11/2013 | Lahcanski |
| 8,627,391 B2 | 1/2014 | Lahcanski |
| 8,660,358 B1 * | 2/2014 | Bergboer ............... G06T 11/60 |
| | | 382/190 |
| 8,843,309 B2 | 9/2014 | Kimchi |
| 8,996,305 B2 | 3/2015 | Kesare |
| 9,313,344 B2 | 4/2016 | Meike |
| 9,464,908 B2 | 10/2016 | Oel |
| 9,817,912 B2 | 11/2017 | Willis |
| 11,232,369 B1 | 1/2022 | Li |
| 2009/0162042 A1 | 6/2009 | Wexler |
| 2009/0171579 A1 | 7/2009 | Wu |
| 2009/0282346 A1 | 11/2009 | Bechtel |
| 2010/0171763 A1 | 7/2010 | Bhatt |
| 2011/0184949 A1 | 7/2011 | Luo |
| 2011/0184953 A1 | 7/2011 | Joshi |
| 2011/0235923 A1 | 9/2011 | Weisenbuger |
| 2011/0307478 A1 | 12/2011 | Pinckney |
| 2012/0110031 A1 | 5/2012 | Lahcanski |
| 2012/0303569 A1 | 11/2012 | Tuzhilin |
| 2013/0124653 A1 | 5/2013 | Vick |
| 2013/0185355 A1 | 7/2013 | Tseng |
| 2013/0222369 A1 | 8/2013 | Huston |
| 2013/0239056 A1 | 9/2013 | Ubillos |
| 2013/0332068 A1 * | 12/2013 | Kesar .................... H04W 4/029 |
| | | 701/430 |
| 2013/0332856 A1 | 12/2013 | Sanders |
| 2014/0372030 A1 | 12/2014 | Leader |
| 2015/0039630 A1 * | 2/2015 | Thomee .............. G06F 16/5838 |
| | | 707/748 |
| 2015/0254042 A1 * | 9/2015 | Seitz .................. G06F 16/5866 |
| | | 382/154 |
| 2016/0189042 A1 | 6/2016 | Gill |
| 2016/0294753 A1 | 10/2016 | Centner |
| 2017/0149795 A1 | 5/2017 | Day, II |
| 2017/0339466 A1 | 11/2017 | Patel |
| 2018/0219814 A1 * | 8/2018 | Maarek ................... H04L 51/08 |
| 2018/0254914 A1 | 9/2018 | Bastide |
| 2018/0341877 A1 | 11/2018 | Panattoni |
| 2018/0349502 A1 | 12/2018 | May |
| 2020/0004291 A1 | 1/2020 | Wexler |
| 2020/0104962 A1 | 4/2020 | Aich |
| 2021/0192651 A1 | 6/2021 | Groth |

\* cited by examiner

Spots Around Me - Map View

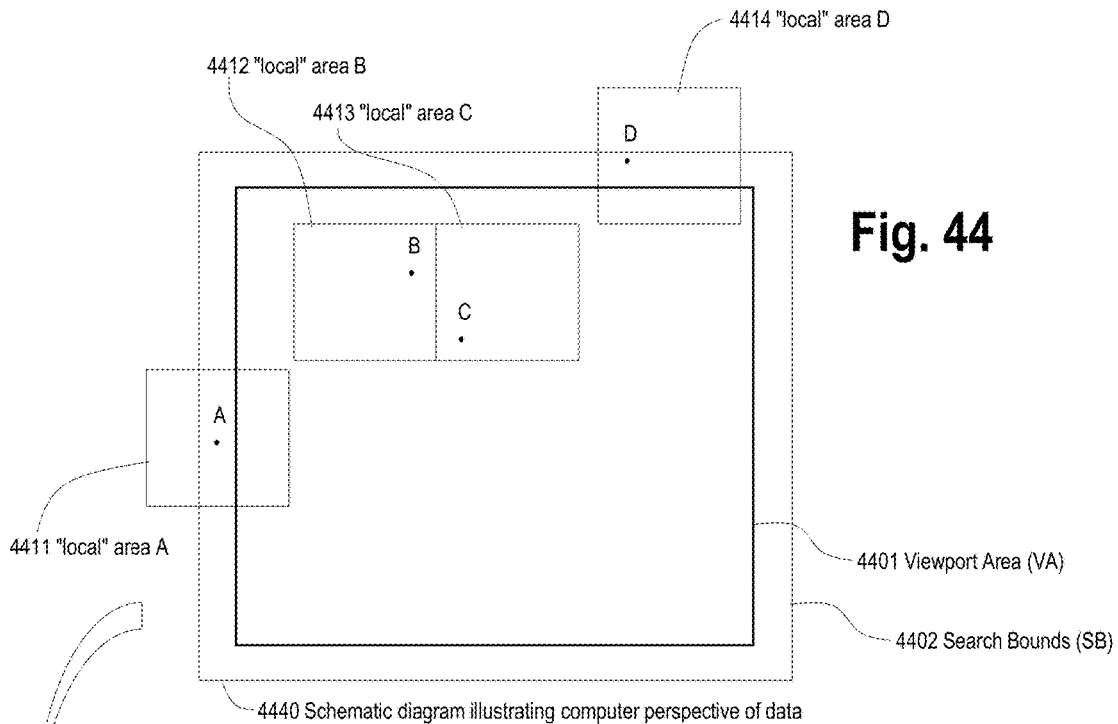
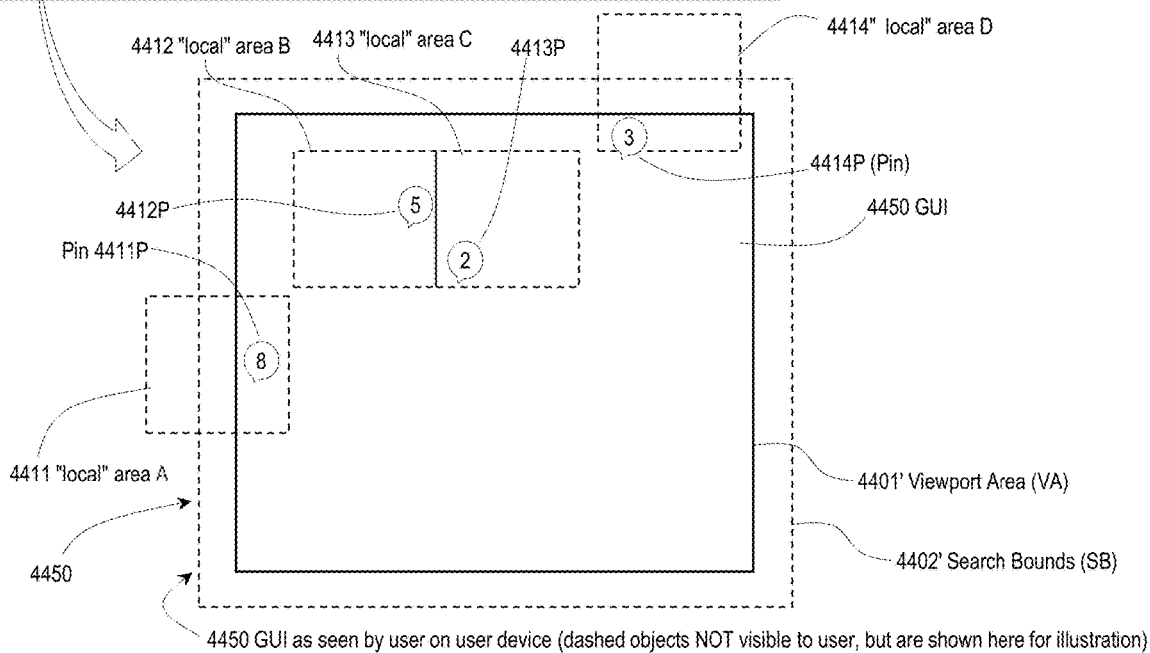
Fig. 44

Fig. 51
(Censorship)

5100 Table
5101 Data records

| Censorship power rating (CPR) | Required Ratification Number (RRN) (Required Ratifiers) | Associated processing |
|---|---|---|
| $40 \leq CPR < 0$ | 20 | Action is performed on photo with 20 other users ratifying |
| $60 \leq CPR < 40$ | 10 | Action is performed on photo with 10 other users ratifying |
| $80 \leq CPR < 60$ | 5 | Action is performed on photo with 5 other users ratifying |
| $100 \leq CPR < 80$ | 0 | Action is performed on image with no other user input required (highest level - no ratification required). This user = super user |

5121 — The CPR of the "nominator" is mapped to a particular RRN:
• the RRN can represent how strong the nominator is.
• a LOW RRN means that fewer (or no) other users have to ratify action, for such action to be applied to the photo 5122 — The RRN can be different for different requested actions or flags (e.g. RRN requirement to comment on a photo is less demanding than RRN requirement to remove a photo 5123 — The number of users that are needed to ratify a particular action can depend on the attributes of the user who is doing the ratifying and/or the particular flag or action that is being requested by the nominator (Censorship)

Fig. 56

5600 CP interfaces with a first user to establish a
FF association (first FF association) between the first user and respective photos
forming a first collection of photos, and the first collection of photos constituting a
first filtered set of photos
(Subroutine called from Fig. 55)

5610 CP establishes Filtered Following (FF) association based on
photos that were "taken" by the first user
(can include interfacing with the first user, i.e. a first user device)
(Subroutine 5700 called - see Fig. 57)

5620 CP interfaces with first user to establish FF association based
on photos that were "liked" by the first user
(Subroutine 5800 called - see Fig. 58)

5630 CP establishes Filtered Following (FF) association based on
photos that were "tagged" in a particular manner by the first user
(Subroutine 5900 called - see Fig. 59)

SYSTEMS AND METHODS FOR PROCESSING MEDIA WITH GEOGRAPHICAL SEGMENTATION

RELATED APPLICATIONS AND PRIORITY

This application is a continuation-in-part (CIP) patent application of U.S. patent application Ser. No. 17/105,054 filed on Nov. 25, 2020, which claims priority to U.S. Provisional Patent Application Ser. No. 62/940,415 filed Nov. 26, 2019, the disclosures of which are all hereby incorporated by reference in their entireties.

BACKGROUND OF THE DISCLOSURE

Systems and methods described herein relate to processing photos and other media, and in particular to processing photos and other media in a geographical area.

Photography is popular with a wide variety of people. Photography can include taking pictures of points of interest, activities of interest, "selfies", and innumerable other items. Photography can include taking a picture with a camera or other device that is dedicated to photography. Photography can include taking a picture with a smart phone, cell phone, or other user device that provides picture taking abilities as well as various other abilities and uses. Websites and other electronic resources exist that provide the ability to upload or otherwise save pictures that have been taken by a person. Such websites can allow a user to access pictures and perform other manipulation of pictures. However, known technology is lacking in capabilities that such technology provides. The systems and methods of the disclosure address shortcomings that exist with known technology.

SUMMARY OF THE DISCLOSURE

Systems and methods are provided to process digital photos and other media. An apparatus to process digital photos and other media (and for processing digital photos and other media) can include a tangibly embodied computer processor (CP) and a tangibly embodied database. The CP can perform processing including: (a) inputting a photo from a user device, and the photo including geographic data that represents a photo location at which the photo was generated; (b) comparing at least one area with the photo location and associating an area identifier to the photo as part of photo data; and (c) performing processing based on the area identifier and the photo data. Processing of a photo and/or a collection of photos can include area segmentation, photo delivery processing including processing based on photo density, censorship processing, and processing using filters. Various other features are described below.

Accordingly, systems and methods of the disclosure can provide for (a) processing media with geographical segmentation; (b) media delivery processing based on photo density and voter preference (c) crowd based censorship of media; and (d) filtering media content based on user perspective, that can be for editing, viewing, comparison, validation and voting, for example. For example, the systems and methods of the disclosure can provide for processing media in a geographical area based on media density. The systems and methods of the disclosure can provide for photo delivery processing including or based on photo density, vote preference, voter preference, or voting preference. Photo delivery processing can be based on photo density with photo density registering voter preference. Various additional features are described herein.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 44 is a schematic diagram also showing features of pin placement processing, in accordance with principles of the disclosed subject matter.

FIG. 51 is a diagram showing aspects of censorship power rating (CPR) and required ratification number (RRN), in accordance with principles of the disclosed subject matter.

FIG. 56 is a flowchart showing details of subroutine 5600 as called from FIG. 55, in accordance with principles of the disclosed subject matter.

DETAILED DESCRIPTION OF EXEMPLARY EMBODIMENTS

Figure 1:
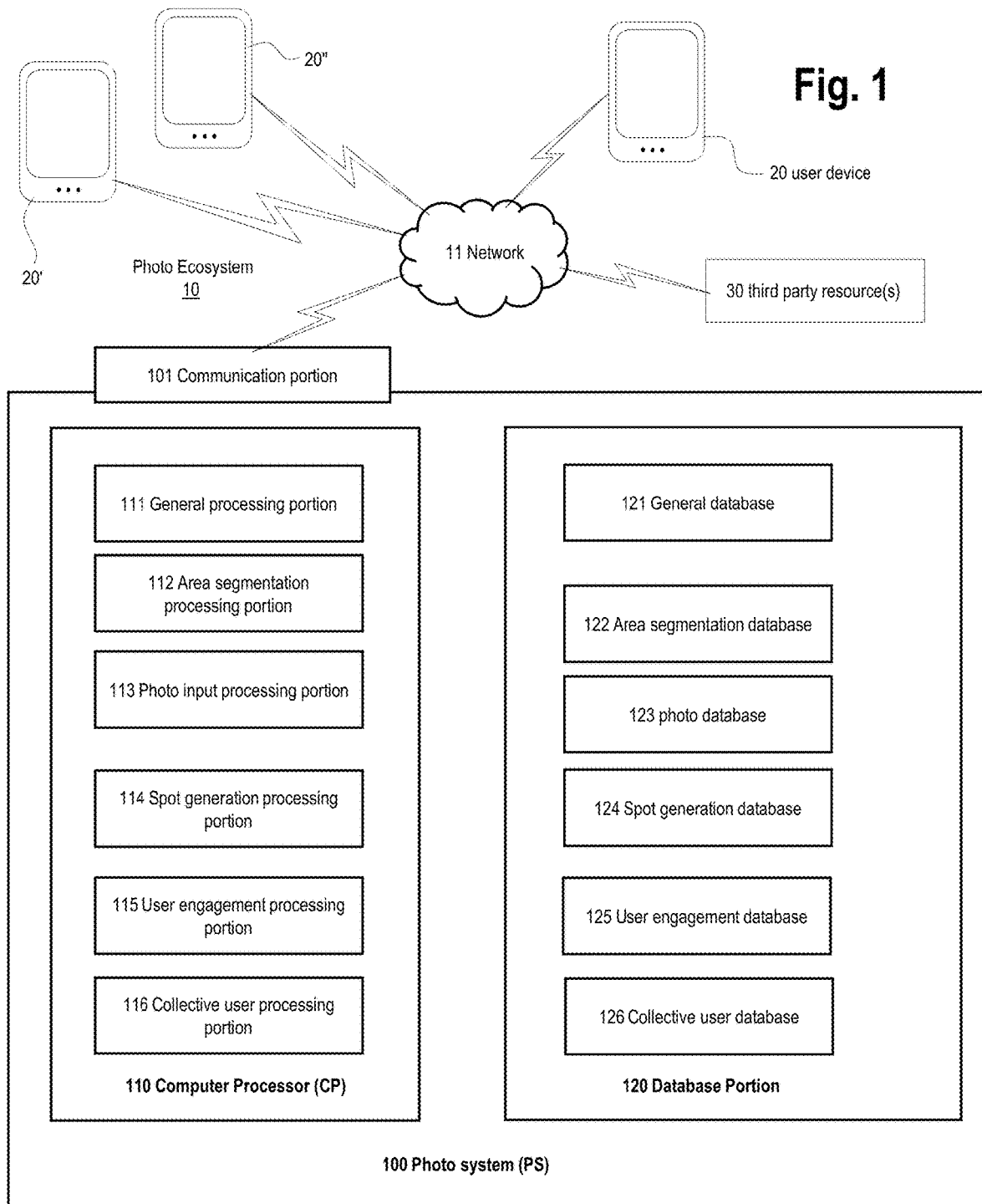
FIG. 1 is a diagram showing a photo ecosystem or ecosystem in accordance with at least one embodiment of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Locations exist that are popular for a variety of reasons and characteristics. Locations can be popular amongst local residents or travelers. Locations can be popular for sight-seeing, taking "selfies", taking photographs, or partaking in interesting activities. Interesting activities can include "seeing (taking pictures), eating, drinking, shopping, and various other activities including conceptual things. Conceptual things can include ideas or referendums, for example. A particular location can be "popular" or locations may become "popular" as a function of time. Locations that become popular as a function of time can be dependent on seasonal events, times of day, newsworthy developments that are related to such location, and trending items that are related to the particular patient.

However, visitors, travelers, and even local residents may not always be aware of these popular locations. A popular location can be marked with a physical sign or other marker so as to notify interested persons of the particular location. Also, some of these popular locations are identified on maps or in travel guides. However, such information is not always readily available to interested travelers or other persons.

Such information may also become outdated. Further, signs and notifications may not provide information about the location that helps an interested person to determine appealing characteristics or other features of interest regarding the location.

It is one objective of the present disclosure to provide information by graphic display on a networked computer, mobile device or other processing system that a user can access to identify locations of interest.

Such locations of interest can include popular locations. The information can be used for planning purposes when a user is planning a visit to the location of interest or near the location of interest. Another objective of the present disclosure is to provide a method and system for processing photos that determine popularity or registers a user vote of preference; and the popularity of a location or area can be identified by being referred to as a "spot". Thus, an area that has a predetermined density of photos can be deemed a "spot" by the PS (photo system) of the disclosure. Thus, for example, a "patch" (as described below) that has a predetermined density of photos can be deemed a "spot" by the PS. Other types of areas, e.g. a "local" may also be deemed a "spot". The method and system can determine the popularity of an area, for example the popularity of a patch, using various characteristics or attributes of interest, which can be associated with the area in a suitable database. Once identified as a "spot", the database can contain information that identifies the spot, conveys information regarding the particular location of the spot, and includes various other attributes of the spot. It is a further objective of the present disclosure to provide the user with photos previously captured at the spot in order to assist the user in determining if the characteristics of the spot are of interest. Another objective of the disclosure is to utilize user supplied content and preferences to assist in a determination in identification of "trusted critics" by establishing user power ratings by area of interest. Such user power ratings can include the establishment of user dashboards highlighting volume of activity, concentration of followers, areas of interest, and geographical proclivity. A further objective is to provide users the ability to identify and organize under "affinity groups." A further objective is to provide users the ability of "filtered following" that organizes content based upon user interests, preferences including trusted critics, affinity groups, geography, and other attributes. It is a further objective to allow users the ability to flexibly organize and reorganize content and perspectives, preferences, user following and/or affinity groups to validate or more generally perform an "assessment" of the popularity or other attribute of a spot. It is a further objective of the present disclosure to provide a system that supplies popular spot characteristics and other information to a user that is dynamically updated over time so as to be of increased relevance to the user. It is a further objective of the present disclosure to provide information to the user regarding a spot that is specifically customized to the user.

The systems and methods of the disclosure can provide the above objectives and can provide various other features as described in detail below. The system of the disclosure can include a computer, computer system or machine that can be in the form of or include one or more computer processors "CPs" and one or more databases. The computer can include or be in the form of or be connected to a network server. Processing can be performed that includes accessing a photo database containing photos, i.e. digital photos, and location data and determining one or more clusters of the digital photos based on the location data. Processing can further include associating time data and a variety of other data appended to the photo or cluster of photos. Processing can be performed to determine a popular spot location for representing the digital photo or cluster of digital photos and to generate results, which can be stored in a database for later access.

In at least one embodiment of the disclosure, the process of determining a popular location, herein referred to as a "spot", can begin with geographic segmentation of the globe or some other area.

Geographic segmentation can include the establishment of uniquely identifiable areas, which can vary in size. The largest areas can be as large as the Pacific Ocean or the Antarctic. The smallest areas can be a point or an area of a few square feet. A smallest area, of the uniquely identifiable areas, can correspond to what is herein referred to as a "patch". A "patch" can become a "spot", i.e. a "patch-spot" if density of photos in the patch is sufficient. The methodology of the disclosure can initially establish larger location areas that are, for example, approximately 100 miles×100 miles in area. The smallest area that can be referred to as a patch, can be approximately 13 feet×13 feet. However, as described below, it should be appreciated that the particular areas processed, including the size of such areas, can vary in implementation of a system of the invention.

Geographic segmentation of an area under consideration, such as the world or globe, can start with a desired segmentation, such as the 100 mile×100 mile segmentation. Such areas that have been formed by segmentation, can be referred to as first level areas. Each of the first level areas can be divided into second level areas. Each of the second level areas can further be divided into third level areas. Further segmentation can be provided. The particular area to be processed, be it the world or some smaller area such as a trade show venue, can vary as desired. Additionally, the number of levels provided can vary as desired, as well as size of each of the areas. Accordingly, the particular number of levels of areas, size of the areas, and other attributes of areas as described herein are for purposes of illustration. The number of levels of areas can be varied as desired, the size of the areas can be varied as desired, the shape of the areas can be varied as desired, other attributes of the areas can be varied as desired, interrelationship between the areas can be varied as desired, and/or other aspects of geographic segmentation can be varied as desired. The size and shape of the area that constitutes or includes a spot can be varied as desired. The sizes as described herein are approximate and may well vary within thresholds. Such thresholds may include variance, of the size of the areas, by + or −5%, + or −10%, + or −15%, + or −20%, for example.

For example, geographic segmentation areas or areas can be generally standardized into 6 size categories, in accordance with at least one embodiment of the disclosure. The segmentation areas can include 6 size categories. The 6 size categories can illustratively include:

(1) "Remote": 100 miles by 100 miles (19,700 across the earth);

(2) "Territory": 10 miles by 10 miles (1.97 Million (M) spots across the earth);

(3) "Sector": 1 mile by 1 mile (1 spot per square (sq) mile—197M spots across the earth);

(4) "Quadrant": ¼ mile by ¼ mile (1,340 ft by 1,340 ft—16 spots per square mile 3.15 Billion (B) across earth); and (5) "Local": 134 ft by 134 ft (1,600 spots per square mile—315B across the earth).

(6) "Patch": 13.4 foot by 13.4 foot areas (160,000 per square mile-31.5 trillion across the earth).

Accordingly, the remote areas can constitute first level areas, the territory areas can constitute second level areas, the sector areas can constitute third level areas, the quadrant areas can constitute fourth level areas, the local areas can constitute fifth level areas, and the patch areas can constitute sixth level areas. Accordingly, the largest of the areas can be the remote areas. The smallest of the areas can be the patch areas. The above naming or nomenclature is used for purposes of explanation and discussion herein. It should of course be appreciated that the areas can be named as desired.

As described herein, the areas as defined and processed in the system of the disclosure can be formed by various techniques and mechanisms. Area boundaries for each remote area, for example, can be established using longitude-latitude data. Various information can be used to determine the boundaries of the remote areas and/or to determine the longitude-latitude (long-lat) of a particular location or geographical feature. Such information can include natural landmass orientation boundaries, ocean or water boundaries, concentrations of populations, countries, states, provinces, counties, cities and other predefined sites or areas.

Once the first level areas are defined with boundaries of each of the "remote" can be defined using a 100 mile×100 mile, the second level areas (territories) can then be defined. The boundaries of each of the "territories" can be defined using a 10 mile×10 mile grid system that can be used for further tagging or identifying content for example. That is, the system of the disclosure can segment each of the "remote" areas by mathematically deriving longitudes and latitudes for each territory, i.e., such that each territory possesses a 10 mile×10 mile area.

Once the second level areas are defined, the third level areas (sectors) can then be defined. The boundaries of each of the sectors can be defined using a 1 mile×1 mile area grid system that can be used for further tagging or identifying content. That is, the system of the disclosure can segment each of the territory areas by mathematically deriving longitudes and latitudes for each sector, i.e., such that each sector possesses a 1 mile×1 mile area.

Once the third level areas are defined, the fourth level areas (quadrants) can then be defined. The boundaries of each of the quadrants can be defined using a ¼ mile×¼ mile grid system that can be used for further tagging or identifying content. That is, the system of the disclosure can segment each of the quadrant areas by mathematically deriving longitudes and latitudes for each quadrant, i.e., such that each quadrant possesses a ¼ mile×¼ mile area, i.e. a 1,340 feet×1,340 feet area.

Once the fourth level areas are defined, the fifth level areas (locals) can then be defined. The boundaries of each of the locals can be defined using a 134 feet×134 feet grid system that can be used for further tagging or identifying content, i.e. by breaking up each of the quadrants by using a 10×10 grid. That is, the system of the disclosure can segment each of the local areas by mathematically deriving longitudes and latitudes for each local, such that each local possesses a 134 feet×134 area.

Once the fifth level areas are defined, the sixth and lowest level areas (i.e. patches) can then be defined. The boundaries of each of the patches can be defined using a 13.4 feet×13.4 feet grid system that can be used for further tagging or identifying content, i.e. by breaking up each of the locals by using a 10×10 grid. That is, the system of the disclosure can segment each of the patch areas by mathematically deriving longitudes and latitudes for each patch, such that each patch possesses a 13.4 feet×13.4 area.

For purposes of description, processing has been described herein as processing a "photo". However, it should be appreciated that such processing described as performed on a "photo" can be performed on content described as a photograph, digital photograph, digital photo, picture, video, digital video, image, digital image, and/or other content described using similar terminology. In general, the processing of the disclosure can be utilized with content or digital content, including a video, as may be desired.

In an embodiment of the disclosure, the process of determining a popular spot can begin with geographic segmentation that starts with the identification of a known geographic area of interest that represents a "site". For example, a "site" can be the area that encompasses the Statue of Liberty. In such example, smaller "spots" of uniquely identified areas can provide different vantage points within the site.

Accordingly, a "bottom up" approach can be used in which spots are identified and such identified "spots" can be accumulated into a site. Further, a first site can be geographically positioned next to or adjacent to a second site.

In accordance with at least one embodiment of the disclosure, the processing can include a determination of a "relevant universe" of all stored digital photos, i.e. "available photos" that can be used in the processing of the disclosure. Stored digital photos can be tied to an area with a related longitude and latitude with such point contained within the area. A photo can include or be associated with metadata that represents the location at which the photo was taken. Such location metadata can be in the form of a point defined in a coordinate system. For example, the point can be the longitude-latitude (i.e. "long-lat" or LL") at which the photo was taken. Parameters can be established for variables that can dictate whether a photo will or will not be included in the processing of the system, i.e. whether a photo will be an "active photo" or an "inactive photo". The parameters can include the current (age of photo) and definition or protocol that can be used to determine the current age of the photo, location type(s), various minimum volumes, popularity rankings, affinity groups, user identification and credentials, and other attributes of a photo. Such attributes can be adjustable or variable through user interface with the system. For example, a photo can be deemed relevant and included, as an active photo, if less than one year old as determined by the date that the photo was taken. Such parameters that control whether a photo is an active photo or an inactive photo, can be adjusted as desired. For example, with some spots, a photo might be relevant, and included as an active photo, if less than 10 years old. With other spots, a photo may only be an active photo if less than 5 years old, for example. Additionally, photos can be included in the processing of the system, as an active photo, dependent on an interrelationship of the photo with other photos. For example, a density of photos can be taken into consideration where the system performs processing to determine how many photos there are in a particular area. If a threshold number of photos in an area has been achieved, then all of such photos in the area can be included as an active photo. On the other hand, if a threshold number of photos in an area has not been achieved, then such photos may be deemed to be inactive photos. That is, illustratively, photos in an area that have not collectively achieved a predetermined density threshold can be maintained as inactive photos in a database. The photos can be maintained on a back end of the system for example. As more photos are added to the particular area, the density of photos is the particular area, such as a patch, will increase. Once the particular density threshold is attained in the area, the photos can be become active, i.e. by virtue that requisite density has been attained—and a patch is thus evolved into a spot, for example. Other variables or parameters can affect whether a particular photo is included in processing as an "active photo" or whether such photo is "inactive".

Inclusion of a photo or photos as active can be dictated, by the processing of the system, dependent on whether there are a sufficient number of photos of a particular patch or other location type or combination thereof. Inclusion of a photo or photos as active can be dictated by attributes of a populated matrix of attributes or characteristics. For example, a "location type" of a photo can include types such as see, do, eat, drink, stay, shop or conceptual. Such types can be associated with particular spots to see, particular activities to engage in, particular restaurants to eat at, particular restaurants to drink at, or particular hotels to stay at. Additionally, the inclusion or non-inclusion of a photo (as an active photo) can depend on attributes of surrounding areas. For example, photos in the top 20% of "local" areas, out of all local areas in a particular area, may be included in the processing as active photos. Such inclusion can be controlled by the processing of the system.

A further processing component of the system of the disclosure can include establishment or generation of "virtual containers". These virtual containers can provide placeholders for segregation and accumulation of photos. The virtual containers can correspond to and be defined by each of the areas described above—including remote, territory, sector, quadrant, local, and patch areas. In at least some embodiments of the disclosure, each of the photos can be segregated based on location of the photo vis-à-vis the particular area or areas in which such location (of the photo) falls within. Processing can be performed on an available photo to determine which area(s) or virtual container(s) the particular photo belongs in. In such processing, a photo can "cascade" down so as to be associated or tagged with the various virtual container(s) to which the photo belongs. More specifically, processing can be performed so as to associate or tag a photo with: a remote area that geographically bounds the location of the photo; a territory (within the tagged remote area) that bounds the location of the photo; a sector (within the tagged territory) that bounds location of the photo; a quadrant (within the tagged sector) that bounds location of the photo; a local (within the tagged quadrant) that bounds location of the photo; and a patch (within the tagged local) that bounds location of the photo.

A further processing component of the system of the disclosure can include an auto incremented and counting routine. For example, further photos can be added into a particular patch. As the photos are added in, a count associated with the particular patch can be automatically incremented. The patches can be then be ranked and processing performed based on such ranking. A table of counts, for each patch, and rankings of the patches can be maintained by the system. A table of counts and rankings can be maintained based on the number of photos in patches. Additionally, a table of counts and rankings can be maintained based on attributes or characteristics of photos in the patches. For example, a table of counts and rankings can be maintained based on how many photos in each "patch" relate to places to eat. For example, a table of counts and rankings can be maintained based on how many photos in each patch relate to events to see. The table of counts and rankings can be maintained in a database for access by the system and updated or overwritten in some periodic manner—or based on additional data that is input into the system.

The processing as described herein, including components of the processing, can be executed periodically or at predetermined time(s). For example processing as described herein may be performed daily, hourly, weekly or other desired frequency and may be limited to or vary by particular identified geographic areas. Processing can be performed when a new photo is uploaded into the system, such as when a new photo is input from a user. Processing can be performed upon request by a requesting, authenticated user over an established network. Processing can be performed when a new photo or batch of photos is uploaded into the system from a user, a database, or a third party server, for example.

Hereinafter, further aspects of the systems and methods of the invention will be described.

In accordance with at least one embodiment of the disclosed subject matter, processing performed by the system can include accessing a photo database, which has been populated by photos from users and other sources. The photo database can contain location data regarding the photos. The processing can include determining popularity of specific areas based on photos associated with each respective area. The processing can include determining popularity of specific areas—such as the number of photos in a "patch". A patch that can be the smallest area demarcated by the processing of the system. An area, such as a patch, can include the relative strength of a preference provided by the user, positive or negative. Popularity of a particular area can be based on various attributes of one or more photos. Popularity can be based on the number of photos in a particular area or areas, such as in a patch. Popularity of an area can be based on attributes of a photo including location data associated with the photo, time data associated with the photo, and various other data associated or appended to the photo or to a cluster of photos.

The area of a "patch" has been described herein for purposes of illustration. For example, a "patch" can evolve into a "spot" if density of photos therein is sufficient. However, other areas can also be considered for and attain "spot" status, as described herein. For example, a geographic region such as a national state park might be processed to determine if such region possess sufficient density (of photos) such that the region should be deemed a spot.

Popularity of a particular area can also be based on "location type" and the number of photos in such area that are associated with such location type. Accordingly, a given area (which can be a "patch") can be saved in the database (of the system) and tagged with a particular location type. In other words, the area can be associated with an attribute that indicates the area is of the particular location type. Such association or tagging can be performed utilizing a relational database, for example. Then, a photo may be associated with the area based on the location (of the photo) being located within the boundaries of such given area. Processing can then be performed to determine what "type" or "types" is the photo that was input. It may be the case that the photo is of a "type" that is the same as the "location type". Accordingly, the input of such photo can contribute to a "location type count" or tally of how many photos of the particular "type" are in the area of the particular "location type". In other words, if a photo in a particular area is of a type that corresponds to a "location type" of the area—then that photo will contribute to what might be referred to as a "location type count" of that area. Such "count" processing can thus provide popularity of a particular area with regard to the particular type. Such data can then be used to compare different areas, such as to compare different patches for comparative ranking.

It should be appreciated that a given area is not limited to one "location type". Additionally, a given photo is not limited to be of one "type". Accordingly, a particular area can be, i.e. can possess an attribute of, one or more location types. A particular photo can be, i.e. possess an attribute of, one or more types.

For example, a photo taken at a popular restaurant at Niagara Falls can be tagged as "where to see" and "where to eat". Relatedly, the "spot" in which such restaurant is located can be tagged as "where to see" and "where to eat". As a result, the particular photo can contribute to the "location type count" of the spot for both "where to see" and "where to eat".

In accordance with at least one embodiment of the disclosed subject matter, coding or instructions of the system can identify location types (of areas) and types (of photos) as may be desired. Location types that are available for association or tagging of an area can be different for different areas. For example, an area that has only one restaurant can be tagged with a more general "location type" that can include "where to eat". On the other hand, another area can be densely populated with restaurants. Accordingly, the more general "location type" of "where to eat" can be further broken out into additional location types such as "Where to eat—American", "Where to eat—Italian", "Where to eat—Mexican", and "Where to eat—fast food".

For purposes of illustration, "location types" can include (1) "places" that can be organized by common characteristics such as consumer driven activities. Such "places" location type can be further differentiated to additional location types or levels, or what might be referred to as sub-levels. The further levels or sub-levels can include: a) where to see; b) where to photograph; c) activities to do; d) where to eat; e) where to drink beverages; f) where to stay, and g) where to shop, for example.

The location types can further include (2) "events" that can be tied to locations that may be activity driven, group attended (like parades or festivals) or newsworthy items that can occur more randomly.

The location types can further include (3) "things" that may include tangible items like candidates tied to a geographic area or intangible conceptual items like a referendum.

The location types can further include (4) "virtual" that may include user defined or "other" items assessed for popularity, user or voter preference.

As described above, the system can process geographic demarcations that can be referred to as "areas". A particular type of area, i.e. the smallest type of area, can be a "patch". Each patch can have an attribute of one or more "location types". A patch can be deemed more popular as more photos are associated with either the patch in general or with a location type(s) of the patch. A patch can be deemed to possess sufficient density of photos, i.e. may be deemed to be popular enough, to be a spot. The more popular spots can be referred to as "top ranked spots". Popularity of an area/spot can be determined by photographic vote, where one or more users submit photos that yield popularity values. Popularity values for each of a number of characteristics of the area can be determined from the photos and associated clusters of photos. Data regarding each photo, clusters of photos, and various other data can be stored in a suitable database so as to perform processing as described herein. Accordingly, a user's photo can be the user's vote.

FIG. 1 is a diagram showing a photo ecosystem or ecosystem 10 in accordance with at least one embodiment of the disclosed subject matter. The ecosystem 10 can include a photo system 100; a plurality of user devices 20, 20', 20"; and a third-party resource(s) 30. The various components of the ecosystem 10 can be connected and in communication with each other utilizing a suitable network 11. For example, the network 11 can be in the form of or include the Internet, a private network, and/or some other network. The network 11 can be composed of a plurality of discrete networks that communicate with each other and with the components illustrated in FIG. 1. It should be appreciated that the diagram of FIG. 1 is for purposes of illustration. The photo system 100 can be in the form of one or more servers or in the form of a distributed computer system. While three user devices are illustrated in FIG. 1, the ecosystem 10 can include many more user devices—and may well include thousands or millions of user devices. Each of such additional user devices can interact with photo system 100. Additionally, while one third-party resource 30 is illustrated, it should be appreciated that many third-party resources can be utilized and included in the ecosystem 10. Additional systems, servers, processors, and other processing assets and/or database assets can be included in the ecosystem 10.

The photo system 100 can perform various processing as described herein based on instructions stored in the database portion 120. The photo system 100 can store instructions so as to provide the processing described herein and can store the various photos, i.e. photo data that can include digital image data (of the image itself—a reproduction of what would be viewed by the human eye) as well as metadata about the photo, that is processed by the photo system 100. The photo system 100 can be connected to the network 11 so as to receive data from a variety of devices. The devices can be stationary in nature, like a desktop computer used for planning future location visits across the earth. The devices can be mobilized to include data identifying a current location and for establishing an area that is proximate to the user—and that is of immediate interest to the user. The photo system 100 can interface with the user device 20 so as to provide a variety of features to the user device 20. The photo system 100 can input data from the user device 20. The photo system 100 can output data to the user device 20.

The photo system 100 can include a computer processor (CP) 110 and a database portion 120. The CP 110 can include a variety of processing portions as illustrated. Additionally, the database portion 120 can include a variety of database portions as illustrated.

The CP 110 can include a general processing portion 111. The general processing portion 111 can perform various general processing so as to perform general operations of the photo system 100. The general processing portion 111 can perform processing based on instructions contained in the database portion 120. The general processing portion 111 can perform any of the processing required or desired (so as to provide functionality of the photo system 100) that is not handled by the more specialized processing portions 112-116. However, it should be appreciated that the processing performed by the general processing portion 111 can be specialized in and of itself so as to provide the various functionality described in this disclosure.

The CP 110 includes the area segmentation processing portion 112. The area segmentation processing portion 112 can handle segmentation processing as described herein. Accordingly, the area segmentation processing portion 112 can handle segmentation of an area, for example the world, into first level areas, second level areas, third level areas and so forth. The area segmentation processing portion 112 can handle segmentation down to the level of a "patch". The area segmentation processing portion 112 can handle various related processing.

The CP 110 also includes the photo input processing portion 113. The processing portion 113 can handle photo input processing as described herein. Such processing can include various processing related to the input of a photo, interfacing with a user in conjunction with input of a photo, processing that is performed once the photo is input, processing of metadata associated with the photo, and various related processing.

The CP 110 also includes the spot generation processing portion 114. The processing portion 114 can handle spot generation processing as described herein. Such processing can include generation of a "spot" once predetermined thresholds have been attained such that a particular area is to be identified as a spot, generation and saving of data in conjunction with generation of a spot, and various related processing.

The CP 110 can also include the user engagement processing portion 115. The processing portion 115 can handle user engagement processing as described herein. Such processing can include a wide variety of processing related to user engagement including using credentials to identify a current user, setting up a new user on the system, establishing preferences or settings of a user, and various related processing.

The CP 110 can also include the collective user processing portion 116. The processing portion 116 can handle collective user processing as described herein. Such processing can include various processing related to crowd sourced information, user review processing, user rating processing, user feedback processing, other processing that relates to interfacing with a plurality of users or other persons on an aggregated basis, and various related processing.

The photo system 100 can include the database portion 120. The database portion 120 can include a general database 121. The general database 121 can include various data used by and/or generated by the general processing portion 111.

The database portion 120 can include an area segmentation database 122. The area segmentation database 122 can include various data used by and/or generated by the area segmentation processing portion 112.

The database portion 120 can include a photo database 123. The photo database 123 can include various data used by and/or generated by the photo input processing portion 113.

The database portion 120 can include a spot generation database 124. The spot generation database 124 can include various data used by and/or generated by the spot generation processing portion 114.

The database portion 120 can include a user engagement database 125. The user engagement database 125 can include various data used by and/or generated by the user engagement processing portion 115.

The database portion 120 can include a collective user database 126. The collective user database 126 can include various data used by and/or generated by the collective user processing portion 116.

The photo system 100 can be in the form of or include one or more computer processors and one or more database portions 120. The photo system 100 can include or be in the form of a server. Various further details of the photo system 100 and the processing performed thereby are described below.

Figure 2:
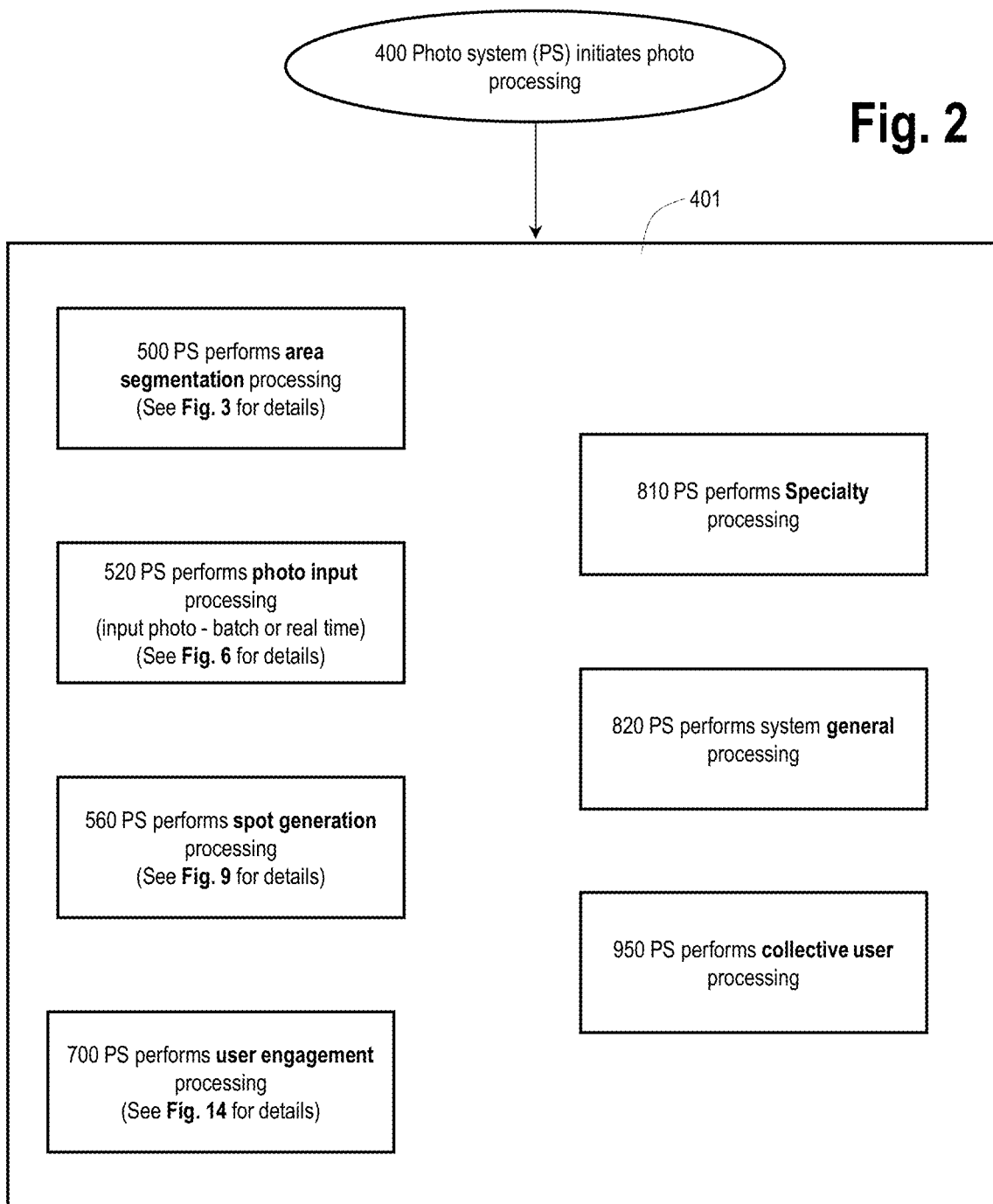
FIG. 2 is a high level flowchart illustrating processing that can be performed by the photo system (PS), in accordance with principles of the disclosed subject matter.

FIG. 2 is a high level flowchart illustrating processing that can be performed by the photo system 100, in accordance with principles of the disclosed subject matter. The processing can start in step 400 with initiating of photo processing. For example, step 400 can include enabling the system 100 or turning the photo system 100 "on".

The processing of FIG. 2 can pass from step 400 onto step 401. Step 401 illustrates various processing that can be performed by the system 100. The processing illustrated in step 401 can be performed in serial or in parallel relative to each other and need not be performed in the particular order illustrated in FIG. 2. In a particular implementation of the system 100, some processes of FIG. 2 can be performed or enabled and other processes may not be performed or enabled.

With reference to step 401 of FIG. 2, in step 500, the system can perform area segmentation processing. Further details are described below with reference to FIG. 3. In step 520, the system 100 can perform photo input processing. Such processing can include the input of photos in real time or in batch manner, for example. Further details are described below with reference to FIG. 6. In step 560, the system 100 can perform spot generation processing. Further details are described below with reference to FIG. 9. In step 700, the system 100 can perform user engagement processing. Further details are described below with reference to FIG. 14. In step 810, the system 100 can perform specialty processing. In step 950, the system 100 can perform collective user processing wherein the system engages with a plurality or mass of users to perform affinity groups processing, user following processing, assessment of ratings view processing, and related processing. In step 820, the system 100 can perform general processing. The various processing performed in step 401 can be performed by one or more of the processing portions in the CP 110. Further details are described below.

Figure 3:
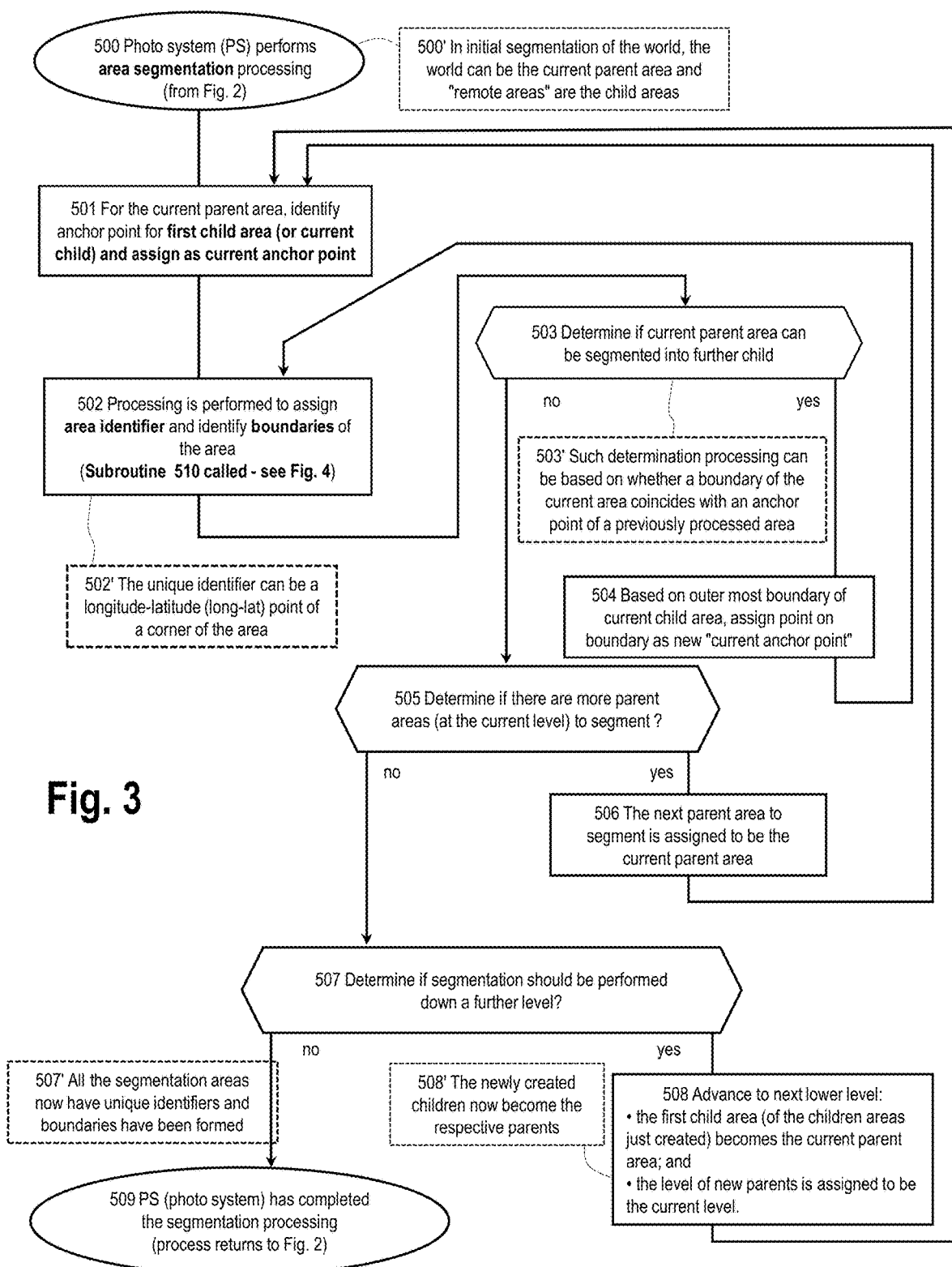
FIG. 3 is a flowchart showing further details of area segmentation processing, in accordance with principles of the disclosed subject matter.

FIG. 3 is a flowchart showing further details of the system 100 performs area segmentation processing, which can be called from the processing of FIG. 2, in accordance with principles of the disclosed subject matter. As illustrated, the processing starts in step 500 with segmentation of a predetermined geographic area, i.e., the world in this illustrative case. As reflected at 500', in initial segmentation of the world, the world can be a current parent area and "remote areas" can be child areas. That is, the processing of FIG. 3 illustrates processing in which a top down approach is utilized. In such processing, an initial area to be segmented can be segmented at a first level, each of the first level segmentations can then be segmented at a second level, and so forth—so as to attain a desired segmentation. Alternatively, a bottom up approach can be utilized. In a bottom up approach, the lowest level area can be segmented, a predetermined number of the lowest level areas can then be aggregated together so as to form a next higher up level, areas in the next higher up level area can then be aggregated so as to perform a further next higher up level, and so forth. In such manner, a desired segmentation can be attained. Accordingly, with bottom up segmentation processing, the system builds up from smallest child to largest parent. With top-down segmentation processing, the system builds down from largest parent to smallest child. In accordance with at least one embodiment of the disclosure, the largest parent can be the world, whereas the smallest child can be demarcated as a "patch" as described herein.

After the processing is initiated in step 500, the process passes onto step 501. In step 501, for the current parent area, the system can identify an anchor point for the first child area (or for the current child) and assign such anchor point as a current anchor point. The anchor point can be long-lat coordinates or other coordinates.

After step 501, the process passes onto step 502. In step 502, processing is performed to assign an area identifier and identify boundaries of the area. In such processing, subroutine 510 of FIG. 4 can be called.

As reflected at 502', the area identifier can be a unique identifier that can be a longitude-latitude point (long-lat) of a corner of the area. Accordingly, in one embodiment of the disclosure, one anchor point can identify location of the area and a height, width, or other geometrical extent can be used to identify boundaries of the particular area. In some embodiments of the disclosure, an upper left (in long-lat coordinates) and lower right (in long-lat coordinates) of the area can be used so as to define the area.

With either approach, a unique identifier can also be assigned to each area so as to be used in processing of the area. After step 502, processing passes onto step 503.

In step 503, the process determines if the current area, which can be referred to as a parent area, can be segmented into a further child (i.e. in addition to the children that have already been formed out of the parent area). Such processing component is indicative of a top down approach, in contrast to a bottom up approach. In other words, the decision processing of step 503 determines if the current area has been fully segmented out such that no further segmentation is needed (in order to segment the current area). As reflected at 503', such determination processing of step 503 can be based on whether a boundary of the current area coincides with an anchor point of a previously processed area. If a boundary of the current area does coincide with an anchor point, such can indicate that the processing has reached the end or limit of the current area. In some embodiments, the processing can advance in a horizontal manner—to segment across an area—until a boundary is reached. Then, the processing can start a new "row" below the row that was just segmented. In such manner, for a given area, the processing can advance across and drop down a row; across and drop down a row; across and drop down a row; and so forth until the particular area has been fully segmented. However, other methodologies can be used.

With further reference to step 503 of FIG. 3, if the decision of step 503 is yes, then the processing passes onto step 504. In step 504, based on an outer most boundary of the current child area, the process can assign a point on such boundary as a new "current anchor point". More specifically, the process may assign the upper point on a right boundary line as the new "current anchor point". If the upper point on the right boundary line has already been assigned to be an anchor point, or is positioned outside the current area being processed—then the system can know that the particular row is completed. Upon such determination, the process can "drop down" a row so as to segment the next row.

Once the new current anchor point is identified/determined in step 504, the processing passes back to step 502. In step 502, processing continues as described above.

On the other hand, it may be determined in step 503, that the current parent area cannot be segmented so as to form a further child. In other words, a no determination in step 503 indicates that the current parent area has been fully segmented into child areas. As a result, the process passes from step 503 onto step 505.

In step 505, the processing determines if there are more parent areas (at the current level) to segment. If yes, then the process passes onto step 506.

In step 506, the next parent area to segment is assigned to be the current parent area. The process passes from step 506 back to step 501. Processing then continues as described above. On the other hand, it may be determined that there are not more parent areas (at the current level) to segment. Such no determination in step 505 indicates that all the areas at the current level have been segmented out, i.e. such that children of the current parent have been created. Accordingly, the process passes from step 505 onto step 507.

In step 507, the processing determines if segmentation should be performed down a further level. If yes in step 507, the processing passes onto step 508. In step 508, the process advances to the next lower level. Accordingly, the first child area (of the children areas just created) becomes the current parent area.

Also, the level of the new parents is assigned to be the current level. More generally, as reflected at 508', the newly created children now become the parents. The processing passes back to step 501. In step 501, the processing continues as described above.

It may be determined in step 507, that segmentation is not to be performed down a further level, i.e. that the segmentation processing has indeed attained the lowest level to be segmented. Such lowest level can be the "patch" level as described herein. As reflected at 507', a no determination in step 507 reflects that all of the segmentation areas now have unique identifiers and that all boundaries of the areas have been formed. Accordingly, the process passes from step 507 onto step 509. In step 509, the system has completed the segmentation processing. Accordingly, the process returns to FIG. 2.

Figure 4:
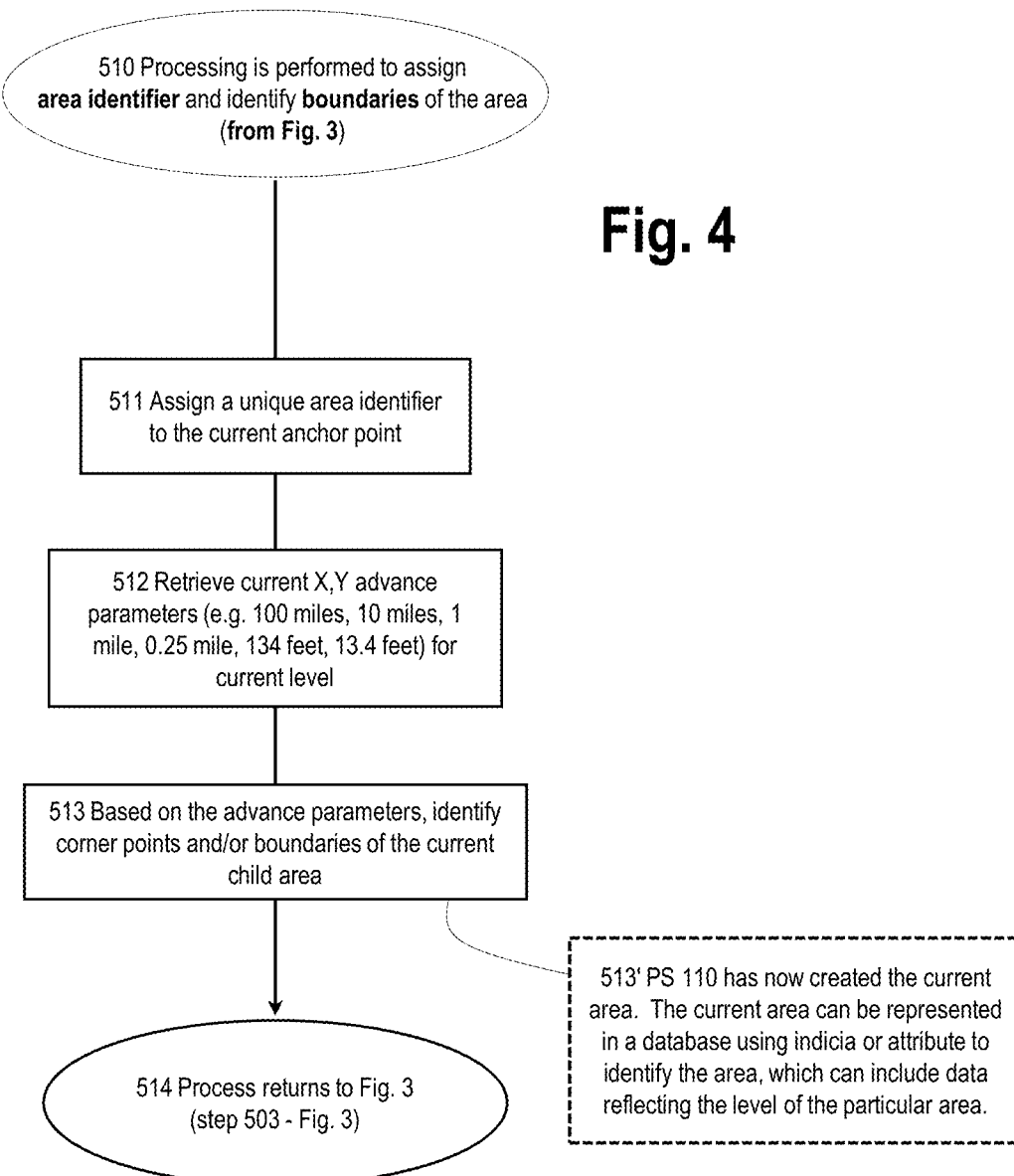
FIG. 4 is a flowchart showing details of "processing is performed to assign area identifier and identify boundaries of the area" in accordance with principles of the disclosed subject matter.

FIG. 4 is a flowchart showing details of "processing is performed to assign area identifier and identify boundaries of the area" of subroutine 510 as called from FIG. 3, in accordance with at least one embodiment of the disclosed subject matter. As shown, the process starts in step 510 and passes onto step 511. In step 511, the system assigns a unique area identifier to the current anchor point. In one embodiment, the unique area identifier can correspond to one corner of the area using longitude and latitude values. Then, the process passes onto step 512.

In step 512, the system can retrieve current X, Y advance parameters for the current level. The current advance parameters can dictate magnitude of a new area to be formed, or in other words to be segmented out. If the X, Y advance parameters are 10 miles, 10 miles, respectively—then an area that is 10 miles wide and 10 miles high will be created. Such X, Y advance parameters can be utilized to create the segmentation areas described above. Such segmentation areas can include remote, territory, sector, quadrants, local, and patch. Accordingly, it should be appreciated that as the system performs segmentation processing, the system can retrieve the particular X, Y advance parameters that correspond to the current level being processed. The X, Y advance parameters can be selected so as to evenly segment a current parent area into children areas. In at least some embodiments, it may be the case that all the children areas are not of the same magnitude in square miles or in square feet, for example. Additionally, the advance parameters can be more complex than X, Y advance parameters. More complex advance parameters can be used when segmenting more complex geographical areas, such as the circular curvature of the world or globe.

After step 512, the process passes onto step 513. In step 513, based on the advance parameters, the system identifies corner points and/or boundaries of the current child area. As a result, as reflected at 513', the CP 110 has now created a new current area.

After step 513, the process passes onto step 514. In step 514, the process returns to FIG. 3. Specifically, the process passes onto step 503 of FIG. 3.

Figure 5:
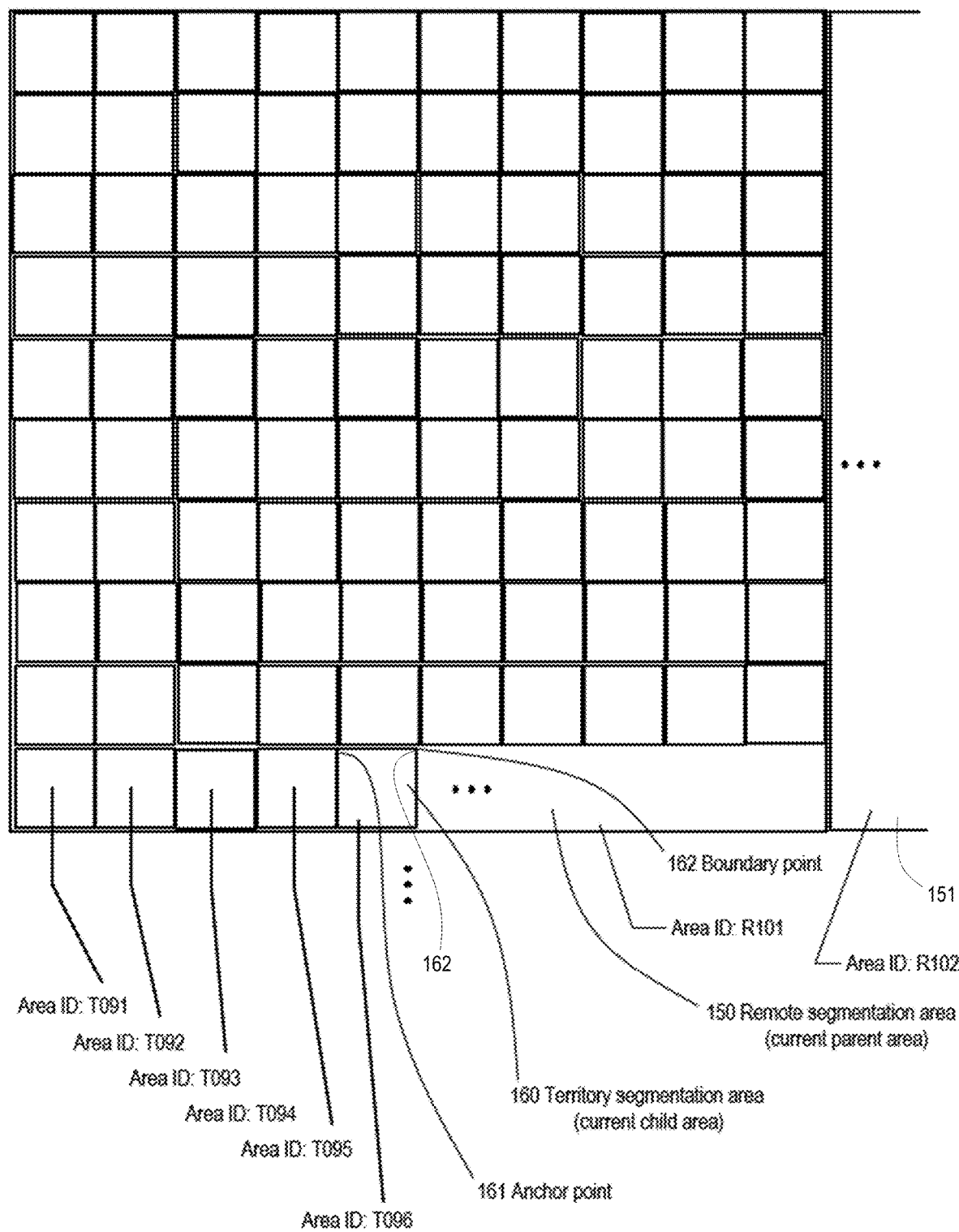
FIG. 5 is a diagram showing segmentation of a remote segmentation area, in accordance with principles of the disclosed subject matter.

FIG. 5 is a diagram showing segmentation of a remote segmentation area 150. In the example, a "remote" area is the current parent area and "territory" children areas are being formed/segmented out of such parent area 150. As shown in FIG. 5, segmentation of the area 150 (current parent area) into children areas is almost complete, i.e. with five children areas to be formed or further segmented out. The current child area 160 has been assigned an area ID (i.e. an area identification or area identifier) of T096. Such area T096 possesses an anchor point 161. In this example, the anchor point 161 can be an upper left hand corner (in long-lat coordinates) of the area T096. The area T096 can also include a boundary point 162. The boundary point 162 can be provided at the upper right-hand corner of the area T096. The boundary point 162 may have been identified by the current X, Y advance parameters as described above with reference to step 512 of FIG. 4. Once the territory area 160 is saved into memory, the processing can then use the boundary point 162 as the next anchor point—for the next territory area to be segmented out. Such is illustrative of the processing of step 504 of FIG. 3. The area 160 can be defined based on a predetermined height (as shown in FIG. 5) so as to define the two-dimensional area. The area can be defined so as to be square—and thus the distance between the points 161 and 162 can also serve to define the height (as shown in FIG. 5) of the two-dimensional area 160, as well as the height.

As illustrated in FIG. 5, after the formation of the area 160, the system has five more territory levels to form (in the remote area 150) in order to fully segment out the remote area 150. The system, i.e. the CP 110, can determine that segmentation is complete once (1) an upper right boundary point 162 of an area corresponds to a right hand boundary of the area 150 and (2) a lower right boundary 162 corresponds to a lower boundary of the area 150, for example.

Once segmentation of the current parent area 150 is completed, then the processing can advance to the next parent area (at the current level). That is, the processing can advance from the remote area 150 onto the remote area 151.

Figure 6:
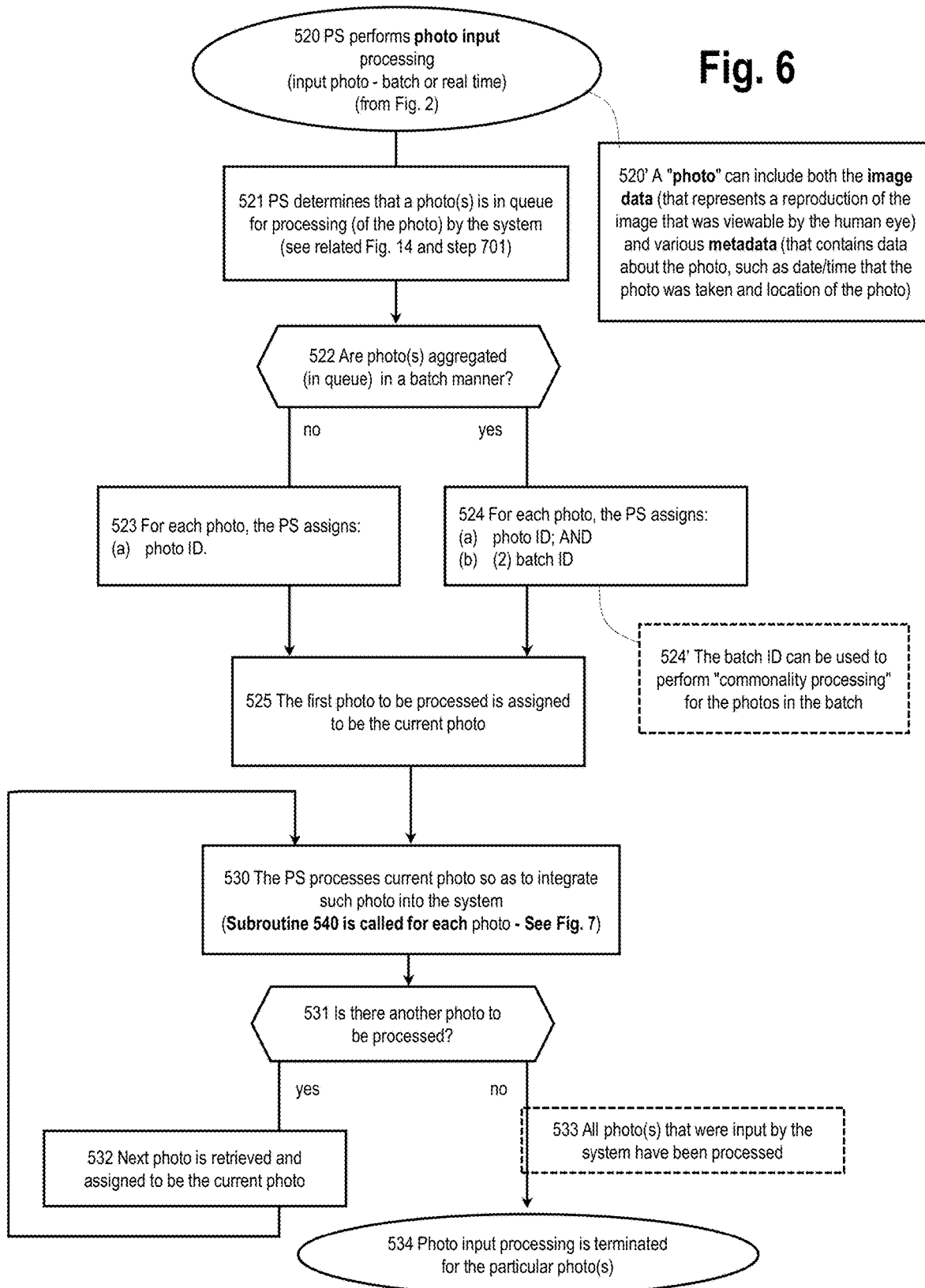
FIG. 6 is a flowchart showing details of the "photo system performs photo input processing", in accordance with principles of the disclosed subject matter.

FIG. 6 is a flowchart showing details of the "photo system (PS) 100 performs photo input processing" of step 520 of FIG. 2, in accordance with principles of the disclosed subject matter. Such processing can include the inputting of a photo or photos with either batch or real time processing, for example. As shown, the process starts in step 520 and passes onto step 521.

As reflected at 520', a "photo" or "photo data" can include both image data (that represents a reproduction of the image that was viewable by the human eye) and various metadata (that contains data about the photo, such as date/time that the photo was taken and location of the photo). The location data of a photo can be in the form or include a point or geographical point. For example, the point can be the longitude-latitude (long-lat) at which the photo was taken.

In step 521 of FIG. 6, the system determines that one or more photos are in queue for processing of the one or more photos by the system 100. Accordingly, the processing of step 521 assumes that one or more photos are in queue for processing. After step 521, the process passes onto step 522.

In step 522, the system determines if the one or more photos are aggregated (in queue) in a batch manner.

In other words, processing can determine if a group of photos has been uploaded to the system in a batch manner. In such situation, it may be desirable or beneficial to capture the fact that such photos were input together in a batch manner. In other words, it may be beneficial to capture such interrelationship between such uploaded photos. The processing of step 524 provides such capture of interrelationship between the photos. That is, if yes in step 522, the process then passes onto step 524. In step 524, for each photo, the system assigns both a photo ID (identification or identifier) and a batch ID. The batch ID can be common to all photos in the particular batch. Accordingly, the interrelationship or association between the photos in the batch can be captured in the database portion 120. As shown at 524', the batch ID can be used to perform "commonality processing" for the photos in the batch. After step 524, the processing passes onto step 525.

On the other hand, it may be the case in step 522 that the photos are not aggregated in a batch manner or that there is only one photo in queue for processing. As a result, the process passes from step 522 onto step 523. In step 523, for each photo, the system assigns a photo ID. The process then passes onto step 525.

In step 525, the first photo to be processed is assigned to be the current photo. Then, in step 530, the system processes the current photo so as to integrate such photo into the system. Such processing can include integration into the database and photo inventory of the system. Subroutine 540, of FIG. 7, can be called upon so as to process each photo. Then, after step 530, the processing passes onto step 531. In step 531, a determination is performed by the system of whether there is another photo to be processed. If yes, then the processing passes onto step 532.

In step 532, the system retrieves the next photo and assigns such retrieved photo to be the "current photo" in the processing. Processing then passes back to step 530. Processing then continues as described above.

Alternatively, it may be determined in step 531, that there is not another photo to be processed.

Accordingly, a no determination is determined in step 531. As shown at 533, such reflects that all photo or photos that were input by the system have been processed. With such determination, the processing passes from step 531 onto step 534. In step 534, photo input processing is terminated for the particular photo(s) or for the particular batch of photos.

Figure 7:
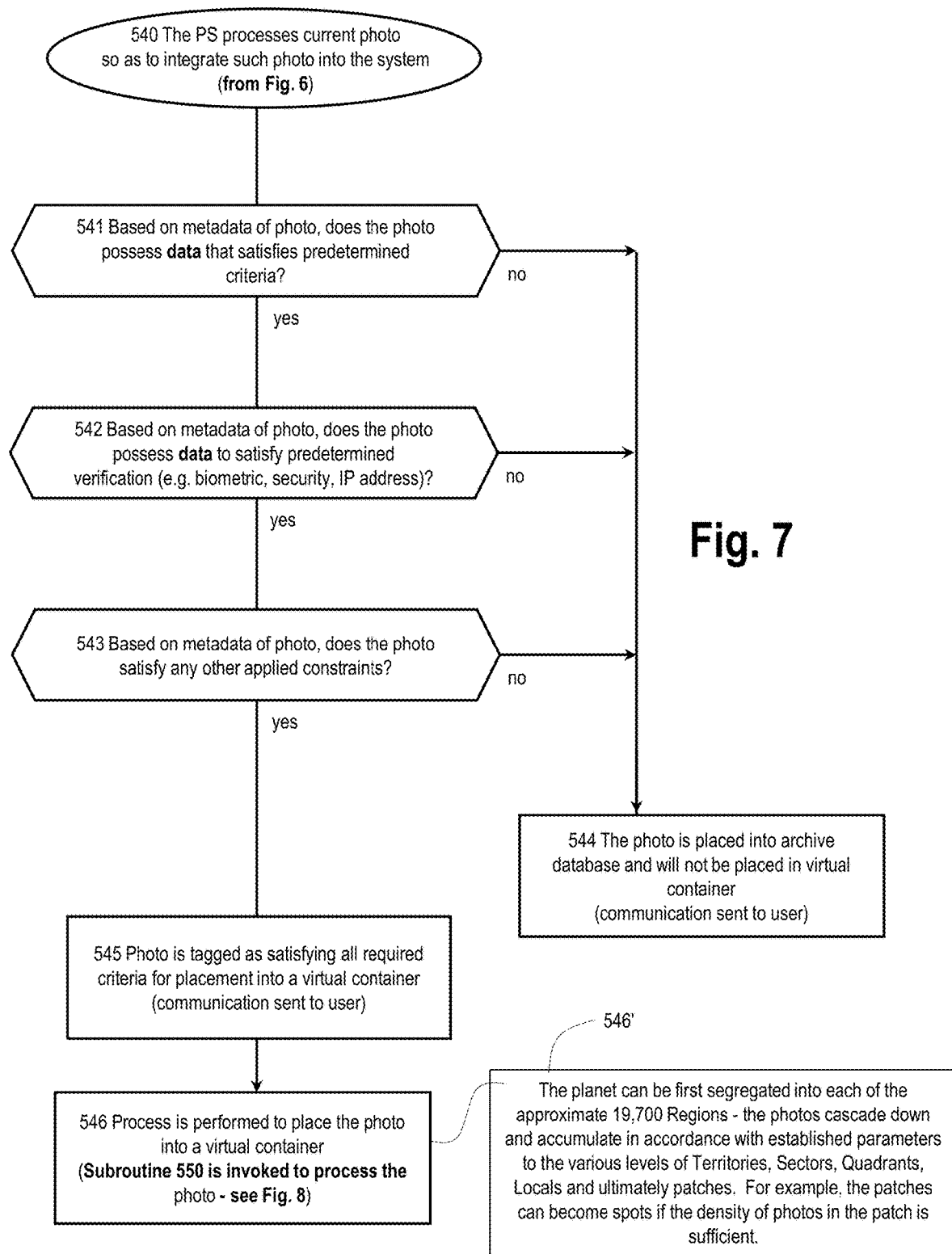
FIG. 7 is a flowchart showing further details of the system "processes current photo so as to integrate such photo into the system" in accordance with principles of the disclosed subject matter.

FIG. 7 is a flowchart showing further details of the system "processes current photo so as to integrate such photo into the system" of subroutine 540 as called from FIG. 6, in accordance with at least one embodiment of the disclosed subject matter. As shown, the process starts in step 540 and passes onto step 541. In step 541, the system determines, based on metadata of the photo, does the photo possess metadata that satisfies predetermined criteria. For example, the processing of step 541 can relate to determining whether the metadata contains appropriate location data that can include longitude and latitude data, appropriate date and time data, data indicating a source of the image such as a particular user, and other requisite data. If no in step 541, the process passes onto step 544. In step 544, the photo can be placed into an archive database or other suitable database and will not be placed in a virtual container, in at least one embodiment of the disclosure. In other words, the photo will not be placed into the active inventory of the system. A communication can be sent to the originating user indicating that the metadata associated with the photo was insufficient to be included in the photo system.

If a yes determination is determined in step 541, then the process passes onto step 542. In step 542, based on metadata of the photo, the system determines whether the photo possesses data to satisfy predetermined verification requirements. For example, was appropriate biometric data included with the photo for verification of the photo, were other security protocols satisfied, and/or was an appropriate IP address of a source user device received. If no, than the processing passes to step 544. In step 544, processing is performed as described above.

If yes in step 542, the process passes onto step 543. In step 543, the processing can determine, based on the metadata of the photo, does the photo satisfy any other applied constraints. If no, then the processing again passes to step 544.

On the other hand, if yes in step 543, then the process passes onto step 545. In step 545, the photo is tagged as satisfying all required criteria for placement into a virtual container or in other words for the photo to be placed in the active inventory of the system as an active photo. As a result, a communication can be sent to the user. Such communication can be of a congratulatory nature indicating that his or her input photo has been successfully input into the photo system 100. Then, the processing passes onto step 546.

Figure 8:
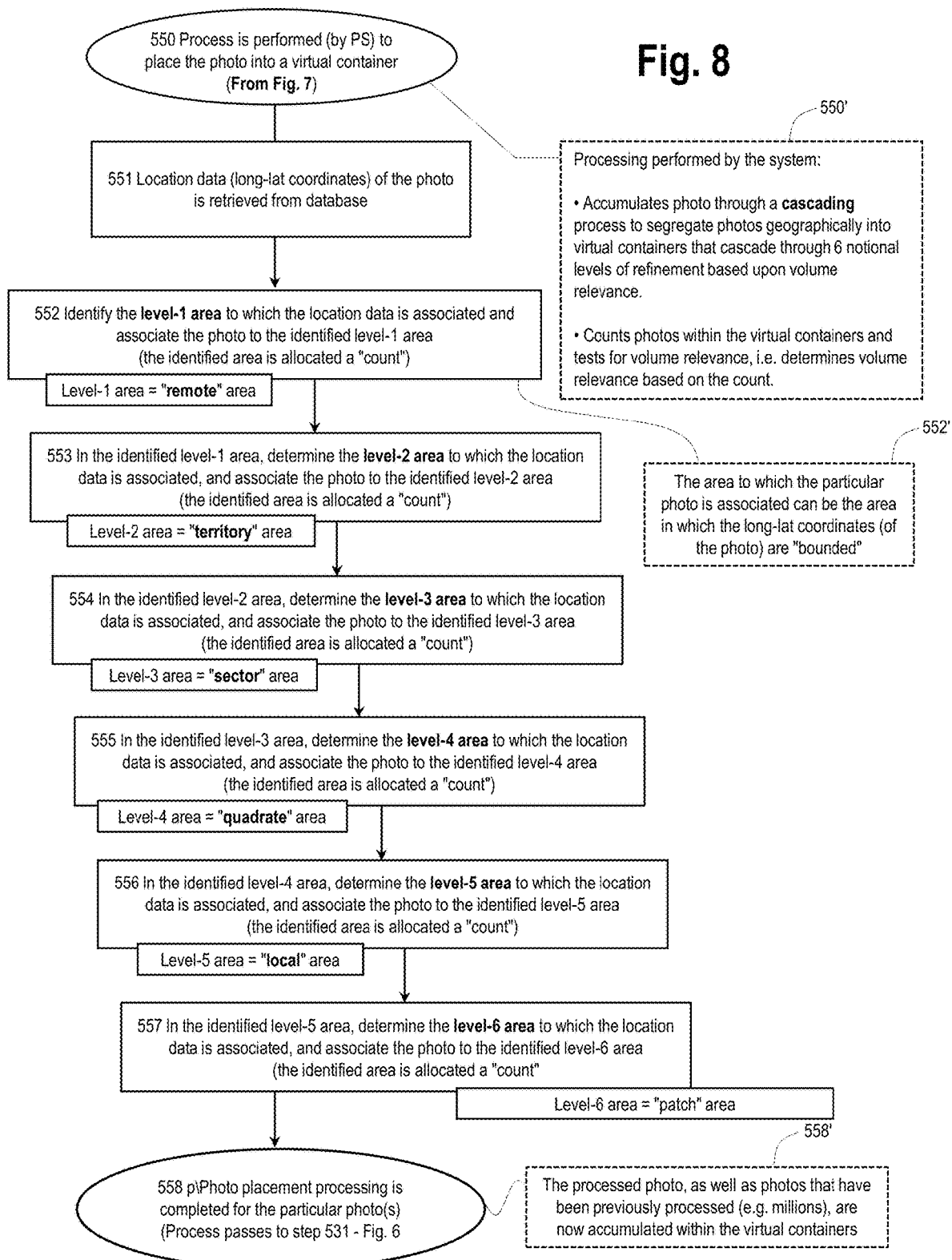
FIG. 8 is a flowchart showing processing "to place a photo into a virtual container," in accordance with principles of the disclosed subject matter.

In step 546, processing is performed to place the photo into a virtual container. Subroutine 550 can be invoked to process the photo, as shown in FIG. 8. As shown in FIG. 7 and reflected at 546', a particular area, such as the world or planet, can be first segregated into one of the approximately 19,700 remote areas. The input photos can cascade down and accumulate in accordance with established parameters to the lower levels of territories, sectors, quadrants, locals, and ultimately patches.

FIG. 8 is a flowchart showing in further detail subroutine 550 (called from the processing of FIG. 7) that can include processing to place the photo into a virtual container, in accordance with at least one embodiment of the disclosure. As is shown at 550', the processing of FIG. 8 can include various components. The processing can accumulate photos through a cascading process to segregate photos geographically into virtual containers that cascade through 6 levels of refinement based upon volume relevance. The processing can count the photos within each of the virtual containers and test for volume relevance. In other words, the processing can determine volume relevance based on a count of photos in a virtual container.

The processing of FIG. 8 starts in step 550 and passes onto step 551. In step 551, location data of the photo is retrieved from the appropriate database. Then, in step 552, the process identifies the particular level-1 area to which the location data is associated and associates the photo to the identified level-1 area. The level-1 area can be one of the "remote" areas as described herein. As reflected at 552', the area to which the particular photo is associated can be the area in which the longitude and latitude coordinates of the photo are bounded. In other words, the area to which the particular photo is associated can be the area in which the photo is located. Then, the process passes onto step 553.

In step 553, in the identified level-1 area, which was identified in step 552, the processing determines the level-2 area to which the photo is associated. The processing then associates the photo to the identified level-2 area. Such identified area is then allocated a count.

In step 554, in the identified level-2 area, which was identified in step 553, the processing determines the level-3 area to which the data is associated. The processing then associates the photo to the identified level-3 area. Such identified area is then allocated a count.

In step 555, in the identified level-3 area, which was identified in step 554, the processing determines the level-4 area to which the photo is associated. The processing then associates the photo to the identified level-4 area. Such identified area is then allocated a count.

In step 556, in the identified level-4 area, which was identified in step 555, the processing determines the level-5 area to which the photo is associated. The processing then associates the photo to the identified level-5 area. Such identified area is then allocated a count.

In step 557, in the identified level-5 area, which was identified in step 556, the processing determines the level-6 area to which the photo is associated. The processing then associates the photo to the identified level-6 area. Such identified area is then allocated a count. The level 6 area can be a patch or patch area.

Accordingly, as shown in FIG. 8, cascade processing can be utilized so as to associate an input photo into a respective virtual container for each of the levels. After step 557 of FIG. 8, the processing passes onto step 558. In step 558, photo placement processing is completed for the particular photo. As reflected at 558', the processed photo, as well as photos that have been previously processed are now accumulated within the various virtual containers. Such photos can be in the many to thousands or millions.

Each "area", as described herein, can constitute or include a "virtual container" and/or be represented by a virtual container. Accordingly, for example, each of the "patches" as described herein can constitute a virtual container.

In step 558, the processing can pass back to step 531 of FIG. 6. Processing can then continue as described above.

Figure 9:
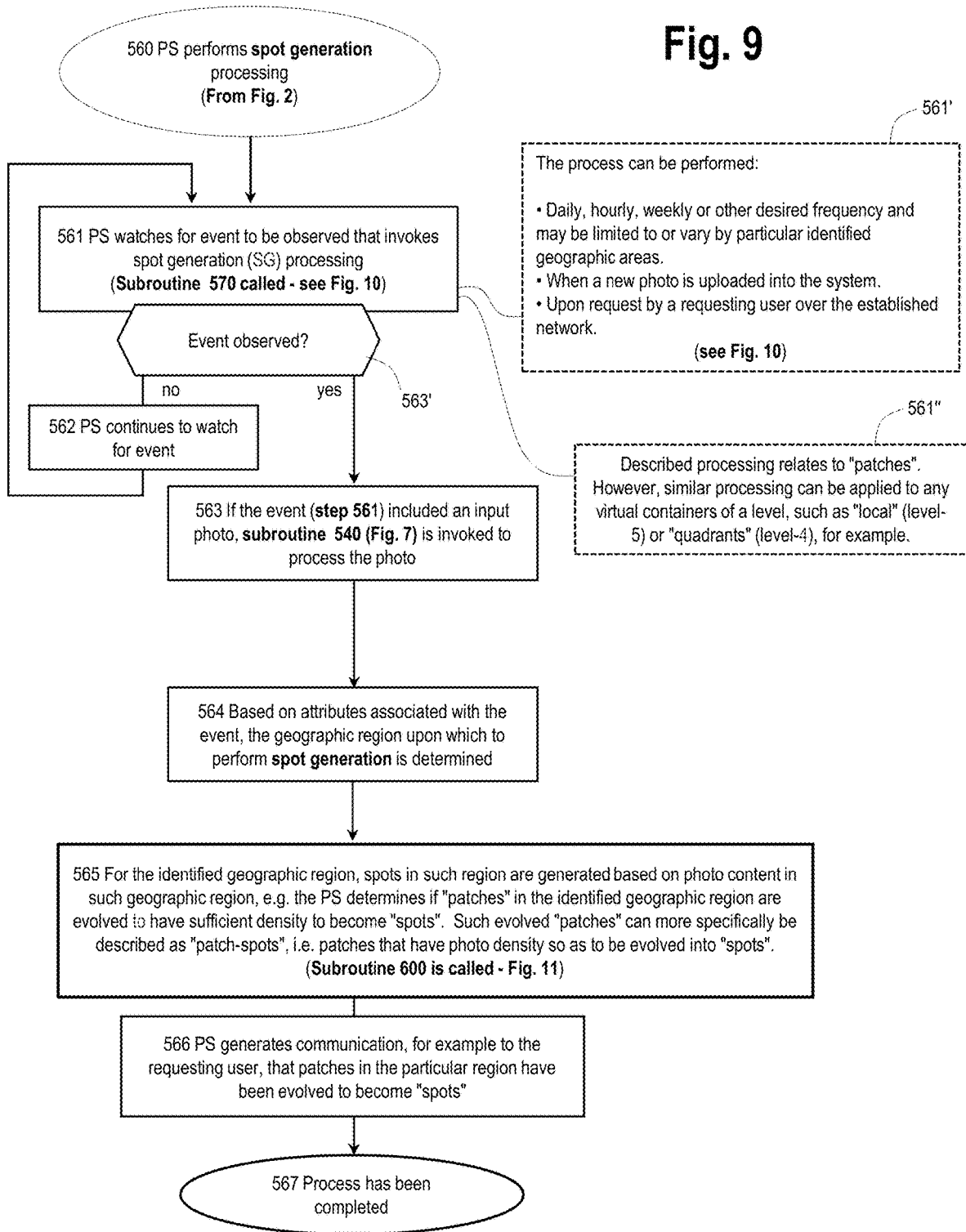
FIG. 9 is a flowchart showing further details of the "system performs spot generation processing", in accordance with principles of the disclosed subject matter.

FIG. 9 is a flowchart showing further details of the "system performs spot generation processing" subroutine 560 of FIG. 2, in accordance with principles of the disclosed subject matter.

As described above, a "patch" can be a smallest area of the various areas that are segmented out. A "patch" can be approximately 13×13 feet, for example. In "spot" generation processing, a "patch" can be elevated to a "spot"—depending on attributes of the particular patch. Such attributes can include the density of photos in the particular patch. If the density of photos surpasses a predetermined threshold, the "patch" can be elevated to the stature of a "spot". Once elevated, such spot can be subject to various processing, such as being identified in search results and/or be given a higher ranking or rating.

As shown in the processing of FIG. 9, the process starts in step 560 and passes onto step 561. In step 561, the system watches for an event to be observed that invokes spot generation (SG) processing. In performing such processing of step 561, subroutine 570 can be called upon or invoked. Further details are described with reference to FIG. 10 below.

Relatedly, as is shown at 561', the process of step 561 can be performed at various times. For example, the processing of step 561 can be performed daily, hourly, weekly, or at other desired frequency and may be limited to or vary by particular identified geographic area. The processing of step 561 can be performed when a new photo is uploaded into the system. The processing of step 561 can be performed upon request by a requesting user over an established network. Further details are described below with reference to FIG. 10.

Based upon the system watching for an event in step 561, in step 563', the system can perform a determination of whether an event was indeed observed. If no in step 563', the system continues to watch for an event as reflected at 562. Accordingly, the processing loops back to step 561 and continues as described above.

On the other hand, if yes in step 563', the process passes onto step 563. In step 563, if the event, which was identified in step 561, included an input photo—then a subroutine can be invoked to process the photo. Specifically, the subroutine 540 of FIG. 7 can be invoked to process the photo. Then, the process passes onto step 564. In step 564, based on attributes associated with the event, the geographic region upon which to perform spot generation is determined. Then, the process passes onto step 565.

In step 565, for the identified geographic region, spots in such region are generated based on photo content in such geographic region. In other words, patch areas in the identified geographic region can be evolved to be spots. Subroutine 600 can be called as shown in further detail in FIG. 11 and described below.

After step 565, the process passes onto step 566. In step 566, the system generates a communication that patches in the particular region have been involved to spots. For example, a communication can be generated and output to a requesting user or to a user that submitted a photo that contributed, in some particular way, to the promotion of a patch to spot. Then, the process passes onto step 567. Step 567 reflects that the processing has been completed. In other words, the processing of the subroutine 560, as shown in FIG. 9, is completed. It should be appreciated that various other processing and subroutines as shown in FIG. 2 can be continued or further called upon as otherwise described herein.

As reflected at 561", the described processing relates to "patches". However, similar processing can be applied to any virtual containers of a level, such as "local" (level-5) or "quadrants" (level-6), for example. A "local" area that has evolved into a spot can be described as a "local-spot".

Figure 10:
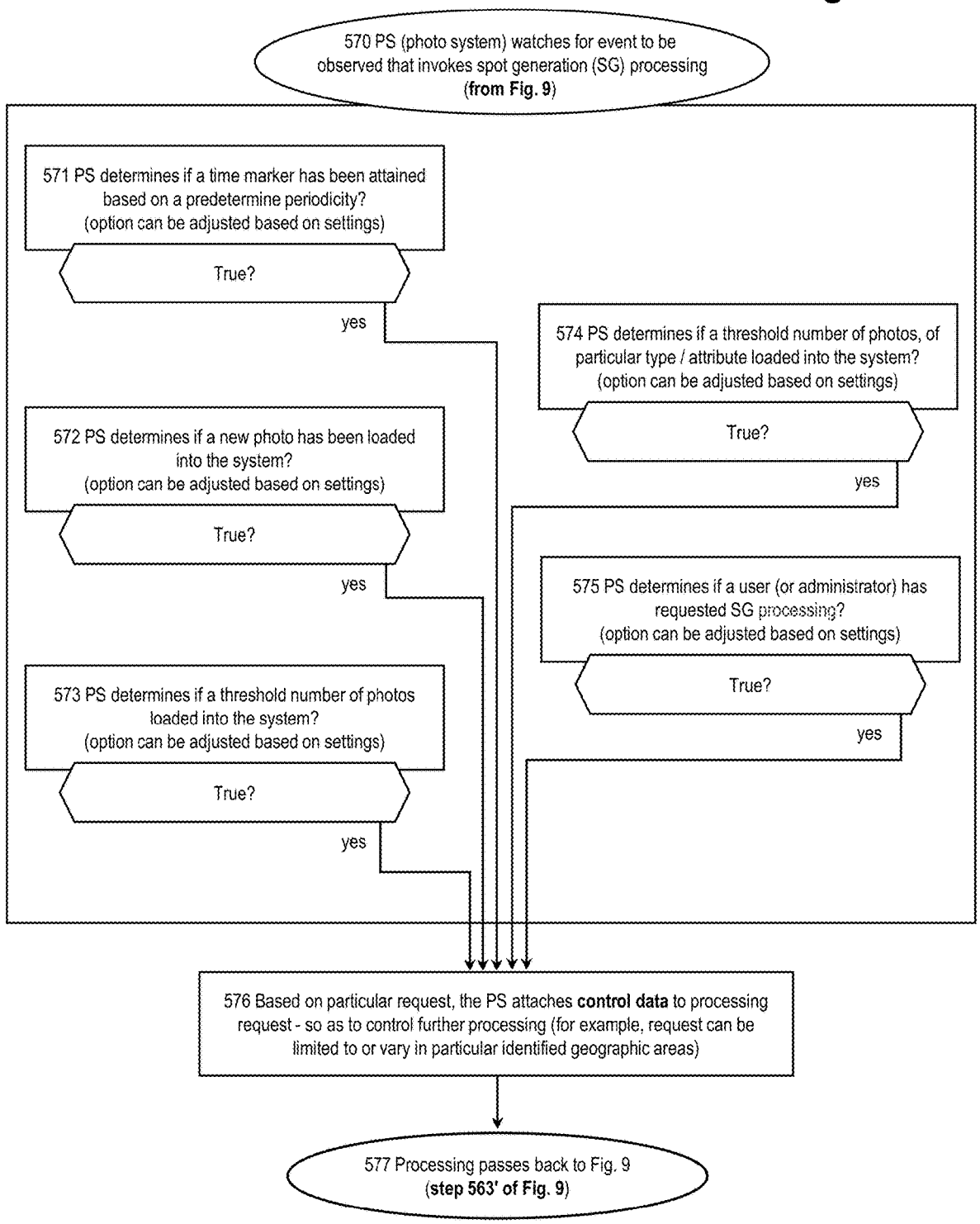
FIG. 10 is a flowchart showing in further detail the "system watches for an event to be observed that invokes spot generation processing" in accordance with principles of the disclosed subject matter.

FIG. 10 is a flowchart showing in further detail the "system watches for an event to be observed that invokes spot generation processing" subroutine 570, as called from FIG. 9. The processing of step 570 of FIG. 10 can include various components 571, 572, 573, 574, and 575. These various processing components can be performed in parallel using respective subroutines that can be performed by the system 100. In step 571, the system can determine if a time marker has been attained based on some predetermined periodicity. In step 572, the system can determine if a new photo has been loaded into the system. In step 573, the system can determine if a threshold number of photos have been loaded into the system. In step 574, the system can determine if a threshold number of photos of a particular type or attribute have been loaded into the system. In step 575, the system can determine if a user or administrator has requested spot generation (SG) processing.

Accordingly, the system can determine if various "triggers" of steps 571, 572, 573, 574, and 575 have been satisfied—so as to enable or activate the processing of each of such steps. Enablement (i.e. whether the processing of such steps is available) of any of such steps 571, 572, 573, 574, and 575 can be performed through suitable settings, which can be controlled by an administrator or user. Additionally, thresholds, parameters, or other attributes of any of the steps 571, 572, 573, 574, and 575 can be adjusted by an administrator or user as may be desired. It should be appreciated that processing of some of the steps 571, 572, 573, 574, and 575 may be enabled, whereas other steps are not enabled.

With further reference to FIG. 10, if a yes determination is determined in any of the various steps 571, 572, 573, 574, and 575, the processing can pass onto step 576 of FIG. 10. In step 576, based on the particular request, the system can attach control data to the processing request. This control data can control processing of the request. For example, the request can be limited to a particular geographic area, such that only "patches" in such geographic area are processed for possible elevation to spot status.

After step 576, the process passes onto step 577. In step 577, the processing passes back to FIG. 9—and specifically passes to step 563'.

Figure 11:
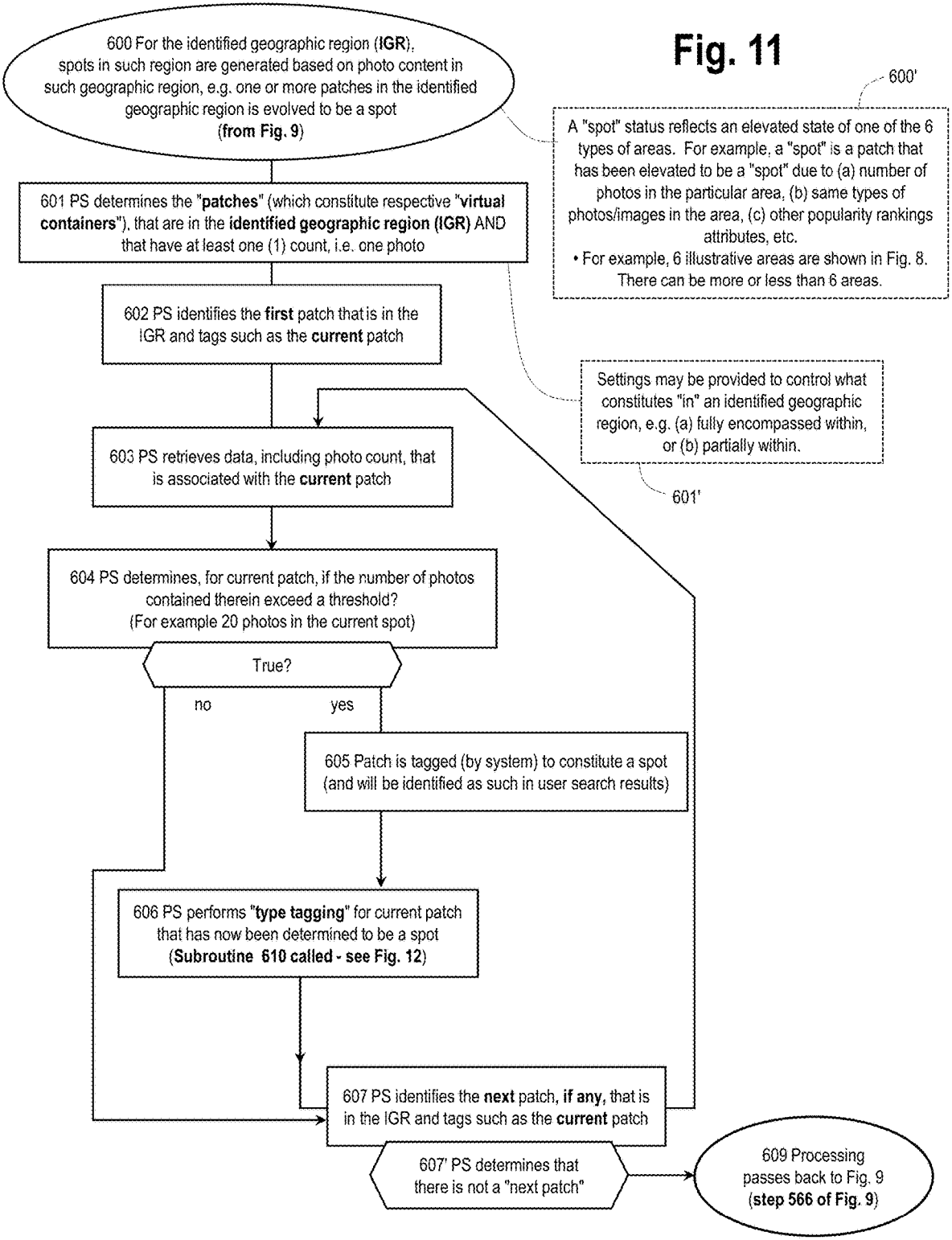
FIG. 11 is a flowchart showing further details of a "spot generation processing" subroutine, in accordance with principles of the disclosed subject matter.

FIG. 11 is a flowchart showing further details of a "spot generation processing" subroutine 600, as called from FIG. 9, in accordance with principles of the disclosed subject matter.

More specifically, the processing of FIG. 11 relates to the consideration of patches, in a predetermined geographical region, that may be promoted to the status of spots. The patches in the particular geographic region, or in other words an "identified geographic region (IGR)", can be considered for promotion based on photo content in such geographic region.

The processing of FIG. 11 starts in step 600 and passes to step 601. In step 601, the system determines the various "patches" that are in the identified geographic region (IGR) AND that have at least one (1) count, i.e. at least one photo associated with the patch, in accordance with at least one embodiment of the disclosed subject matter. As described above, a patch can be in the form of or include a virtual container in which photos are placed (or associated with). An identified geographic region may be all the patches in a particular "local"; all the patches around a particular point of interest; all the patches in a particular geographic region, such as along a coast line; or all patches that have some other common attribute or that are identified for processing and some suitable manner. Additionally or alternatively, patches can be processed in some sequential manner. Accordingly, the processing of step 601 contemplates that not all patches in the world or country, for example, will be processed at the same time. Rather patches can be carved out and processed in groups and/or processed sequentially dependent on processing capabilities and bandwidth that is available.

After the processing identifies the patches to processed in step 601, the processing passes onto step 602. In step 602, the system identifies the first patch that is in the IGR and tags such as the current patch. Such tagging can identify the particular patch as being the next patch to be processed. After step 602, the process passes onto step 603.

In step 603, the system retrieves data, including photo count, that is associated with the current patch. In other words, how many photos have been associated with the particular patch. Then, the process passes onto step 604.

In step 604, the system determines, for the current patch, if the number of photos contained therein exceed a threshold. For example, the threshold could be 20 photos that have been associated with the current patch. If 20 photos have not been associated with the current patch, then a no is rendered in the processing of step 604. As a result, the process passes from step 604 onto step 607.

On the other hand, a yes determination may be rendered in the processing of step 604. Such yes determination reflects that the current patch has indeed attained 20 photos associated therewith. Based on the yes determination in step 604, the process passes onto step 605. In step 605, the current patch is tagged (by the system) to constitute a "spot". In accordance with at least one embodiment of the disclosure, a patch designated as a spot will then be rendered in search results, as further described below.

On the other hand, a patch that has not been involved to be a spot may not be rendered in search results.

After step 605 of FIG. 11, the process passes onto step 606. In step 606, the system performs "type tagging" for the current patch, which has now attained spot status. Such elevated patches can be deemed a "patch-spot". To perform the processing of step 606, subroutine 610 can be called as described below with reference to FIG. 12. The type tagging of step 606 can also be performed for patches that have not attained the predetermined threshold (step 604).

After step 606, the process passes onto step 607.

In step 607, the system identifies the next patch, if any, that is in the identified geographic region (IGR) and tags such next patch as the current patch. As reflected in the processing of step 607', the system may determine that there is not a next patch. As a result, the process passes onto step 609. In step 609, the processing passes back to FIG. 9—and specifically passes onto step 566 of FIG. 9.

With further reference to FIG. 11, and in the situation that there is indeed a further patch or next patch identified in step 607, the processing passes from step 607 back to step 603. In step 603, the system retrieves data, including photo count, that is associated with the current patch. Processing then continues as described above.

As shown at 600' (FIG. 11), a "spot" status can reflect an elevated state or status of any of the 6 types of areas, and not just a "patch". Relatedly, the processing of FIG. 11, and in particular step 604, is based on whether a particular photo count has been attained by a particular patch. However, the systems and methods are not limited to such particulars. For example, a "spot" can be a local or other area that has been elevated to be a "spot" due to (a) number of photos in the particular area, (b) same types of photos in the particular area that exceed some threshold, and/or (c) based on other popularity rankings, attributes, etc. that have been attained in the particular area.

In accordance with principles of the disclosed subject matter, the location of a photo can be a point, i.e. a longitude/latitude point (long/lat point). The area to which the photo is to be associated can be determined mathematically—by determining the particular area in which the photo is bounded. Relatedly, there may by a case in which an area, such as a patch, is not fully encompassed with an identified geographic region (IGR). For example, an area might be generated to be around a landmark or an area might be drawn or designated by a user. Such area might be split or cross-over two or more IGRs. In such a situation, settings may be provided to control what constitutes "in" an identified geographic region, e.g. (a) fully encompassed within, or (b) partially within. Thus, for example, if a particular patch is only partially in an IGR to be processed (step 601 of FIG. 11), then such patch may indeed be processed based on an inclusive setting. However, it may be that another setting dictates that a particular patch has to be fully within an IGR. Other parameters and/or attributes of a patch (or other area) and/or a particular IGR can be utilized so as to dictate whether a patch will be processed or will not be processed in a particular IGR.

Figure 12:
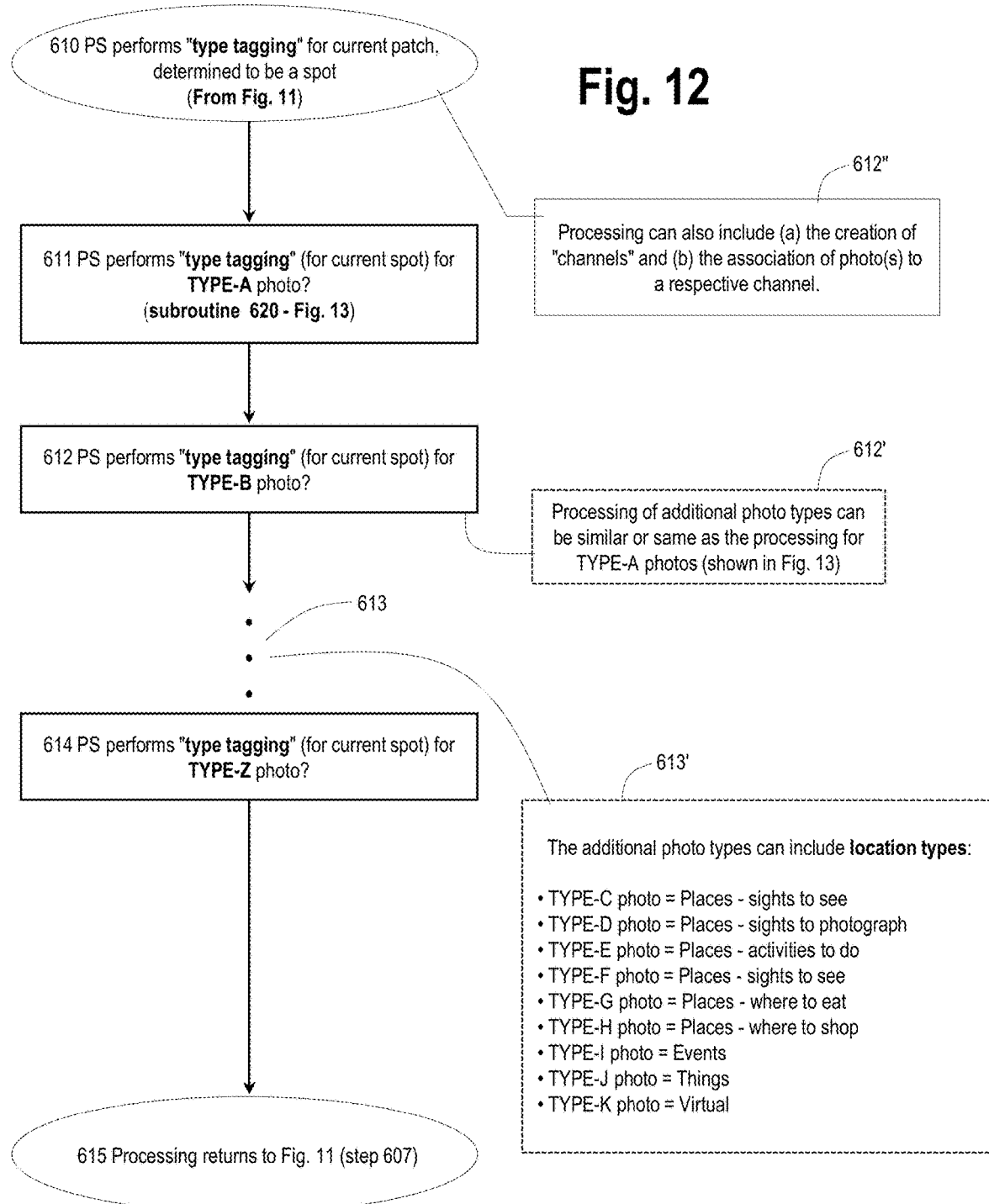
FIG. 12 is a flowchart showing in further detail the system performs "type tagging" for a current patch, in accordance with principles of the disclosed subject matter.

FIG. 12 is a flowchart showing in further detail the system performs "type tagging" for the current patch of subroutine 610 of FIG. 11, in accordance with principles of the disclosed subject matter.

The process begins in step 610 and passes onto step 611. In step 611, the system performs "type tagging" for the current patch for a type-A photo. The processing of step 611 can call upon the subroutine 620 of FIG. 13. Then, the process passes onto step 612.

In step 612, the system performs "type tagging" for the current spot for a type-B photo. In step 614, the system performs "type tagging" for the current spot for a type-Z photo. As reflected at 613 of FIG. 12, it should be appreciated that processing can be performed for any desired number of "types" of photos. For example, as shown at 613', additional photo types can include a variety of location types.

Figure 13:
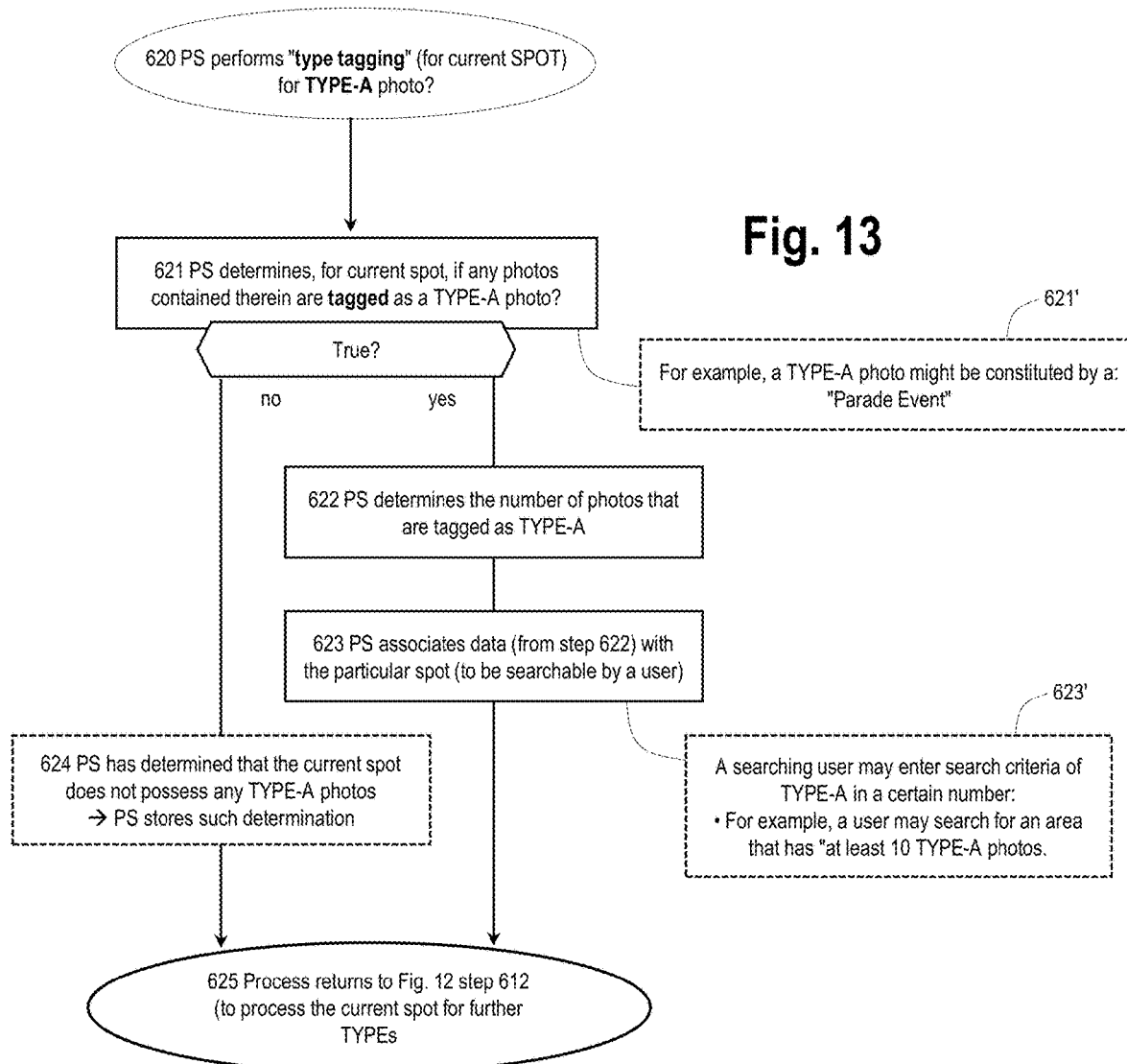
FIG. 13 is a flowchart showing further details of the system performs "type tagging" for a current spot for a type-A photo, in accordance with at least one embodiment of the disclosed subject matter.

For purposes of illustration, subroutine 620 of FIG. 13 shows type tagging to determine whether a particular spot has one or more type-A photos. However, the processing as illustrated in FIG. 13 can be applied to any of the types illustrated in FIG. 12 or other types, as may be desired.

Accordingly, in the various processing of FIG. 12, the system determines what type of photos are associated with the particular spot. As described above, a particular one photo can be tagged as two or more types. Thus, for example, a particular photo might be tagged in both step 611 and step 612 of FIG. 12.

After all the types have been processed in FIG. 12, the process passes onto step 615. In step 615, the processing returns to FIG. 11—and specifically passes onto step 607 of FIG. 11.

FIG. 13 is a flowchart showing further details of the system performs "type tagging" for the current spot for a type-A photo of subroutine 620, in accordance with at least one embodiment of the disclosed subject matter. As shown, the process starts in step 620 and passes onto step 621.

In step 621, the system determines, for the current spot, if any photos contained therein are tagged as a type-A photo. For example, a type-A photo might be a "parade event", for example, as reflected at 621'. However, it is appreciated that a photo can be possess or be attributed with any of a variety of types.

Such "type" can include any "thing" or attribute that is associated with the particular photo. For example, the "thing" that is associated with the photo might be a particular time window in which the photo was taken.

If yes in step 621, the process passes onto step 622. In step 622, the system determines the number of photos that are tagged as type-A. Then, in step 623, the system associates data (from step 622) with the particular spot so as to be searchable by a user. Then, the processing passes onto step 625. In step 625, the processing returns to FIG. 12 and step 612. In step 612, the processing continues as described above—to process the current spot to identify further types of photos in such spot.

On the other hand, a no determination may be rendered in step 621. Accordingly, the processing passes from step 621 onto step 624. In step 624, the system has determined that the current spot does not possess any type-A photos. The system can then store such determination. Then, processing passes onto step 625. Processing then continues as described above.

As reflected at 623' of FIG. 13, a searching user may enter search criteria of type-A in a certain number. For example, a user may search for a particular area, i.e. a particular geographical area, that has at least 10 type-A photos. Additionally, search criteria may not be constrained or dictated by a certain number of a particular type of photo in a spot. Rather, search criteria can utilize top ranked spots or other areas. In such processing, the top ranked spot or spots can be returned as search results regardless of the particular number of a particular type of photo associated with such spot.

Figure 14:
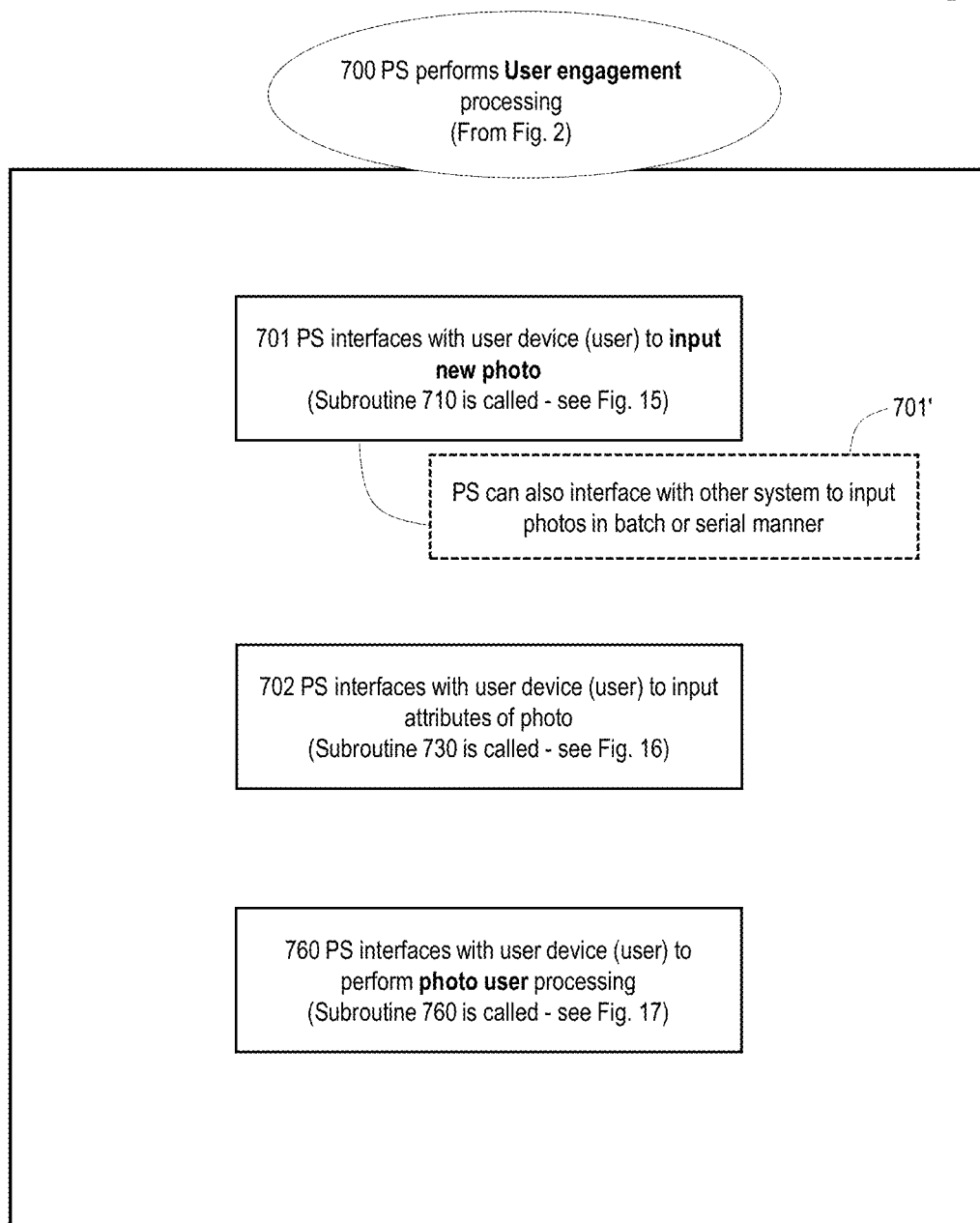
FIG. 14 is a flowchart showing in further detail the system performs "user engagement processing," invoked or called upon from FIG. 2, in accordance with principles of the disclosed subject matter.

FIG. 14 is a flowchart showing in further detail the subroutine 700, system performs user engagement processing, invoked or called upon from FIG. 2. The processing of subroutine 700 can include both step 701 and step 702, in accordance with embodiments of the disclosed subject matter. In particular, the processing of FIG. 14 relates to interfacing with a user device, which is associated with a human user, to input both a new photo that can include image data and attributes or metadata regarding such new photo. The processing of steps 701 and 702 can be performed in parallel or in serial and need not be performed in the particular manner illustrated in FIG. 14.

In step 701 of FIG. 14, the system interfaces with a user device to input a new photo. In such processing, subroutine 710 can be called upon or invoked. Such subroutine 710 is illustrated in further detail below with reference to FIG. 15. As reflected at 701 of FIG. 14, the system 100 can also interface with other systems to input photos in batch or serial manner, for example.

In step 702 of FIG. 14, the system interfaces with a user device to input attributes of the photo. In such processing, subroutine 730 can be called upon or invoked. Such subroutine 730 is illustrated in further detail below with reference to FIG. 16.

In step 760 of FIG. 14, the PS interfaces with the user device, i.e. the user, to perform photo user processing. In performing such processing, a subroutine 760 can be called or invoked. Such subroutine 760 is illustratively shown in FIG. 17.

Figure 15:
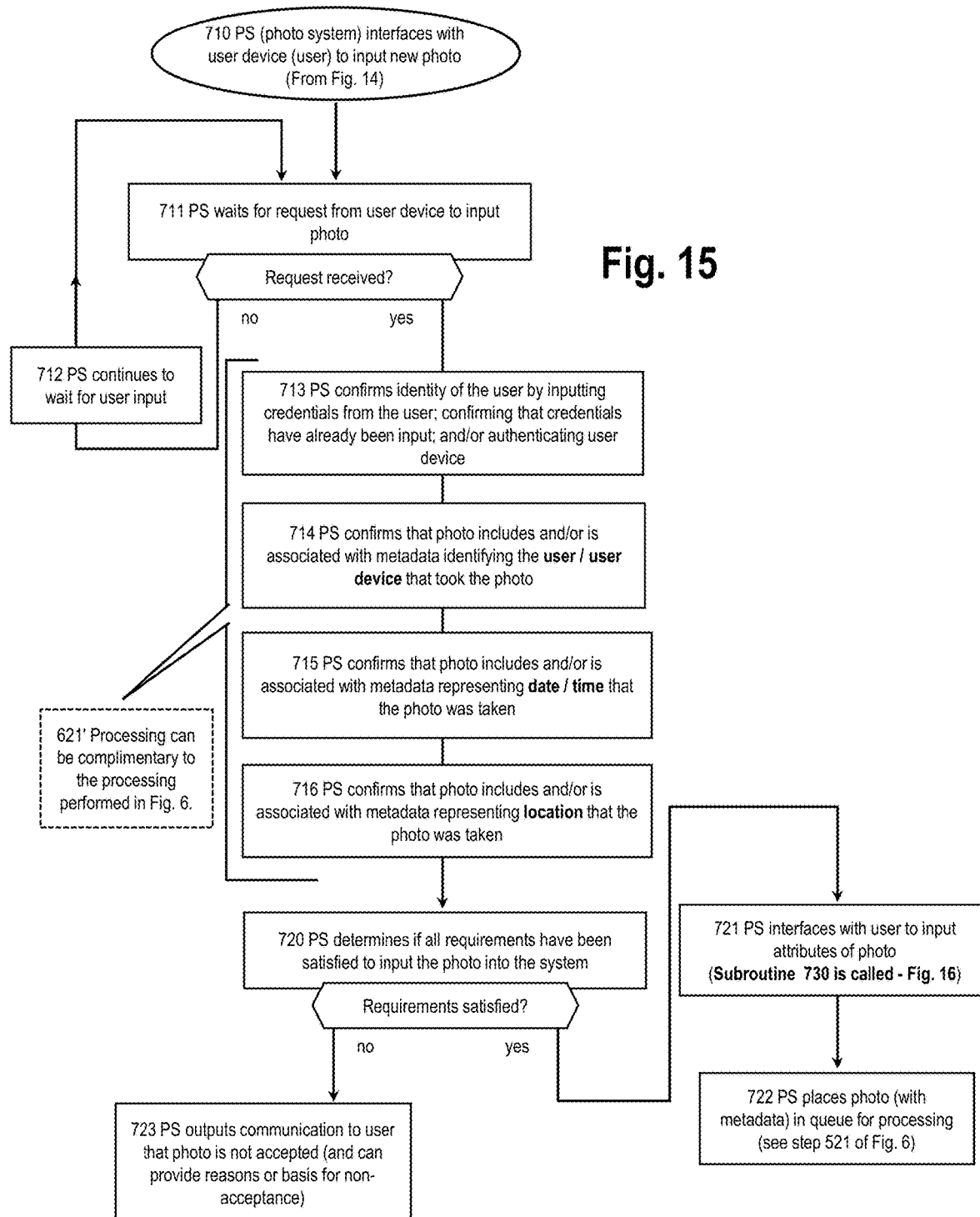
FIG. 15 is a flowchart showing in further detail the photo system "interfaces with a user device to input a new photo", in accordance with principles of the disclosed subject matter.

FIG. 15 is a flowchart showing in further detail the photo system "interfaces with a user device to input a new photo" of subroutine 710 that can be called upon or invoked from the processing of FIG. 14. As shown, the process starts in step 710 and passes onto step 711. In step 711, the system waits for a request from a user device to input a photo. If no is rendered, then the process passes onto step 712. In step 712, the system continues to wait for user input.

On the other hand, a yes determination may be rendered in the processing of step 711, indicating that the system has indeed received a request from a user device to input a photo. Accordingly, the process passes onto step 713. In step 713, the system confirms identity of the particular user by inputting credentials from the user, confirming that credentials have already been input from the user, and/or authenticating the user device in some manner. Any suitable authentication mechanism, arrangement, or technology can be utilized so as to allow the system to confirm identity of the user device and/or human user. For example, biometrics can be utilized so as to authenticate the user device and/or human user. After step 713, the process passes onto step 714.

In step 714, the system confirms that the photo includes and/or is associated with metadata identifying the user and/or user device that took the photo. Then, the process passes onto step 715.

In step 715, the system confirms that the photo includes and/or is associated with metadata representing date and time that the photo was taken. Then, in step 716, the system confirms that the photo includes and/or is associated with metadata representing location that the photo was taken. After step 716, the process passes onto step 720.

In step 720, the system determines whether or not all requirements have been satisfied so as to input the photo into the system. If no, then the process passes onto step 723. In step 723, the system outputs a communication to the user that the photo, which the user submitted, is not accepted. Such communication can provide basis for not accepting the photo, so as to be helpful to the user.

If the processing determines that all requirements have been satisfied to input the photo into the system, in step 720 of FIG. 15, then a yes is rendered in step 720. Accordingly, the processing passes onto step 721.

In step 721, the system interfaces with the user to input attributes of the photo. In such processing, subroutine 730 of FIG. 16 can be called upon or invoked. Accordingly, it should be appreciated that the system can interface with a user so as to input attributes of the photo subsequent to input of the photo (step 721 of FIG. 15) or independently of input of the photo (step 702 of FIG. 14), i.e. at some later time relative to input of the photo itself.

After step 721 of FIG. 15, the process passes onto step 722. In step 722, the system places the photo, with metadata, in queue for processing. Accordingly, with the processing of step 722, the processing of FIG. 15 can be terminated. Once photo(s) are identified or observed as being in queue, the system can invoke or call upon the processing of step 521 of FIG. 6.

Accordingly, in the processing of steps 713, 714, 750, 716, various steps can be performed so as to determine if the photo possesses required attributes or metadata so as to be processed by the system 100. As reflected at 621' of FIG. 15, such processing can be complementary to the processing performed in FIG. 6.

Figure 16:
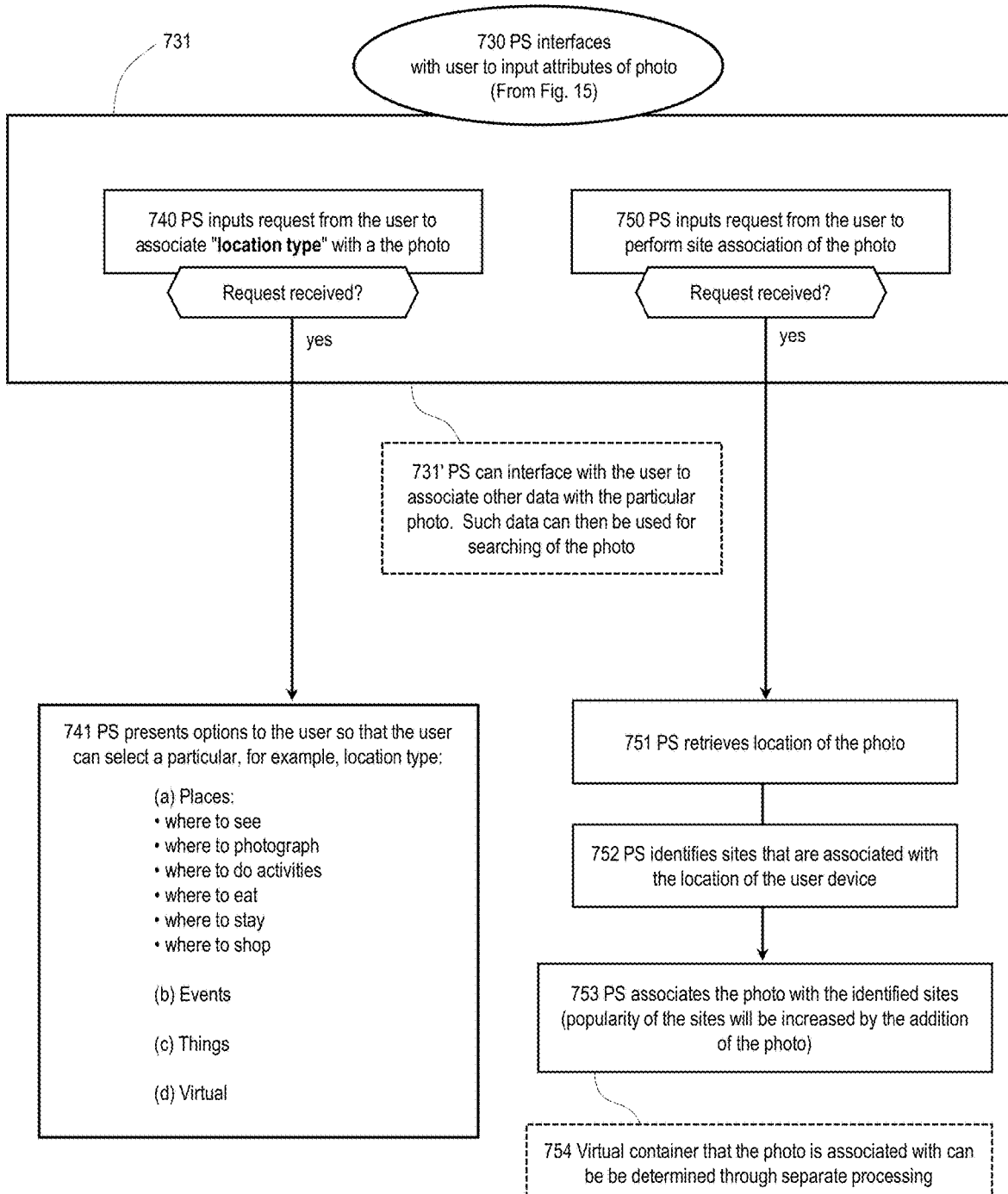
FIG. 16 is a flowchart showing in further detail the "photo system interfaces with a user to input attributes of a photo" in accordance with principles of the disclosed subject matter.

FIG. 16 is a flowchart showing in further detail the "PS interfaces with a user to input attributes of photo" subroutine 730 as called from the processing of FIG. 15. The process of FIG. 16 is initiated and the processing passes to step 731. In step 731, the PS waits for a request from the user via either of step 740 or step 750. In step 740, the PS monitors for an input request from the user to associate "location type" with the photo. In step 750, the PS monitors for an input request from the user to perform site association of the photo. For example, the "wait" processing of FIG. 16 can include the PS waiting for a user to log on or sign into the system, i.e. the PS (photo system)—and engage with the PS so as to render a yes in step 740 or step 750.

In the processing of step 731, as reflected at 731', the PS can interface with the user to associate other or additional data with the particular photo that is being processed. Such data, which is then associated with the photo, can then be used in various processing. For example, the additional data associated or appended to the photo can be used by the PS to perform searching based on a user query, i.e. based on a user search. The additional data can be used to determine if a patch can be elevated to the disposition of a spot.

With reference to step 740, upon a request being received in step 740 such that a "yes" is rendered in the processing, the process passes to step 741. In step 741, the PS presents options to the user so that the user can select a particular location type, for example. That is, in the processing of step 741, the user can associate a photo with a location type. For example, the PS can interface with the user so as to present a photo to the user. The user might select the photo in some suitable way such as from an index of photos, a listing of photos, or in some other manner Once a particular photo is selected, the user may be presented with a list of possible location types which may be associated with the particular photo. For example, "location types" that are presented to the user (as an option to associate with a photo) can include places, events, things, or virtual. Other location types can be provided as may be desired. The location type "places" can provide the user the ability to associate a photo with a particular place. The location type "events" can provide the user the ability to associate a photo with a particular event. The location type "things" can provide the user the ability to associate a photo with a particular thing. The location type "virtual" can provide the user the ability to associate a photo with a virtual concept, such as to provide an association of a photo with a game based event, for example.

With reference to step 750, the CP can determine that a request was indeed received from a user to perform site association of a photo. Accordingly, a yes is rendered in step 750. The processing then passes to step 751. In step 751, the PS retrieves location of the photo. For example, the PS may retrieve the location of the photo from metadata associated with the photo. Then, the process passes onto step 752. In step 752, the PS identifies sites that are associated with the location of the photo, i.e. the location that was retrieved in step 751. Then, the process passes onto step 753. In step 753, the PS associates the photo with the identified sites. For example, one "site" might be New York City. Another "site" might be Times Square. Accordingly, a photo taken in Times Square can be associated (in step 753) with both the Times Square site and the New York City site. As reflected in step 753, popularity of the sites will be increased by the addition of the photo to that site, in accordance with at least some embodiments. As reflected at 754 of FIG. 16, the virtual container that the photo is associated with can be performed through separate processing vis-à-vis processing of step 751-753. Relatedly, a site can be composed of a plurality of spots.

Figure 17:
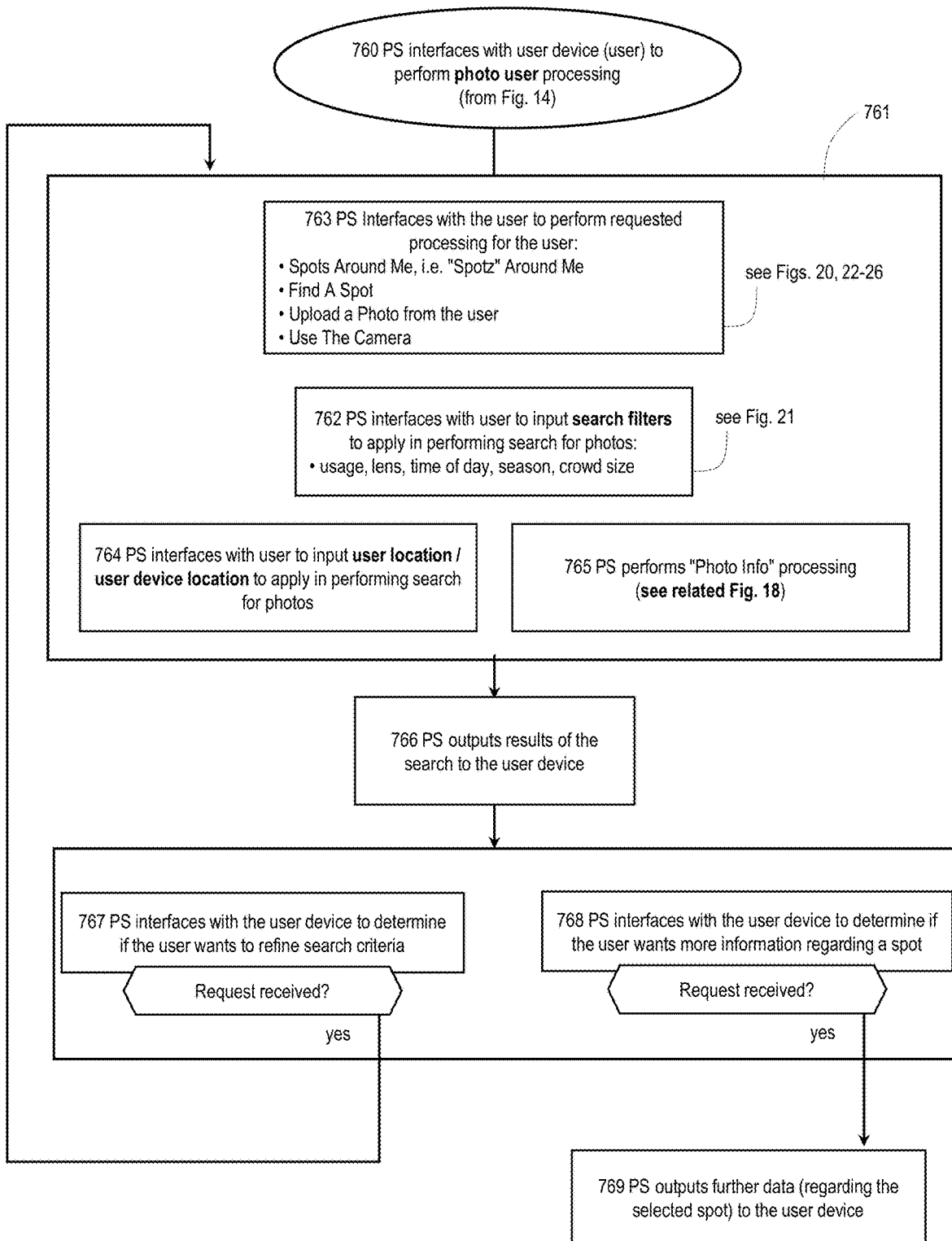
FIG. 17 is a flowchart showing in further detail the "photo system interfaces with a user device to perform photo user processing, in accordance with principles of the disclosed subject matter.

FIG. 17 is a flowchart showing in further detail the "PS interfaces with a user device to perform photo user processing subroutine 760 of FIG. 14. The process is initiated and passes to step 761. In step 761, various processing can be performed in step 762, 763, 764, and 765. Such processing can be requested or invoked through user interface.

Figure 18:
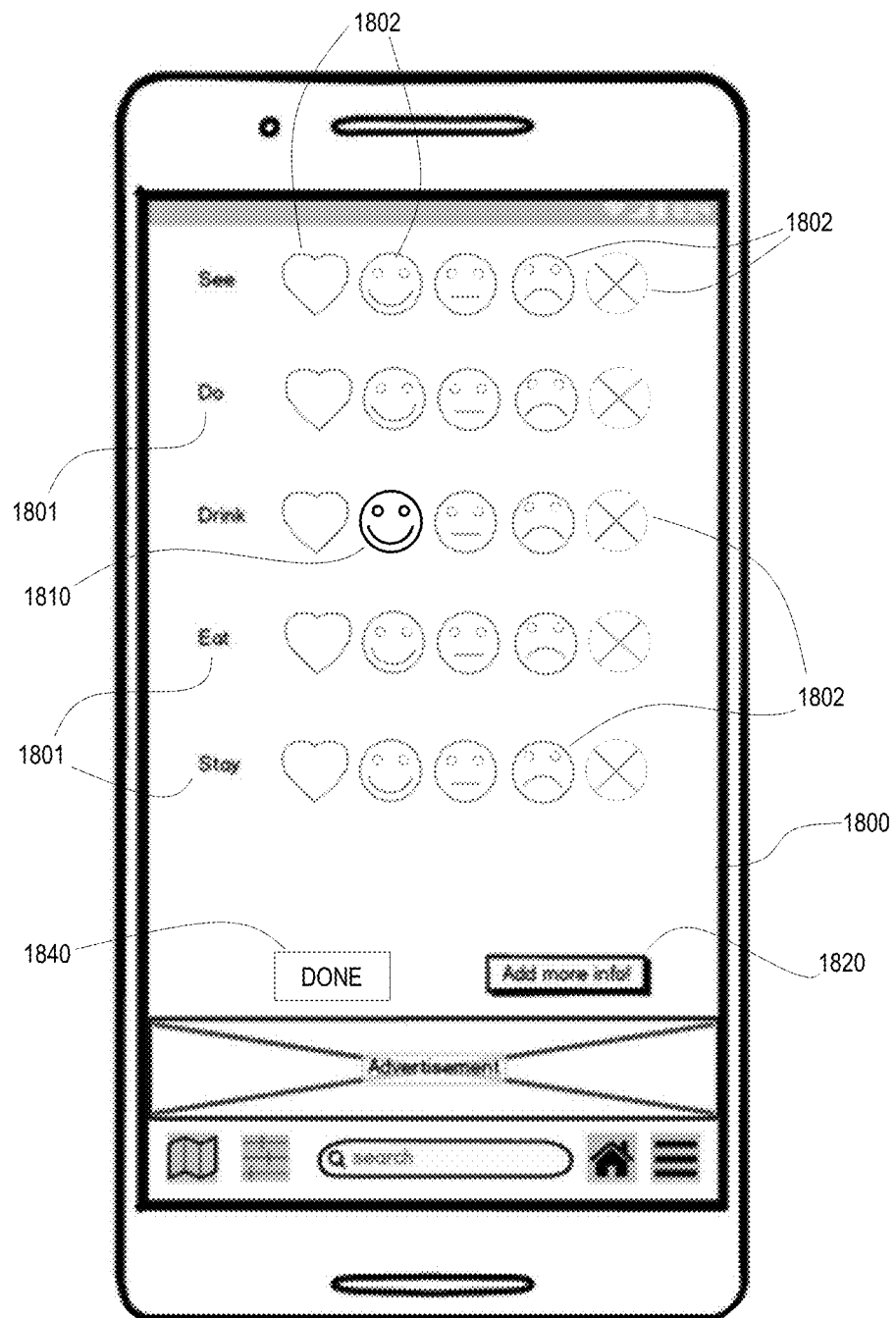
FIG. 18 is a diagram that includes a GUI (graphical user interface) that illustrates aspects of "photo info" or "photo information" processing, in accordance with principles of the disclosed subject matter.

In step 763 of FIG. 17, the PS can interface with the user to perform requested processing for the user. For example, the PS can interface with the user to perform "spots around me" or "spots near me" processing for the user. Such processing can also be described as "Spotz Around Me" processing. The term "spotz" can be used interchangeably with the term "spots" so as to reflect the novel processing of the disclosure. Additionally, the term "ShotSpotz" can be used to mean, be a part of, or include the photo system 100, in accordance with at least one embodiment of the disclosed subject matter. In such processing of FIG. 17, the PS can retrieve or input the geographical location of the user device so as to identify spots that are proximate to the user. The proximity can be determined based on predetermined thresholds. That is, settings can be provided that can control whether "proximate" means within 1 mile of the user, 10 miles of the user, or 100 miles of the user, for example. The processing of step 763 can also include "find a spot" processing. In find a spot processing, the user can enter search criteria or search terms that contain criteria of what the user is looking for either in a photo or in a spot. For example, a GUI 1800 as shown in FIG. 18 can be utilized so as to input search criteria from the user. In regard to "find a spot" processing—such processing can include or be associated with planning, planning a trip, organizing a plurality of spots, saving a collection of spots, retrieving one or more spots, and related processing and functionality.

Figure 20:
FIG. 20 is a diagram that includes a GUI 2000 that can be utilized so as to launch or invoke processing in accordance with principles of the disclosed subject matter.

Additionally, the processing of step 763 can include "upload a photo" processing. In such processing, a photo can be uploaded from a user device of the user. The photo can then be processed as otherwise described herein. Additionally, step 763 can include the option "use the camera". With such option, the camera of the user device can be activated. FIG. 20 illustrates a GUI 2000 that can be utilized so as to launch or invoke the processing of step 763 (FIG. 17).

Figure 21:
FIG. 21 is a diagram that includes a GUI 2100 that can be utilized so as to interface with the user so as to input selection of search filters, in accordance with principles of the disclosed subject matter.

In step 762 of FIG. 17, the PS can interface with the user to input search filters to apply in performing search for photos. Such search filters can include such items as usage, lens, time of day, season, and crowd size. The processing of step 762 can provide functionality to allow a user to specify the things that the user wants to see, where to drink e.g., provide a filter for image types, filter an image based on metadata or attributes associated with the image, and/or provide other functionality. FIG. 21 illustrates a GUI 2100 that can be utilized so as to interface with the user so as to input selection of search filters. For example, a particular search filter option or options can be provided via a dropdown menu. For example, a usage option can be provided via which the user chooses a particular usage option, which might be Street, urban, or night. The lens option can provide the user, searching for a particular photo, to request photos that have been taken with a particular type of camera, such as a wide lens camera or a superwide lens camera. For example, an option can be provided in which the user indicates he or she would like to search for photos that were taken in a particular season of the year.

In accordance with at least one embodiment of the invention, "spot" generation can be correlated with the search filter options provided in the GUI 2100. For example, a patch can be processed to determine if the patch is associated with at least 20 pictures that were taken in the summer. If such patch does indeed include 20 pictures that were taken in the summer, then that patch would be deemed (by the photo system (PS)) to be a "spot" for that particular search criteria. More generally speaking, a particular area, such as a patch, can be assessed to determine if such area possesses density of photos with certain attributes, such as usage, lens, time of day, season, or crowd size. An area that does indeed possess density of a particular attribute can then be deemed a spot for that attribute. The user can then search for spots with such attribute, i.e. as shown in the GUI of FIG. 21.

FIG. 17 can also include the processing of step 764. In step 764, the PS interfaces with the user to input user location or user device location to apply in performing search for photos. For example, the PS can input the user device location in step 764. Then, additional processing can be requested by the user that uses such input user device location. For example, the "spots around me" processing can be performed after the PS inputs user device location in step 764.

FIG. 17 can also include the processing of step 765. In step 765, the PS performs "photo info" processing. FIG. 18 is a GUI 1800 that illustrates such processing. Further details of the GUI 1800 are described below.

In accordance with an embodiment, the PS can identify when the user has input search criteria and has selected that the PS should perform a search based on such search criteria. The search criteria can be a wide variety of criteria such as spots around the user, spots having a certain photo density, spots having photos of a particular type, spots having photos of a particular attribute, spots that are associated with a particular site, and other criteria as may be desired. Accordingly, once the PS identifies that the user has interfaced (with the PS) so as to provide both search criteria and a request to perform the search, then the process passes onto step 766. In step 766, the PS outputs the results of the search to the user device. The results of the search can be one or more spots, from which the user can select, which match the input criteria. The results of the search can be one or more photos that match the input criteria. The results of the search can be one or more sites that match the input criteria. Additional processing can then be provided by the PS.

Figure 28:
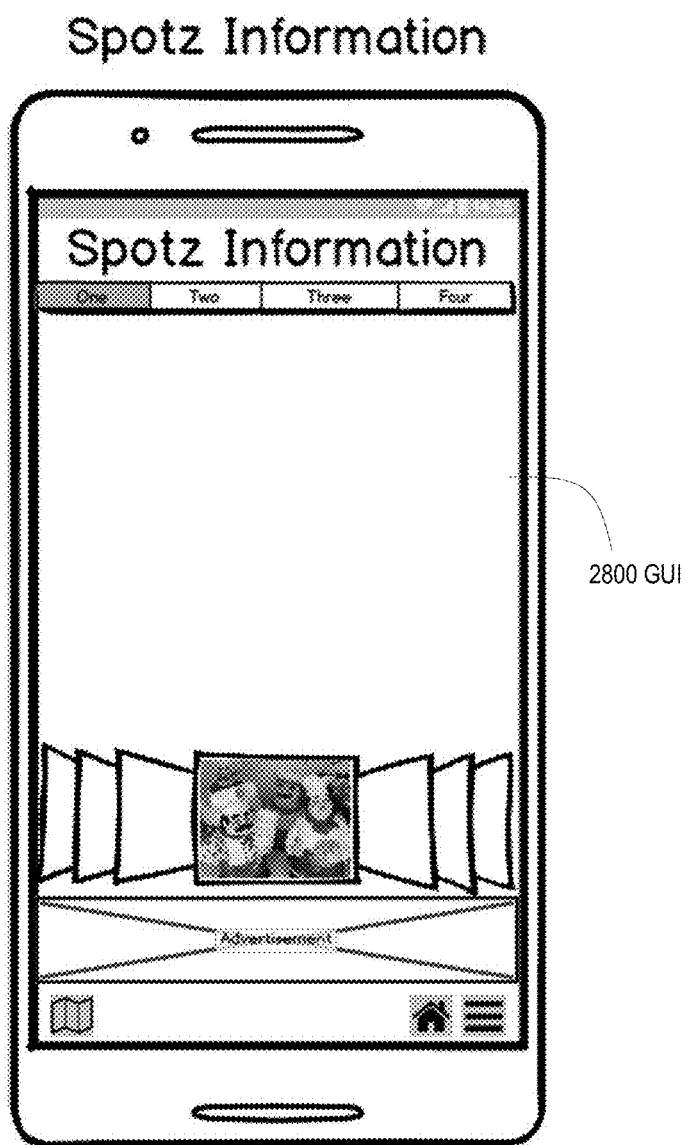
FIG. 28 is a diagram that includes a GUI 2800 that can provide various information regarding one or more spots, in accordance with principles of the disclosed subject matter.

That is, in step 767, the PS can interface with the user device to determine if the user wants to refine the search criteria. If yes, then the process passes back to step 761. Processing then continues as described above. In step 768, the PS can interface with the user to determine if the user wants more information regarding an identified spot, for example. More specifically, the processing of step 768 can include a situation in which the user is presented with a spot or spots that matches the search criteria input by the user. Upon being presented with spots that match the search criteria, the user can select a particular spot. Upon selection of the particular spot, the PS can provide additional information to the user regarding the selected spot. FIG. 28 is a GUI 2800 that can be presented to the user—to provide a collection of spots that satisfy search criteria of the user. Upon selection of a particular spot in the GUI 2800, of FIG. 28, various information regarding the selected spot can be presented. Details of a selected spot that can be presented to the user includes number of photos in the spot, various attributes of those photos, the types of photos in the particular spot, attributes of users who took the photos that are in a particular spot, and various other information regarding the spot and photos that are associated with the spot.

In the processing of step 768, a yes request can be received. Accordingly, the process passes onto step 769. In step 769, the PS outputs further data, regarding the selected spot, to the user device.

As described above, FIG. 18 is a GUI that illustrates aspects of "photo info" processing. The GUI 1800 can be utilized or a variation of the GUI 1800, to perform a variety of processing. The GUI 1800 can be presented to the user in various operating situations. For example, the GUI 1800 can be presented to the user in conjunction with inputting a photo from the user. For example, the GUI 1800 can be utilized to provide the processing of step 741 of FIG. 16. The GUI 1800 can include a plurality of criteria 1801. For example, the criteria 1801 can constitute the "location type" of step 741 (FIG. 16). Each criteria can then be associated with a ranking 1802. The ranking 1802, for each criteria 1801, can be selected by the user so as to input data regarding attributes of the particular photo (that is being input or uploaded from the user). For example, in the example GUI 1800, the user has selected a particular ranking 1810 that corresponds to a "drink" location type. The user can tap such item 1810. Upon tapping such item 1810, the PS can highlight the item, bold the item, or provide some other change in appearance of the item so that the user can see that such item has been selected. The user can select any number of items in the GUI 1800. Additionally, the GUI 1800 can be provided with a button 1820. The button 1800 can take the user to additional GUIs or user interface mechanisms by which the user can input additional information regarding the particular photo. Accordingly, the GUI 1800 provides a quick and efficient way for the PS to input information regarding a photo from the user. Upon a user completing his or her selection in the GUI 1800, the user can tap the button 1840 so as to indicate to the PS that the user has completed selection—and that the PS can process the uploaded or input photo based on the user's selections.

Accordingly, the GUI 1800 of FIG. 18 can be utilized in conjunction with a user uploading a photo—to provide the user with a mechanism to input attributes of such uploaded photo. However, the GUI 1800 can also be utilized to perform other processing. That is, the GUI 1800 can be presented to the user so that the PS can input search criteria from the user. The user can make selections in the "matrix" of the GUI 1800 as may be desired. The PS can then perform a search based on the input criteria. In such processing, the button 1820 can be utilized by the user so as to allow the user to input more detailed search criteria information. In such processing, the button 1840 can be selected by the user upon the user completing his or her selection(s), for example ranking 1810, of the various items in the GUI 1800. Thus, upon the user tapping the button 1840, the PS can perform the requested search.

Figure 19:
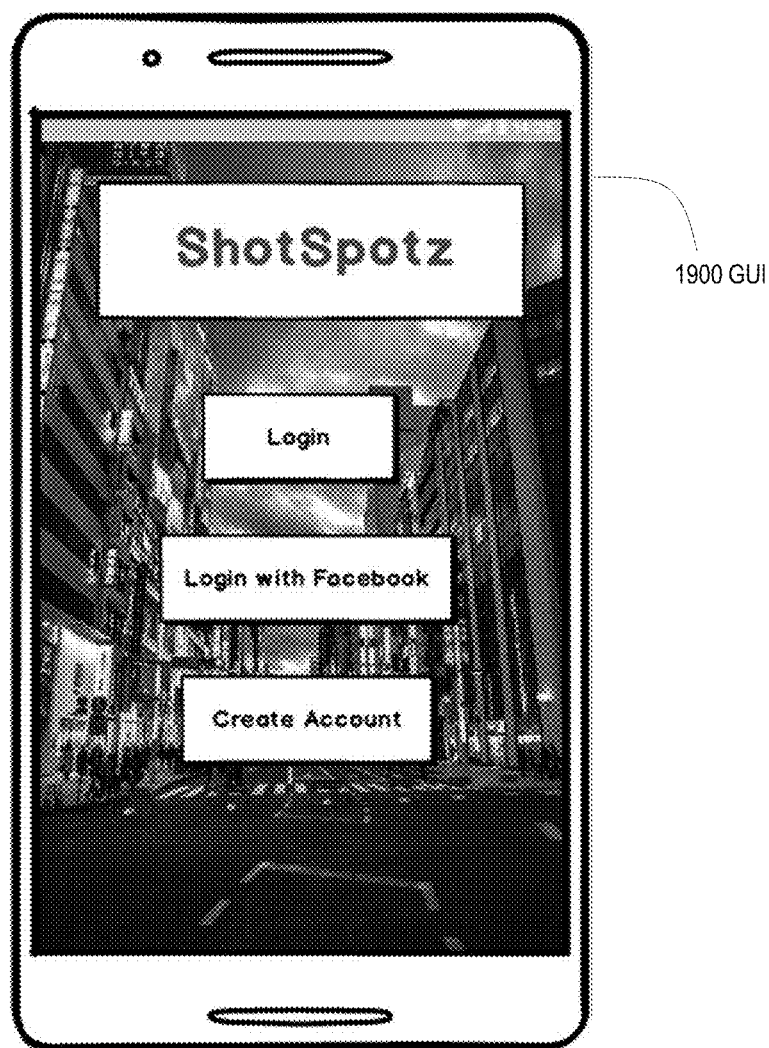
FIG. 19 is a diagram that includes a GUI that can be presented to a user or potential user in conjunction with the user signing on or logging into photo system, in accordance with principles of the disclosed subject matter.

FIG. 19 shows a GUI 1900. The GUI 1900 can be presented to a user or potential user in conjunction with the user signing on or logging in to the PS (photo system). The GUI 1900 can include a login option.

The GUI 1900 can include a login via Facebook option. The GUI 1900 can also include a create account option, i.e. in the situation that the user has not yet created an account in the PS. It should be appreciated the options shown in the GUI 1900 are illustrative. Additional options or mechanisms can be provided so as to input credentials from the user and allow the user access to his or her account.

Features of FIG. 20 are described above. In accordance with at least one embodiment of the disclosure, the GUI 2000 of FIG. 20 can provide a main landing page. That is, the user might be presented with the GUI 2000 upon first logging on to or in 2 the system.

Figure 22:
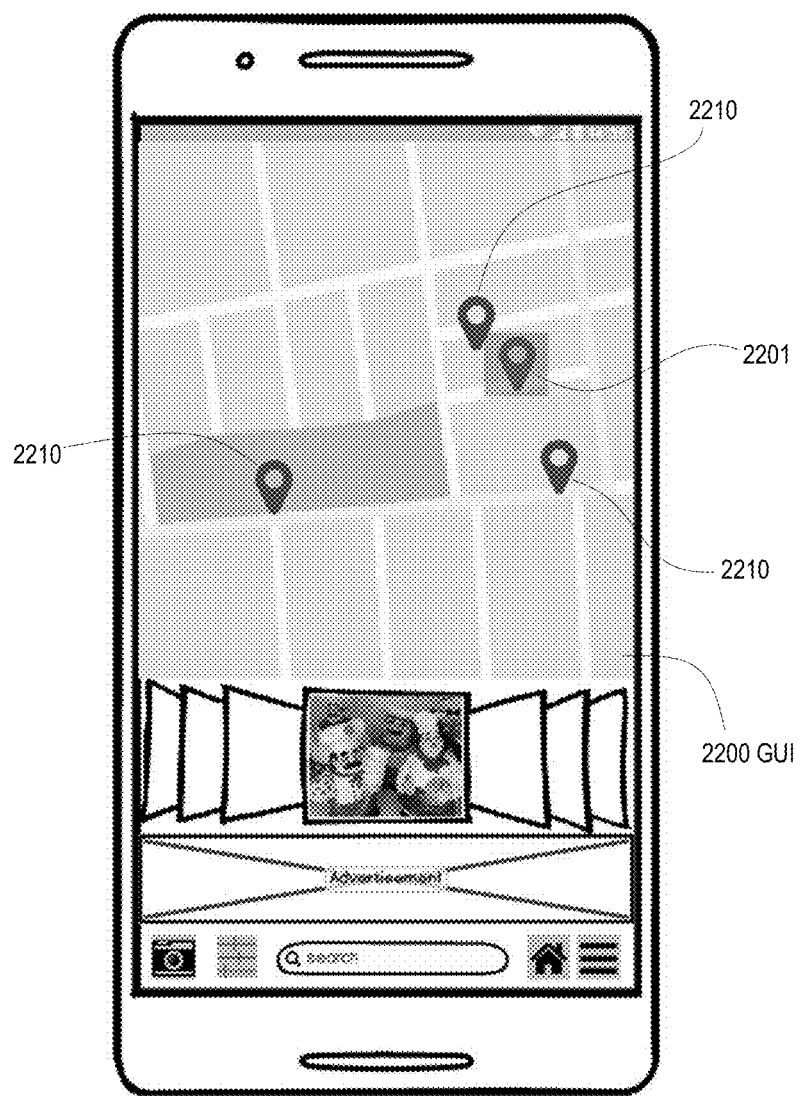
FIG. 22 is a diagram that includes a GUI 2200 that can be utilized to provide the user "spots around me" functionality in accordance with principles of the disclosed subject matter.

As described above, a processing option provided by the PS can include "spots around me" or what might be described as "spots near me". In such processing option, the PS can generate a GUI 2200 such as shown in FIG. 22. The GUI 2200 can include first indicia 2201 that reflects user location or user device location. The GUI 2200 can also include second indicia 2210 that reflects "spots" around the user that the PS has identified. For example, the user might hover his or her cursor over a particular indicia 2210 so as to invoke the system to present additional information regarding the particular spot that is thereby selected. A user can select a particular spot in some manner, such as by clicking the particular spot, as represented by indicia 2210. In clicking a particular spot, the PS can present the user with various photos 2220 that are contained in the selected spot. The PS can interface with the user so as to allow the user to "flip through" the various presented photos 2220.

Figure 23:
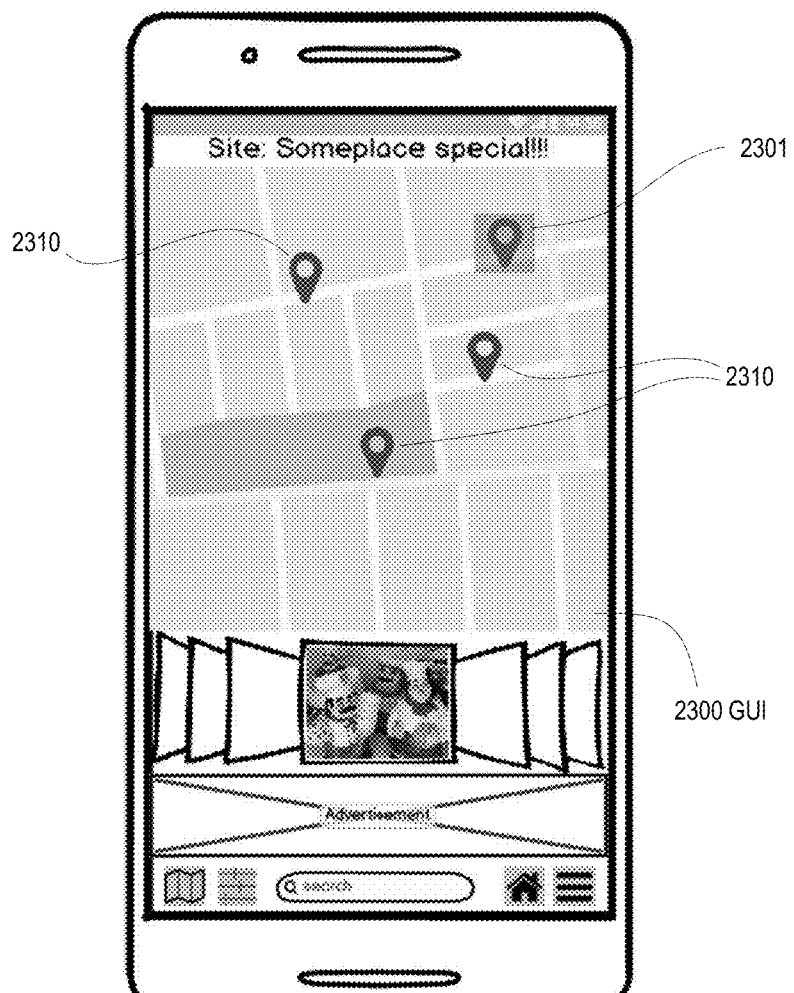
FIG. 23 is a diagram that includes a GUI 2300 that can be utilized to provide the user information regarding a "site", with such site including a plurality of spots, in accordance with principles of the disclosed subject matter.

As described herein, the PS can perform various processing related to a spot. A spot can be generated based on a particular area, such as a patch, having sufficient photo density. Relatedly, a plurality of spots can be collectively form a "site". In such processing, the PS can generate a GUI 2300 such as shown in FIG. 23. The GUI 2300 can include first indicia 2301 that reflects user location or user device location.

The GUI 2300 can also include second indicia 2310 that reflects "sites" around the user—that the PS has identified. The user might hover his or her cursor over a particular indicia 2310 so as to invoke the system to present additional information regarding the particular site that is thereby selected. A user can select a particular site in some manner, such as by clicking. In clicking the particular site, the PS can present the user with various photos 2320 that are contained in the particular selected site. The PS can interface with the user so as to allow the user to "flip through" the various presented photos 2320 that are associated with the selected site.

Figure 24:
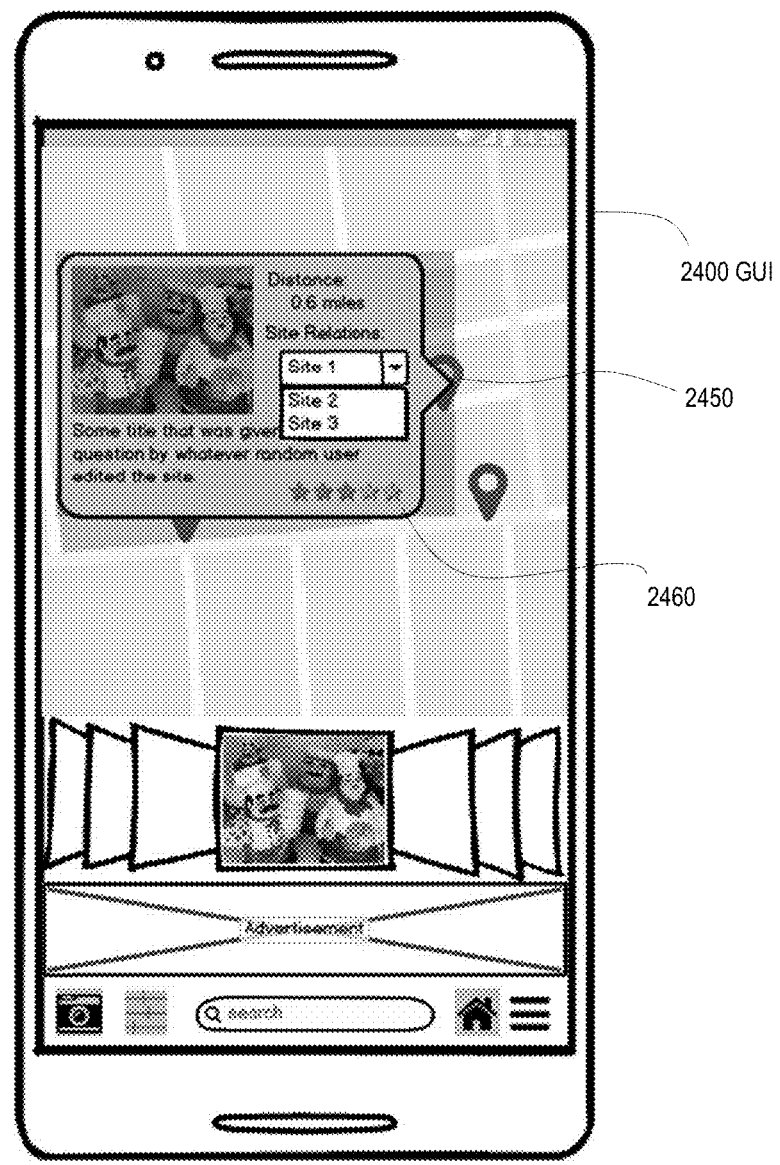
FIG. 24 is a diagram that includes a GUI 2400 that illustrates "spots around me" functionality, in accordance with principles of the disclosed subject matter.

In accordance with a further aspect of the disclosure, FIG. 24 shows a GUI 2400 that illustrates "spots around me" functionality. The GUI 2400 can provide information to the user regarding spots around the user—and more specifically provide a map view of spots around the user. A user can select a particular spot, for example as represented by indicia 2450. Once selected, information regarding the particular spot can be displayed to the user in a display box 2460. A distance between the user and the spot can be displayed. For example, such distance might be based on a center point of the particular spot. As described above, a "spot" can be an area, such as a patch, that has attained a threshold density of photos or that has attained a threshold density of photos of a particular type or attribute, for example. The display box 2460 can also include additional information. Such additional information can include sites that are associated with the particular selected spot. The user might select a particular site so as to result in the PS to display yet further information regarding the particular site.

Figure 25:
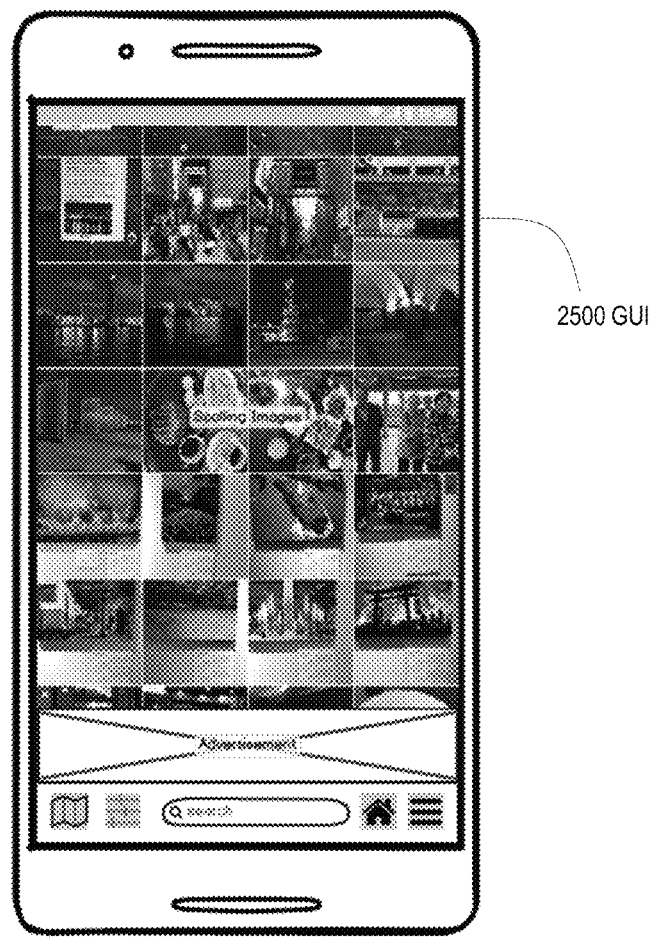
FIG. 25 is a diagram that includes a GUI 2500 that can be presented to the user to provide additional information to the user regarding spots around the user or user device, in accordance with principles of the disclosed subject matter.
Figure 26:
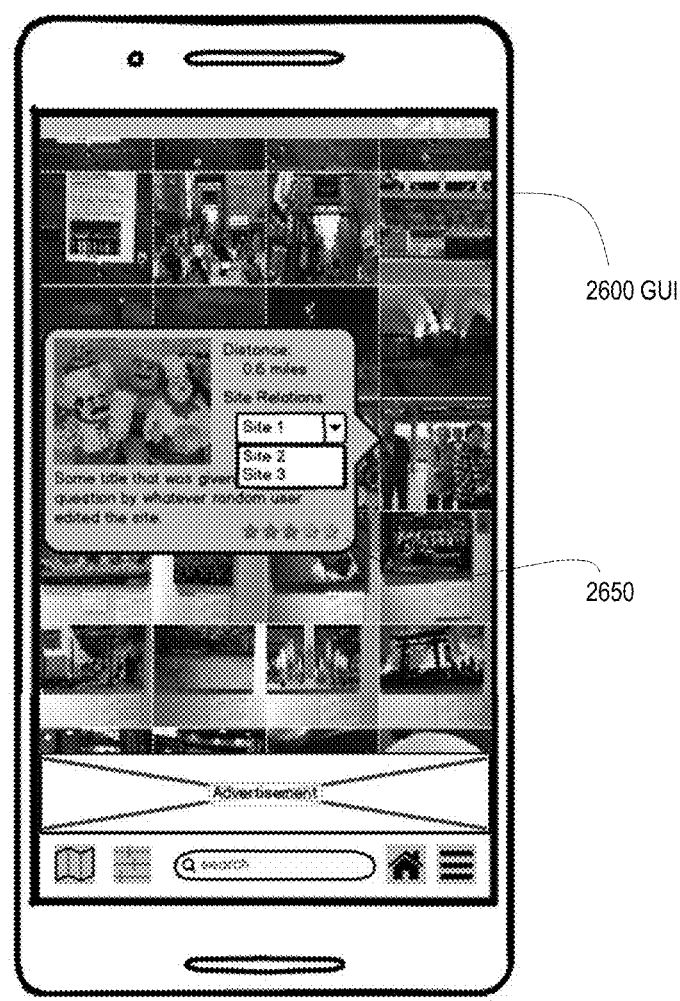
FIG. 26 is a diagram that includes a GUI 2600 that shows further details of "spots around me" functionality in accordance with principles of the disclosed subject matter.

FIG. 25 shows an additional GUI 2500 that can be presented to the user to provide additional information to the user regarding spots around the user or user device. The selection of photos can be presented based on various options or criteria. For example, a representative photo for each spot can be presented to the user. For example, all photos from a particular spot or spots can be presented to the user. The user can be provided the ability to select a photo. Selection of the photo can result in additional information being displayed to the user, such as particulars of the spot to which the photo is associated. Such additional information is illustrated by display box 2650 in the GUI 2600 of FIG. 26. Such data can include a distance that the user is from the selected spot or the selected photo. Such data can include sites that are associated with the selected spot or the selected photo.

Figure 27:
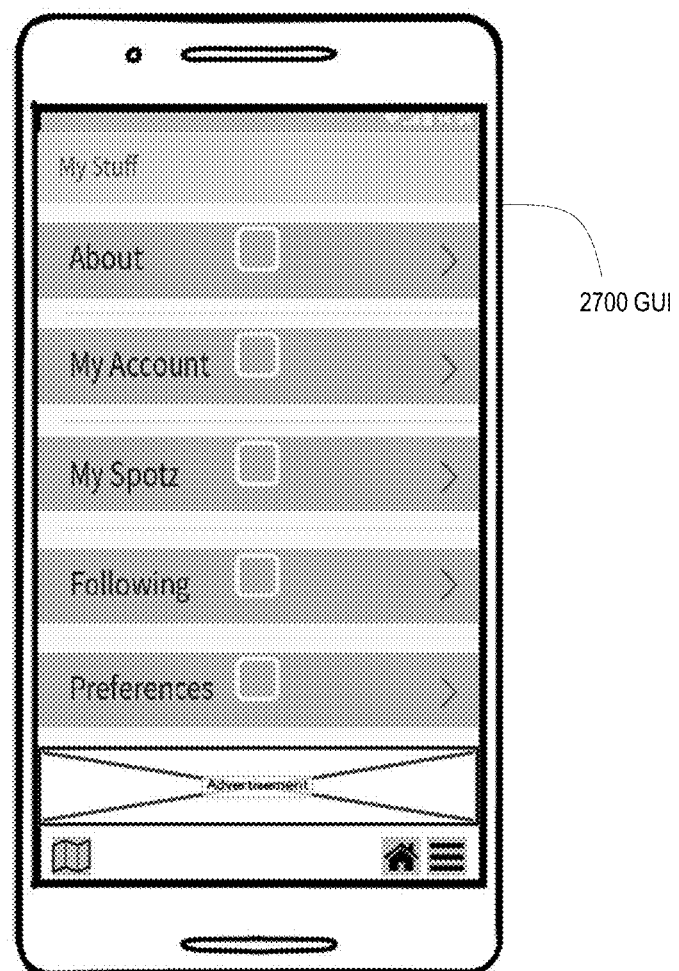
FIG. 27 is a diagram that includes a GUI 2700 that can be presented to the user to provide various menu selection items in accordance with principles of the disclosed subject matter.

FIG. 27 shows a GUI 2700 that can be presented to the user via a suitable menu selection. The GUI 2700 can include various options including about, my account, my spots, following, and preferences. The about option can provide various information about the user. The my account option can provide various information to the user regarding her account, as well as functionality so that the user can change attributes of their account. For example, the my account option might provide the user with the ability to change a phone number associated with her account. The my spots option can provide various information regarding the spots, i.e. that can be described as "Spotz", that are associated with the user account. For example, the my spots option can provide the user with details regarding spots to which the user has contributed photos. The my spots option can provide the user functionality so that the user can opt to receive updates regarding particular spots, i.e. favorite spots.

Additionally, the GUI 2700 can include a "following" option. The following option can provide functionality by which the user can select spots that the user desires to "follow". For example, a user following a spot can mean that the system can identify any changes or updates to the followed spot. For example, if photos are added to the particular spot, then the user (who is following the spot) can be notified of such added photos. Additionally, the "following" functionality can include various other options. For example, the following functionality can include an association between the particular user and a second user. For example, a first user might follow a second user so as to be updated regarding where the second user has taken photos, spots with which the second user has engaged with, or other information. The PS can interface with each of the involved users so as to input authorization and/or acceptance to share related data.

As described above, FIG. 28 shows a GUI 2800 that can provide various information regarding one or more spots. In particular, FIG. 28 can provide the user access to photos associated with a particular spot.

Figure 30:
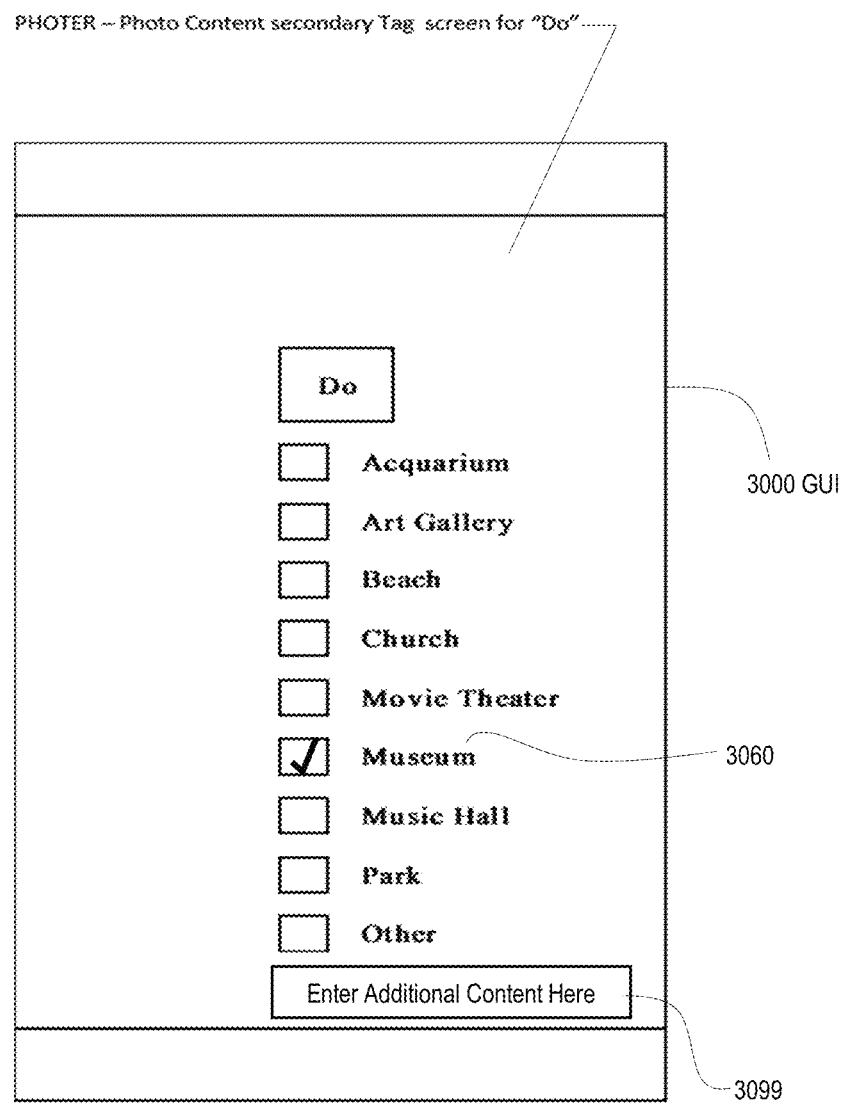
FIG. 30 is a diagram that includes a GUI 3000 that can be displayed as a result of the user tapping or selecting a suitable button for further tagging of photos or allowing users to identify additional content that can be added to or associated with a photo, for example, in accordance with principles of the disclosed subject matter.

As described above, FIG. 18 is a GUI (graphical user interface) 1800 that illustrates aspects of "photo info" processing. The GUI 1800 can provide an interface by which the PS can input various information regarding a photo, a group of photos, a collection of photos, a spot, or a site, for example. As described above, the GUI 1800 can also include the button 1820. The button 1820 can be selected by the user so as to input additional information. Relatedly, FIG. 30 shows a GUI 3000 that can be displayed as a result of the user tapping or selecting the button 1820. In other words, the GUI 3000 can be presented to the user so as to provide the user the ability to add additional information above and beyond that input via GUI 1800. The GUI 3000 can be presented to the user via suitable menu option. The GUI 3000 might be selected by the user tapping the criteria or location type "do" 1801 in the GUI 1800 of FIG. 18. The GUI 3000 allows the user to input additional particulars regarding the "do" location type. For example, if an input photo relates to activities associated with a museum, then the user might select the appropriate item 3060 as illustrated in FIG. 30. The GUI 3000 can include dialogue box 3099 into which a user can input comments, i.e. text, regarding the user's selection in the GUI 3000, one or more associated photos, and/or the user, for example.

Figure 29:
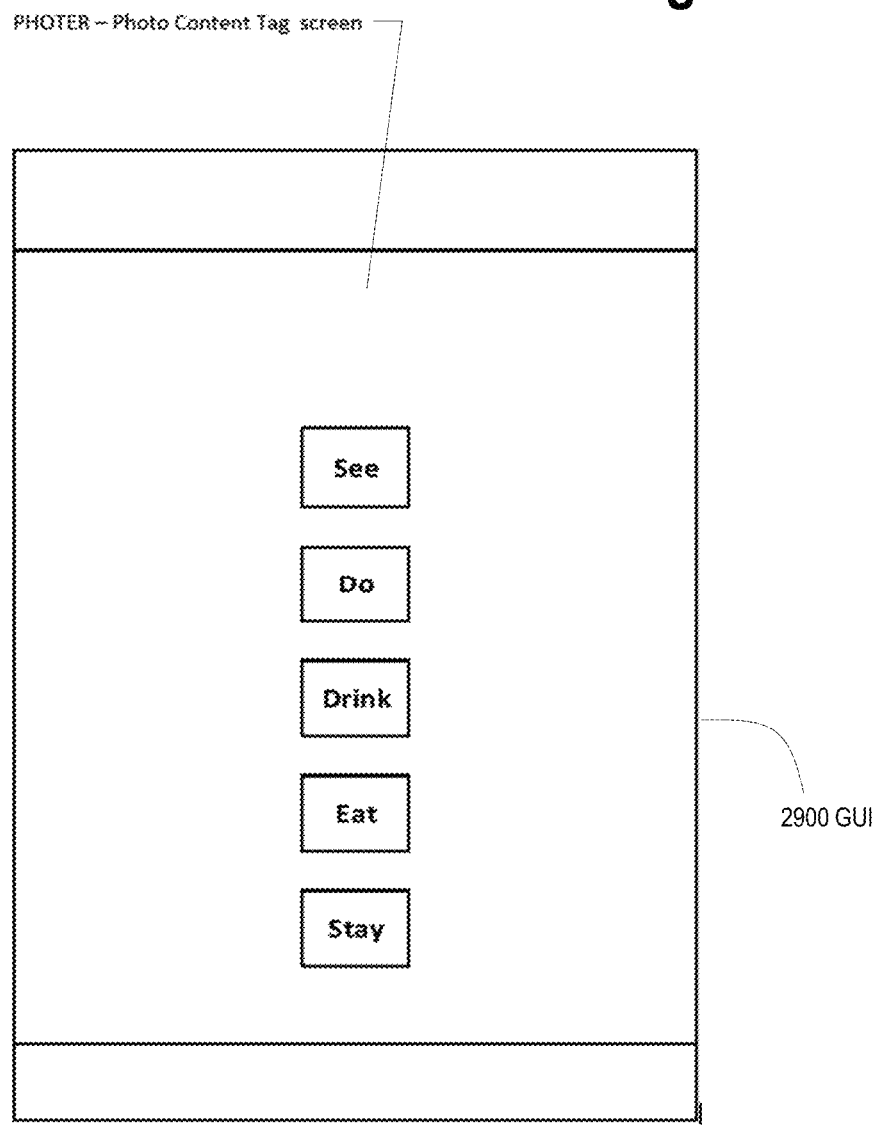
FIG. 29 is a diagram that includes a GUI 2900 that can provide tagging of photos or allowing users to identify additional content that can be added to or associated with a photo, for example, for future search options in accordance with principles of the disclosed subject matter.

FIG. 29 is a further GUI 2900 in accordance with principles of the disclosed subject matter. The GUI 2900 can be presented to the user in connection with either tagging a photo that is to be uploaded to the photo system or in connection with searching for a particular type of photo or spots having a particular type of photo. Using the GUI 2900, the user can specify whether the user wants to tag a particular photo as see, do, drink, eat, or stay, for example—or to search for a photo having such attributes.

Figure 31:
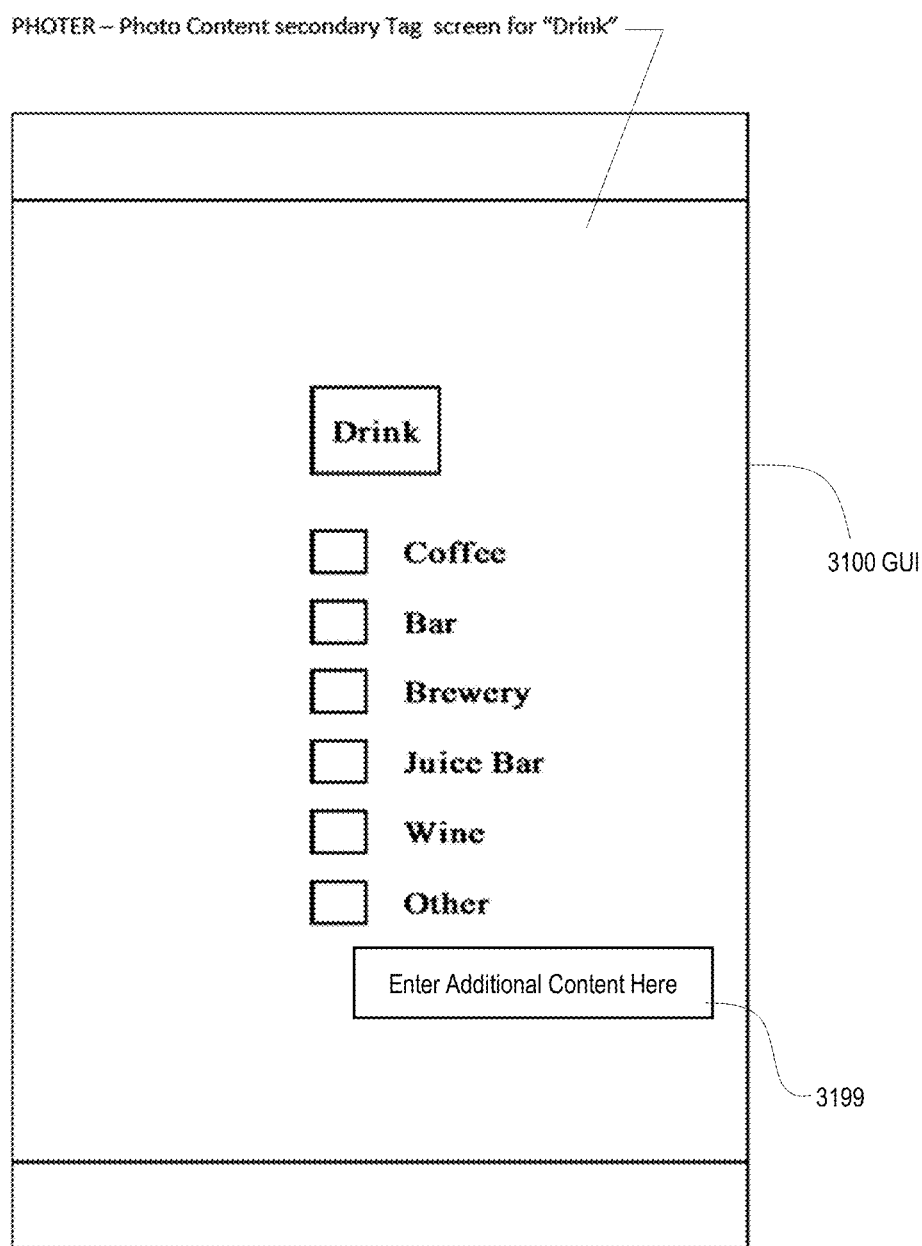
FIG. 31 is a diagram that includes a GUI 3100 for further tagging of photos or allowing users to identify additional content, which can be added to or associated with a photo, that can be generated by the photo system and presented to the user, in accordance with principles of the disclosed subject matter.
Figure 32:
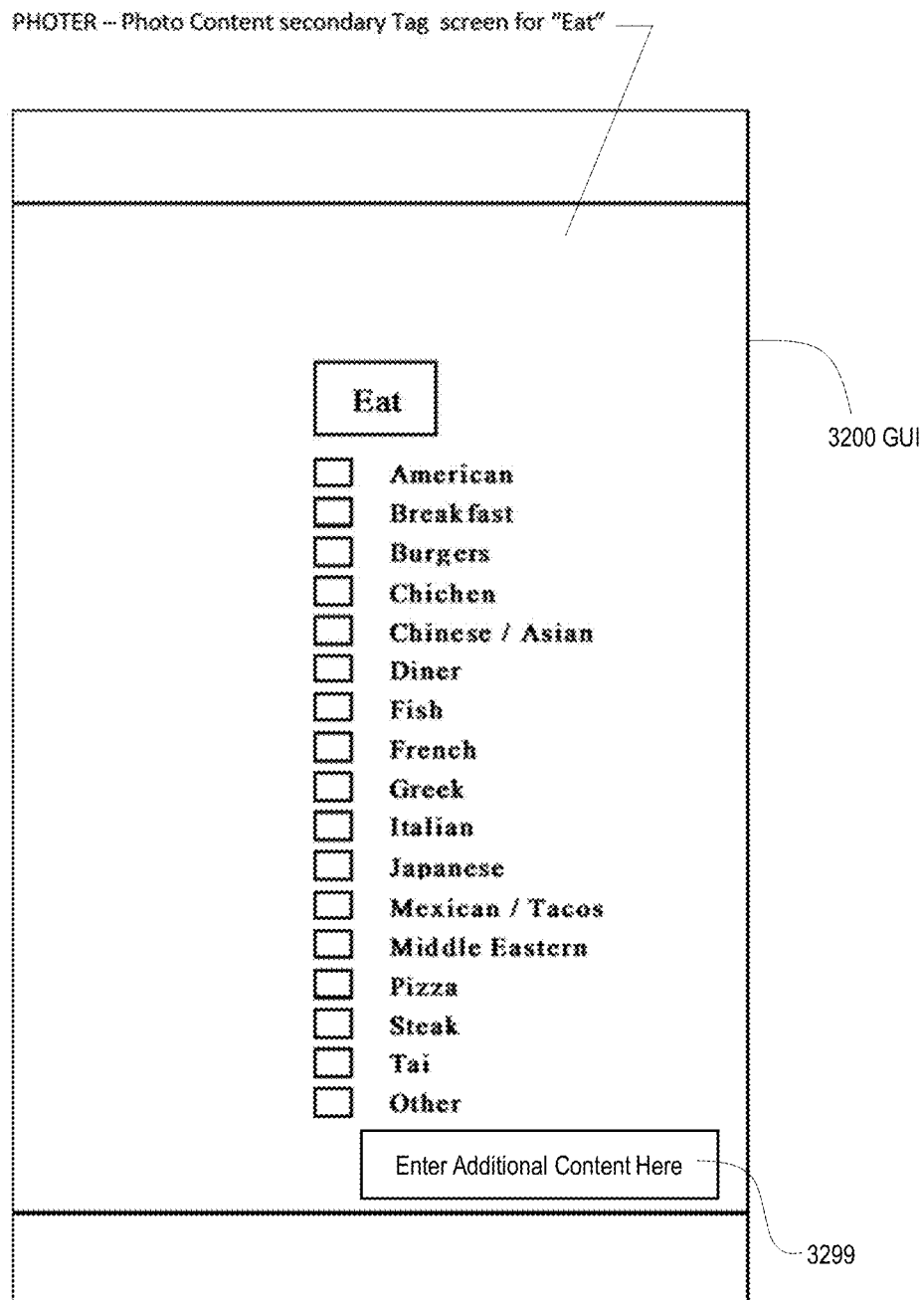
FIG. 32 is a diagram that includes a GUI 3200 for further tagging of photos or allowing users to identify additional content, which can be added to or associated with a photo, that can be generated by the photo system and presented to the user, in accordance with principles of the disclosed subject matter.
Figure 33:
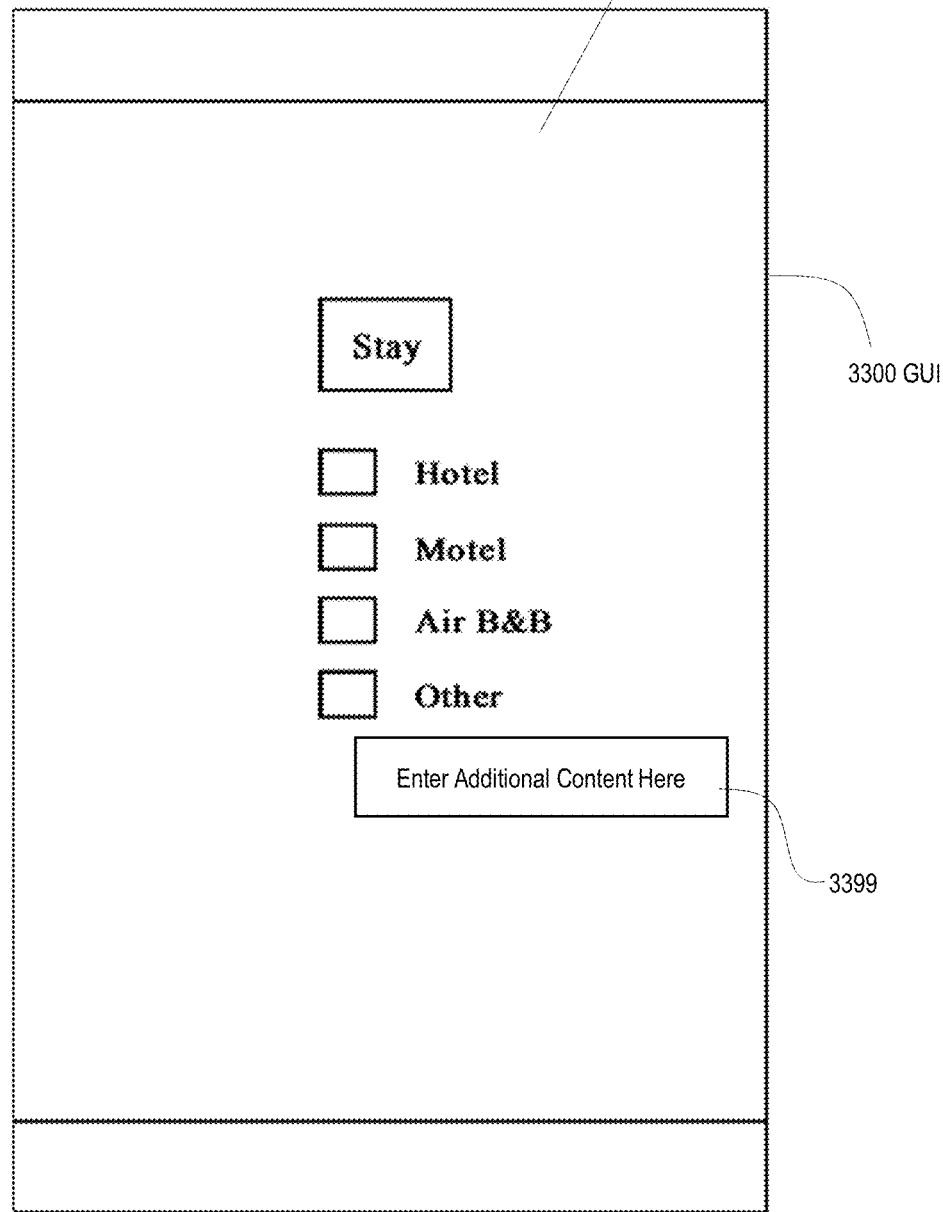
FIG. 33 is a diagram that includes a GUI 3300 for further tagging of photos or allow users to identify additional content, which can be added to or associated with a photo, that can be generated by the photo system and presented to the user, in accordance with principles of the disclosed subject matter.

FIG. 31 illustrates a further GUI 3100 that can be generated by the PS and presented to the user. The further GUI 3100 allows the user to input additional information regarding a "drink" location type. The GUI 3100 can include dialogue box 3199 into which a user can input comments, i.e. text, regarding the user's selection in the GUI 3100, one or more associated photos, and/or the user, for example. FIG. 32 illustrates a further GUI 3200 that can be generated by the PS and presented to the user. The further GUI 3200 allows the user to input additional information regarding an "eat" location type. The GUI 3200 can include dialogue box 3299 into which a user can input comments, i.e. text, regarding the user's selection in the GUI 3200, one or more associated photos, and/or the user, for example. FIG. 33 illustrates a further GUI 3300 that can be generated by the PS and presented to the user. The further GUI 3300 allows the user to input additional information regarding a "stay" location type. The GUI 3300 can include dialogue box 3399 into which a user can input comments, i.e. text, regarding the user's selection in the GUI 3300, one or more associated photos, and/or the user, for example.

Hereinafter further features of the systems and methods of the disclosure will be described.

As described above, a particular area can achieve a predetermined density of photos so that the area can be elevated to the status of a spot. The predetermined density of photos can include a determination of how many photos of any type are disposed in the particular area. The predetermined density of photos can include a determination of how many photos of a particular type are disposed in a particular area. In response to a search query by a user, search results can be provided based on whether an area has or has not attained the status of a spot. Further functionality can be provided so as to distinguish between different spots. For example, spots can be ranked so as to be compared with other spots. For example, a predetermined threshold to attain spot status can be 20 photos in a particular area, such as in a particular patch. However one spot can include 21 photos. Another spot can include 55 photos. Accordingly, functionality can be provided so as to differentiate the relevancy of such 2 different spots. For example, data can be provided to the user, in response to a search query, so as to advise the user of such different density in spots. For example, a spot can be ranked so as to be able to be compared with other spots.

Additionally, the criteria or thresholds used to determine if density of an area is sufficient to deem the area a "spot" can depend on various criteria. For example, in a highly populated area, the threshold to elevate an area to a spot can be different than the threshold (to elevate an area to a spot) in a very rural area. Thus, in New York City, a patch might be required to have 50 photos associated with a patch so as to attain spot status. On the other hand, a patch in a rural area may only be required to have 10 photos associated with such patch so as to attain spot status. Further, patches in respective regions, such as rural versus urban, can be of different size, in accordance with at least one embodiment of the disclosed subject matter.

Relatedly, various attributes of a particular photo can be used so as to determine whether the photo should or should not count toward elevating a particular area to a spot. For example, date data or metadata that is associated with a particular photo can dictate whether the photo should be counted towards elevating an area to spot status. For example, for a particular area, if the date of the photo is more than 6 weeks old, then the photo might not count. In a high-traffic area, such threshold date might be much more recent than a more rural area. Various factors can be considered in determining such threshold date for whether a photo is or is not counted towards spot status. Additionally, date "Windows" can be utilized. For example, a particular event may have occurred over a particular week. Accordingly, only photos that bear a date of that week might be deemed to count towards spot status. Additionally, attributes relating to upload of the photo can also be taken into account in whether a photo should or should not be counted towards spot status. For example, if a photo is taken at a particular location, in a particular area, and uploaded within 5 minutes—then such photo may be deemed a "recent" or "live" photo. In such processing, both data regarding when the photo was actually taken and when the photo was uploaded can be used. For example, if the photo was not uploaded until after some predetermined time, such as two days, then the photo might not be counted towards spot status. Accordingly, predetermined thresholds can be used that relate to when a photo was taken and when the photo was uploaded to the photo system, for example.

As described herein, a spot can be generated in any of a variety of manners. A spot can be generated based on pure number of photos within a particular area. A spot can be generated based on number of photos of a particular type within a particular area. Thus, a single geographical area can be associated with a plurality of spots that correspond to that area. For example, a particular area may be deemed a spot based on such area including 20 photos that have been tagged as location type "drink". That same area may be deemed a spot based on such area including 20 photos that have been tagged as location type "eat". Additionally, that same area may be deemed a spot based on such area including a total number of 30 photos, i.e. in the situation that a threshold number of photos to attain spot status might be 25. Accordingly, the PS provides the ability for a user to search or assess "spots" in a variety of different manners. Such different manners might be described as different "lenses" through which the user might look to assess details of a particular area. Relatedly, functionality provided by the PS may allow for the observation of correlation, or lack thereof, between attributes of spots associated with a particular area.

For example, a particular "area X" may have gained spot status by virtue of a sufficient number of photos being tagged as location type "eat". Indeed, the number of photos may have far exceeded the threshold to attain spot status. However, that same area X may not have attained spot status based on number of photos being tagged as location type "drink". Accordingly, such disparity can be observed. In such situation, it may be the case, for some reason, that a correlation is expected between drink location type and location type. However, in this example, such correlation is not observed. Accordingly, such disparity may be flagged and appropriate action taken and/or appropriate research performed so as to determine the reason behind such disparity. Appropriate action can be taken in some automated manner by the photo system.

Relatedly, the upload or submission of a photo associated with a particular area may indeed constitute a "vote" by the user for that area. As the user uploads a further photo associated with an area, that photo constitutes a further vote for the area. Such functionality can be described as "your picture is your vote" or such functionality can be described as "the picture is your vote".

In accordance with principles of the disclosed subject matter, a submitted photo can relate to various aspects of ranking and popularity. Popularity can include or relate to volume of submitted photos and/or a preference strength as determined by submitted photos and can be flexible for location type, etc.

Therefore, a submitted photo by a user can led to related ranking processing and attributes, such as the ranking of a spot or area. Accordingly, a user's photo can constitute a spot or area. Accordingly, a user's photo can constitute a spot and that vote can vary by location and/or purpose. The viewpoint of a "spot" can be presented in a variety of methods, whether by volume ranking, user following strength, affinity group, etc. Such processing can be described as an "assessment" that can include assessment of "ratings" based upon varying ranking viewpoints, different lenses, lenses of different rankings and dominant lens, for example.

To describe further, processing can be performed that provides an "assessment" of a spot or other area. Such "assessment" can include verification of attributes of an area, and such attributes can include popularity of an area. Assessment can include performing processing to provide multiple viewpoints of the same thing, such as the popularity of a coffee house based on input photos that are input from two different affinity groups. Assessment can reveal differing or divergent viewpoints of an area. Assessment can include the aggregation or analysis of an area from different perspectives or from different lenses or from different affinity groups, i.e. based on respective data that is input from such different affinity groups. Assessment can reveal both (1) validation of an attribute of an area and/or (2) identification of divergence of opinion regarding an attribute of an area.

For example, some users might be associated with a first affinity group and some users might be associated with a second affinity group. Association of a particular user to an affinity group can be based on user interaction and/or attributes of the user. For example, the user might input data to the system indicating that the user is a "hiker" or a "climber". A GUI might be presented to the user via which the user inputs such data. Also, attributes of a user might dictate an affinity group to which the user will be associated, i.e. for example, the system might identify locations that the user frequents and, based thereon, tag the user as a hiker or a climber.

In one scenario, the hiker affinity group might collectively submit photos, which can be described as votes, so as to deem a particular restaurant popular. The climber affinity group might also collectively submit photos so as to deem the same restaurant popular. Based on such data that is input by the system, the system can assign a level of validation to such restaurant as truly being popular, i.e. since there was correlation between the hiker group and the climber group.

In a different scenario, the hiker affinity group might collectively submit photos, which can be described as votes, so as to deem a particular restaurant popular. The climber affinity group might also collectively submit photos so as to deem the same restaurant NOT popular. Based on such data that is input by the system, the system can assign a level of divergence or an indication of divergence to such restaurant as questionably being popular, i.e. since there was NOT correlation between the hiker group and the climber group.

Accordingly, "assessment" processing of the disclosure can (1) determine popularity of an area, (2) determine unpopularity of an area, and/or identify divergent perspectives of different affinity groups, for example. Assessment processing of the disclosure can include (1) determination of a popularity of an area, (2) validation of a popularity of an area, (3) substantiation of a popularity of an area, and/or (4) identify divergence (of popularity or unpopularity) amongst different viewpoints or amongst different affinity groups.

Such "assessment" might also be described as a "triangulation" of a spot or area or might also be described as including "triangulation" or "validation" of a spot or area.

In accordance with principles of the disclosed subject matter and as described above, the world or planet can be divided into areas in accordance with principles of the disclosed subject matter. The areas can include 6 levels in accordance with one embodiment of the disclosed subject matter. The areas can be divided in a hierarchical manner—with each area of a particular level being divided into subareas. Such might be in the form of a parent and child interrelationship as described above. However, the disclosure is not limited to such particulars. For example, instead of the planet being broken down into areas and subareas, a venue might be broken into areas. For example, the venue of a tradeshow might be an area to be broken down, i.e. such that the venue of the tradeshow is analogous to the planet. The venue of a tradeshow might be broken down into different levels of areas as desired, such as 4 levels. The lowest level might be termed a "patch" akin to the patch described above. Each of the patches at the tradeshow might correspond to a respective booth. As each booth receives a threshold number of photos, that booth/patch is elevated to be a "spot". Each photo can be viewed as a vote. The systems and methods of the disclosure can be applied in many other uses. For example, the systems and methods of the disclosure can be applied to zip codes and/or voting wards.

The systems and methods of the disclosure can also include functionality related to monitoring or censoring that can be performed by the photo system (PS) or by users of the PS. For example, such censoring can include a user censoring for inappropriate photo content or other content (for example explicit content or violence) being uploaded. Another example of censoring can include a user censoring for photos that have been tagged with an inaccurate or inappropriate location type. For example, a user might observe a number of photos that have been tagged as location type "places to eat". However, upon review of such photos, the photos may not in any way be related to restaurants or eating. Accordingly, the user may interface with the system so as to de-tag or un-tag the particular photo or photos. In at least some embodiments, such un-tagging can result in the photo immediately being removed from such "places to eat" status. In other embodiments, an administration person or functionality may be required prior to the photo being removed or un-tagged from such "places to eat" status. In some embodiments, a user can be provided with the ability to quarantine a photo or a group of photos.

Relatedly, functionality can be provided so as to censor the censoror, i.e. the user doing the censoring. Such functionality can be provided by the photo system (PS) assessing correlations between various data or data sets. For example, a user that is observed as censoring outside or in excess of a norm can be scrutinized or constrained in some manner. For example, a user can be constrained based on some predetermined threshold(s). For example, if a user is observed by the system to de-tag or un-tag allegedly inappropriate photos at twice average rate—such might constitute a threshold. Based on exceeding such threshold, a user's ability to de-tag or un-tag additional photos might be disabled. Such disabling might be performed in some automated manner by the photo system. In accordance with principles of the disclosed subject matter, such a user can be identified as an outlier, based on predetermined criteria and/or thresholds, and as a result, the user's censoring abilities be constrained or disabled in some manner.

Systems and methods are provided to process a digital photo. An apparatus to process digital photos can include a tangibly embodied computer processor (CP) and a tangibly embodied database, the CP implementing instructions on a non-transitory computer medium disposed in the database, and the database in communication with the CP. The apparatus can include (A) a communication portion for providing communication between the CP and an electronic user device; (B) the database that includes a non-transitory computer medium, and the database including the instructions, and (C) a cascading framework that includes framework areas, and the framework areas include: first level areas, and each of the first level areas divided into second level areas, the second level areas being divided into third level areas; and (D) the CP. The CP can perform processing including: (a) inputting a photo from the user device, and the photo including geographic data that represents a photo location at which the photo item was generated; (b) comparing the first level area, of the first level areas, in which the photo location is located and associating a first level area identifier to the photo as part of the photo data; (c) comparing the photo location with the second level areas to determine a second level area in which the photo location is located and associating a second level area identifier to the photo as part of the photo data; (d) comparing the photo location with the third level areas to determine a matching third level area in which the photo location is located and associating a third level area identifier to the photo as part of the photo data; (e) assigning the photo to the matching third level area; and (f) performing photo processing, and the photo processing including aggregating a photo count of the matching third level area.

In accordance with principles of the disclosed subject matter, the disclosure provides systems and methods to perform geographic identification of an area combined with using a photo, which is associated with the area, as a vote for one or more popularity determinations of the geographic area. The geographic area can be used for a variety of other purposes. The geographic area and/or a photo associated with the geographic area can be tagged so as to associate content or attributes to the geographic area and/or to the photo.

Hereinafter, further aspects of the systems and methods of the disclosure will be described.

Figure 34:
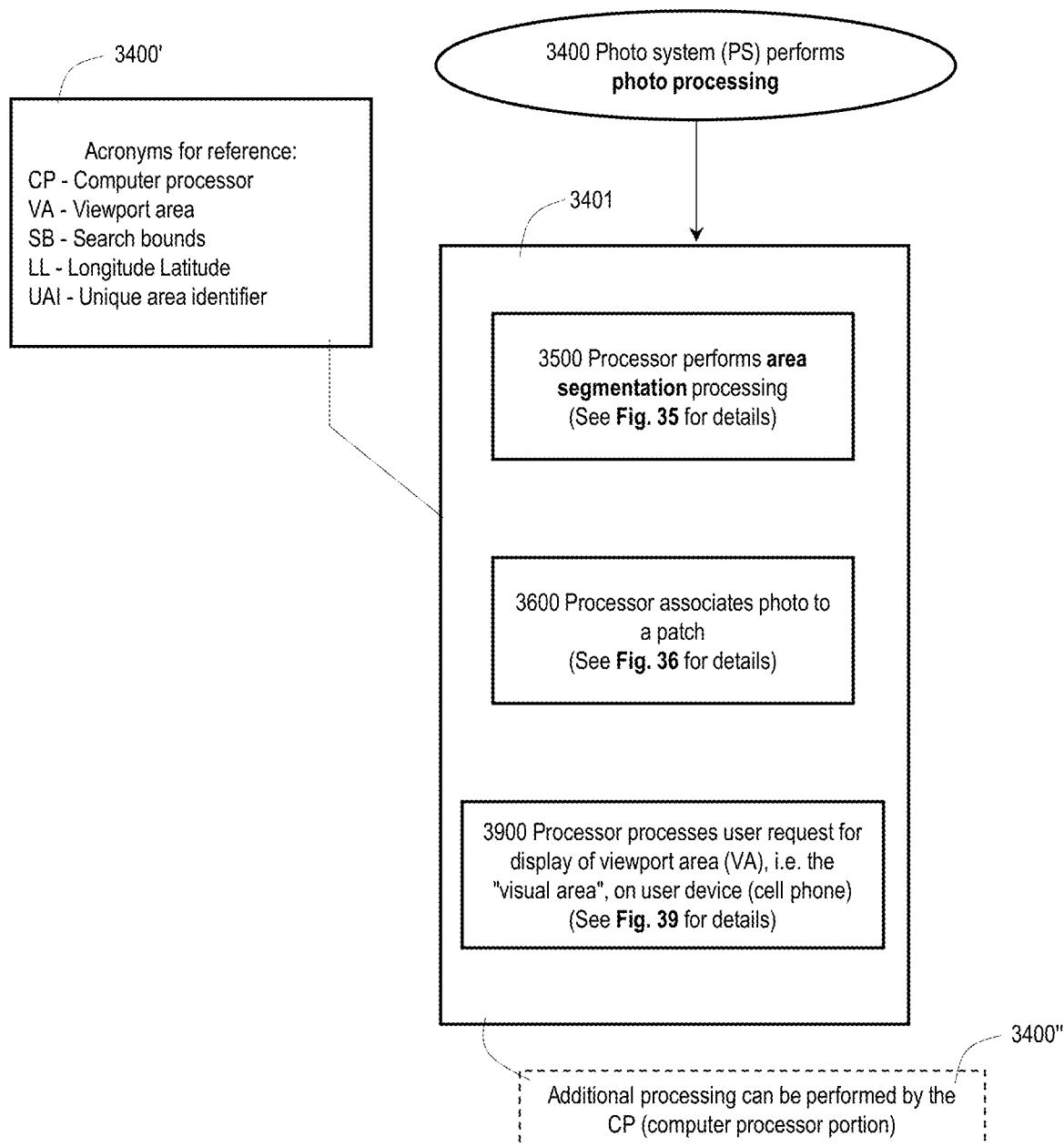
FIG. 34 is a high level flowchart showing additional processing of the disclosure in accordance, with principles of the disclosed subject matter.

FIG. 34 is a high level flowchart showing additional processing of the disclosure in accordance, with principles of the disclosed subject matter. The additional processing relates to further aspects of segmentation, association of a photo to a patch, visual display of information, and various related features. Details are described below.

As shown, the high level processing can begin in step 3400 which reflects that the photo system (PS) performs photo processing. Once initiated or launched, the processing passes onto step 3401. In step 3401, various additional processing can be performed. Acronyms described for reference, as reflected at 3400' in FIG. 34, include CP—computer processor; VA—viewport area; SB—search bounds; LL—longitude Latitude; and UAI—unique area identifier.

The processing of step 3401 can include step 3500. In step 3500, the processor or computer processor (CP) performs area segmentation processing. In such processing, an area such as the world or globe is segmented into identifiable areas. Further details are described with reference to FIG. 35. The processing of step 3401 can also includes step 3600 and step 3900. In step 3600, the processor associates a photo to a patch. In other words, the processor associates a photo that is input into the system into a designated area or framework of the system. Further details are described with reference to FIG. 36.

The processing can also include step 3900. In step 3900, the processor processes a user request for display of a "visual area", i.e. that can be described as a viewport area (VA) on a user device (UD). The user device can include a cell phone. Further details are described below with reference to FIG. 39. As reflected at 3400″, various additional processing can be performed by the CP in conjunction with the particular processing shown in FIG. 34. Such additional processing is otherwise described herein.

Figure 35:
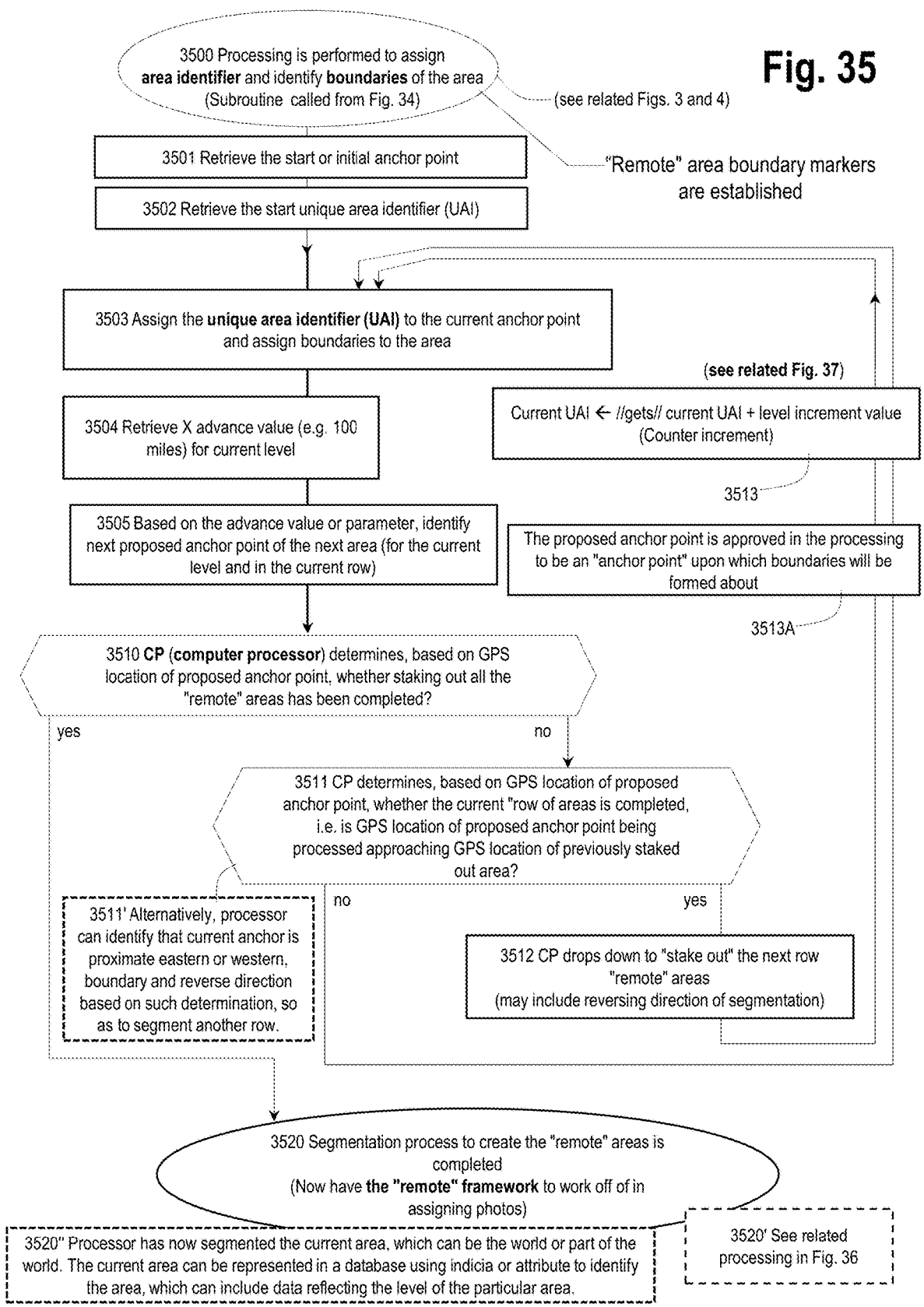
FIG. 35 is a flowchart showing details of "processing is performed to assign area identifier and identify boundaries of an area" of step 3500 of FIG. 34, in accordance with principles of the disclosed subject matter.

FIG. 35 is a flowchart showing details of "processing is performed to assign area identifier and identify boundaries of an area" of step 3500 of FIG. 34, in accordance with principles of the disclosed subject matter. As shown, the process starts in step 3500. The processing of FIG. 35 or portions of such processing can be used in lieu of the processing of FIGS. 3 and 4 described above, in accordance with at least some embodiments of the disclosed subject matter. The processing of FIG. 35 can be used in combination with features of the processing of FIGS. 3 and 4, as may be desired. In this illustrative embodiment of the disclosure, the processing of FIG. 35 can be used to establish a framework of "remote" areas. That is, in other words, what are described as "remote" areas can be generated that include both identifiers and boundaries of each respective remote area that is generated. Accordingly, a framework can be generated. Subsequent processing can then build on such initial framework.

After the processing starts in step 3500 of FIG. 35, the process passes onto step 3501. In step 3501, the CP can retrieve the start or initial anchor point for a first area to demarcate. For example, anchor points can be identified by latitude and longitude where a first anchor point can be 0 latitude and 0 longitude, i.e. off the East Coast of Africa in the Atlantic Ocean. However, the initial anchor point can be any location as desired. Then, the process passes onto step 3502.

In step 3502, the CP retrieves an initial or start unique area identifier (UAI). Further details of the UAI are described below with reference to FIG. 37. After step 3502, the process passes onto step 3503. In step 3503, the CP assigns a UAI to the current anchor point or other identifying reference point or attribute of the particular area. Also in step 3503, the CP assigns boundaries to the current anchor point, which corresponds to the current UAI. The assignment of boundaries is described further below.

Then, the process passes to step 3504. In step 3504, the CP retrieves an advance parameter for the current level, i.e. in the present example the "remote" level is the current level. In this example, each remote area is 100 miles×100 miles. Accordingly, the processing can advance or move 100 miles east of a current anchor point so as to advance to the next anchor point. That is, after step 3504, in which the advance parameter is retrieved, the process passes onto step 3505. In step 3505, based on the X-coordinate advance parameters or value, the CP identifies the next proposed anchor point of the next area (for the current level) and in a current row. Accordingly, the processing of step 3505 reflects that "remote" areas can be carved out or demarcated by going east around the globe or world. As described above, once an anchor point for a particular remote area is identified, the CP can then advance 100 miles to the east so as to identify the next anchor point for the next area. It should be appreciated that areas can be generated, i.e. "carved out," in other directions as may be desired.

After step 3505, with a next potential anchor point identified, the process passes onto step 3510. In step 3510, the CP determines based on GPS (global positioning system) location (or longitude/latitude) of the current area, whether demarcating or staking out the remote areas has been completed. In other words, has the globe or world (or some other area that has been designated for segmentation) been fully demarcated or carved out into discrete "remote" areas. For example, such processing can compare GPS locations of areas that have been carved out versus GPS data of the entire globe. If the entire globe is populated with carved out areas, then the determination of step 3510 renders a yes. Alternatively, the GPS locations of areas that have been carved out or "staked out" can be compared to a specific area that is desired to be "staked out". If the complete area desired to be staked out is fully populated with areas, in this illustrative example "remote" areas, then a "yes" would be rendered in the processing of step 3510. On the other hand, a "no" may be rendered in step 3510.

If a "no" is rendered in step 3510, the process then passes onto step 3511. In step 3511, the CP determines, based on GPS location of the current area, whether the current "row" of areas is completed. That is, the processing can determine whether the GPS location of the current area being processed is approaching a GPS location of a previously staked out area. For example, if a new anchor point is identified—and such new anchor point is identified to be within 100 miles of a previously identified anchor point—than the processor can determine that the particular "row" circling the globe has been completed. Accordingly, a "yes" can be rendered in the processing of step 3511. The process then passes onto step 3512.

In step 3512, the CP drops down, i.e. since in this example the segmentation is advancing in a southern direction, to "stake out" the next row of "remote" areas. The amount of the CP drops down can be dictated by a Y-coordinate advance value or parameter. In this example, the described "remote" areas are 100 miles×100 miles. Accordingly, the Y-coordinate advance value is the same as the X-coordinate advance value, i.e. 100 miles, in this example. After step 3512, the process passes onto step 3513A.

On the other hand, a "no" may be rendered in the determination of step 3511. Such "no" determination indicates that there are still additional "remote" areas that are to be carved out or demarcated in the particular row of areas. Accordingly, the next remote area can be determined by advancing in eastern direction according to the X-coordinate advance value. In this example, the X-coordinate advance value can be 100 miles. After step 3511, upon a no being rendered, the process passes to step 3513A.

Accordingly, step 3511 or step 312 are reflective that a proposed anchor point has been determined that can be associated with or identify a further area. If the further anchor point "runs up against" a previously identified anchor point or other row ending identifier, then the CP knows that the particular row of anchor points has been completed, and step 3512 is performed. If the further anchor point does not "run up against" a previously identified anchor point, then the CP knows the particular row of anchor points has not been completed, and the process passes directly from step 3511 to step 3513A. Either way, a further anchor point has been identified that is to be associated with a further identifier. Accordingly, in step 3513A, the proposed anchor point is approved in the processing to be an "anchor point" upon which boundaries will be formed about. Then, in step 3513, the CP increments the current unique area identifier (UAI) so as to generate a new unique area identifier. Such increment processing can be performed by adding a level increment value on to the current UAI value. Further details are described with reference to FIG. 37 regarding a particular numbering scheme that can be utilized in the processing of the disclosure.

Accordingly, step 3513 results in the generation of a new UAI. Then, the process passes back to step 3503. In step 3503, the processor indeed assigns that newly determined UAI to represent the current anchor point. Processing then advances to step 3504. Processing then continues as described above.

With further reference to FIG. 35, it may be determined in step 3510, that the processor has determined that the "staking out" of the remote areas has been completed. That is, a yes is rendered in step 3510. As a result, the process passes onto step 3520.

In step 3520, segmentation processing to create the "remote" areas in the area to be segmented has completed. Thus, the system now has a "remote" area framework to work off of to assign photos in manner as described below. As noted at 3520", step 3520 reflects that the processor has now segmented the current area, which can be the world or part of the world. The current area can be represented in a database using indicia or attribute to identify the area, which can include data reflecting the level of the particular area.

It should be appreciated that the description herein has been described in the context of a "remote" area. In this example, such remote area is the highest level area or largest area that the framework includes.

The "remote" area is illustratively 100 miles×100 miles, though such distance can be varied as desired. It is appreciated that the term "remote" area could be renamed as desired, and is used herein for purposes of description. Once the framework has been established, various related processing can be performed.

Figure 36:
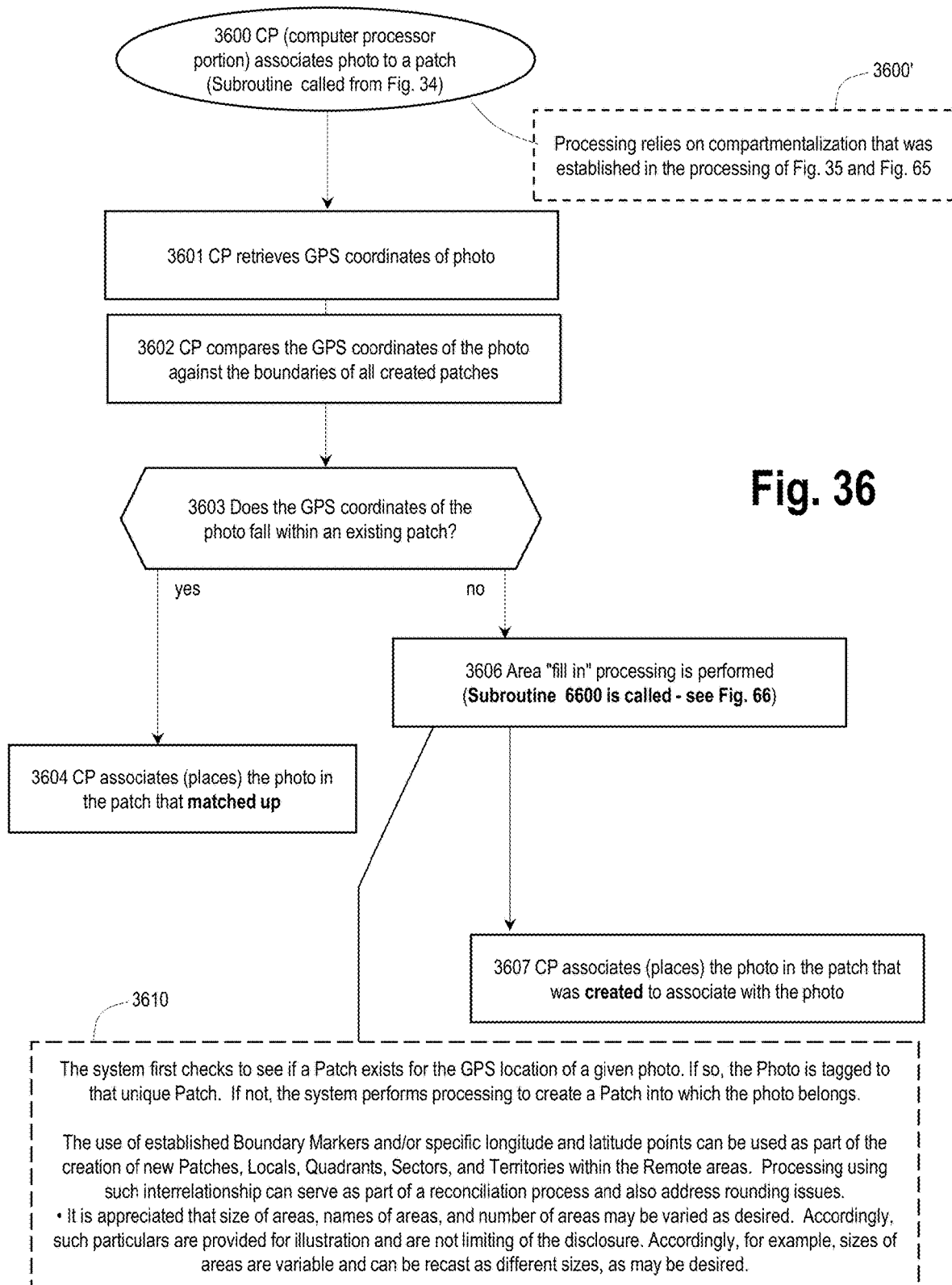
FIG. 36 a flowchart showing details of "CP associates photo to a patch" of subroutine 3600 as called from FIG. 34, in accordance with principles of the disclosed subject matter.

As reflected at 3520' in FIG. 35, FIG. 36 shows related processing that can utilize the framework created by the processing of FIG. 35.

As described above, the CP can assign boundaries to each anchor point that is represented by a corresponding UAI. Such boundaries can be assigned or demarcated in different manners. In one embodiment, once an anchor point is established for reference to a particular area, then other points or corner points of the area can also be established.

Figure 65:
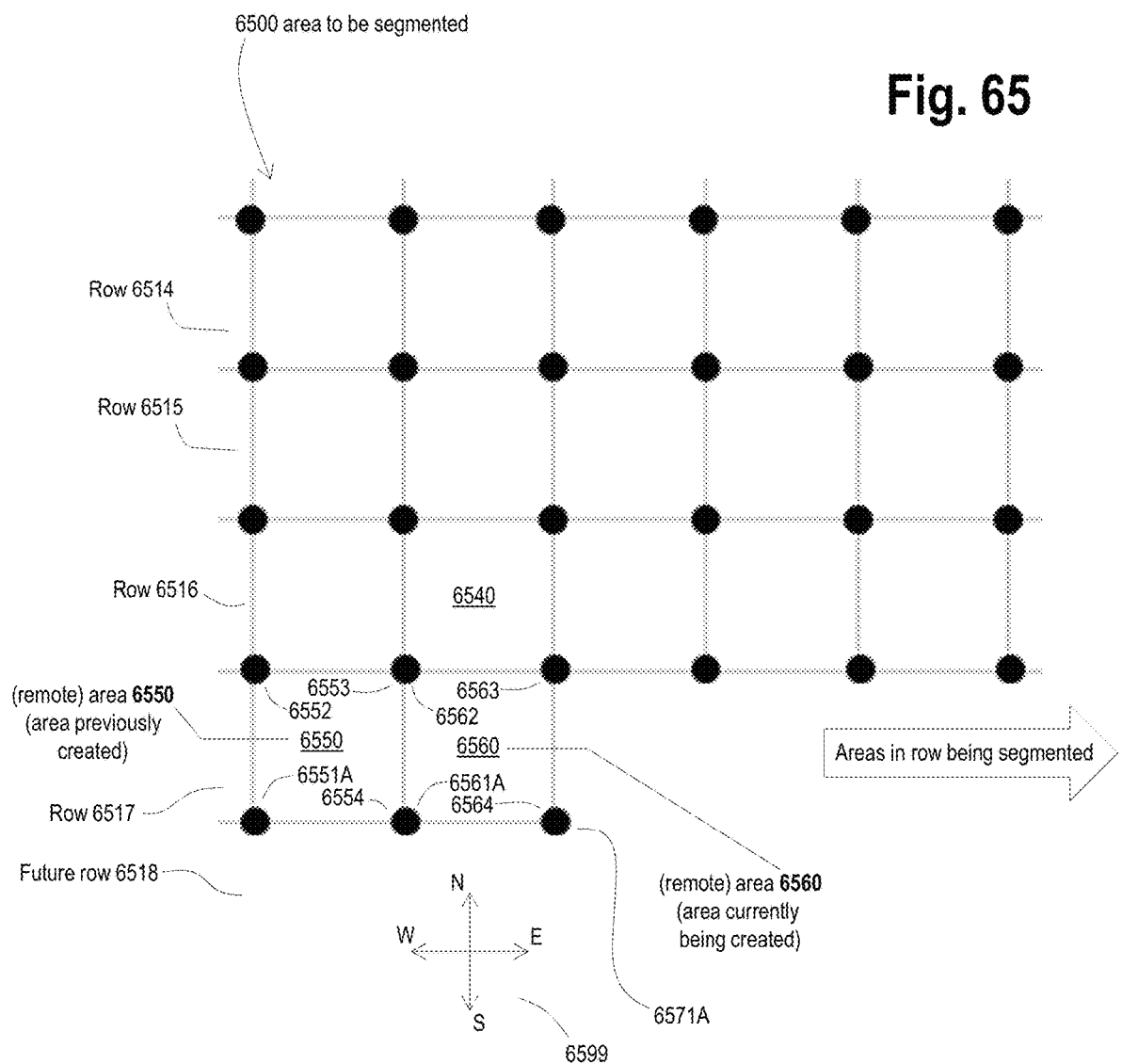
FIG. 65 is a diagram further illustrating segmentation of an area 6500, in accordance with principles of the disclosed subject matter.

FIG. 65 is a diagram further illustrating segmentation of an area 6500, in accordance with principles of the disclosed subject matter. For reference, FIG. 65 includes coordinates 6599. As shown, an area 6550, within the area 6500, has been segmented. The area 6550 is in a row 6517. The area 6550 can be identified by an anchor point 6551A. The area 6560 can include NW corner point 6552, NE corner point 6553, and SE corner point 6554. Processing can then be performed to generate a new area 6560.

In accordance with at least one embodiment of the disclosed subject matter, the processor can retrieve the SE corner point 6554, i.e. of the previously generated area 6550. The processor can assign coordinates (of such SE corner point of the area 6550) to be the coordinates of proposed anchor point 6561A of the new area 6560. As described above with reference to FIG. 35, such proposed anchor point 6561A can be checked to determine proximity to other previously created anchor points and/or checked to determine proximity to a border to the area to be segmented, such as a quadrant of the globe, for example.

If such proposed anchor point 6561A is not proximate in such manner, then such proposed anchor point 6561A is deemed a full fledged or approved "anchor point". Accordingly, the processor can advance to assign boundaries to such anchor point.

In the processing to assign boundaries to such anchor point, the processor can perform the following.

Retrieve the anchor point 6561A of the current area 6560 from memory.
 The SE corner point 6564 of the new area 6560 can then be determined by "adding" 100 miles, i.e. the advance value in the x-direction, on to the anchor point 6561A in the east direction.
 The NW corner point 6562 of the new area 6560 can then be determined by "adding" 100 miles, i.e. the advance value in the y-direction, on to the anchor point 6561A in the North direction.
 The NE corner point 6563 of the new area 6560 can then be determined by "adding" 100 miles on to the NW corner point 6562 in the east direction.

Once segmentation of the row 6517 is completed, the processor can proceed with segmenting the row 6518, i.e. future row 6518.

The segmentation can be described as taking 100 mile square chunks of area moving due east along a line, in a row, in accordance with at least one embodiment of the disclosed subject matter. The processor can determine that a row, e.g. row 6516, has been completed based on (1) comparison of area to be segmented versus the GPS location of the current proposed anchor point being generated and/or (2) that the GPS location of the current anchor point being generated is approaching a previously generated anchor point. Once segmentation of the row 6516 is complete, the processor can advance down to segment a further row 6517, as shown. As shown in FIG. 65, rows 6514 and 6515 have been already segmented.

In alternative processing, the corner point 6562 might be deemed as the new anchor point 6562, and a new SW corner point 6561A be generated based on the newly deemed anchor point 6562. It is appreciated that any corner point (or a center point) might be used as the reference or anchor point, as may be desired. As shown, segmentation can proceed in a down or south direction. Segmentation could instead proceed up or north, or indeed in any direction as desired.

Accordingly, in this manner, the boundaries, of the area 6560 that is associated with the anchor point 6561A, can be determined. Also, the anchor point 6561A can be identified or associated with a unique area identifier (UAI) as described further below.

Accordingly, each anchor point can be associated with a distinct area. Relatedly, the generation of anchor points, for each respective area, can be performed. In the segmentation processing, the anchor point can be established in advance of boundaries associated with a given anchor point. In the example of FIG. 65, the anchor point 6561A has been established. Once the anchor point 6561A has been established, the boundaries associated with the anchor point 6561A can be established as described above. Then, the processing can determine the next proposed anchor point for the particular row being processed. Such corresponds to the processing described in step 3505 of FIG. 35. In this example, a next anchor point 6571A can be determined by moving the advance distance in a direction to the east (from anchor point 6561A), as reflected in coordinates 6599.

It is appreciated that the processing that is utilized to demarcate areas of the particular framework can be varied. In the example of FIG. 65, remote areas can be carved out in rows progressing in an eastern direction. As one row is completed around the globe or world, then the processing drops down (or advances down) to complete the next row. Such processing is reflected in step 3512 of FIG. 35.

However, other approaches and methodologies may be used. For example, an area can be segmented by going back and forth over the area. Thus, as the processor identifies that a proposed anchor point has been established proximate to or at a boundary, the direction of segmentation can be reversed. That is, for example, as segmentation approaches an eastern boundary of the area to be segmented, the processing can be reversed so as to proceed in a western direction. Then, at a point, the segmentation will reach a western boundary of the area to be segmented. Then segmentation can again be reversed so as to again advance in the eastern direction carving out remote areas, in this example. Such alternative processing is reflected at 3511' in FIG. 35. Accordingly, the globe or some other predetermined area can be segmented in what might be described as ribbons or layers. As one ribbon or layer is completed, i.e. segmented, the processing drops down (or up) to the next layer. As a final ribbon or layer is completed in a particular area, the GPS position of the anchor point 6511 can be identified as approaching the southern or bottom extent of an area to be segmented. Accordingly, akin to step 3510 of FIG. 35, the processor can identify if the segmentation of the particular area has been completed.

As described above, segmentation can be performed by going around the entire global world in ribbons or layers. Once an anchor point is identified as being sufficiently proximate a previously created anchor point in a row, i.e. a ribbon around the world has been completed, then the processing can drop down to "stake out" the next row as reflected in step 3512 of FIG. 35. However, instead, the world could be broken into discrete areas and each discrete area segmented separately. For example, the world could be broken into quadrants including a northwest quadrant, a northeast quadrant, a southwest quadrant, and a southeast quadrant. Each demarcated area can be identified by its quadrant. For example, an area in the northeast quadrant could include the indicia NE in its unique area identifier. Further details are described below.

In one embodiment of the processing described above, the southeast corner point, i.e. the coordinates of such point, can be used to generate the anchor point 6561A for the next area to be generated, i.e. the area 6560, as shown in FIG. 65. Such processing methodology to generate a row of segmented areas can be utilized even in the situation that there is not a row above the current row being segmented. That is, the methodology could be utilized even if row 6516 had not previously been generated. That is, such methodology can be utilized if there is a row running above the current row being generated, as well as if there is not a row running above the current row being generated.

However, in some embodiments of segmentation, it can be advantageous to rely on an adjacent row, if indeed such adjacent row does indeed exist. For example, coordinates of the southwest corner point of an area 6540, shown in FIG. 65, could be utilized to generate the northwest corner point 6562 for the area 6560. Such interrelationship in forming a new row based on coordinates of an existing row can decrease inconsistencies, inaccuracies, and prevent drift. In general, it is appreciated that the generation of a new area in segmentation can utilize any existing area, anchor point, corner point, or other reference point as may be desired.

As described above, in steps 3510 and 3511 of FIG. 35 for example, a proposed anchor point can be generated. Once the proposed anchor point is generated, the processor can determine whether that proposed anchor point is proximate a boundary of the area to be segmented or whether the proposed anchor point is proximate to another anchor point previously generated to form an area. Such a border or previously generated anchor point can be generally described as an "impediment" to the current proposed anchor point, i.e. in that such impediment impedes the proposed anchor point being deemed an anchor point—and impedes the proposed anchor point being subsequently associated with boundaries and a unique area identifier.

To explain further, in generation of remote areas, the advance value in the X-direction can be 100 miles. For example, the segmentation of a row can be approaching the end of the row. As result, a proposed anchor point can be, for example, 67 miles from the anchor point of the first area in the particular row. In such situation, a fractional or shortened "remote" area can be generated. Such a fractional remote area can include the 67 miles that has to still be allocated to a particular area. Such fractional remote area can still be 100 miles in "height". Accordingly, the particular row can be fully completed using such a mini area or fractional area. The segmentation could be engineered such that such a fractional area could be in a remote location unlikely to receive photos. In addition, a user might be alerted to any such fractional area by a GUI alert on the user device (UD). Relatedly, in a segmentation map, such as is shown and rendered in FIG. 37, a fractional area on the right end of a row can complement a fractional area on the left end of the same row, so as to collectively form a complete area, such complete area being equal in area to other areas along the length of the row.

Accordingly, various processing to perform segmentation of the world or other geographical area is described above with reference to FIGS. 35 and 65.

FIG. 36 a flowchart showing details of "CP associates photo to a patch" of subroutine 3600 as called from FIG. 34, in accordance with principles of the disclosed subject matter. As reflected at 3600', the processing of FIG. 36 relies on the segmentation of compartmentalization that was established in the processing described with reference to FIGS. 35 and 65. That is, the processing of FIG. 36 relies on the remote areas that are created in the processing of FIGS. 35 and 65.

The subroutine is initiated in step 3600 and passes onto step 3601. In step 3601, the CP retrieves the GPS coordinates of the photo. For example, the photo may have just been input from a user. Then, the process passes onto step 3602. In step 3602, the CP compares the GPS coordinates of the photo against the boundaries of all created patches. Then in step 3603, the CP determines if the GPS coordinates of the photo fall within an existing patch. For example, if a previous photo has been added into the system from a GPS location proximate the new photo, then it may well be that a patch will already exist for the new photo. Accordingly, a "yes" may be rendered in the determination of step 3603—and the process passed onto step 3604. In step 3604, the CP associates or places the photo in the identified patch that matched up. The photo has thus found a "home" in a patch that was previously created.

On the other hand, a "no" may be rendered in the determination of step 3603. As a result, the process passes onto step 3606. In step 3606, area "fill in" processing is performed. Such processing is performed to create a patch into which the photo may be placed. Subroutine 6600 can be utilized to perform such fill in processing. Details are described below with reference to FIG. 66.

Accordingly, a result of the processing of step 3606 is to create a patch area, i.e. a patch, into which the new photo can be placed. After step 3606 as shown in FIG. 36, the process passes onto step 3607. In step 3607, the CP proceeds with associating or placing the photo into the appropriate patch, which was created in step 3606.

As reflected at 3610 in FIG. 36, and in summary, the system can first check to see if a Patch exists for the GPS location of a given photo. If so, the Photo is tagged or associated to that unique Patch. If not, the system performs processing to create a Patch into which the photo belongs.

The use of established Boundary Markers and/or specific longitude and latitude points (or GPS location) can be used as part of the creation of new Patches, Locals, Quadrants, Sectors, and Territories within the Remote areas. Processing using such interrelationship can serve as part of a reconciliation process and also address rounding issues. It is appreciated that size of areas, names of areas, and number of areas may be varied as desired. Accordingly, such particulars as described herein are provided for illustration and are not limiting of the disclosure.

Figure 66:
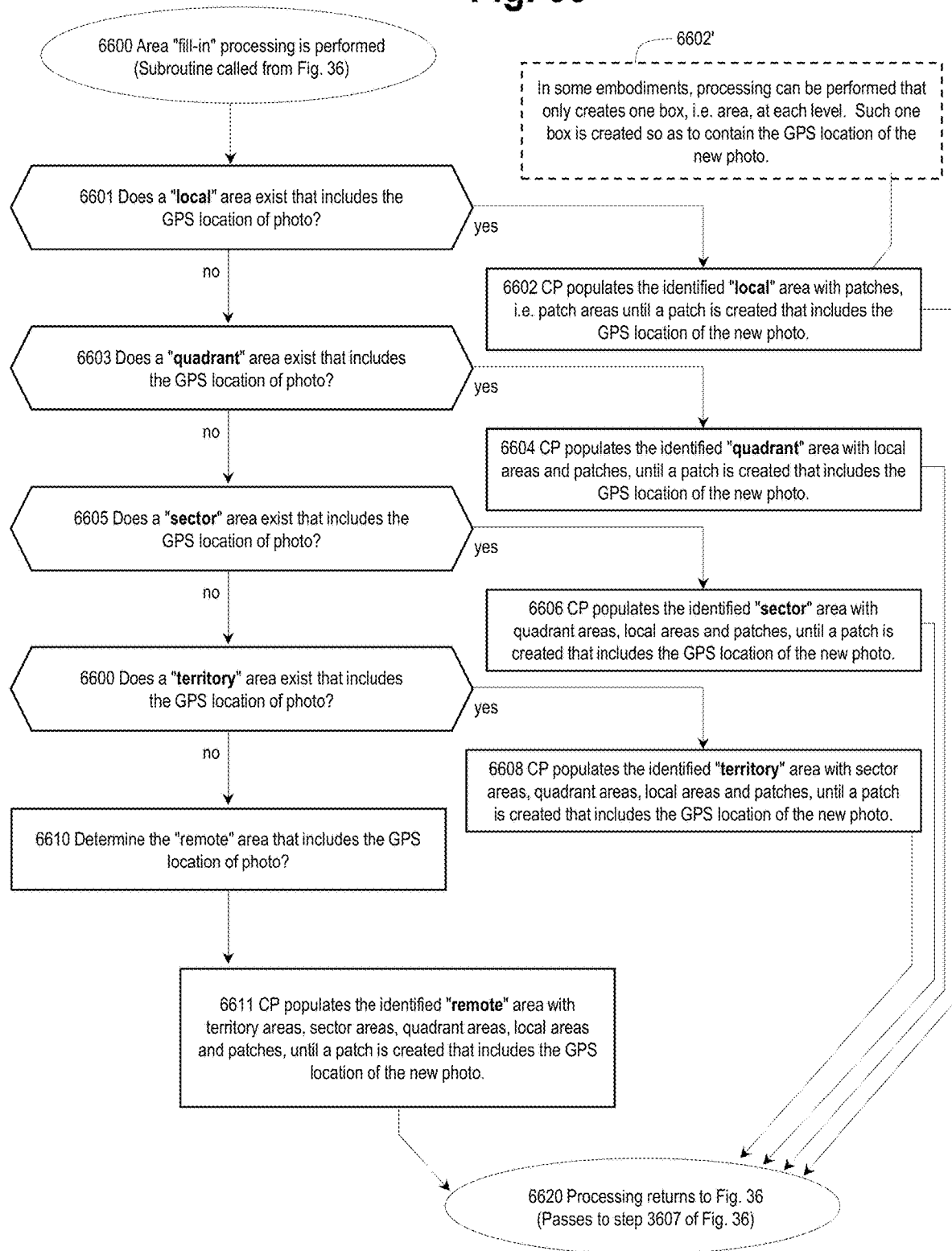
FIG. 66 is a flowchart showing details of "area fill-in processing is performed" of subroutine 6600 as called from FIG. 36, in accordance with principles of the disclosed subject matter.

FIG. 66 a flowchart showing details of "area fill-in processing is performed" of subroutine 6600 as called from FIG. 36, in accordance with principles of the disclosed subject matter. The process is initiated in step 6600 and passes to step 6601. In summary, it is appreciated that the processing of FIG. 66 is invoked in the situation that a photo is input into the system and the GPS coordinates of that photo do not match up within an existing patch area. In such situation, as described below, the processing can include going "up" the segmentation framework until an area is identified that includes the GPS location of the new photo. Once the area is identified, the processing then "fills in" such identified area until a patch is generated that includes the GPS location of the new photo. In this manner, the new photo is provided a "home".

FIG. 66 illustrates such processing. In step 6601, the processor or CP determines if a local area exists that includes the GPS location of the photo. If "yes", then the processor populates the identified local area with patches, until a patch is created that includes the GPS location of the new photo. That is, in some embodiments, patches will only be created in the local area until a patch is created that contains the GPS location of the new photo. However, in other embodiments, the entire local area can be segmented into patches—after which the particular patch that contains the GPS location of the photo will be identified.

Such alternative processing may require additional processing capacity as compared to a situation where patch generation is terminated upon the patch, containing the GPS location of the photo, being identified. After step 6602, the processing passes onto step 6620.

Relatedly, as reflected at 6602' in FIG. 66, in some embodiments, processing can be performed that only creates one box, i.e. area, at each level. Such one box is created so as to contain the GPS location of the new photo. To explain further, in the processing of steps 6602, 6604, 6606, and 6608, the CP can, at each level, start at a starting point and create areas, i.e. boxes, until an area (at the particular level) is created that contains the GPS location of the new photo. However, in an other embodiment, only one box can be created at each level. That is, in such other embodiment, only one box, i.e. area, at each level can be created—with such one area being created to contain the GPS location of the new photo. The one box, in each area, can be created.

For example, the processing to create an area within a higher level area, e.g. a patch within a local, can include the following. If a photo, having a photo GPS position, is determined to be in a local area, but no patch has been created that contains the photo within its boundaries, a new patch can be created. The processor (i.e. the CP) can determine the local, i.e. the local area, in which the new photo is disposed.

The processor can then demarcate out divisions within the local area. For example, the local area can be broken into 10 divisions in the x direction and 10 divisions in the y direction. Each division can be identified with a marker. The processor can identify which two x-markers the photo GPS position is between in the x-direction, as well as which two y-markers the photo GPS position is between in the y-direction. Accordingly, the CP can then create a patch area based on which four (4) markers are identified, i.e. which two x-markers bound the photo GPS position, and which two y-markers bound the photo GPS position.

The highest value x-marker and the highest value y-marker can define a northeast corner of the patch.

The lowest value x-marker and the lowest value y-marker can define a southwest corner of the patch. If any of the markers and/or the corners of the patch are proximate a previously created marker and/or corner—then the previously created marker and/or corner can be used, so as to provide consistency and smooth continuity of segmentation. This described processing can be applied to other levels of areas, as desired.

With further reference to FIG. 66, on the other hand, it may be determined in step 6601 that a local area does not exist that includes the GPS location of the photo. Accordingly, the process passes to step 6603.

In step 6603, the processor determines if a quadrant area exists that includes the GPS location of the photo. Accordingly, the processor will go to higher-level and larger areas to determine an area that contains the GPS location of the new photo. If a "yes" is rendered in step 6603, then the process passes onto step 6604. In step 6604, the processor populates the identified quadrant area with local areas and patches, until a patch is created that includes the GPS location of the new photo. Once a matching patch is created and identified, then the processing of step 6604 is terminated. After step 6604, the process passes onto step 6620. On the other hand, a "no" may be rendered in the processing of step 6603. As a result, the process passes onto step 6605.

In step 6605, the processor determines if a sector area exists that includes the GPS location of the photo. If "yes," then processing passes onto step 6606. In step 6606, the CP populates the identified sector area with quadrant areas, local areas and patches, until a patch is created that includes the GPS location of the new photo. Then, the process passes onto step 6620. On the other hand, a "no" may be rendered in step 6605. Thus, the process passes onto step 6600.

In step 6600, the processor determines if a territory area exists that includes the GPS location of the new photo. If "yes," then the process passes onto step 6608. In step 6608, the CP populates the identified territory area with sector areas, quadrant areas, local areas and patches. Such processing is performed until a patch is created that includes the GPS location of the new photo. On the other hand, a "no" may be rendered in the processing of step 6600. As a result, the process passes onto step 6610.

In step 6610, the processor determines the remote area that includes the GPS location of the photo. Step 6610 reflects that all remote areas have previously been created, in this embodiment of the disclosure. Accordingly, the particular remote area that contains the GPS location, of the new photo, can be determined in step 6610. Then, in step 6611, the processor populates the identified remote area with the territory areas, sector areas, quadrant areas, local areas, and patches. Such processing to populate the identified remote area is performed until a patch is identified that includes the GPS location of the new photo. That is, processing is performed until a patch is identified as a "home" to the new photo. After step 6611, the process passes onto step 6620.

In step 6620, the processing returns to FIG. 36 with a patch having been created that includes the GPS location of the new photo. As described above, in step 3607 of FIG. 36, the processor then associates or places the photo into the patch that has been created.

It is appreciated that any of the framework generation processing, the segmentation processing and/or other related processing described herein can be utilized in conjunction with the processing of FIG. 66. As described above, in step 6602, 6604, 6606, 6608, and 6611, processing can be performed until a patch is identified that matches up with the GPS location of the new photo. On the other hand, in another variation of the processing, if a remote area is identified as containing the new photo, then it might be the case that the entirety of such remote area is populated with territories, sectors, quadrants, locals, and patches. Other selective processing can be utilized so as to identify a matching patch as quickly as possible and with minimal processing, if such is desired. For example, the processing might include determination of where a patch is located in a particular remote area. If a patch is located adjacent a corner of such remote area, then generation of areas within such remote area might be initiated proximate to the identified corner. Other "efficient" processing techniques might be utilized as desired.

Figure 37:
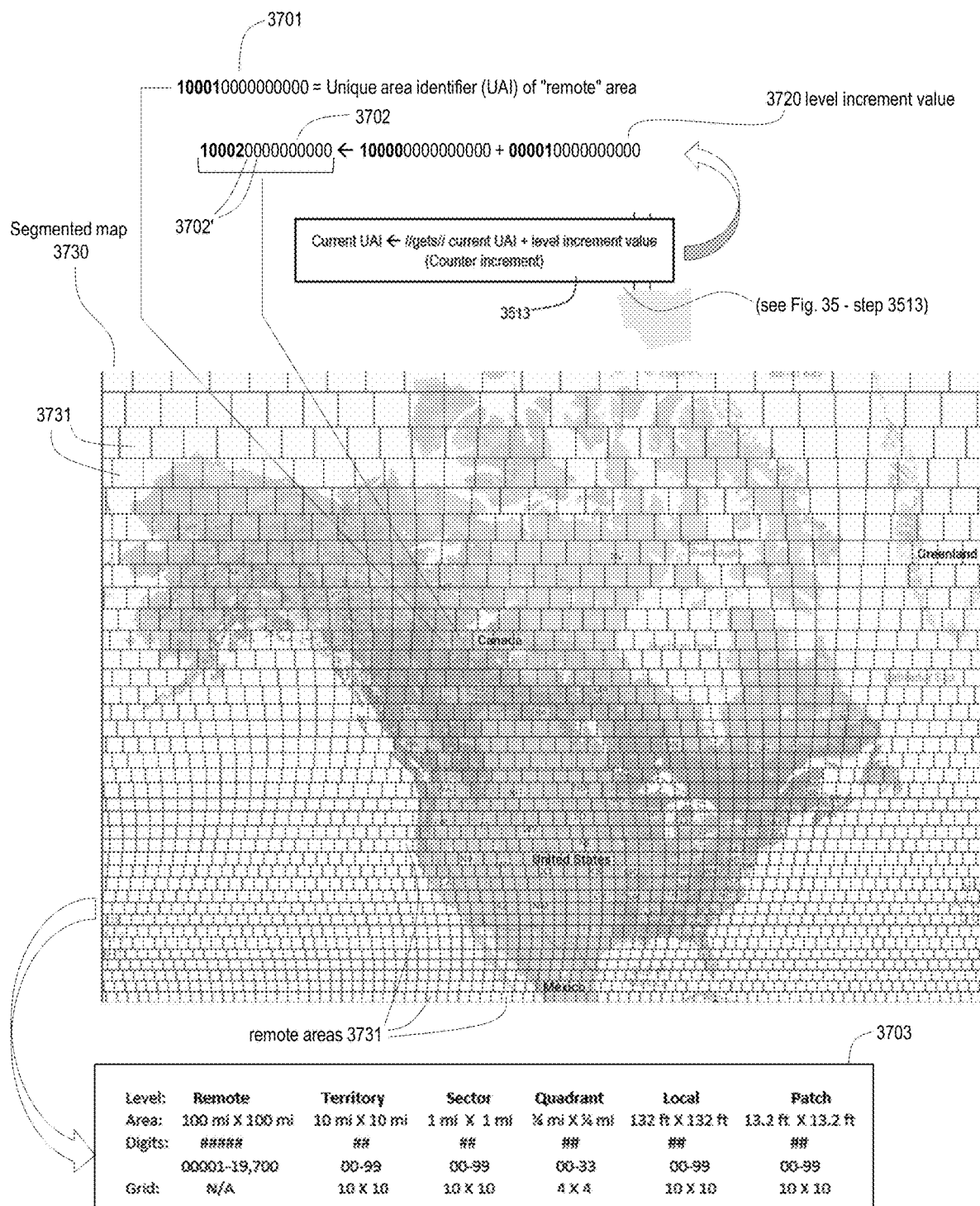
FIG. 37 is a diagram showing aspects of unique area identifier (UAI) generation, in accordance with principles of the disclosed subject matter.
Figure 38:
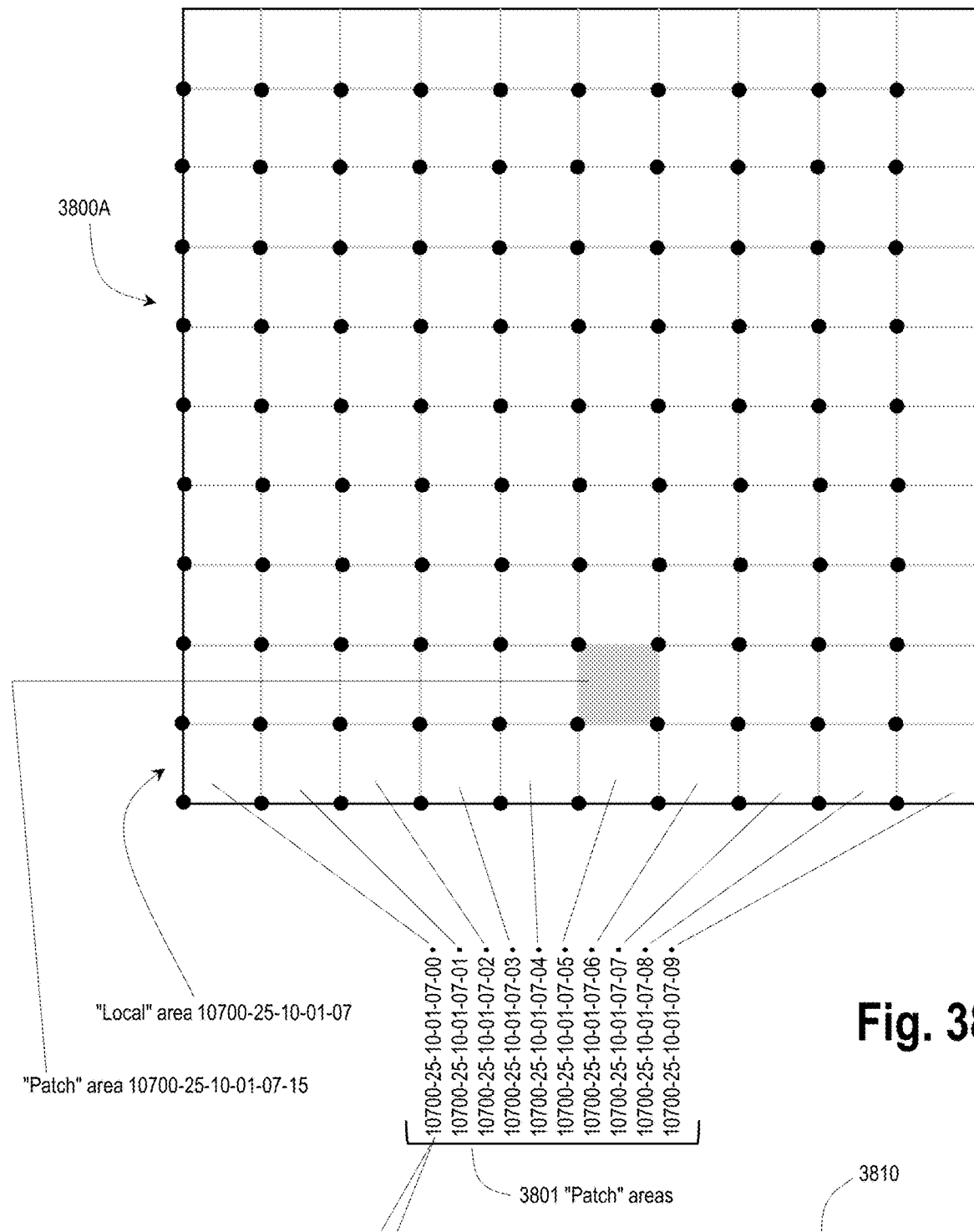
FIG. 38 is a further diagram showing further aspects of UAI generation, in accordance with principles of the disclosed subject matter.

As described above, each patch can be identified by a unique area identifier (UAI). FIG. 37 is a diagram showing aspects of unique area identifier (UAI) generation, in accordance with principles of the disclosed subject matter. Additionally, FIG. 38 is a further diagram showing further aspects of UAI generation, in accordance with principles of the disclosed subject matter.

In accordance with the disclosure, the disclosed methodology can establish and utilize a unique numbering system. The unique numbering system can include the use of unique area identifiers (UAIs). Each UAI can include a sequence of characters. The sequence of characters can be alpha characters, numerical characters, and/or any other character as may be desired. In the example of FIG. 37, an illustrative UAI 3701 is provided. For purposes of illustration, the UAI 3701 includes a sequence of numbers. Predetermined numbers in the sequence represent a respective area.

To explain, the UAI 3701 includes 5 initial numbers or digits. Such 5 initial numbers can correspond to a particular remote area, as illustrated in box 3703 of FIG. 37. The next two numbers (in the UAI 3701) correspond to a particular territory area. The next two numbers can correspond to a particular sector area.

The next two numbers can correspond to a particular quadrant area. The next two numbers can correspond to a particular local area. And lastly, the final 2 numbers of the UAI 3701 can correspond to a particular patch. Box 3703 in FIG. 37 also provides illustrative dimensions for various areas. For example, a territory area can be 10 miles×10 miles. Such dimensions are for purposes of illustration, and the disclosure is not limited to such particulars.

The methodology of the UAI can be powerful in its implementation. The UAI can identify patches or any other area in an efficient and effective manner. Accordingly, use of the UAIs can assist in processing efficiency and in storage of data in an effective and efficient manner.

In one embodiment of the disclosure, the globe or world can be broken into 4 quarters. Segmentation processing can be performed for each of the 4 quarters independently. Indicia can be utilized so as to signify a particular quarter of the globe. Accordingly, each UAI can include two alpha characters at the beginning of the character sequence for each UAI, for example. The two alpha characters might include NW for an area in the northwest quarter, NE for an area in the northeast quarter, SW for an area in the southwest quarter, and SE for an area in the southeast quarter. In the situation that an area is broken up into different or additional areas, than other alpha or alphanumeric character sequences can be utilized. For example, Times Square in New York City might be represented by the UAI:

NW32111928018078, which corresponds to the latitude and longitude (Lat-Long) coordinates:

40.7599638889, −73.9848416667.

Accordingly, embodiments can include segmentation of the globe (i.e. world) for example into quadrants such as NW; NE; SW; SE quadrants. The particular quadrant that an area is located in can be represented as alpha characters. Such alpha characters can be added as a prefix to the Unique Area Identifiers, for example. Such is illustrated above by the above New York City UAI. Any character sequence can be used to represent an area in the form of a UAI.

FIG. 37 also illustrates a further unique area identifier (UAI) 3702. FIG. 37 shows segmented map 3730. The segmented map 3730 includes portions of Mexico, the United States, and Canada. Accordingly, this example illustrates that the processing of the disclosure need not be in the context of the entire globe or world. Rather other smaller areas can be segmented and the processing limited to such smaller areas, if such is desired. The map 3730 shows hundreds or thousands of remote areas 3731. Each remote area can be represented by a UAI. As shown, the UAI 3701 represents a first remote area in Canada. The UAI 3702 represents a second remote area in Canada, which is adjacent to the first remote area. The UAI for both remote areas can include a 15 digit number as shown. The first 5 digits of such number can be dedicated to identification of a remote area. Accordingly, the UAI of the first remote area 3701 is one (1) digit off of the UAI 3702 that represents the second remote area. Assignment of a respective UAI to each remote area is described above with reference to FIG. 35, for example. In particular, step 3513 of FIG. 35 relates to incrementing a current UAI (for a current remote area) and incrementing that current UAI by a level increment value so as to generate a UAI for the adjacent or next remote area. FIG. 37 shows level increment value 3720. The level increment value 3720 is crafted so as to increment the appropriate "digits" for the particular area to which the UAI relates. For example, in segmentation processing, a remote area can be broken into 100 territories. Assignment of a UAI to each territory can include incrementing the appropriate digits of the UA. In the example of FIG. 37, such appropriate digits can include the digits 3702' as shown in FIG. 37. Further, as smaller areas are segmented and UAIs are assigned, the appropriate digits, which represent such smaller area, can be incremented based on the schema shown at 3703 of FIG. 37.

The segmented map 3730 of FIG. 37 shows many remote areas. Each of the remote areas, in this example, is 100 miles×100 miles. The segmented map 3730 is graphically expanded at the top so as to render the map shown in FIG. 37 to be square. As a result, the areas 3731 toward the top of the map appear larger than areas at a lower portion of the map. This is a result of the rendering of the map 3730 so as to be in the rectangular geometry as shown. Thus, it is appreciated that the areas 3731 at the top of the map are indeed the same geographical 100 miles×100 miles as the areas 3731 at the bottom of the map.

As described above, in segmentation of a particular area, if segmentation reaches the end of a row and/or attains a boundary of the area to be segmented, an area can be segmented so as to be smaller, i.e. so as to accommodate the residual area of the particular row that is remaining. Accordingly, this is apparent from the segmented map 3730 in which areas on opposing ends of the rows may be of different size than internal areas within the rows.

In further explanation of the UAI, FIG. 38 is a diagram that illustrates the UAI of a local area 3800A, in accordance with principles of the disclosed subject matter. The UAI is 10700-25-10-01-07 for the particular local area, in this example. Dash separators can be used so as to better visually decipher a particular UAI. In processing, the processor can disregard such dash separators.

As reflected at 3810 in FIG. 38, each UAI can correspond to an area of specific coordinates. For example, a patch area—the smallest area—can be represented by a 15 digit number. A local area can be represented by a 13 digit number or in other words the first 13 digits of the UAI. Further, a remote area can be represented by 5 digit number or in other words the first 5 digits of the UAI. Further, determination of child areas in a parent area can be determined by searching and comparison of UAIs. FIG. 38 shows a plurality of patch areas 3801 in a row. In processing, it should be appreciated that UAIs can be utilized and manipulated in various ways. For example, in the local area shown in FIG. 38, the UAI for each patch in the local area is the same. Accordingly, different UAIs can be compared to determine if they are indeed from the same remote area, territory, sector, quadrant, or local area. Further, the entire UAI can be transferred in processing components and stored in databases—and portions of the UAI be used as desired. For example, if it is desired in processing to determine which patches are in a particular remote area, then only the first 5 digits of searched UAIs might be utilized. Other processing and manipulation of UAIs may be performed.

The 15 digit UAI, to represent a particular remote area—and areas within such remote area—is for purposes of illustration. As shown, a specific digit or group of digits in the UAI can correspond to a particular area, as is the case with the UAIs illustrated in FIGS. 37 and 38. The particular format of the UAI may be varied as desired.

Figure 39:
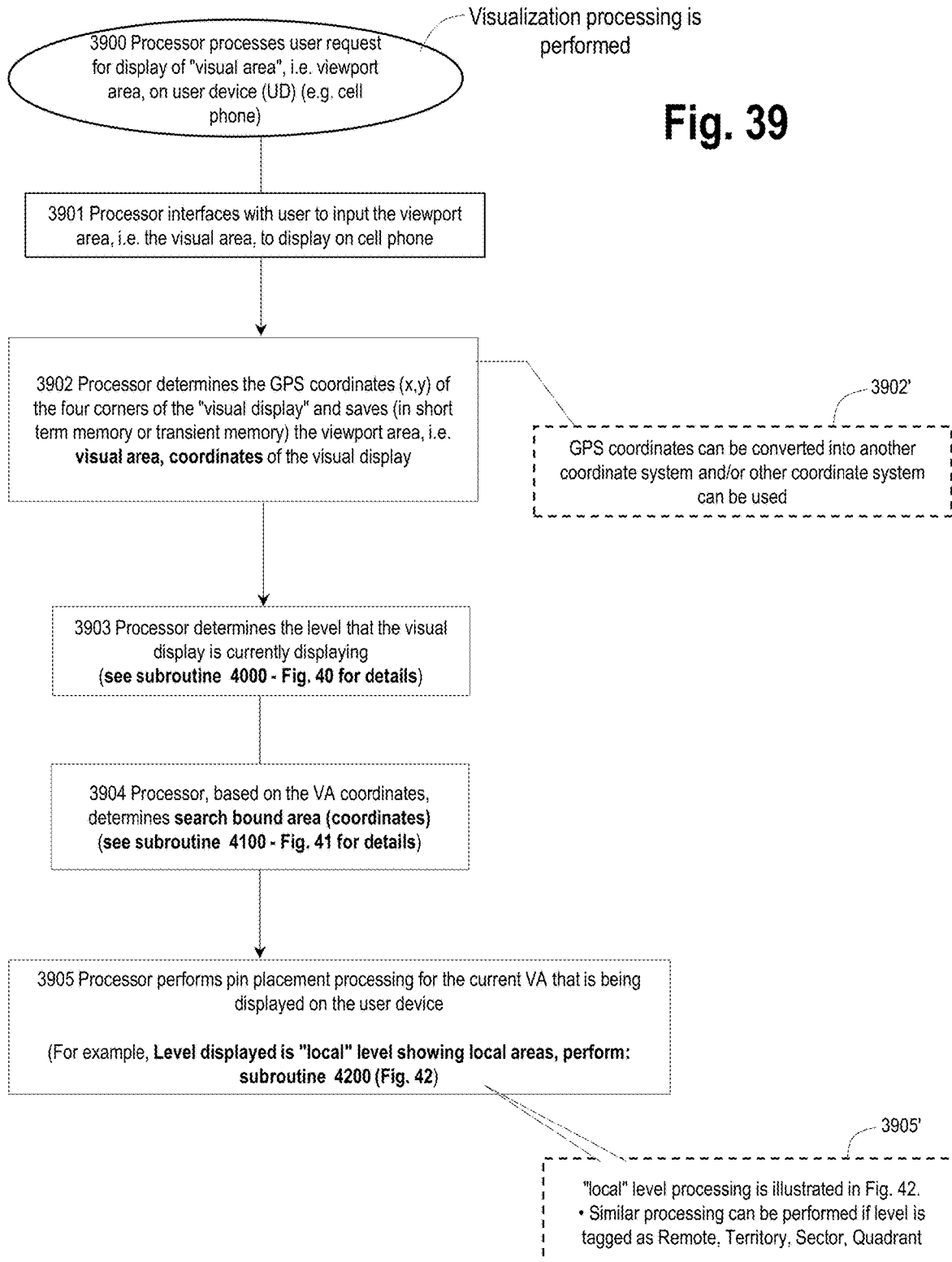
FIG. 39 is a flowchart showing "processor processes user request for display of "visual area" on user device (cell phone)" of subroutine 3900, in accordance with principles of the disclosed subject matter.

Hereinafter, further details of the systems and methods of the disclosure relating to visualization processing will be described. Such processing relates to the effective and efficient display of a variety of data, including image data, on a user device, for example. Accordingly, FIG. 39 is a flowchart showing "processor processes user request for display of "visual area" on user device (cell phone)" of subroutine 3900, in accordance with principles of the disclosed subject matter. As shown in FIG. 39, the processing is initiated in step 3900. For example, the processing of FIG. 39 might be initiated when a user zooms in on a particular area of interest, so as to view photos in the particular area of interest. Once initiated, the processing passes onto step 3901 of FIG. 39. In step 3901, the processor interfaces with the user to input a visual area to display on the user device. The processor can be located on a server remote from the user device and in communication with user device. The processor can be located on the user device. The processor can be located partially on the user device and partially on a remote server. After step 3901, the process passes onto step 3902. In step 3902, the processor determines or retrieves the GPS coordinates of the 4 corners of the visual display of the user device. The GPS coordinates can be saved in short-term memory or in transient memory for further processing. Such GPS coordinates can be described as visual area coordinates. Further, a visual display, on a user device, can be described as a "drawn map". As reflected at 3902', the GPS coordinates can be converted into another coordinate system and/or other coordinate systems can be utilized in the processing of the invention. For example, a longitude and latitude coordinate system; x and y coordinate system, or other coordinate system can be utilized in the systems of the disclosure. In some embodiments, two opposing corners (e.g. southwest corner and north east corner coordinates) can be input and the visual display or area of display be determined based on such coordinates.

Figure 40:
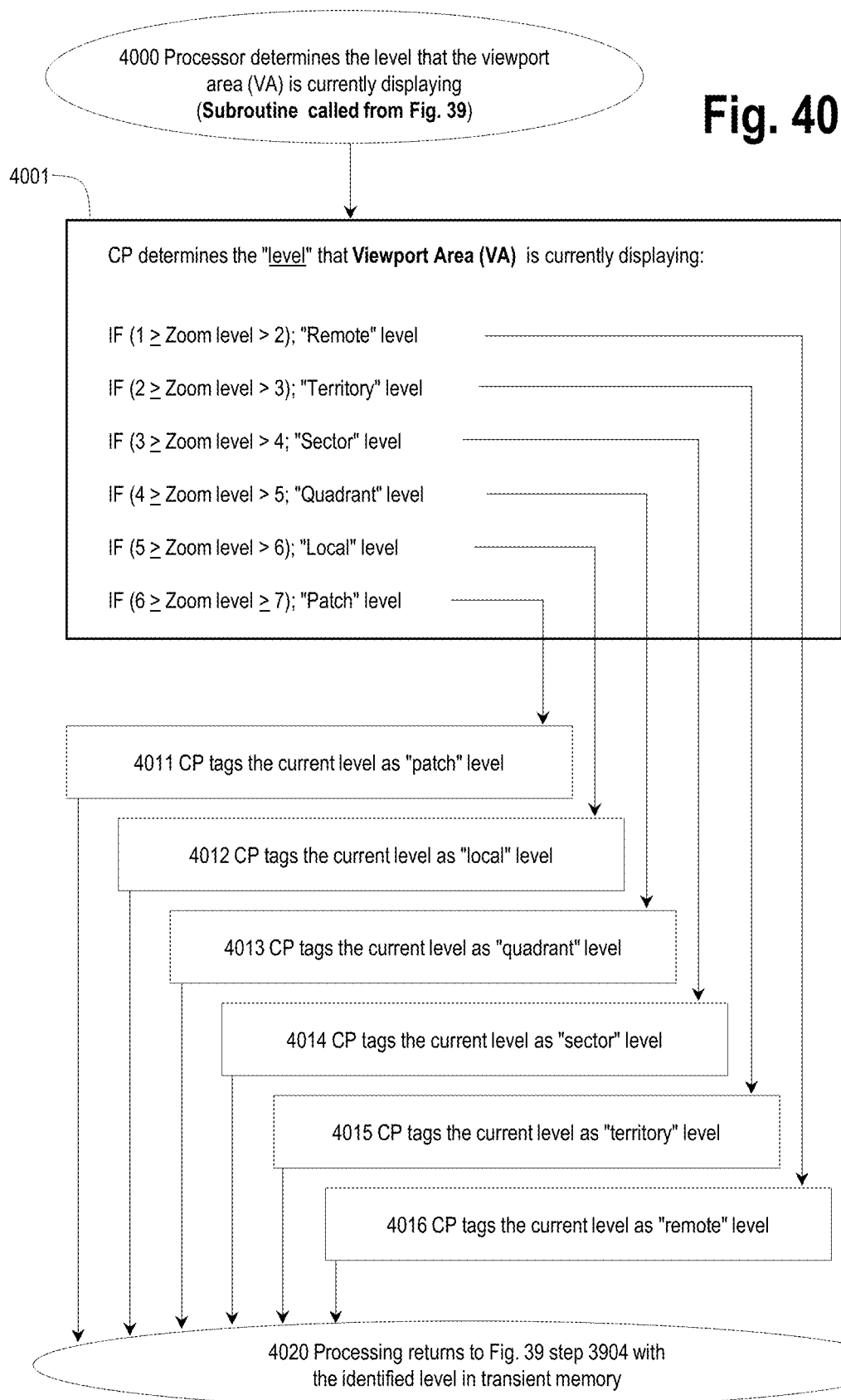
FIG. 40 is a flowchart showing "processor determines the level that the visual area (VA) is currently displaying" of subroutine 4000, as called from the processing of FIG. 39, in accordance with principles of the disclosed subject matter.
Figure 41:
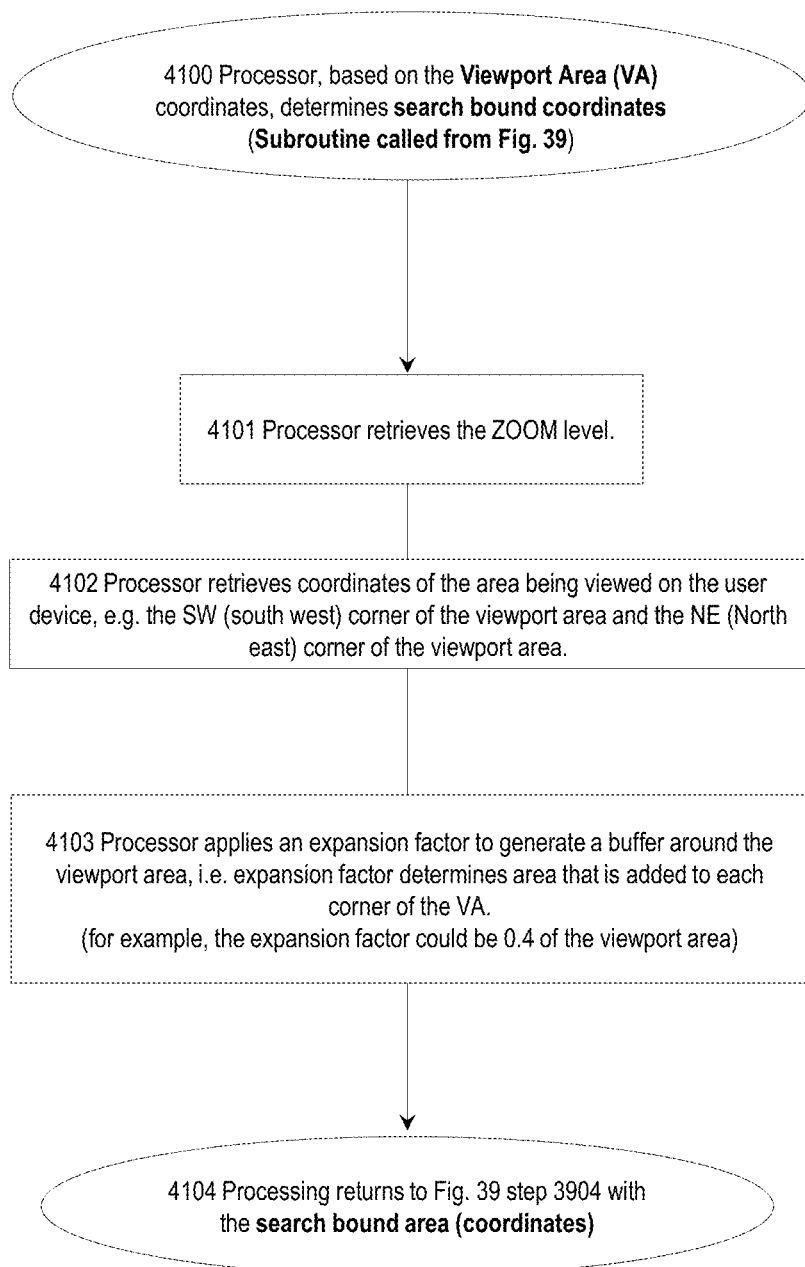
FIG. 41 is a flowchart showing "processor, based on the coordinates of the Viewport Area (VA), determines search bound coordinates" of subroutine 4100 as called from the processing of FIG. 39, in accordance with principles of the disclosed subject matter.

After step 3902, the process passes onto step 3903. In step 3903, the process determines the level that the visual display is currently displaying. Subroutine 4000 as shown in FIG. 40 can be invoked. Then, the process passes onto step 3904. In step 3904, the processor, based on visual area (VA) coordinates, determines a search bound area. Such search bound area can be represented in coordinates. Subroutine 4100 as shown in FIG. 41 can be invoked for such processing.

After step 3904, the process passes onto step 3905. In step 3905, the processor performs pin placement processing for the current visual area (VA) that is being displayed on the user device. Such processing can be performed for the particular zoom level that is being displayed on the user device. Depending on the particular zoom level being displayed on the user device, details of different levels can be displayed.

For purposes of illustration, it is assumed in step 3905 that the particular zoom level being displayed on the user device is the "local" level, i.e. meaning that a plurality of local areas are displayed on the user device, in this example. If a plurality of sector levels are displayed on the user device, such might be described as—the particular zoom level being displayed is the "sector level". However, for this particular example, the local level is being displayed. As a result, subroutine 4200 of FIG. 42 can be called upon or invoked. Accordingly, subroutine 4200 is illustrative of pin processing at the local level. However, as reflected at 3905' similar respective processing can be performed if it is determined that another level is being displayed on the user device, i.e. as a result of the particular zoom setting on the user device.

FIG. 40 is a flowchart showing "processor determines the level that the visual area (VA) is currently displaying" of subroutine 4000, as called from the processing of FIG. 39, in accordance with principles of the disclosed subject matter. As shown, the subroutine is launched in step 4000 and passes onto step 4001. In step 4001, the processor determines the "zoom level", or more generally the level of resolution, that the viewport area is currently displaying. It is appreciated that the illustrated zoom levels are for purposes of illustration. The zoom level can be input from the user device as a zoom level or number. The zoom level can be input from the user device as a percentage value, for example. Depending on the particular zoom level identified, the processor can determine which level is to be displayed on the user device and can determine other attributes of the processing to be performed. For example, if the zoom level is between 6 and 7, the process passes onto step 4011. In step 4011, the processor tags the current level as being at the patch level.

If the zoom level is between 5 and 6, the process passes onto step 4012. In step 4012, the processor tags the current level as being at the local level. As noted above, processing at the local level is illustratively shown in subroutine 4200 described below with reference to FIG. 42. If the zoom level is between 4 and 5, the process passes onto step 4013. In step 4013, the processor tags the current level as being at the quadrant level.

If the zoom level is between 3 and 4, then the process passes onto step 4014. In step 4014, the processor tags the current level as being the sector level. If the zoom level is between 2 and 3, then the process passes onto step 4015. In step 4015, the processor tags the current level as the territory level. Further, if the zoom level is between 1 and 2, then the process passes onto step 4016. In step 4016, the processor tags the current level as the remote level. As shown in FIG. 40, after identifying the particular level (that processing is occurring at) in one of steps 4011, 4012, 4013, 4014, 4015, 4016—the process then passes onto step 4020. In step 4020, the process returns to FIG. 39. Specifically, the process passes onto step 3904 with the identified level in transient memory, for later processing.

FIG. 41 is a flowchart showing "processor, based on the coordinates of the Viewport Area (VA), determines search bound coordinates" of subroutine 4100 as called from the processing of FIG. 39, in accordance with principles of the disclosed subject matter. As shown, the subroutine is initiated in step 4100 and passes onto step 4101. In step 4101, the processor retrieves the zoom level from transient memory, as such zoom level was determined in the processing of FIG. 40. After step 4101, the process passes onto step 4102. In step 4102, the process retrieves coordinates of the area being viewed on the user device. For example, coordinates retrieved can be the southwest corner coordinates of the viewport area and the northeast corner coordinates of the viewport area. Such corner coordinates can convey the particular viewport area being displayed on the user device. Other coordinates and/or attributes of the displayed image can be used to determine the area being viewed on the user device.

Then, the process passes onto step 4103. In step 4103, the processor applies an expansion factor to the viewport area. The expansion factor is applied to generate a buffer or "search bounds (SB)" around the viewport area. In other words, the expansion factor might be described as determining an area that is added to each corner of the viewport area. The expansion factor might be described as determining an area that is added around the edge of the viewport area, so as to frame the viewport area. Such processing effectively adds a band, i.e. the search bounds, around the viewport area. As described below, "pins" and/or photos that are identified in the search bounds can affect display of data in the viewport area. For example, the expansion factor could be 0.4 or 40% of the viewport area.

After step 4103, the process passes onto step 4104. In step 4104, the processing passes onto step 3904 (FIG. 39) with the coordinates of the search bound area in transient memory.

Figure 42:
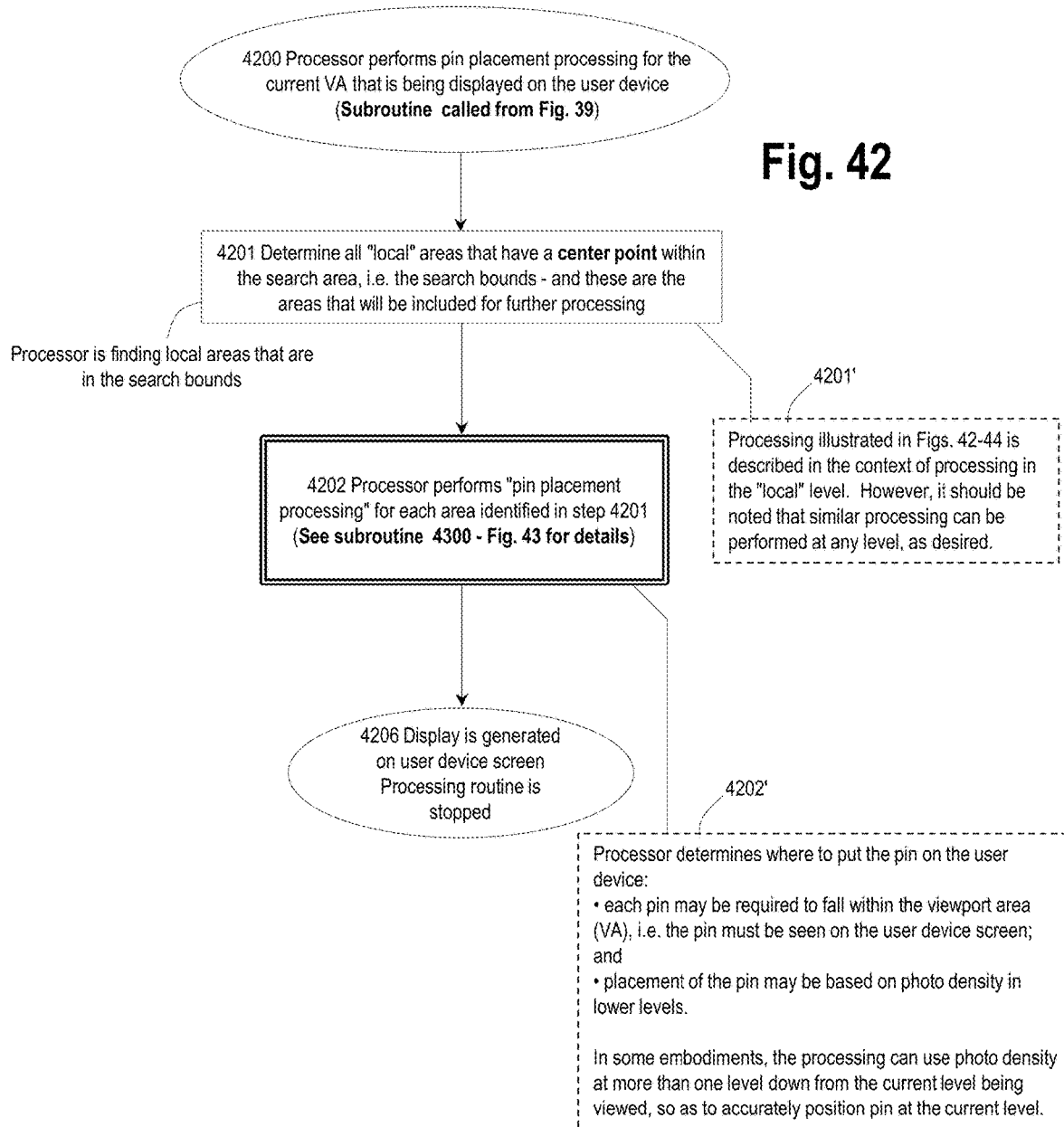
FIG. 42 is a flowchart showing "processor performs pin placement processing for the current viewport area that is being displayed on the user device" of subroutine 4200 as called from the processing of FIG. 39.
Figure 43:
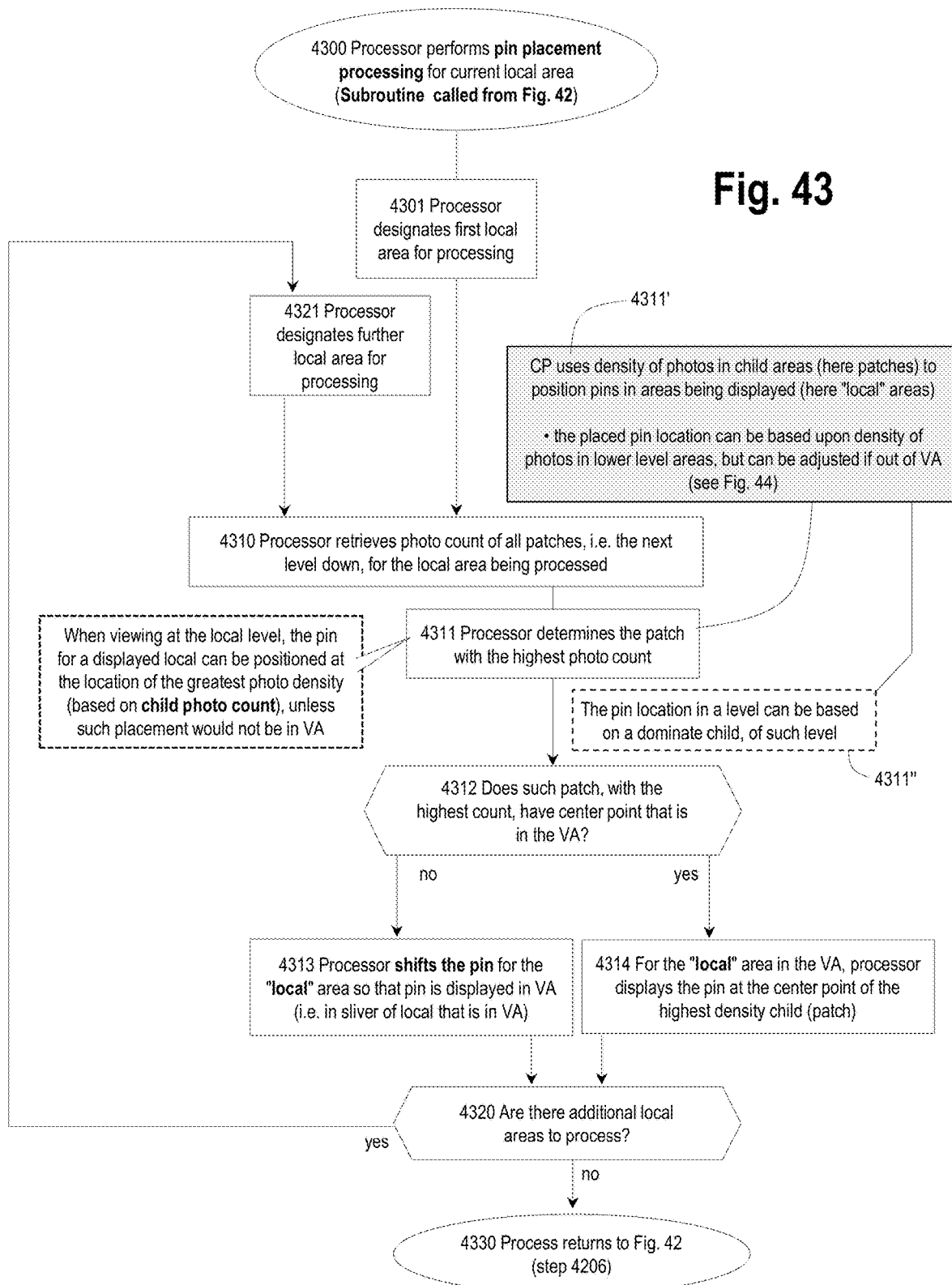
FIG. 43 is a flowchart showing "processor performs pin placement processing for area" of subroutine 4300, as called upon from the processing of FIG. 42, in accordance with principles of the disclosed subject matter.

FIG. 42 is a flowchart showing "processor performs pin placement processing for the current viewport area that is being displayed on the user device" of subroutine 4200 as called from the processing of FIG. 39. As described above, the processing of FIG. 42 is set forth in the context of "local" level processing. However, it is appreciated that similar processing can be applied to other levels as may be desired. As shown in FIG. 42, the subroutine 4200 is launched in step 4200 and passes onto step 4201. In step 4201, the processor determines all the local areas that have a center point within the search area, i.e., within the search bounds (SB) as determined in the processing of FIG. 41. These local areas, which are identified as having a center point within the search area, are saved into transient memory for further processing. Such local areas can be described as "identified areas" and can be identified by their respective UAI and boundaries. As reflected at 4201' in FIG. 42, processing illustrated in FIGS. 42-44 is described in the context of processing in the "local" level. However, it should be noted that similar processing can be performed at any level, as desired. The particular level at which processing is performed can depend on the particular zoom level at which the user is viewing a segmented map, for example.

After step 4201, the process passes onto step 4202. In step 4202, the processor performs "pin placement processing" for each area identified in step 4201. To perform such processing, subroutine 4300 can be called upon or invoked. Such subroutine 4300 is described below with reference to FIG. 43. In the processing of step 4202, (and as reflected at 4202') the processor can determine where to put or place a pin on the user device. In accordance with some embodiments, each pin can represent at least one photo.

In some embodiments, in particular in areas more densely populated with photos, a pin might only be generated if a threshold number of photos are in a particular area. For example, a local area might only display a pin if 10 photos are in the particular local area.

In some embodiments, each pin, so as to be viewed, may be required to fall within the viewport area. In other words, the pin may be required to fall within the viewport area so as to be seen on the user device. Placement of the pin on the user device can be based on pin density and/or photo density in lower levels. Accordingly, placement of a pin at a given level can be based on density of photos at one level below such given level. Placement of a pin at a given level can be based on density of photos at multiple levels below such given level. Thus, for example, placement of a pin (in the situation that the local level is being displayed) may depend on density of photos at the patch level. In other words, in some embodiments, processing can use photo density at more than one level down from the current level being viewed, so as to accurately position a pin(s) at the current level. Each pin can include a displayed number so as to convey the number of photos that the particular pin represents. Further details are described below.

After step 4202, the process passes onto step 4206. In step 4206, the generated display is displayed on the user device, and the processing routine is stopped.

FIG. 43 is a flowchart showing "processor performs pin placement processing for area" of subroutine 4300, as called upon from the processing of FIG. 42, in accordance with principles of the disclosed subject matter. The process of FIG. 43 is directed to pin placement processing at the "local" level, for purposes of illustration. Relatedly, FIG. 44 is a schematic diagram also showing features of pin placement processing, in accordance with principles of the disclosed subject matter.

The subroutine 4300 is launched in step 4300 and passes onto step 4301. In step 4301, the processor designates the first local area for processing. For example, the local area 4411, shown in the illustrative display of FIG. 44, might be designated as the first area for processing. Then, the process passes onto step 4310.

In step 4310, the process retrieves a photo count of all patches, i.e. the next level down, from the "local" area that is being processed. Then, the process passes onto step 4311. In step 4311, the processor determines the patch with the highest photo count. To explain further with reference to tag 4311', in this processing, the processor uses density of photos in child areas (here patches) to position pins in areas being displayed (here local areas). Accordingly, a placed pin location can be based upon density of photos in a lower level area or even multiple lower level areas, e.g. two levels down from the current level. Note, as described below, pin placement can be adjusted if the pin would otherwise be placed out of the viewport area. In other words, as reflected at 4311, pin location in a level can be based on a dominant child, of a given level.

After step 4311, the process passes onto step 4312. In step 4312, a determination is made of whether the patch with the highest photo count does indeed have a center point that is in the viewport area.

Accordingly, at this point in the processing, the patch (having highest density of photos) that will dictate pin placement has been determined. However, it is still to be determined whether such patch has a center point in the viewport area. If the center point is not in the viewport area, then adjustment is needed, else the pin will not be visible to the user. Accordingly, if a "yes" is rendered in the determination of step 4312, then the process passes onto step 4314.

In step 4314, for the local area in the viewport area, the processor displays the pin at the center point of the highest density child, here a patch. On the other hand, a "no" may be rendered in step 4312. If a "no" is rendered in step 4312, the process passes to step 4313. In step 4313, the processor shifts the pin for the local area so that the pin is indeed displayed in the viewport area, otherwise the user would not see the pin on the user device. In other words, such processing can be described as identifying that, without adjustment, the pin would be displayed in a sliver that is outside of the viewport area of the user device. Accordingly, adjustment is made such that position of the pin is moved inside or just inside the viewport area. This processing, of adjustment of pin placement, occurs with areas 4411 and 4414, shown in FIG. 44 After either of steps 4313, 4314, the process passes onto step 4320. In step 4320, the process determines whether there are additional local areas to process. For example, in the viewport area 4401 of FIG. 44, there are four local areas to process. If "yes" in step 4320, the process passes to step 4321. In step 4321, the processor designates the further local area for processing. Then, the process passes onto step 4310. Processing then proceeds as described above. On the other hand, if a "no" is rendered in step 4320, the process passes onto step 4330. In step 4330, the process returns to FIG. 42. Specifically, the process passes to step 4206 of FIG. 42.

As described above, FIG. 44 is a diagram showing features of pin placement processing, in accordance with principles of the disclosed subject matter. FIG. 44 provides a schematic diagram 4440 illustrating a computer perspective of data 4440.

As reflected at 4420 in FIG. 44, pin positions of a displayed area can be based on child density. In other words, pin positions of a displayed area can be based on density of photos in child areas, of the area being displayed. As shown in FIG. 44, the diagram shows a viewport area 4401. The viewport area 4401 includes a plurality of local areas, in which photos have been identified. The local areas include areas 4411, 4412, 4413, and 4414. FIG. 44 also shows a search bounds 4402. With reference to the viewport area 4401, the point A represents the location (in local area A) of the patch, of local area A, having the highest density of photos. The point B represents the location (in local area B) of the patch, of local area B, having the highest density of photos. The point C represents the location (in local area C) of the patch, of local area C, having the highest density of photos. The point D represents the location (in local area D) of the patch, of local area D, having the highest density of photos. Accordingly, the viewport area 4401 illustrates a computer perspective of data.

FIG. 44 also shows representation of a GUI 4450. As reflected at 4450', the dashed objects in the GUI 4450 would not be seen by the user in the GUI, but are shown in FIG. 44 for illustration from the perspective of processing. The GUI 4450 shows a pin 4412P. The location of the pin 4412P is based on, in this embodiment, the patch having highest density of photos in the local area B. However, such pin 4412P can reflect the count of all photos in the local area B. Thus, to reiterate, while the location of the pin 4412P can be based on the patch with the highest density of photos, the count of the pin 4412P indeed reflects all the photos in the particular local area. Similarly, the pin 4413P reflects location of the patch having highest density in the local area C and also reflects the total count of photos in local area C.

The GUI 4450 also shows pin 4411P and pin 4414P. However, the position of such pins in the GUI 4450 have been altered or adjusted vis-à-vis position of the points A and D, respectively, in the search bounds 4402, i.e. as shown in the upper diagram 4440 of FIG. 44. That is, the processing adjusts the location of the pins 4411P, 4414P since such pins would not otherwise be viewable in the viewport area 4401'.

Accordingly, the processing of the disclosure can adjust the position of pins that are identified in a search bounds 4402. The position of such pins can be adjusted so as to be just inside the viewport area 4401'. That is, in the processing of the disclosure, a pin can be placed as close as possible to the highest density, in terms of photos, of a child area, yet still be in a viewport area 4401'. Even though a pin may be adjusted in position, such pin can still reflect the total number of photos in the patch, or other area, that the pin represents. As shown, all the pins have been adjusted to not be present in the search bounds 4402', which surrounds the viewport area 4401'. As otherwise noted herein, the processing of FIGS. 43 and 44 could be applied to areas of other levels, as desired.

Figure 45:
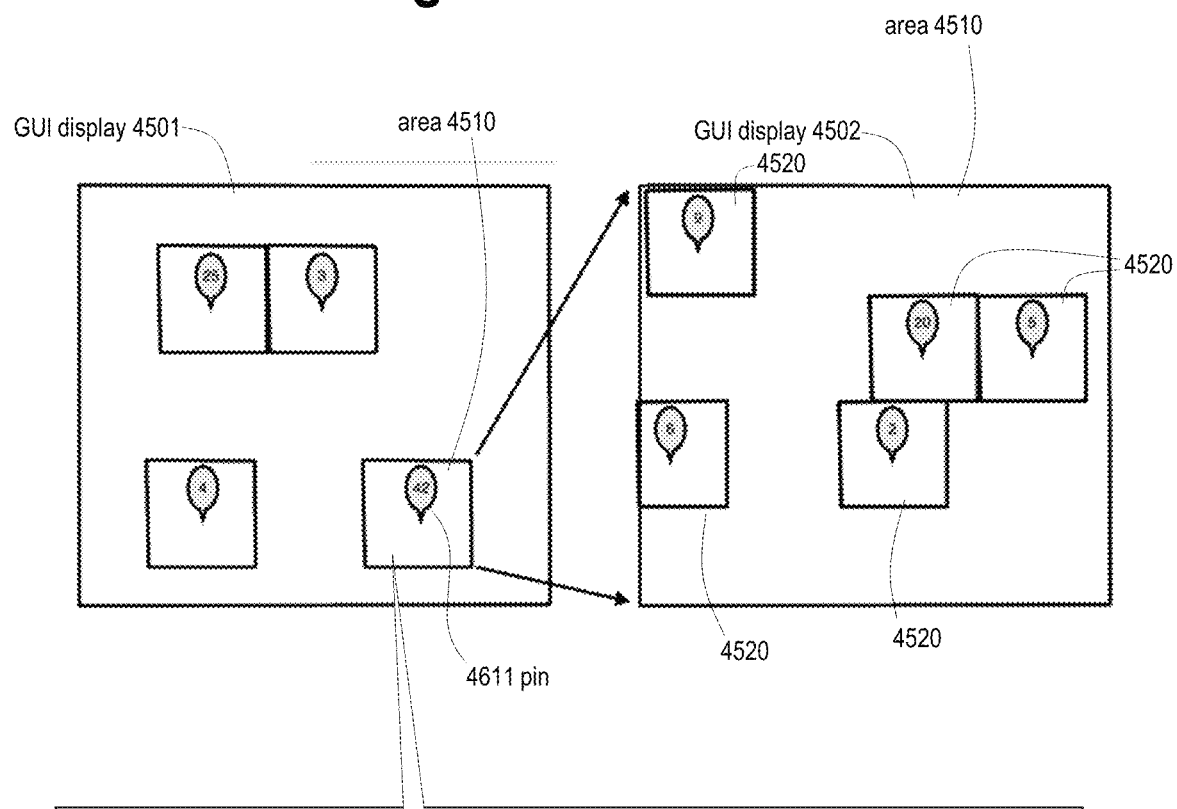
FIG. 45 is a schematic diagram showing further aspects of pin processing, in accordance with principles of the disclosed subject matter.

FIG. 45 is a schematic diagram showing further aspects of pin processing, in accordance with principles of the disclosed subject matter. The diagram shows a GUI display 4501 and GUI display 4502. As reflected at 4500', a pin 4611 is shown on the left, in GUI display 4501, with 42 photos. Other pins can also be displayed in the GUI display 4501. The particular pin 4611 represents the number of photos in area 4510. A user can zoom in on the pin 4611. When a user "zooms" in on the pin 4611, the GUI display 4502 is generated, i.e. the display on the right is generated. That is, the GUI display 4502 shows the area 4510 expanded or "zoomed in on". In the display 4502, the pin 4611 is seen to represent photos of a plurality of child areas 4520. The total sum of photos of the child areas are represented in the pin 4611. There are 42 photos represented by the pin 4611. This count of photos can be seen by the plurality of pins in the GUI display 4502. Accordingly, the diagram of FIG. 45 demonstrates that count shown, in a pin 4611, can reflect an aggregation or accumulation of pins in lower areas, e.g. pins 4520 included in lower areas of the area 4510. Relatedly, as a user "zooms" OUT of an area, the count of photos as represented by a pin, i.e. pin count, may increase since an area represented by such pin can increase, so as to accumulate or aggregate more photos to the particular pin. Inversely, as a user zooms IN, pin count (as represented by a particular pin) may go down. Relatedly, a pin might only be shown in a particular area if the photo density, in such area, satisfies a predetermined threshold.

Figure 46:
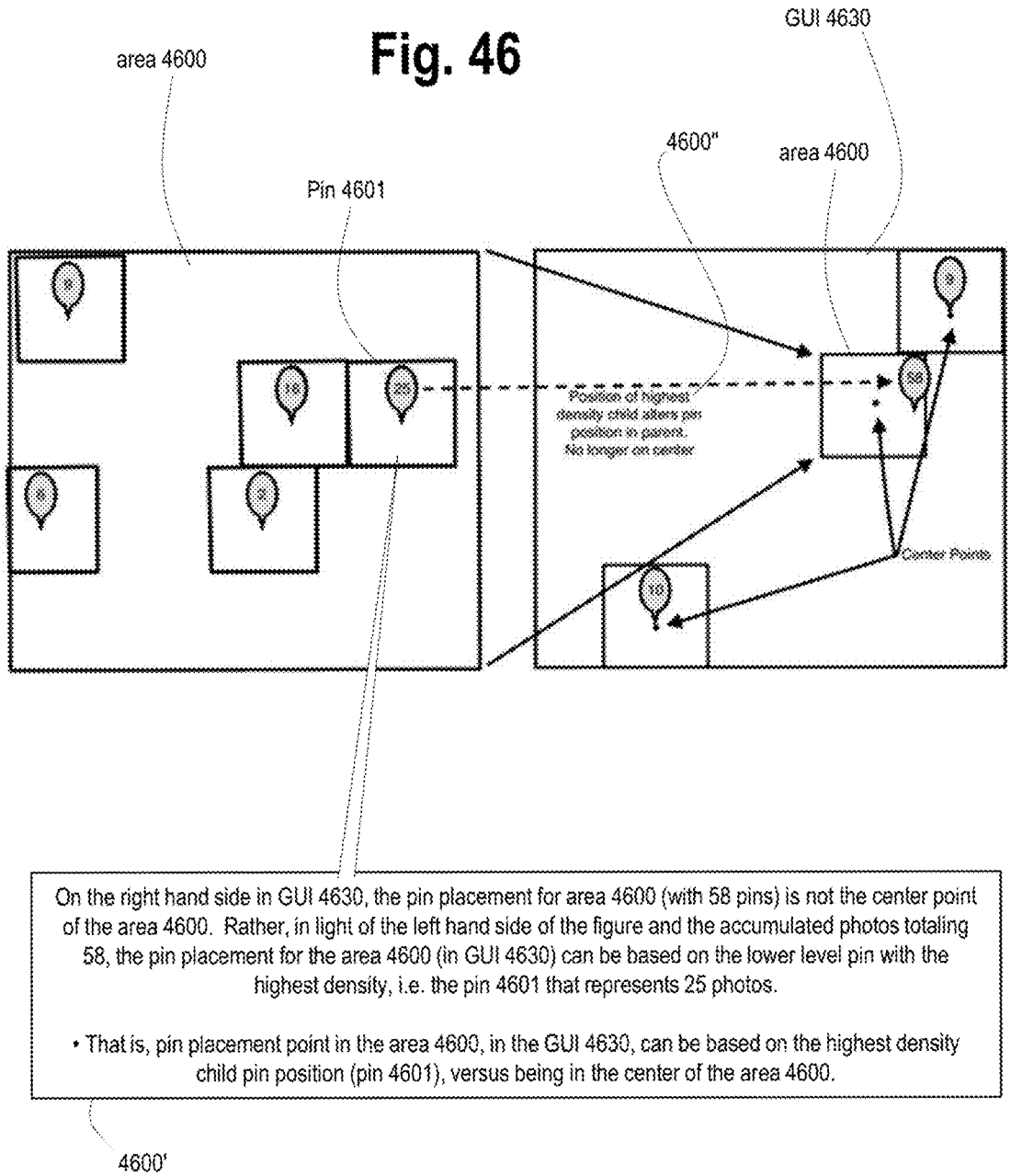
FIG. 46 is a schematic diagram showing further aspects of pin processing, in accordance with principles of the disclosed subject matter.

FIG. 46 is a schematic diagram showing further aspects of pin processing, in accordance with principles of the disclosed subject matter. In particular, FIG. 46 illustrates pin placement in an area based upon density of photos in a lower level area. Accordingly, FIG. 46 is provided to supplement other related disclosure herein. On the right hand side of FIG. 46, in the GUI 4630, the pin placement for area 4600 (with 58 pins) is not the center point of the area 4600, as reflected at 4600'. Rather, in light of the left hand side of FIG. 46 and the accumulated photos totaling 58, the pin placement for the area 4600 (in GUI 4630) can be based on the lower level pin with the highest density, i.e. the pin 4601 that represents 25 photos. That is, pin placement point in the area 4600, in the GUI 4630, can be based on the highest density child pin position (pin 4601), versus being in the center of the area 4600. Accordingly, as reflected at 4600", position of a highest density child can alter pin position in a parent area. That is, pin position in the parent can be altered from being in the center of the area. Accordingly, pin placement at a particular "zoom" level, displayed on a user device, can be based on density of pins one level down from the particular level being displayed. In some embodiments, pin placement can be based on one, two, or more levels down from the level that is being displayed. An advantage of basing pin placement on pin density and/or photo density at a lower level (than is being displayed) is to position pins more in line with actual position of photos that are driving the particular pin. Alternatively, a pin displayed in a particular area such as a "local" area (to represent the count of photos in the area) could be displayed at some default position. For example, the pin could be displayed at the center of a particular area. However, such default position of a pin may be mis-leading as to where in such area the photos are indeed concentrated. Further, it is appreciated that pin placement in an area at the lowest level, for example a "patch" area, can be based on photos at that lowest level, i.e. since there is no lower level.

Relatedly, a pin might only be generated in a particular area if photo density in the particular area exceeds a predetermined threshold, for example, if photos in the area exceed 10 photos. However, in some embodiments, a pin might be generated based on only one photo in a particular area.

Figure 47:
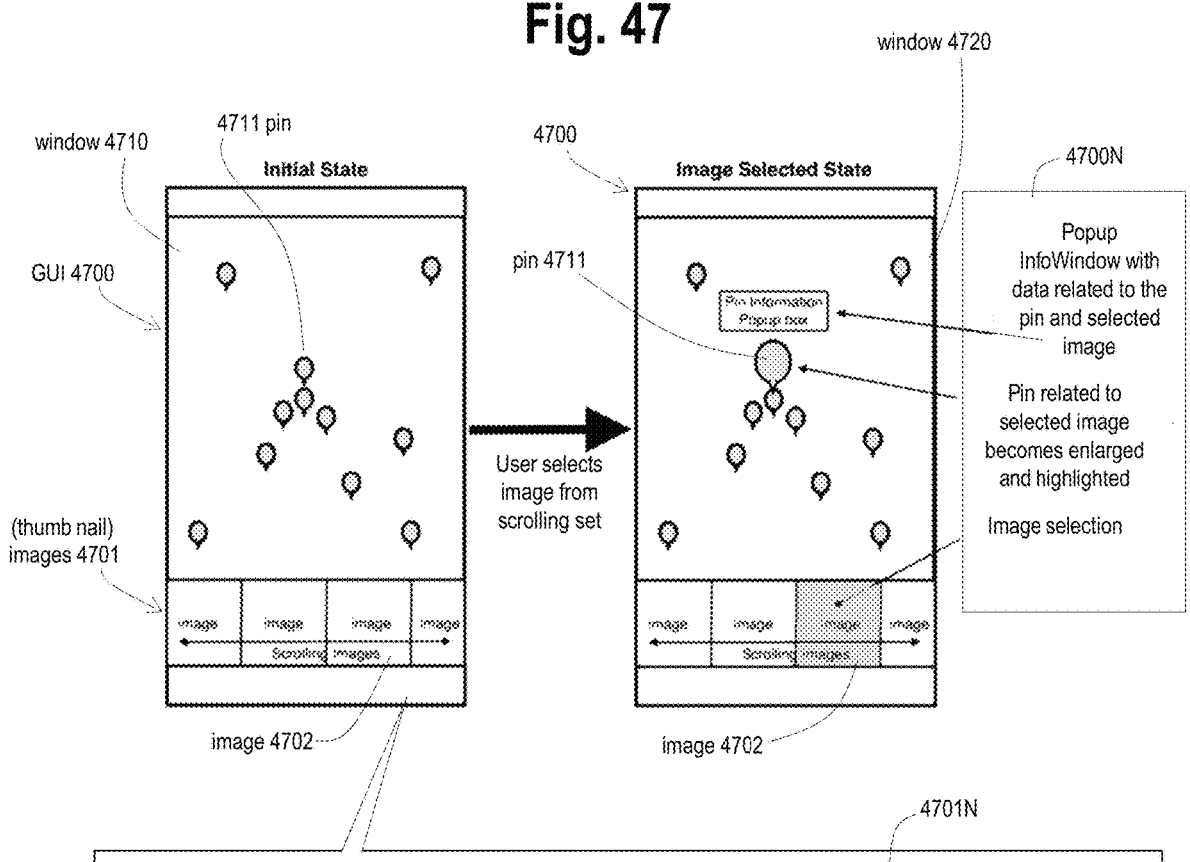
FIG. 47 is a schematic diagram showing yet further aspects of pin processing in conjunction with manipulation of thumbnails, in accordance with principles of the disclosed subject matter.

FIG. 47 is a schematic diagram showing yet further aspects of pin processing in conjunction with manipulation of thumbnails, in accordance with principles of the disclosed subject matter. FIG. 47 shows processing relating to a GUI 4700. The GUI 4700 is transformed from an "initial state" to an "image selected state" as shown in window 4710 and window 4720, respectively. The GUI 4700 can include pin 4711. Other pins can be displayed as shown in the GUI 4700. The GUI 4700 can also include a plurality of images 4701 provided in a bottom portion or window of the GUI 4700. The images 4701 can include or be in the form of thumbnail photos. The images 4701 can include image 4702. The user can select the image 4702 from the scrolling set of images in the window 4710. As a result, the display shown in window 4720 is generated. The image 4702 can be dynamically linked to the pin 4711. When the user clicks the image 4702, the pin 4711 can become enlarged, change color, or in some other manner be distinguished from the other pins. As shown, a pop-up information window can be provided in the window 4720. Such information window can relate to the pin 4711 and the corresponding selected image 4702.

Relatedly, various features provided by the systems and methods of the invention are illustrated in note box 4701N. Scrolling thumbnails or images 4701 at the bottom of the GUI 4700 can be dynamically linked to pins in the windows 4710, 4720. Once a user clicks a pin 4711 in the window 4710, at least one image can be shown that corresponds to such clicked pin. For example, the most popular images can be shown that correspond to the pin that was clicked. A user can toggle between pin to thumbnail. A user can toggle between thumbnail to pin. Color change, change in size, or other distinguishing characteristic can be used to distinguish a selected image 4701 or pin 4711. Accordingly, as reflected at 4700N of FIG. 47, a popup InfoWindow with data related to a pin and selected image can be generated upon clicking an image 4702—and the pin related to the selected image 4702 can become enlarged and highlighted.

Accordingly, thumbnails at the bottom of a generated GUI can be associated with pins represented on the screen of the GUI. Thumbnails can be arranged by algorithm at the bottom of the screen. For example, thumbnails can be ranked based on a number of associated photos that are associated with the particular thumbnail. A user can be provided the ability to scroll through thumbnails ranked in order of pins in the window 4710. Touch of a thumbnail can highlight the pin so as to differentiate the particular pin. Touch of a thumbnail can toggle to a related pin location in the window 4710. Additionally, a user can touch pin display ranked thumbnails related to the pin. Thumbnails can be presented in a variety of orders, starting with the most popular thumbnail. The ability to toggle from thumbnail to spot, for example, can be provided. That is, a spot can be a patch area that has attained a predetermined threshold of photos contained in such patch. The ability to toggle from spot to detailed information, about the spot, can be provided. It is appreciated that the functionality described with reference to FIG. 47 can similarly be applied to a level as desired. That is, the system of the disclosure can provide similar functionality for any of the levels described herein, as desired.

Figure 48:
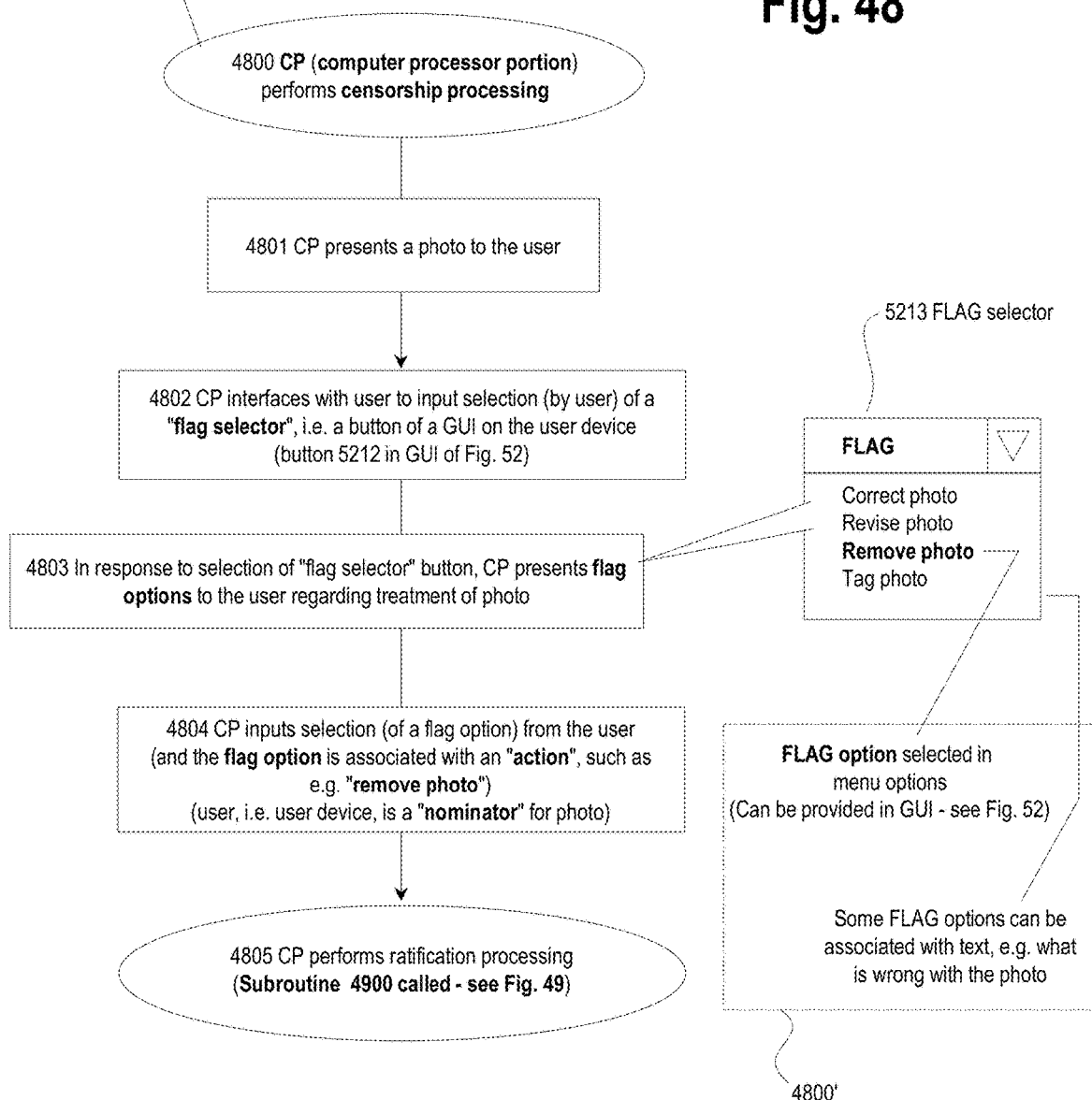
FIG. 48 is a flowchart showing details of a processor of the disclosure performing censorship processing, in accordance with principles of the disclosed subject matter.

Hereinafter, further features of the disclosure will be described that relate to censorship processing. FIG. 48 is a flowchart showing details of a processor of the disclosure performing censorship processing, in accordance with principles of the disclosed subject matter. The censorship processing can relate to a nominating process to "flag" a photo for various reasons. The processing is not limited to photos. That is, the censorship processing can be applied to comments or other media or content, including a video, sound media, and/or text content, for example. As shown, the process starts in step 4800 and passes onto step 4801.

Figure 52:
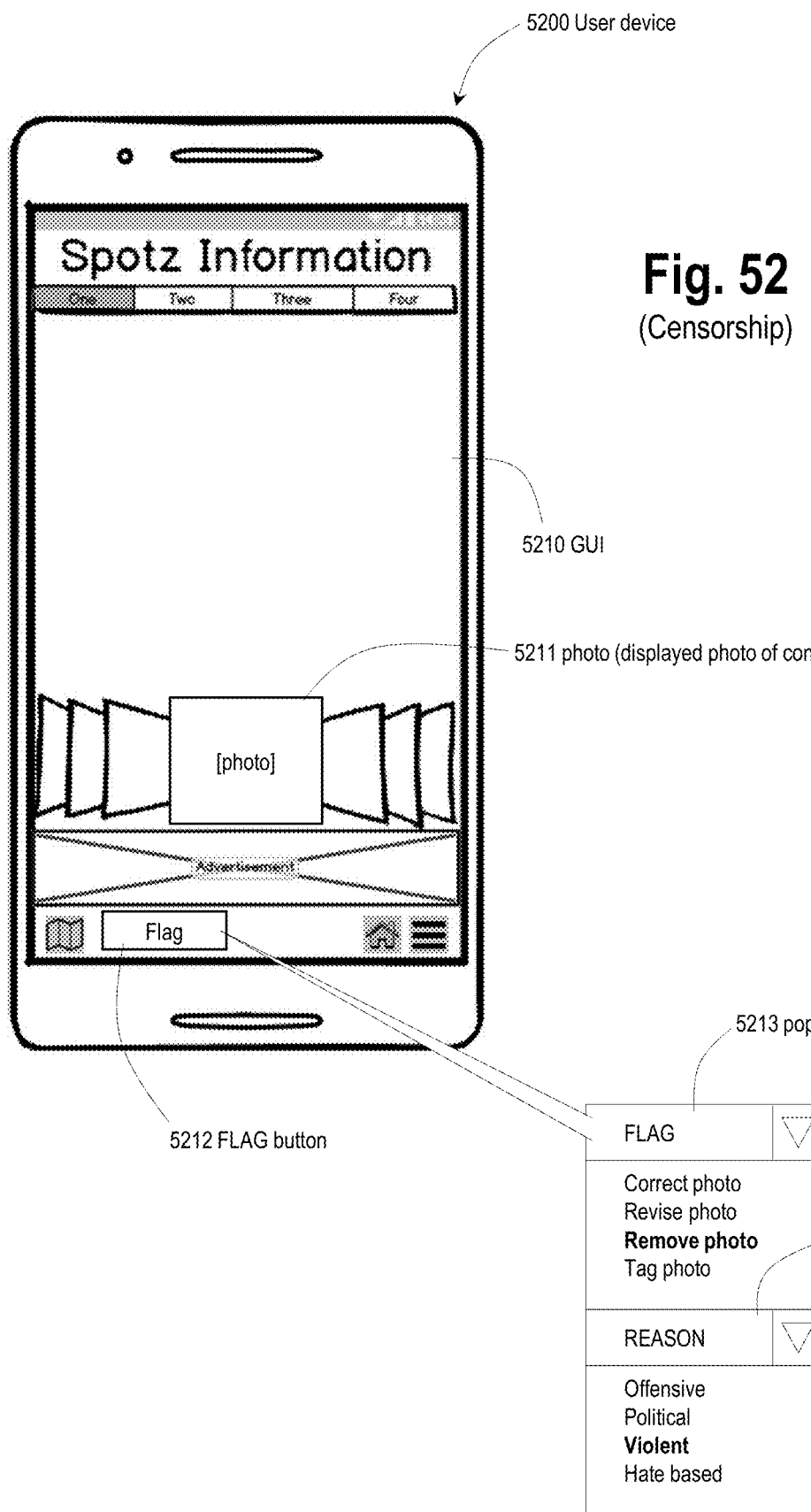
FIG. 52 is a schematic diagram of a user device with GUI, in accordance with principles of the disclosed subject matter.

In step 4801, the processor presents a photo to the user. For example, such presentation of a photo may be performed via a display on a user device, such as a cell phone shown in FIG. 52. FIG. 52 is a schematic diagram of a user device with GUI, in accordance with principles of the disclosed subject matter. After step 4801, in step 4802, the processor interfaces with the user to input selection of a flag selector. The flag selector may be in the form of a button 5212 of a GUI 5210 on a user device 5200. A photo 5211 can be displayed on the GUI 5210. The user can identify some deficiency or concern with the photo 5211.

Accordingly, the user can tap the flag button 5212, so as to flag, in some manner, the photo 5211. It is appreciated that the particular photo, about which the user wishes to flag, could be identified in some other manner that is different from the visual selection shown in FIG. 52.

With further reference to FIG. 48, after step 4802, the process passes onto step 4803. In step 4803, in response to selection of the flag selector button, the processor presents flag options to the user. Such flag options reflect different possible treatment of the particular photo that was selected.

Such flag options can be presented utilizing a flag selector or menu 5213 as shown in FIG. 48 and FIG. 52, and noted at 4800' in FIG. 48. As shown in the menu 5213, options can be provided including correct photo, revise photo, remove photo, and tag photo, for example. It should be appreciated that various other options might also be provided regarding possible treatment of the photo. The flag options may include additional information as to the rationale for such treatment. For example, the user may flag to "remove photo" and provide the reason. For example, the reason may include violent content, pornography or bullying, as shown in a related menu 5214. The flag selector or menu, with further delineation in a series of subsequent flag selector rationale or menu(s) can be provided in the form of respective pop-up menus 5213 and 5214, as shown in FIG. 52. Alternatively, such tagging can be input from the user in some other manner. As reflected in FIG. 48, some flag options, such as correction or removal for example, can be associated with text. For example, if a user, i.e. a nominator, is flagging a particular photo for correction—such user might also provide comment/text regarding basis for correction. Accordingly, a "flag" can be selected from the "flag" pop-up menu 5213—and once a particular flag is selected, a corresponding "reason" pop-up menu 5214 can be generated. The user can then select a reason from the "reason" pop-up menu 5214. The user might also be able to "type in" their own flag and/or reason. The functionality can provide further depth of understanding as to why a user objects to a particular photo or other media.

After step 4803, the process passes onto step 4804. In step 4804, the processor inputs the selection, of the flag option, from the user. The flag option can be associated with a desired action. For example, the flag option "remove photo" can be associated with the action of removing the photo from one or more collection of photos in the system. For example, the photo might be removed from public access. The user who flags the photo can be described as a "nominator" for the photo. As described below, the nominator can be associated with particular attributes. Attributes of a nominator can vary depending on the particular flag type. For example, a nominator may be "stronger" with respect to one flag type as opposed to another flag type. After step 4804, the process passes onto step 4805. In step 4805, the processor performs ratification processing. Such ratification processing can be performed by subroutine 4900 of FIG. 49.

Figure 49:
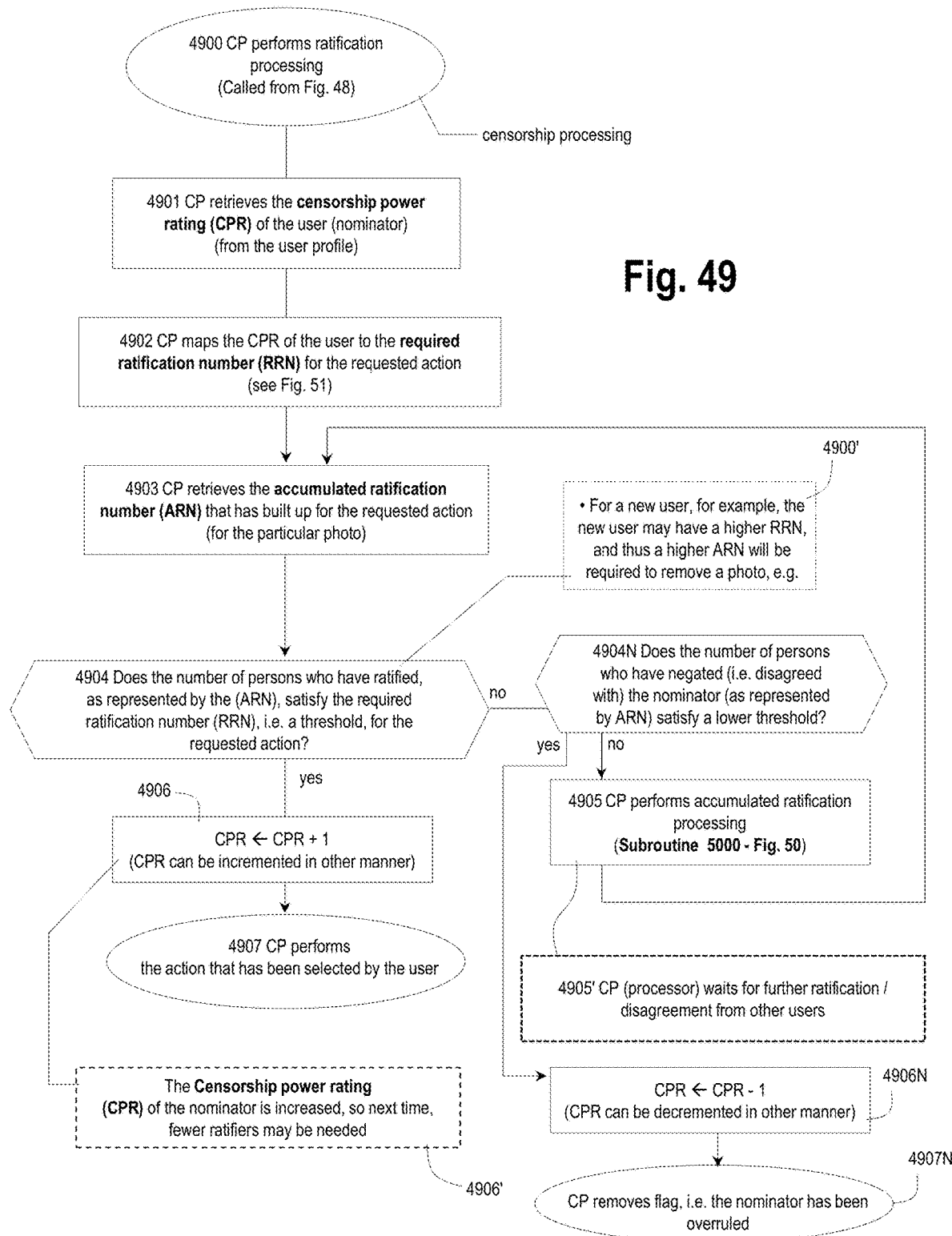
FIG. 49 is a flowchart showing "processor performs ratification processing" of subroutine 4900, in accordance with principles of the disclosed subject matter.

Accordingly, FIG. 49 is a flowchart showing "processor performs ratification processing" of subroutine 4900, in accordance with principles of the disclosed subject matter. Such subroutine can be called from the processing of FIG. 48. The subroutine is launched in step 4900 and passes onto step 4901.

In step 4901, the processor retrieves a censorship power rating (CPR) of the user, who is a nominator, from the user profile. The censorship power rating can be based on the particular flag that was selected.

That is, power ratings can vary, for a particular user, based on what flag is selected. A particular flag can include sub flags or other underlying delineation. Also, channels can be provided and a particular flag (or sub-flag) can be allocated to a particular channel. The flag, sub flag, underlying delineation and/or established "channels" can be based upon "location types" as shown in FIG. 12 step 613, for example. A user might be very weak with regard to one type of flag (or sub-flag), and very strong with regard to another type of flag (or sub-flag). Such variation(s) in strength of a user may also be provided whereby a user is weak in one flag type in a given "channel" and very strong in the same flag type in another "channel". Also, different user bases can be provided. Each user base can be associated with, i.e. include, a particular group of users. A user base for a given "channel" may have differing norms or settings for censorship, as compared to a user base for another channel. Accordingly, the censorship power rating (CPR) of the user (and other parameters that are used in censorship processing and related processing), can be dictated by a variety of attributes including flag associated with a photo, sub-flag associated with a photo, underlying delineation associated with the photo, channel in which a flag is disposed, channel in which the photo is disposed, user base to which the user is associated, and other attributes.

With further reference to FIG. 49, after step 4901, the process passes onto step 4902. In step 4902, the processor maps the CPR of the user to the required ratification number (RRN) for the requested action. Such mapping can be performed utilizing the processing of FIG. 51. Then, the process passes onto step 4903. In step 4903, the processor retrieves the accumulated ratification number (ARN) that has built up for the requested action, for the particular photo. If ratification processing has just begun for the particular photo, the accumulated ratification number may be 0. Then, the process passes onto step 4904. In step 4904, the processor determines whether the number of persons who have ratified, as represented in the accumulated ratification number, satisfy the required ratification number. That is, has the threshold for the predetermined action been attained or not attained. If a "yes" is rendered in step 4904, the process passes onto step 4906.

In step 4906, the censorship power rating (CPR) of the user is incremented (for a positive ratification) in some manner. In this example, the CPR is incremented by the value of 1. However, it is appreciated that other methodologies can be utilized so as to increase the CPR of the user. Accordingly, as reflected at 4906' of FIG. 49, the CPR of the nominator, i.e. the user who nominated the flag, can be increased for a positive ratification. As a result, the next time that the nominator nominates a photo, for a particular flag, fewer ratifiers may be needed. This is because the nominator's strength, as to the particular flag, has increased as reflected in his or her CPR. Relatedly, as reflected at 4900' in FIG. 49, for a new user, for example, the new user may have a higher required ratification number (RRN), as compared with an older user with a strong CPR, and thus a higher accumulated ratification number (ARN) may be required in order to perform the particular action requested by a selected flag. After step 4904, the process passes onto step 4907. In step 4907, the processor performs the action that has been selected by the user. That is, the processor performs the action that is associated with the flag selected by the nominator user.

On the other hand, a "no" may be rendered in the processing of step 4904. Such a no indicates that a sufficient number of ratifiers has not been attained so as to perform the action requested by the nominator.

Accordingly, the process passes onto step 4904N in FIG. 49. In step 4904N, the processor determines: does the number of persons who have negated (i.e. disagreed with) the nominator (as represented by ARN) satisfy a lower threshold? If "yes", then the process passes onto step 4906N.

In step 4906N, the censorship power rating (CPR) of the user is decremented (for a negative ratification) in some manner. In this example, the CPR is decremented by the value of 1. However, it is appreciated that other methodologies can be utilized so as to decrease the CPR of the user. Accordingly, the CPR of the nominator, i.e. the user who nominated the flag, can be decreased for a negative ratification. As a result, the next time that the nominator nominates a photo, for a particular flag, MORE ratifiers may be needed. This is because the nominator's strength, as to the particular flag, has decreased as reflected in his or her CPR.

Then, in step 4907N, the processor removes the flag. That is, the nominator has been overruled.

Figure 50:
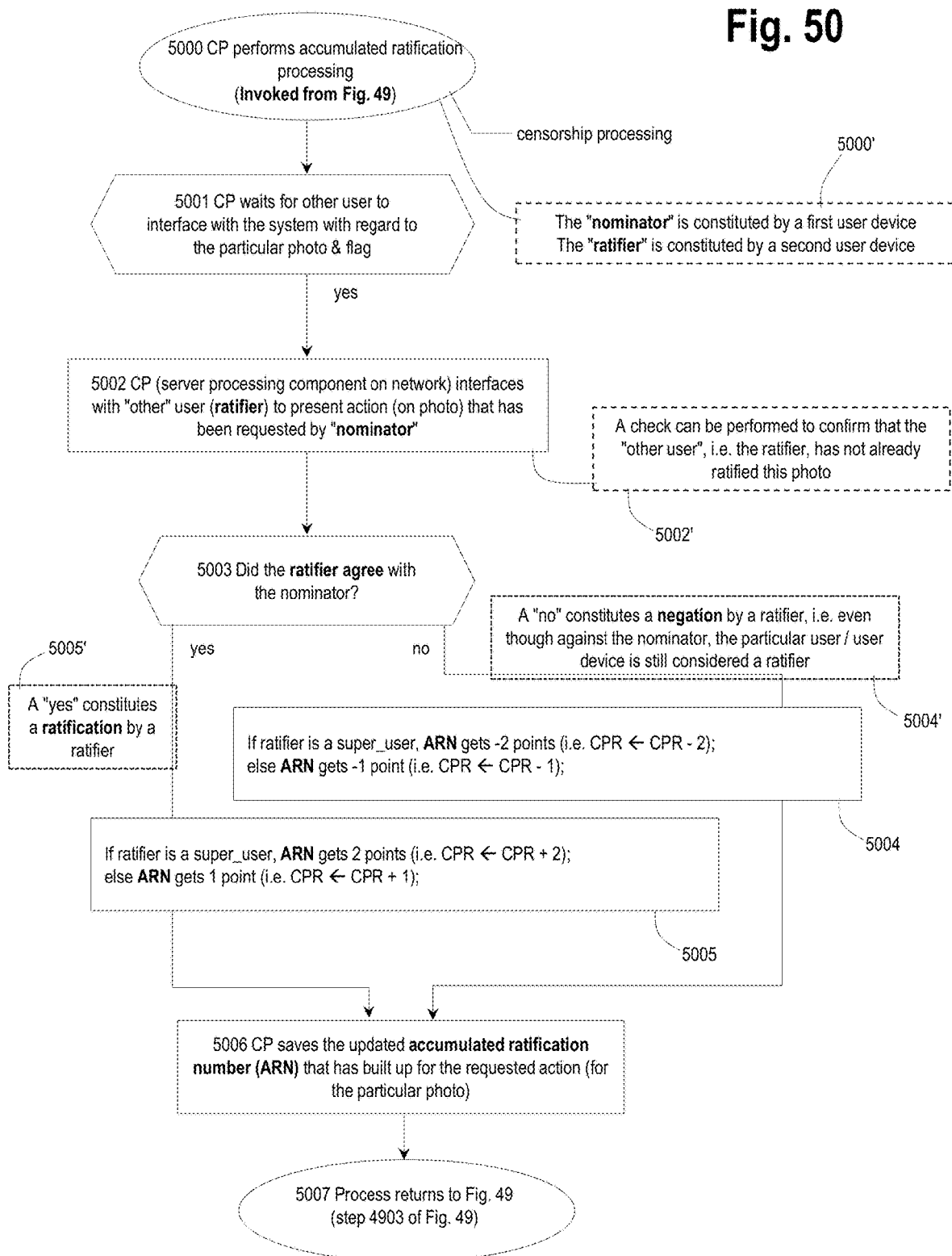
FIG. 50 is a flowchart showing "processor performs accumulated ratification processing" of subroutine 5000 as invoked from FIG. 49, in accordance with principles of the disclosed subject matter.

As noted herein, other methodologies can be utilized so as to increase or decrease the CPR of the user, such as in steps 4906, 4906N, 5004 (FIG. 50) and/or 5005 (FIG. 50). Such other methodologies can include other additive processing, multiplicative processing, use of thresholds, and/or use of absolute values. For example, step 4904 can include determining if the accumulated ratification reaches an absolute value of "X" and/or a multiplicative value of "Y". For example, step 4904N can include determining if the accumulated ratification reaches an absolute value of "X" and/or a multiplicative value of "Y".

On the other hand, if no in step 4904N of FIG. 49, the process passes onto step 4905 of FIG. 49. In step 4905, the CP or processor performs accumulated ratification processing. Subroutine 5000 of FIG. 50 can be called upon to perform such processing. In such ratification processing, as reflected at 4905', the processor waits for further ratification from other users and/or waits for further disagreement from other users. Once ratification processing has been performed in step 4905, the process loops back to step 4903. Processing then continues as described above.

Accordingly, FIG. 50 is a flowchart showing "processor performs accumulated ratification processing" of subroutine 5000 as invoked from FIG. 49, in accordance with principles of the disclosed subject matter.

The subroutine is launched in step 5000 and passes to step 5001. In step 5001, the processor waits for other users to interface with the system with regard to the particular photo and particular flag. As reflected at 5000', a nominator can be constituted by a first user device, and ratifiers can be constituted by additional respective user devices.

Once a user interfaces with the system, a "yes" is rendered in the determination of step 5001. Thus, the process passes onto step 5002. In step 5002 using a suitable GUI window, the processor interfaces with the user (a ratifier) to present action, on the photo, that has been requested by the nominator. Relatedly, as reflected at tag 5002', a check can be performed by the processor to confirm that the other user, i.e. a potential ratifier, has not already ratified this photo for this particular flag. After step 5002, the process passes onto step 5003. In step 5003, the processor determines whether or not the ratifier did indeed agree with the nominator.

If the determination of step 5003 renders a "yes," then such "yes" constitutes a ratification by a ratifier, as reflected at 5005' in FIG. 50. The process then passes to step 5005. Step 5005 reflects processing functionality that action by the ratifier may be magnified. That is, some ratifiers may carry more weight than other ratifiers. In the example of step 5005, if the ratifier is a superuser, then the ARN gets 2 points.

If the ratifier is not a superuser, then the ARN gets only one point. It is appreciated that other methodologies can be utilized so as to magnify the decision of a favored ratifier. For example, other summation techniques could be utilized and/or other multiplication techniques could be utilized so as to magnify the decision of a favored ratifier, in a magnitude and manner as desired. In the processing of step 5005, such processing may or may not be based on flag type. That is, the CPR of the user might only be increased for that particular type of flag. After step 5005, the process passes onto step 5006.

On the other hand, a "no" may be rendered in the determination of step 5003. As reflected at 5004' of FIG. 50, a "no" constitutes a negation by a ratifier. That is, such negation will count against the action requested by the nominator. Note, even though the decision or "vote" is against the nominator, the particular user or user device is still considered a ratifier for purposes of description herein. Accordingly, a "ratifier" can either agree with a nominator with respect to a flagged photo or disagree with the nominator with respect to a flagged to photo.

The processing then passes onto step 5004. Similar to step 5005, but in reverse, step 5004 is provided to magnify the negation of some users. That is, if the ratifier is a superuser, then the ARN is decremented minus 2 points. Otherwise, the ARN is decremented minus 1 point. Other mathematical processing can be used so as to decrement the ARN. In the processing of step 5004, such processing may or may not be based on flag type. That is, the CPR of the user might only be decreased for that particular type of flag.

Thus, the process can include censoring the censurer, i.e. censoring the nominator user. In some embodiments, a user's privilege to flag a photo can be disabled. For example, if a threshold number of flags, which were flagged by a particular nominating user, are not ratified—then the user's ability to flag a photo might be disabled. Such disablement might apply to that particular flag. Further. a user might be disabled in general, i.e. the user is not allowed (by the system) to flag a photo with any flags.

After step 5004 of FIG. 50, the processing passes onto step 5006. In step 5006, the processor saves the updated ARN that has built up for the requested action, for the particular photo. Then, the process passes onto step 5007. In step 5007, the process returns to FIG. 49—and in particular to step 4903 of FIG. 49. Processing then continues as described above.

FIG. 51 is a diagram showing aspects of censorship power rating (CPR) and required ratification number (RRN), in accordance with principles of the disclosed subject matter. FIG. 51 shows table 5100. The table 5100 includes a plurality of data records 5101. The data records 5101 include various data that can be used in censorship processing.

As reflected at 5121, the CPR of a nominator can be mapped to a particular RRN. The RRN can correlate to how strong the nominator is. A low RRN can mean that fewer or no other users have to ratifier a particular action for a particular flag, with regard to a particular photo. As reflected at 5122, an RRN can be different for different requested actions, i.e., for different flags the RRN can be different. For example, a RRN requirement to submit a comment on a photo can be less demanding than an RRN to remove a photo entirely. Additionally, as described above and reflected at 5123, the number of users who are needed to ratify a particular action, for a particular flag, can depend on the attributes of the user(s) who is doing the ratifying.

With further reference to FIG. 51, each of the data records 5101 include a censorship power rating (CPR), a required ratification number (RRN), and a description of associated processing. For example, if the CPR of the nominator is between 0 and 40, then the required ratification number is 20 in this example. This means that action is performed on the photo with 20 other users ratifying. Such required number of ratifiers can be decreased if 1 of the ratifiers is a superuser or super ratifier, such that his or her ratification is magnified.

For example, if the CPR of the nominator is between 40 and 60, then the required ratification number is 10 in this example. That is, a CPR of 40 to 60 is mapped to a required ratification number of 10. This means that action is performed on the photo with 10 other users ratifying. As shown in the table 5100, it may be the case that the CPR of the nominator is between 80 and 100. Such reflects a very strong nominator. In this situation, the required ratification number might indeed be 0. Accordingly, no ratification might be required to complete the action that is requested by the particular nominator.

Accordingly, the number of ratifying users needed to ratify a particular action (e.g. removal of a photo) can depend on (a) strength or censorship power rating (CPR) of the nominator user, and (b) strength of the ratifying users who can agree or disagree with the nominator. Relatedly such strength of the nominating user and strengths of the ratifying users can be different for different flags, i.e. different for different requested actions. Thus, a weak nominating user may require more ratifying users, as compared with a strong nominating user.

Various features of censorship processing are described above. Censorship processing of the disclosure can include a nomination by one user and then ratification by additional users. The additional users can either follow or not follow the nominator. Successful or unsuccessful censorship can be logged into user profiles to determine a censorship power rating over time, where the censorship power rating gets stronger with ratification and weaker with negation, as described herein. The power rating can be integrated and considered in the nomination and ratification processing associated with censorship of a photo. Censorship can include removing a particularly offensive photo, for example. Censorship can include any of a variety of other action items. Censorship can include corrections to a photo, revisions to a photo, removal or deletion of a photo, or other action items as desired. Censorship processing can address offensive content and/or undesirable content and provide a mechanism by which users of the system can control such content. Undesirable content can include sexually suggestive photos, cruelty, violence, promotion or solicitation, hate or discriminating comments, political debate, and/or other offensive content and may be reflected in pop-up menus as represented by menu 5214 shown in FIG. 52.

Figure 53:
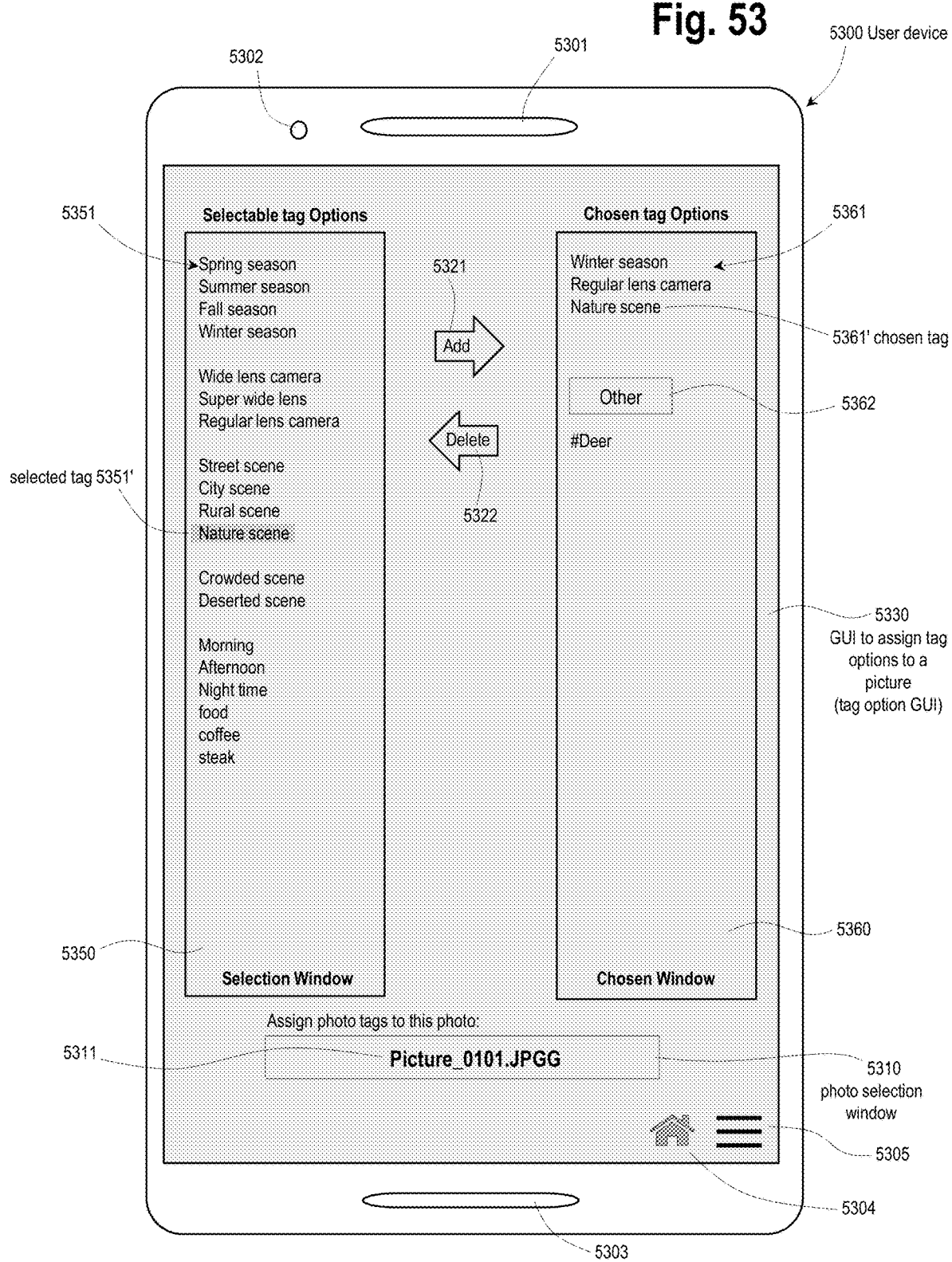
FIG. 53 is a schematic diagram showing a user device 5300 with the GUI 5330, in accordance with principles of the disclosed subject matter.

FIG. 53 is a schematic diagram showing a user device 5300 with the GUI 5330, in accordance with principles of the disclosed subject matter. The GUI 5330 includes a selection window 5350 that displays selectable tag options. The GUI includes a chosen window 5360 that displays chosen tag options 5361.

The GUI includes a photo selection window 5310. Using the photo selection window 5310, a user can select a particular photo for processing. In this example, a photo 5311 that has been selected is Picture_0101.JPGG. Selection of such photo 5311 can include searching for the photo, retrieving the photo from a folder, clicking on the photo in a particular GUI, using a drop-down menu, and/or other mechanism to identify the particular photo for processing. The selection window 5350 includes various tag options 5351, i.e. selectable tag options. For example, the window 5350 includes a selected tag 5351', "Nature scene". The user can identify that the photo 5311 relates to a nature scene. Accordingly, the user might select the tag 5351'. The user can then tap an add button 5621 in the GUI 5330. Such action results in the "Nature scene" identifier 5361' being added into the chosen window 5360. As shown, the tag options winter season and regular lens camera have already been added into the chosen window 5360.

A user may also remove items from the chosen window 5360. A user can select an item in the chosen window 5360, and tap the delete button 5322. As result, the CP will remove the selected item from the chosen window 5360. As shown, an "Other" button 5362 can be provided on the GUI 5330. The user can tap the "Other" button 5362 which allows for the addition of user freeform tag entries. Freeform tag entries can be entered as hashtags and in the example the user has entered #Deer. Such hashtag is shown in the chosen window 5360. Users can enter multiple freeform tags so as to tag a selected picture. The windows 5350 5360 and GUI 5330 of FIG. 53 can also be provided with other visual mechanisms and/or selection mechanisms, such as drop down menus.

As shown in FIG. 53, the GUI 5330 can include a home icon 5304 by which a user can access a landing page of the system. A menu icon 5305 can be provided. A user can tap the menu icon 5305 so as to access any of a variety of menu options or features as described herein. The user device 5300 can also include functional items including a speaker 5301, a camera 5302, and a microphone 5303. A camera can also be provided on the opposing side of the user device 5300. The user device 5300 can include known features that can be used in conjunction with the novel features of the disclosure.

Figure 54:
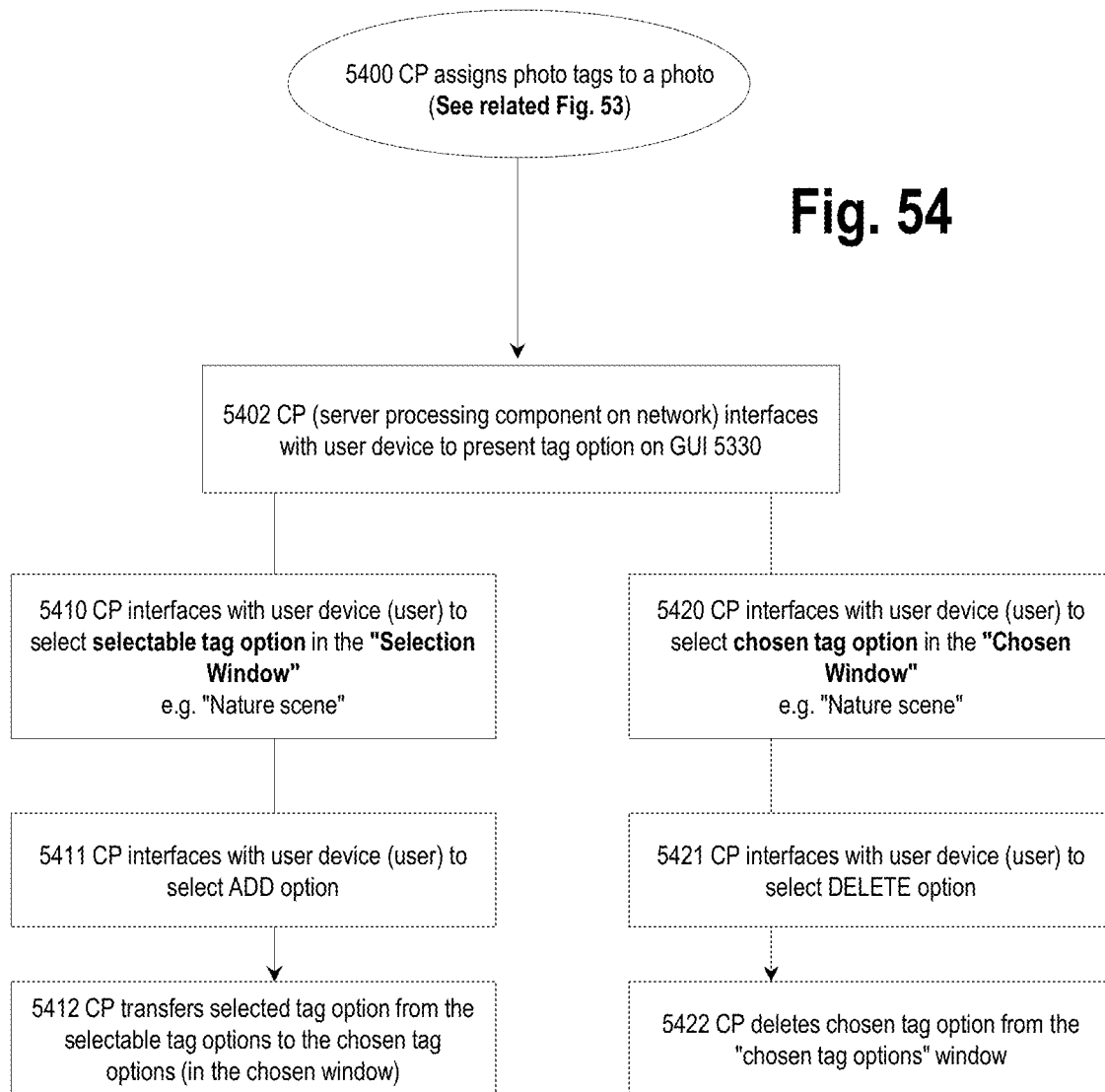
FIG. 54 is a flowchart showing processing that can be used in conjunction with the GUI 5330 of FIG. 53, in accordance with principles of the disclosed subject matter.

FIG. 54 is a flowchart showing processing that can be used in conjunction with the GUI 5330 of FIG. 53. The process of FIG. 54 is launched in step 5400. Such process can be launched, invoked, or called upon as a result of the user accessing the GUI 5330, for example. The GUI 5330 can be accessed via a suitable GUI option or menu option, for example. Once the process is launched, the process passes onto step 5402. In step 5402, the CP interfaces with the user device to present a tag option on the GUI 5330. The tag option might be "nature scene" or a freeform tag option, which can be created by tapping the "Other" button 5362. The freeform tag option can be a "hashtag" such as "#Deer" as described above. The CP can be a server processing component disposed on a network and in communication with user device. In step 5410, the processor interfaces with the user device, i.e. interfaces with a user, to select a selectable tag option in the selection window 5350. Then in step 5411, the CP interfaces with the user device to select the add option 5321. Then in step 5412, the CP transfers the selected tag option from the selection window 5350 to the chosen window 5360. Alternatively, in step 5420, the CP can interface with the user to select a chosen tag option in the chosen window 5360. In step 5421, the CP interfaces with user device to select the delete option 5322. Once selected, in step 5422, the CP deletes the chosen tag option from the chosen window 5360. Accordingly, the processing of FIG. 54 can be used to enable the GUI 5330 of FIG. 53.

Additional features of the disclosure are described below relating to "filtered following" processing. The disclosure provides a methodology that allows users to accumulate data that can be used to validate or verify data presented by the system of the disclosure. At a high level, users can select a "Location Type" as identified in FIG. 12 (in step 613) to filter and tag photos. Photos can be collected into established formal "channels" or "channels" of grouped photos.

To explain further, as reflected at 612" in FIG. 12, processing can be performed that includes (a) the creation of "channels" and (b) the association of photo(s) to a respective channel. The created channels can be created and stored, as a digital framework, in the database portion 120. Accordingly, the system of the disclosure can include viewable channels of photos. For example, a food channel can be provided that includes photos tagged with "To Eat" or other food related tags. Other channels might include a "Nature Channel" (containing nature related photos) or a "sports channel" (containing sports related photos). As described herein, censorship power ratings may be used in the processing of the disclosure. Censorship power ratings, as well as other parameters used in the processing of the disclosure, can be tracked based upon such channels of photos, i.e. so as to potentially be different (for a given photo) for different channels. Accordingly, parameters can be different for different channels. Censorship power ratings and other parameters can be different for different user groups that follow or view certain "channels". For example, censorship expectations based upon mature content, etc., can vary between different user groups.

In a more complex example, filtered following processing can be used to test or validate the truth of ratings preferences with regard to a particular photo or other media content, such as a posting. Filtered following processing allows a user to readily change their perspective or viewpoint. The perspective can be seen through different users or through different groups of users. Filtered following processing can allow for a user to view the perspective of an established trusted critic(s), an affinity group, followed users, friends, groups of friends, trusted specialty groups, or other persons or groups, for example. Processing to achieve such objectives is described below.

Figure 55:
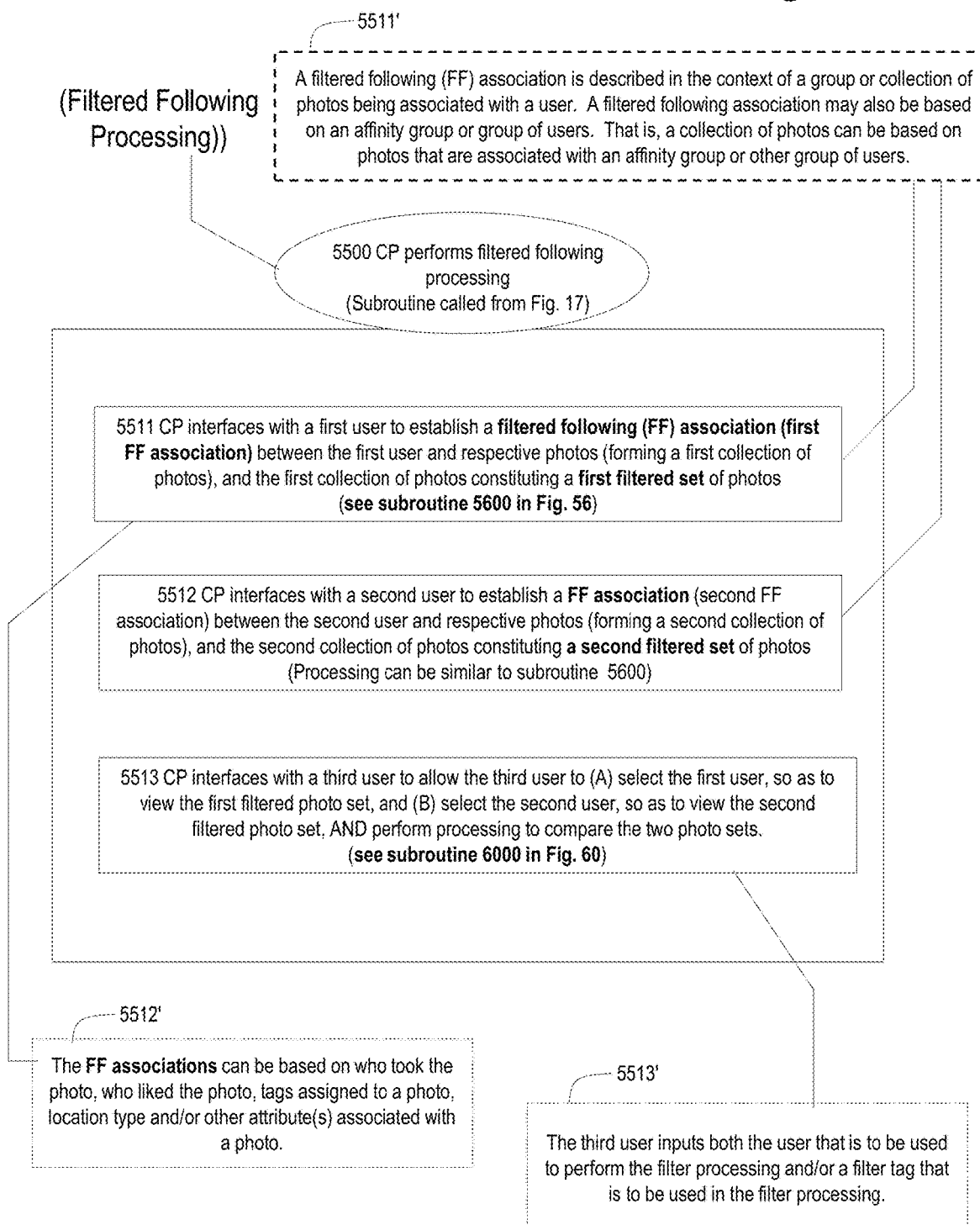
FIG. 55 is a flowchart showing filtered following processing, in accordance with principles of the disclosed subject matter.

FIG. 55 is a flowchart showing filtered following processing, in accordance with principles of the disclosed subject matter. The filtered following processing of FIG. 55 can be called or invoked utilizing a suitable option presented on a GUI of a user device. For example, filtered following processing could be called upon or invoked as part of the processing of step 763 of FIG. 17. The process of FIG. 55 is launched in step 5500. Upon the filtered following processing being launched, any of the processing of steps 5511, 5512 and 5513 can be performed as called upon through user interaction with a user, i.e. with a user device.

In step 5511, the CP interfaces with a first user to establish a filtered following (FF) association (i.e. a first FF association) between the first user and respective photos (forming a first collection of photos), and the first collection of photos can constitute a first filtered set of photos, i.e. a first filtered photo set of photos. Details are described below with reference to subroutine 5600 of FIG. 56. As reflected at 5512', the FF associations can be based on who took the photo, who liked the photo, tags assigned to a photo, location type and/or other attribute(s) associated with a photo. The FF associations can be based on a person or a group. As reflected at 5511' in FIG. 55, a filtered following (FF) association is described in the context of a group or collection of photos being associated with a user, such as in the processing of step 5511 and step 5512. A filtered following association may also be based on an affinity group or other group of users. That is, a collection of photos can be based on photos that are associated with an affinity group or other group of users.

In step 5512 of FIG. 55, the CP interfaces with a second user to establish a FF association (i.e. a second FF association) between the second user and respective photos (forming a second collection of photos), and the second collection of photos can constitute a second filtered set of photos, i.e. a second filtered photo set of photos. Processing can be similar to subroutine 5600, described above. Rather than photos, other media can be processed, such as electronic messages or other content.

In step 5513, the CP interfaces with a third user to allow the third user to (A) select the first user, so as to view the first filtered photo set, and (B) select the second user, so as to view the second filtered photo set. Processing can be performed so as to compare the two photo sets. Details are described below with reference to subroutine 6000 of FIG. 60. As reflected at 5513 the third user can input or select both the user that is to be used to perform the filter processing (i.e. a first user whose perspective will be viewed by the third user) and/or a filter tag that is to be used in the filter processing. For example, the first filtered photo set can be based on an association of photos with one or more users. For example, the second filtered photo set can be based on an association of photos with one or more users. For example, a second filtered photo set might be a collection of photos that are associated with all users in the system and/or a collection of photos that have been input into the system.

FIG. 56 is a flowchart showing details of subroutine 5600 as called from FIG. 55, in accordance with principles of the disclosed subject matter. The process is launched and can include any of the processing of steps 5610, 5620 and 5630. In step 5610, the CP establishes filtered following (FF) association based on photos that were "taken" by the first user. Such processing can include interfacing with the first user, i.e. a first user device. Subroutine 5700 can be called, as described with reference to FIG. 57 below. In step 5620, the CP interfaces with the first user to establish FF association based on photos that were "liked" by the first user. Subroutine 5900 can be called, as described with reference to FIG. 59 below. In step 5630, the CP establishes a filtered following (FF) association based on photos that were "tagged" in a particular manner by the first user. Subroutine 5900 can be called, as described with reference to FIG. 59 below.

Figure 57:
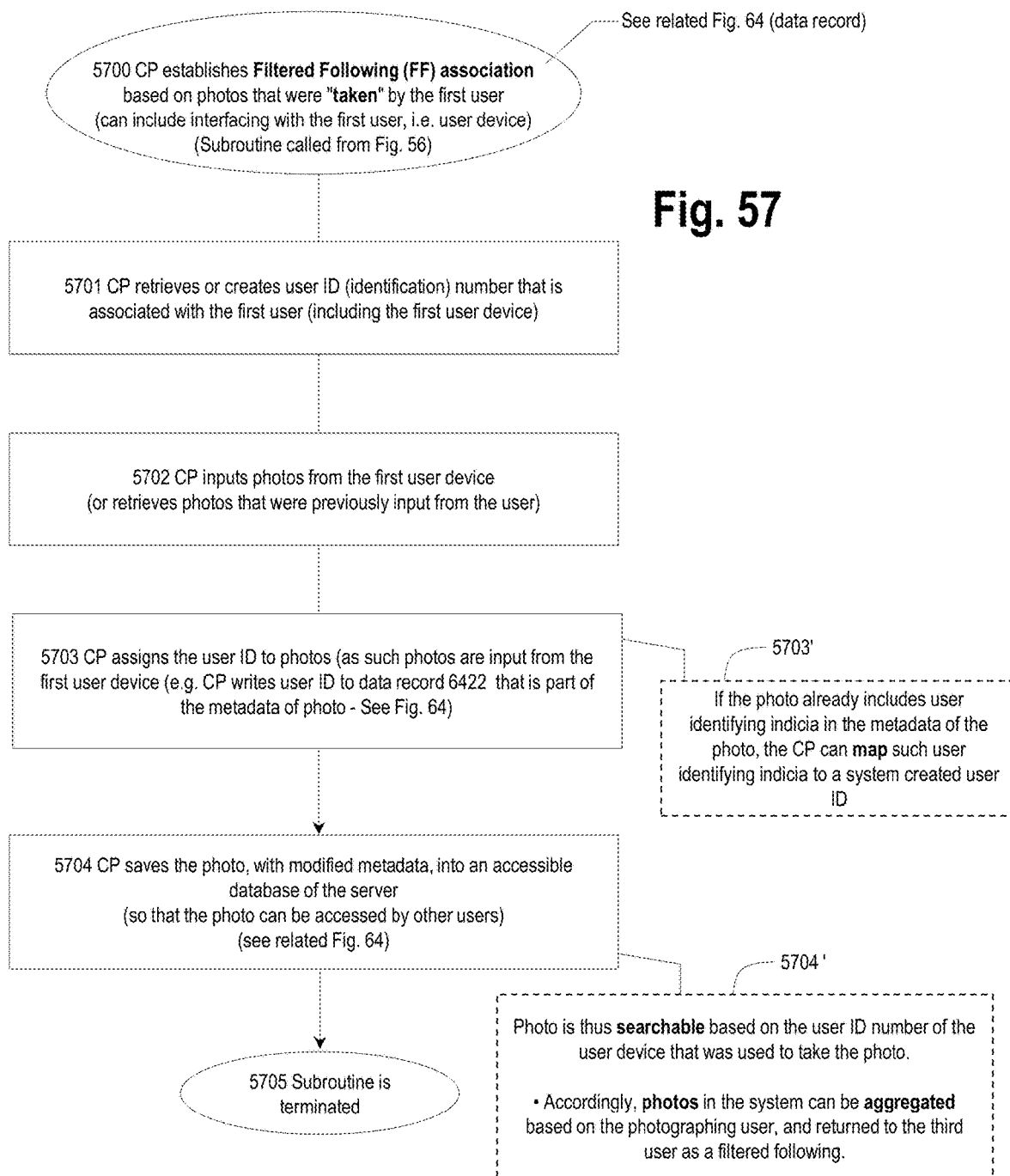
FIG. 57 is a flowchart showing details of "CP establishes filtered following (FF) association based on photos that were "taken" by the first user" of subroutine 5700 as called from FIG. 56, in accordance with principles of the disclosed subject matter.

FIG. 57 is a flowchart showing details of "CP establishes filtered following (FF) association based on photos that were "taken" by the first user" of subroutine 5700 as called from FIG. 56, in accordance with principles of the disclosed subject matter. The process of FIG. 57 can include interfacing with the first user device, i.e. interfacing with the first user. The subroutine is launched in step 5700 and passes onto step 5701. In step 5701, the processor retrieves or creates a user ID number or other identifying number or identification that is associated with the first user device, i.e. the first user. Then, in step 5702, the processor inputs photos from the first user device. Alternatively, the processor could retrieve photos from memory or data store that were previously input from the user. The photos can be associated with the user via a data association, such as is shown in the data architecture FIG. 64. Accordingly, in step 5703, the processor assigns the user ID to such photos as the photos are input from the user device. The CP can write the user ID to a data record 6422 that is part of the metadata of the photo (see FIG. 64). As reflected at 5703, if the photo already includes user identifying indicia in the metadata of the photo, the CP can map such user identifying indicia to a system created user ID, and insert such system created user ID in data record 6422. Then the process passes onto step 5704.

In step 5704, the system saves the photo, with modified metadata, into an accessible database of the server—so that the photo can be accessed by other users. Accordingly, as reflected at 5704' the photo is thus searchable based on the user ID number of the user device that was used to take the photo.

Accordingly, photos in the system can be aggregated based on the photographing user, and presented to the third user as a filtered following. Then, in step 5705, the process is terminated, i.e. the subroutine has been completed.

Figure 58:
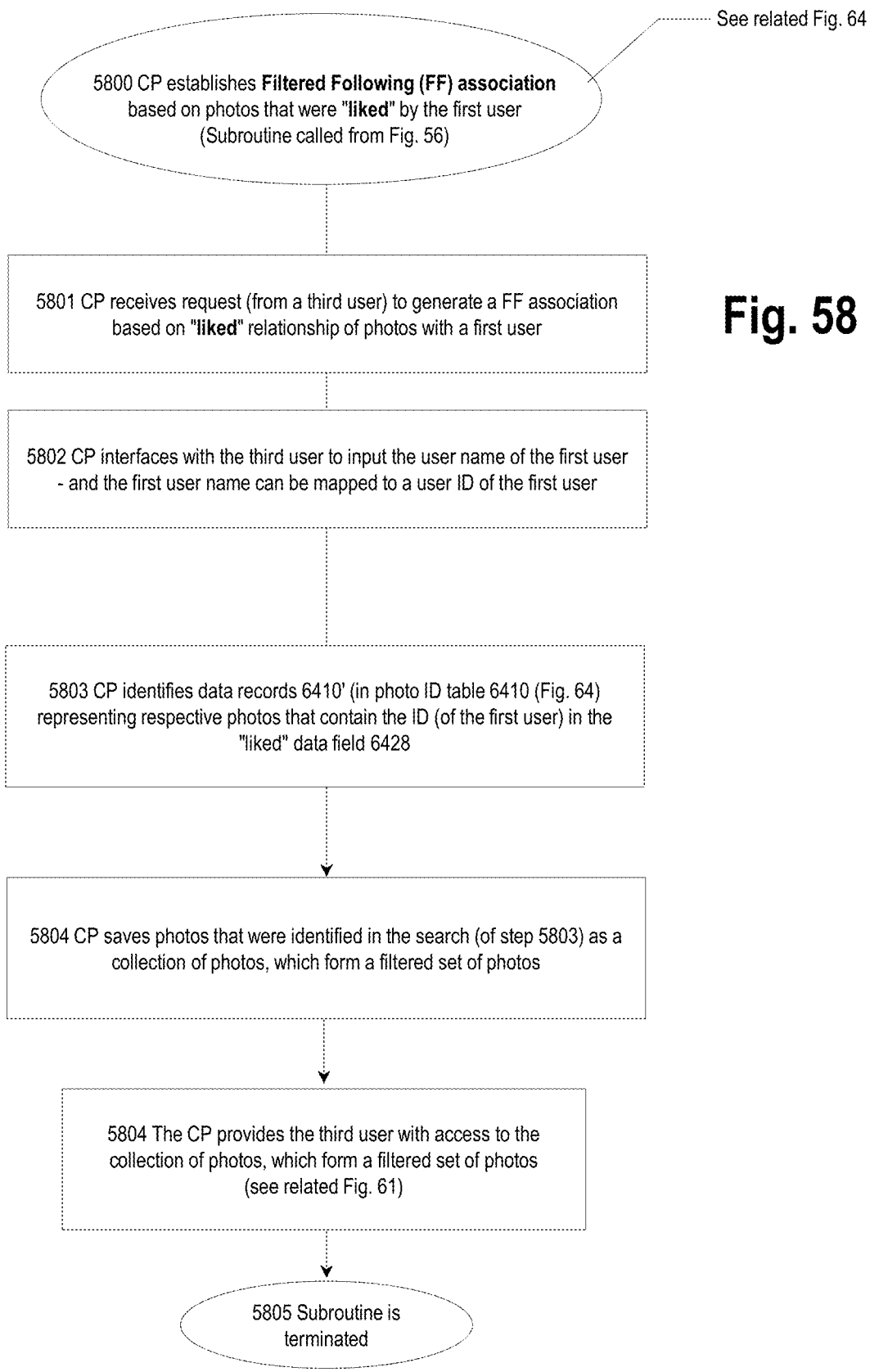
FIG. 58 is a flowchart showing details of "CP establishes filtered following (FF) association based on photos that were "liked" by the first user" of subroutine 5800 as called from FIG. 56, in accordance with principles of the disclosed subject matter.

FIG. 58 is a flowchart showing details of "CP establishes filtered following (FF) association based on photos that were "liked" by the first user" of subroutine 5800 as called from FIG. 56, in accordance with principles of the disclosed subject matter. The process of FIG. 58 can include interfacing with the first user device, i.e. interfacing with the first user. The subroutine is launched in step 5800 and passes onto step 5801. In step 5801, the processor receives a request (from a third user) to generate a FF association based on "liked" relationship of photo with a first user. In step 5802, the processor interfaces with the third user to input the user name of the first user. The first user name can then be mapped to a user ID of the first user. Then, in step 5803, the processor identifies data records 6410' (in photo ID table 6410 (FIG. 64)) representing respective photos that contain the ID (of the first user) in the "liked" data field 6428.

Then in step 5804, the processor saves photos that were identified in the search (of step 5803) as a collection of photos, which form a filtered set of photos. The process then passes onto step 5804.

In step 5804, the processor provides the third user with access to the collection of photos, which form the requested filtered set of photos. Then, in step 5805, the process is terminated, i.e. the subroutine has been completed.

Figure 59:
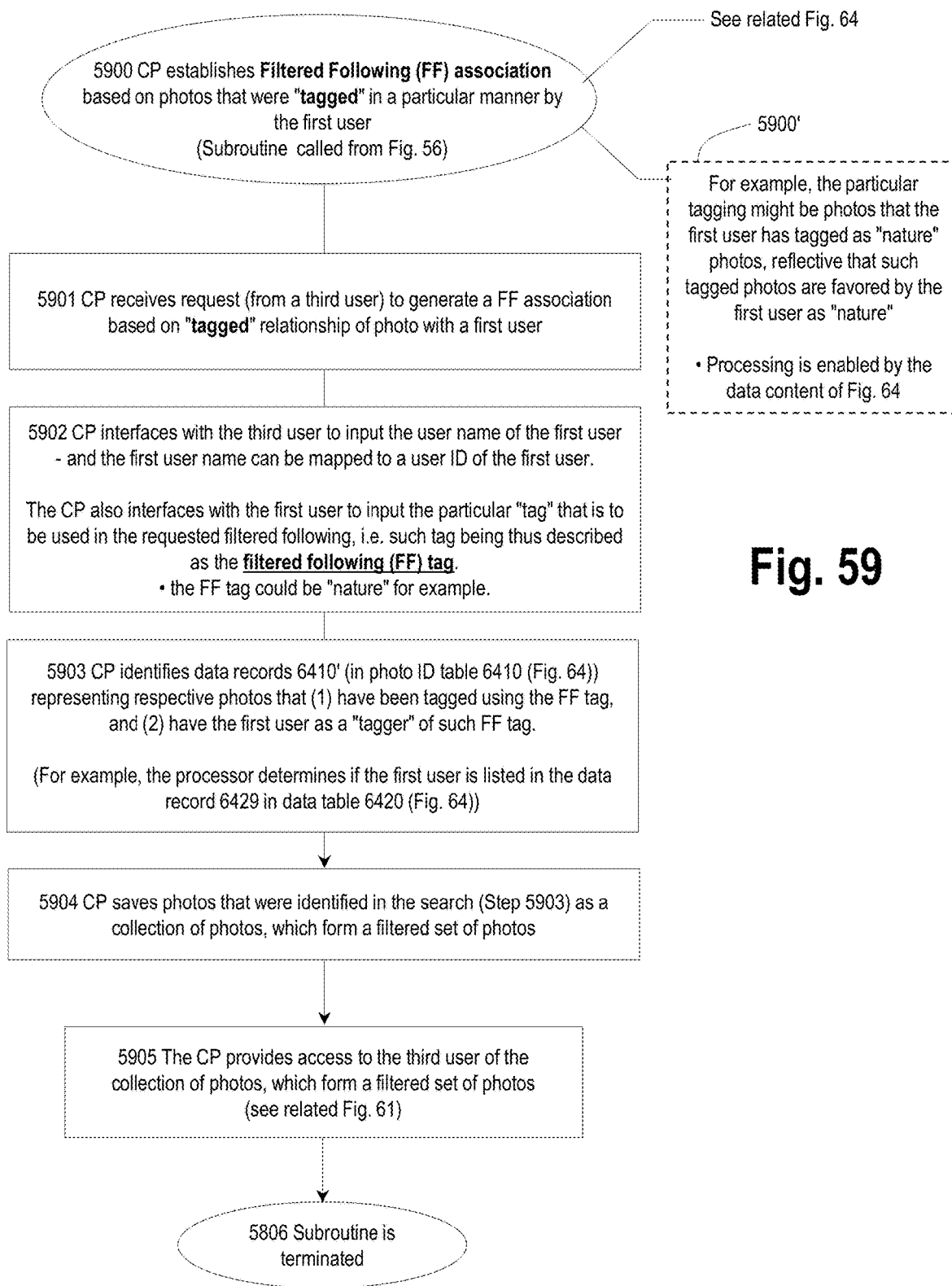
FIG. 59 is a flowchart showing details of "CP establishes filtered following (FF) association based on photos that were "tagged" in a particular manner by the first user" of subroutine 5900 as called from FIG. 56, in accordance with principles of the disclosed subject matter.

FIG. 59 is a flowchart showing details of "CP establishes filtered following (FF) association based on photos that were "tagged" in a particular manner by the first user" of subroutine 5900 as called from FIG. 56, in accordance with principles of the disclosed subject matter. As reflected at 5900', for example, the particular tagging might be photos that the first user has tagged as "nature" photos. Such tagging can be indicative that such tagged photos are favored by the first user as nature photos. Accordingly, a perspective via the first user's eyes can be provided to other users. The processing of FIG. 59 is enabled by the data content of FIG. 64.

Figure 64:
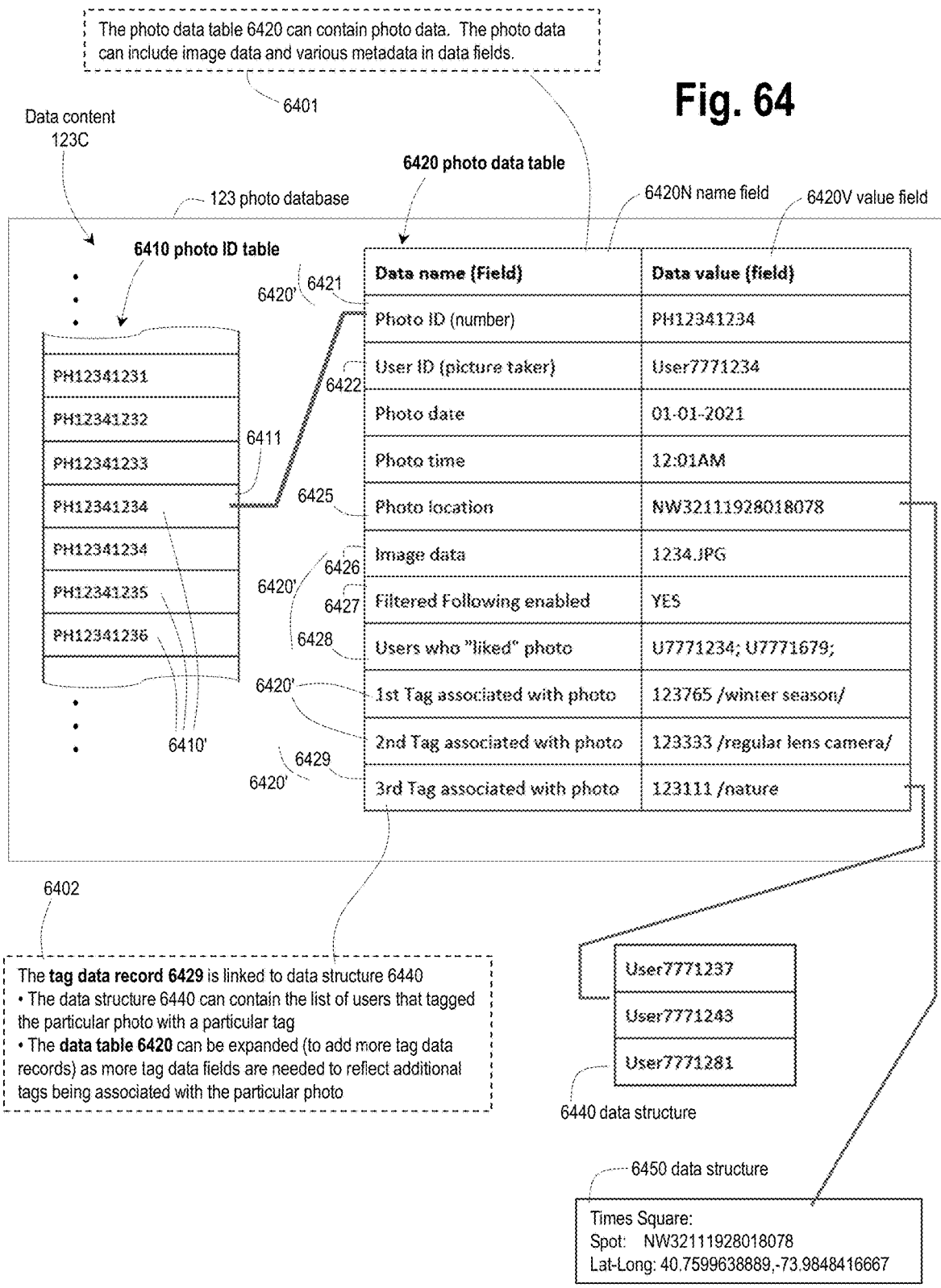
FIG. 64 is a schematic diagram showing data content 123C, in accordance with principles of the disclosed subject matter.

The processing of subroutine 5900 starts in step 59 and passes onto step 5901. In step 5901, the processor receives a request, from the third user in this illustrative example, to generate a filtered following association based on "tagged" relationship of photos with the first user. Then, the process passes onto step 5902. In step 5902, the processor interfaces with the third user to input username of the first user to be used in the filtered following. Then, the first user name can be mapped to a user ID of the first user. The CP also interfaces with the first user to input the particular "tag" (i.e. the FF tag) that is to be used in the requested filtered following. The tag could be "nature" for example. Then, in step 5903, the processor identifies data records 6410' (in photo ID table 6410 (FIG. 64)) representing respective photos that (1) have been tagged using the FF tag, and (2) have the first user as a "tagger" of such FF tag. For example, the processor determines if the first user is listed in the data record 6429 in data table 6420 (FIG. 64).

Then in step 5904, the processor saves photos that were identified in the search (of step 5903) as a collection of photos, which form a filtered set of photos. The process then passes onto step 5905.

In step 5905, the processor provides the third user with access to the collection of photos, which form the requested filtered set of photos. Then, in step 5906, the process is terminated, i.e. the subroutine has been completed.

Figure 60:
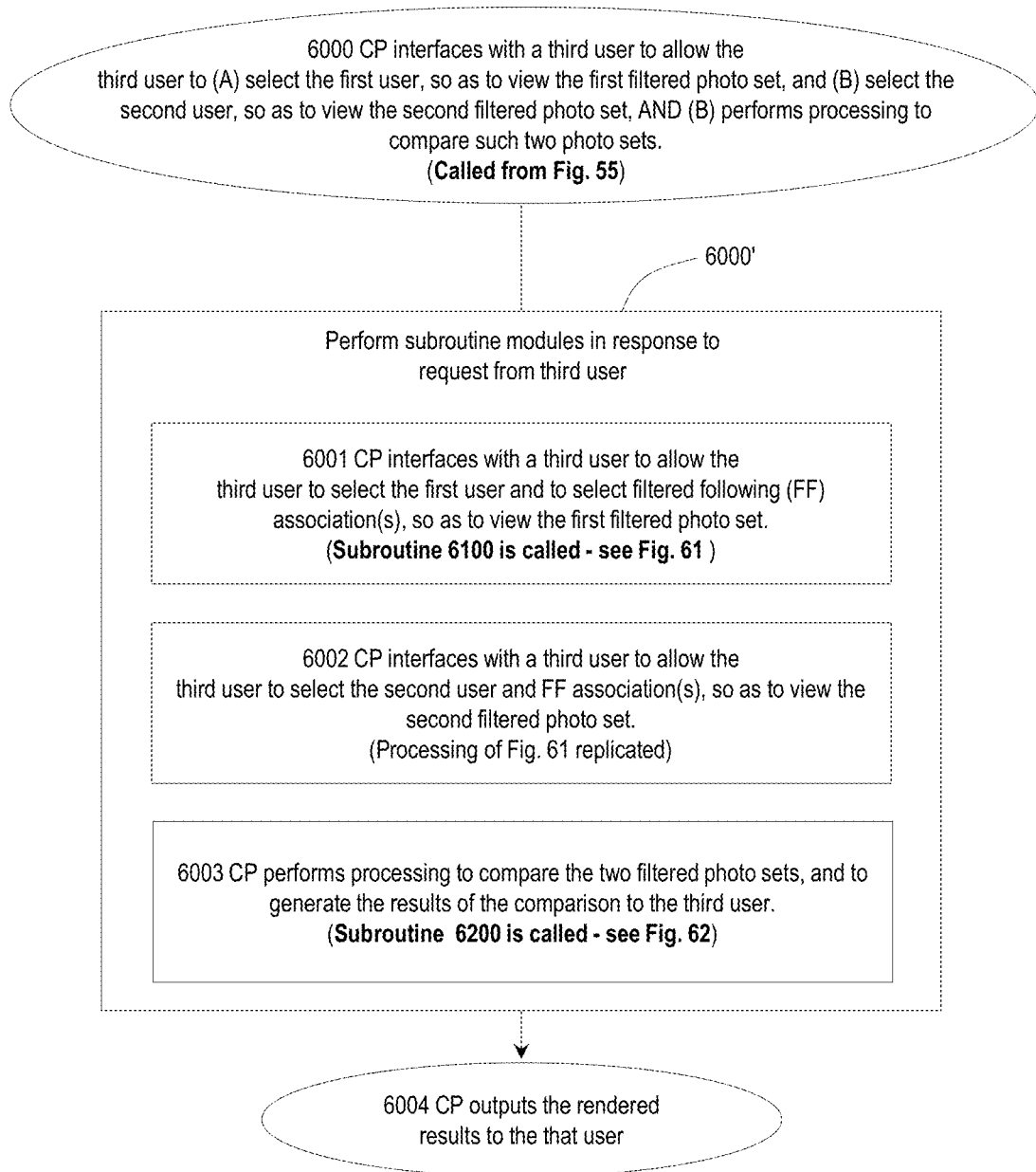
FIG. 60 is a flowchart showing details of "CP interfaces with a third user to allow the third user to (A) select the first user, so as to view the first filtered photo set, (B) select the second user, so as to view the second filtered photo set, AND (C) perform processing to compare the two photo sets" of subroutine 6000 as called from FIG. 55, in accordance with principles of the disclosed subject matter.

FIG. 60 is a flowchart showing details of "CP interfaces with a third user to allow the third user to (A) select the first user, so as to view the first filtered photo set, (B) select the second user, so as to view the second filtered photo set, AND (C) perform processing to compare the two photo sets" of subroutine 6000 as called from FIG. 55, in accordance with principles of the disclosed subject matter. The subroutine is launched in step 6000 and passes to Step 6000'. In step 6000', the processor performs subroutine modules in response to request from a user, in this case a user described as a third user. Accordingly, the processing provides for any of the modules 6001, 6002 and 6003 to be performed.

In the module 6001, the CP interfaces with a third user to allow the third user to select the first user and to select filtered following (FF) association(s), so as to view the first filtered photo set. Subroutine 6100 is called, as described below with reference to FIG. 61. In the module 6002, the CP interfaces with the third user to allow the third user to select a second user and FF association(s), so as to view the second filtered photo set. Module 6002 is provided to reflect that the third user can select additional users in filtered following processing. As otherwise described herein, the additional users can be selected so as to allow the third user to view different perspectives. The processing of module 6002 can be similar to the processing described below with reference to module 6001.

In the module 6003, the CP can perform processing to compare the two filtered photo sets that were generated in modules 6001 and 6002. Module or step 6003 can also generate results of the comparison for the third user. Module 6003 can be performed by subroutine 6200 as described below with reference to FIG. 62. After the desired processing is performed in step 6000', the process can pass onto step 6004.

In step 6004, the processor can output the rendered results to the user, here the third user.

Figure 61:
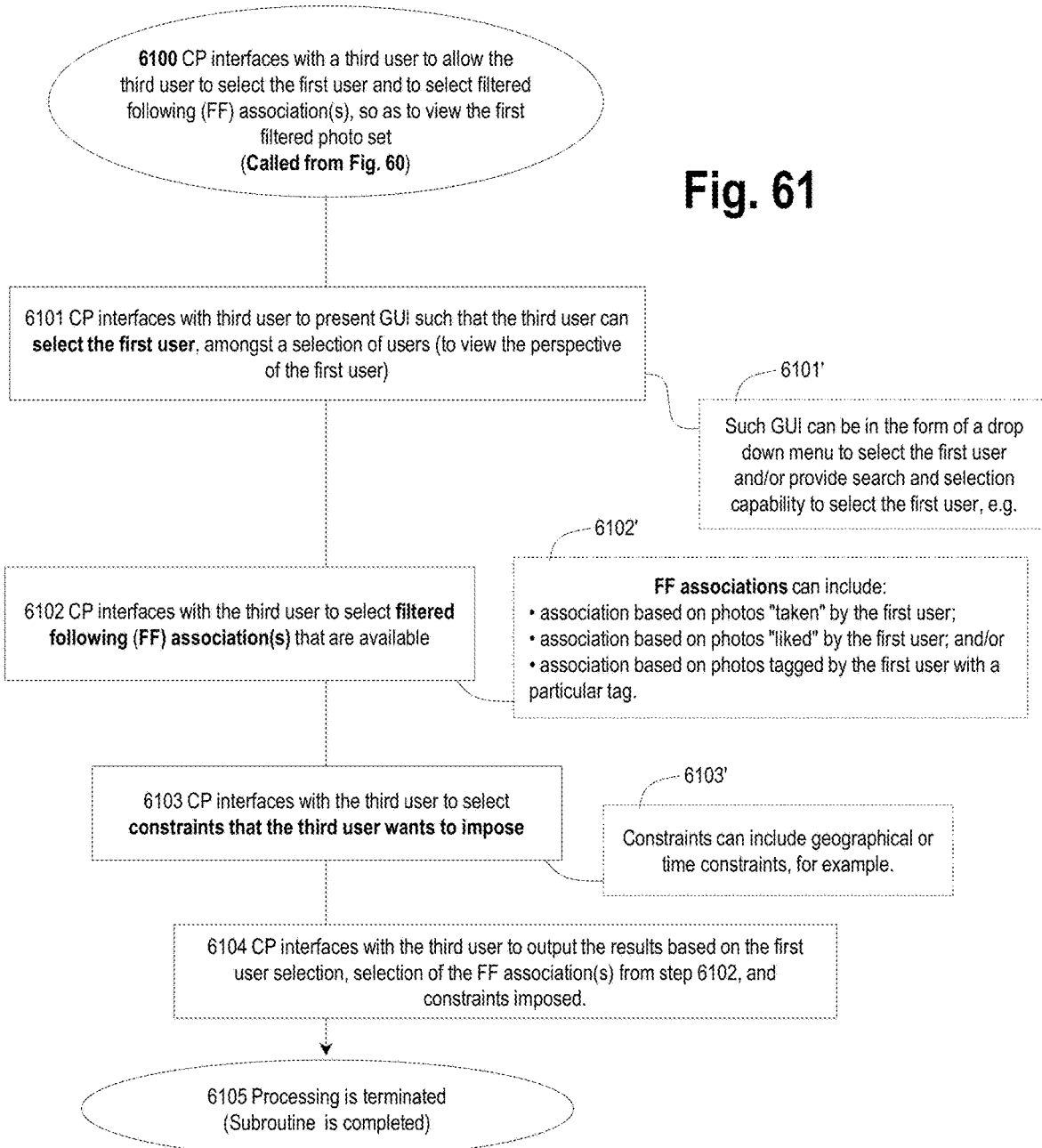
FIG. 61 is a flowchart showing details of "CP interfaces with a third user to allow the third user to select the first user and to select filtered following (FF) association(s), so as to view the first filtered photo set" of subroutine 6100 as called from FIG. 60, in accordance with principles of the disclosed subject matter.
Figure 63:
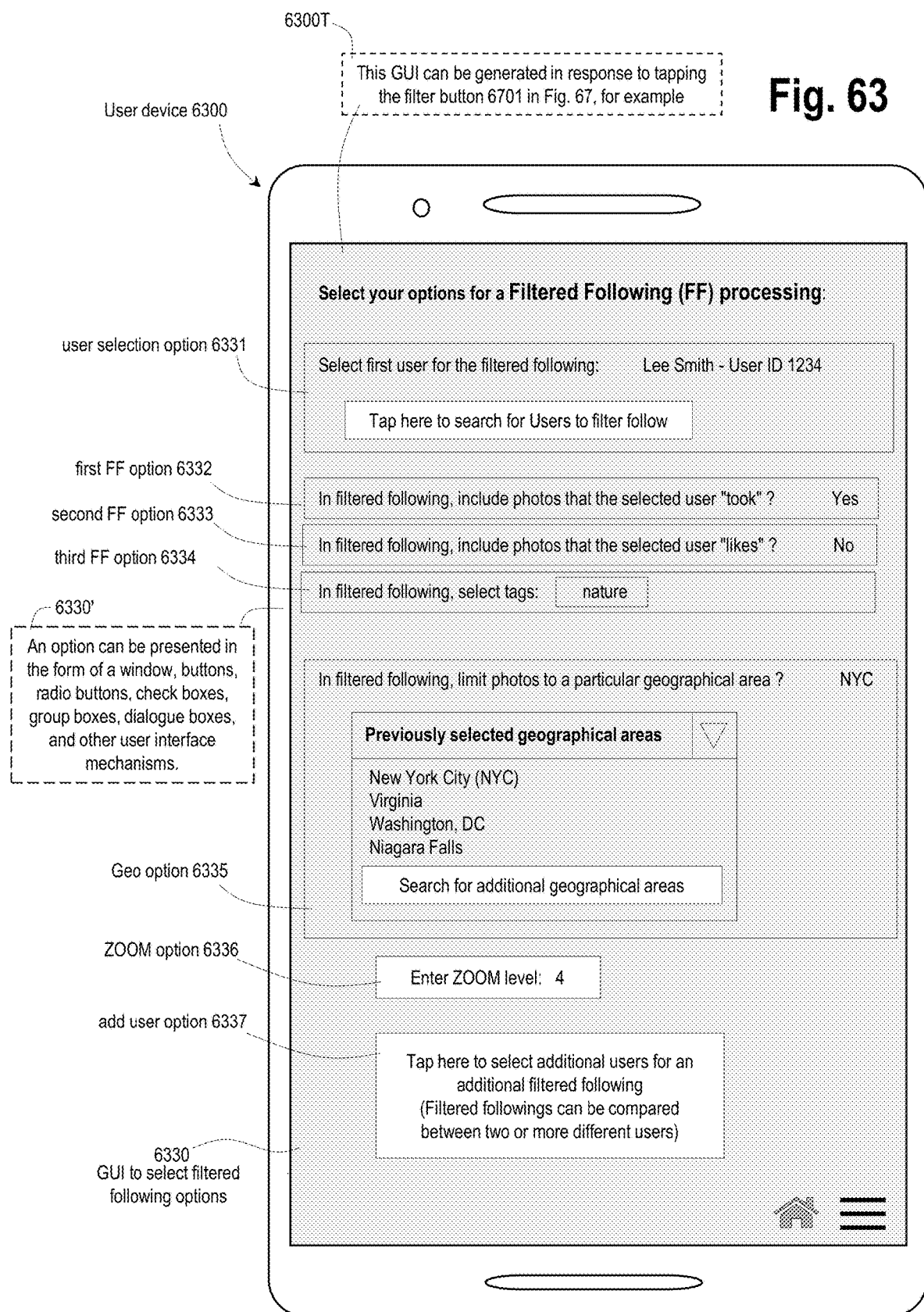
FIG. 63 is a diagram that shows a user device 6300 displaying a GUI 6330, in accordance with principles of the disclosed subject matter.

FIG. 61 is a flowchart showing details of "CP interfaces with a third user to allow the third user to select the first user and to select filtered following (FF) association(s), so as to view the first filtered photo set" of subroutine 6100 as called from FIG. 60, in accordance with principles of the disclosed subject matter. Relatedly, FIG. 63 shows a user device 6300 displaying a GUI 6330, in accordance with principles of the disclosed subject matter. The GUI 6330 is provided to select filtered following options.

Note FIGS. 57-59 relate to establishing filtered following associations based on input data. On the other hand, FIG. 61 relates to the actual inputting of the data from the user, i.e. and once such data is input, the data can be used in the processing of FIGS. 57-59.

With further reference to FIG. 61, the subroutine is launched in step 6200 and passes onto step 6101. In step 6101, the processor interfaces with the third user to present a GUI such that the third user can select the first user, amongst a selection of users, so as to view a perspective of the first user. Such a GUI can be in the form of a drop-down menu to select the first user and/or provide certain selection capability to select the first user, for example. The GUI 6330, of FIG. 63, can include a user selection option 6331.

The option 6331 allows the third user to tap and search for users, such as a first and second user for example, to filter follow. Other selection mechanisms could be utilized as desired. For example, the user selection item 6331 can provide a user with the ability to select a group of users to filter follow. The group of users, which may be selected, may be an affinity group; "friends"; or "users followed," for example. Accordingly, a user can be selected, i.e. the "first user" is selected for purposes of this description. After step 6101, the process passes onto step 6102. In step 6102, the processor interfaces with the third user to select filtered following (FF) association(s) that are available. As noted at 6102', the filtered following associations can include (1) association based on photos taken by a first user, (2) association based on photos "liked" by a first user, and/or (3) association based on photos that were tagged by the first user with a particular tag. More specifically, with regard to the association based on tags, note related step 5902 of FIG. 59. The processor can interface with the user to input the filtered following (FF) options via the first FF option 6332, the second FF option 6333, and/or the third FF option 6334, as shown in the GUI 6330 of FIG. 63. Various other FF options can be provided for selection by the user. Indeed all the photos that are available to the user and/or all the photos that are on the system (and satisfy selected criteria), for example, can be provided as an FF option.

With further reference to FIG. 61, after step 6102, the process passes onto step 6103. In step 6103, the processor interfaces with the third user to select constraints that the third user wants to impose upon the filtered following. Note at 6103', constraints can include geographical constraints, time constraints, or other constraints as may be desired. Such constraints can be selected and imposed upon the filtered following so as to limit photos contained and presented to the third user in the filtered following. For example, such a constraint can be selected by the third user utilizing the Geo option 633 of the GUI 6330 of FIG. 63. With such Geo option 6335, the third user has limited the photos to the particular geographical area of New York City. As noted at 6330', an option or selection of the GUI 6330 (FIG. 63) can be presented in the form of a window, buttons, radio buttons, checkboxes, group boxes, dialogue boxes and other user interface mechanisms. The GUI 6330 can also provide a zoom option 6336. The zoom option allows the third user to render results of the filtered following to a particular zoom level and/or to particular longitude-latitude coordinates, for example. Additionally, the GUI 6330 includes an add user option 6337. Such option allows the third user to select additional users for an additional filtered following. Filtered followings can be generated and compared between two or more different users.

Also, a filtered following can be generated and viewed in and of itself.

Figure 67:
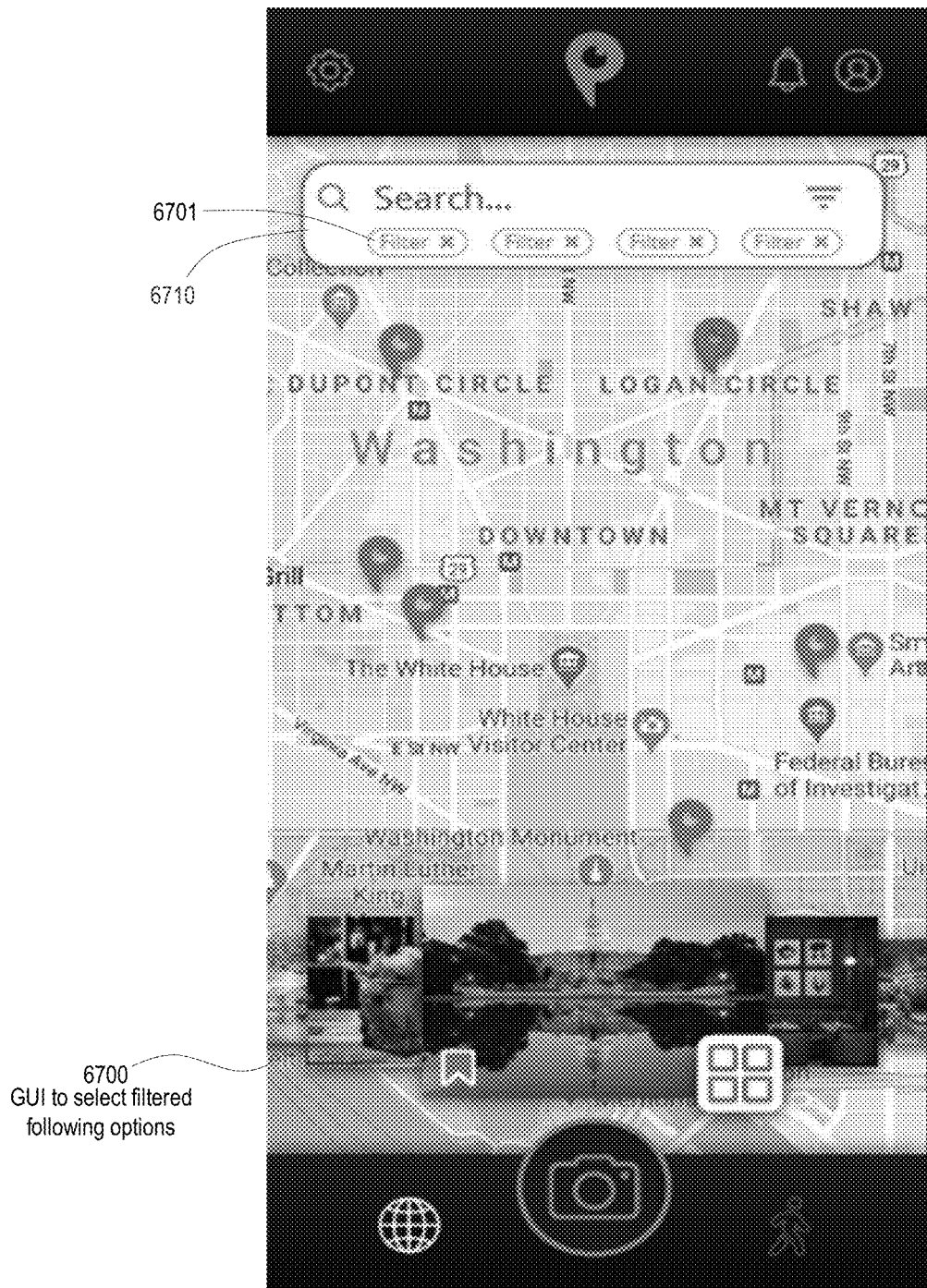
FIG. 67 is a representation of a GUI with filtering options, in accordance with principles of the disclosed subject matter.

FIG. 67 is a representation of a GUI 6700, in accordance with principles of the disclosed subject matter. The GUI 6700 can include various "filter" icons 6701 for selection by a user, e.g. the "third" user as described herein. By tapping on one of the displayed filter icons 6701, a user can access a previously set up filtered following. Also, a displayed filter icon 6701 can be mapped to a traditional filter. Such a traditional filter could include a filter that renders only "city" photos, for example, from a collection of photos. Such a traditional filter is distinct from the filtered following processing as described herein. The filters of GUI 6700 can be enabled to be scrolled left and right—by the user "swiping" their finger—so as to "roll" through different filters. Accordingly, by swiping in the area 6710, the user can access more filters. As many filters can be provided as may be desired.

After step 6103, the process passes onto step 6104. In step 6104, the processor can interface with the third user to output the results based on the first user selection, selection of the FF association(s), and any particular constraints imposed. Then, in step 6105, the subroutine is terminated. As reflected at 6300T in FIG. 63, the GUI of FIG. 63 can be generated in response to a user tapping the filter button 6701 in FIG. 67, for example.

Figure 62:
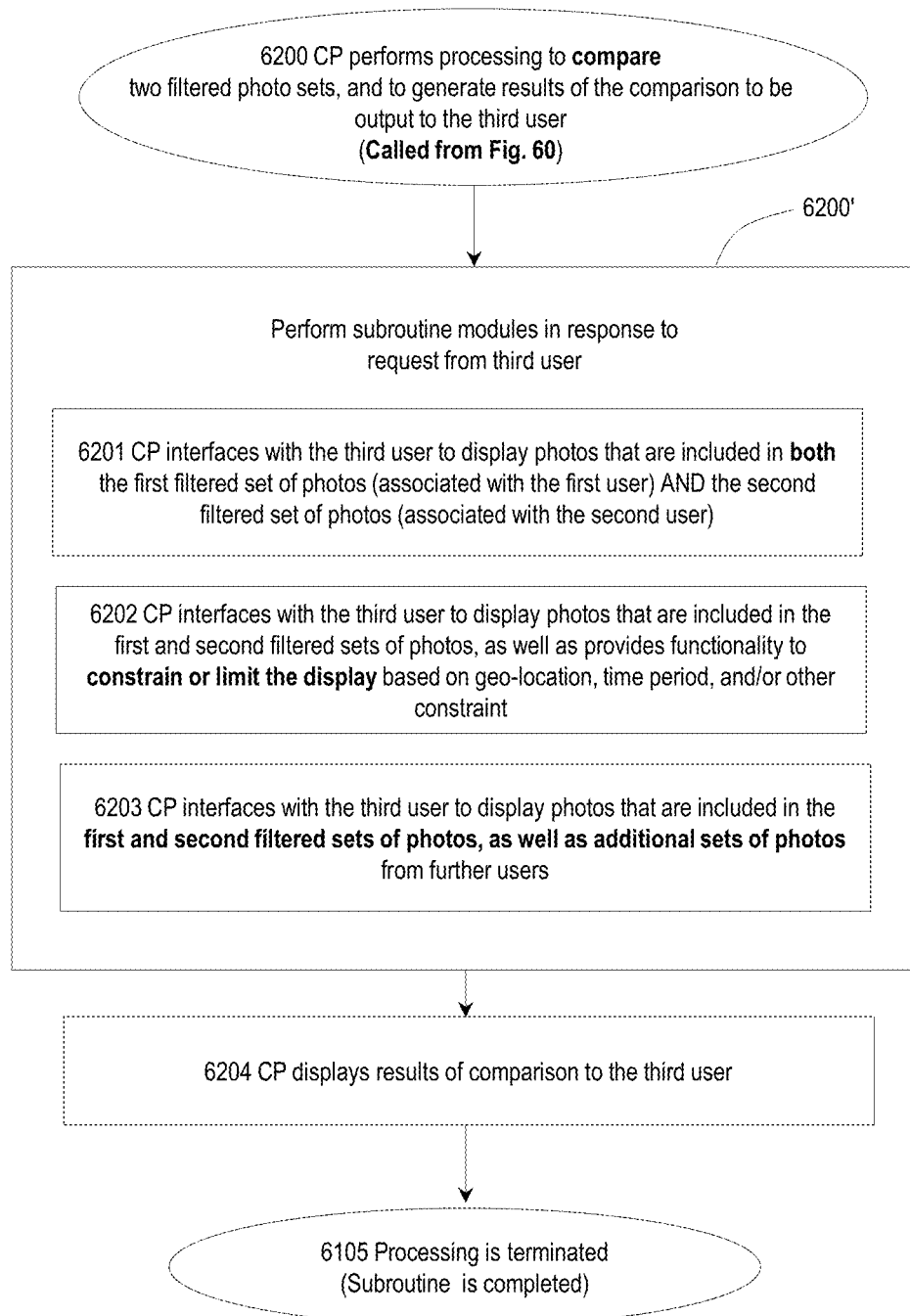
FIG. 62 is a flowchart showing details of "processor performs processing to compare two filtered photo sets, and to generate results of the comparison to be output to the third user" of subroutine 6100 as called from FIG. 60, in accordance with principles of the disclosed subject matter.

FIG. 62 is a flowchart showing details of "processor performs processing to compare two filtered photo sets, and to generate results of the comparison to be output to the third user" of subroutine 6100 as called from FIG. 60, in accordance with principles of the disclosed subject matter. The subroutine can be launched and pass onto step 6200'. In step 6200', various modules can be provided so as to be selectable by a user, in this example the third user. In general, it is appreciated that filtered following processing that generates a filtered following can relate to a single user. That is, the third user can select a first user whose perspective the third user wishes to observe. However, different filtered followings can be performed so as to generate different filtered photo sets. These different filtered photo sets can then be compared. For example, a user might just mentally compare different filtered photo sets by viewing one set and then viewing the other set. However, processing functionality can also be provided so as to compare different filtered photo sets. FIG. 62 relates to such processing functionality.

FIG. 62 shows the processing module 6201. In processing of such module, the processor interfaces with the third user to display photos that are included in both the first filtered set of photos (associated with the first user) AND the second filtered set of photos (associated with the second user). FIG. 62 also shows processing module 6202. In processing of such module, the processor interfaces with the third user to display photos that are included in the first and second filtered sets of photos, as well as provides functionality to constrain or limit the display based on geo-location (i.e. geographical location), time period, and/or other constraint. FIG. 62 also shows processing module 6203. In processing of such module, the processor interfaces with the third user to display photos that are included in the first and second filtered sets of photos, as well as additional sets of photos from further users. After a module of step 6200 is selected, the process passes onto step 6204. In step 6204, the processor displays results of the selected comparison to the third user. For example, pins (that represent photos) could be color coded so as to indicate which user the particular pin is associated with. Other graphical distinctions could be used. Then, the process passes onto step 6205. In step 6205, the processing is terminated. That is, the subroutine is completed. It is appreciated that comparison processing and other processing related to generated filtered photo sets are not limited to the particular processing shown in FIG. 62. Various other functionality and processing can be provided. In the processing of step 6200' of FIG. 62, the first and second filtered sets of photos can be presented (for comparison by a user) (a) on respective first and second screens that are adjacent to each other or (b) on the same screen. Pins, with photo count, representing photos can be displayed. Pins can be selectively displayed so as to reflect only more dense areas. For example, if viewing at the "local" level, displayed pins might only represent the top 10 patches in any local area being displayed—so as to reflect the top 10 highest points of interest in a particular local area being displayed. Other features can be provided so as to give a user comparison ability. For example, a group of pins might be selected so as to be aggregated or displayed collectively in some manner.

However, as noted above, a filtered following can be generated and viewed in and of itself. That is for example, the processing of step 6200' of FIG. 62 can also include a request to view only one set of filtered photos. That is, the illustrative "third user" can request, through interfacing with the CP (processor), a first filtered set of photos that is associated with a first user. Such processing is illustrated in FIG. 61, for example. The third user can then view such filtered following, so as to look though the perspective or "lens", metaphorically speaking, of the first user. Such processing can be a powerful tool in and of itself. Such processing can provide the user (e.g. the third user) with the ability to "see what you want to see" and the ability to filter out what the third user does not want to see. Such filtered following processing can provide for filtering media content based on user perspective, that can be for editing, viewing, comparison, validation and voting, for example. Thus, in such processing and implementation, there might not be comparison between different filtered sets of photos, but viewing of one filtered set of photos individually.

FIG. 64 is a schematic diagram showing data content 123C, in accordance with principles of the disclosed subject matter. For example, the data content 123C could be contained in the photo database 123 shown in FIG. 1. The data content of FIG. 64 can include a photo ID table 6410 and a photo data table 6420. The photo ID table 6410 can include a plurality of data records 6410'. Each of the data records 6410' can include a photo ID number. For example, the data record 6411 can include the photo ID number PH12341234. The photo ID table 6410 is searchable by a user. Each of the photo ID numbers can be linked, mapped or otherwise associated to a photo data table. As result, a user can access a respective photo data table for data regarding a particular identified photo. The data content of FIG. 64 shows that the data record 6411 is linked to the photo data table 6420, in this illustrative example. As shown, the photo data table 6420 can contain photo data. The photo data can contain image data and various metadata in respective data fields, as reflected at 6401.

The photo data table 6420 can include data records 6420'. Each data record 6420' can include a name field 6420N and a value field 6420V. The photo data table 6420 can include the photo ID number in a photo ID data record 6421. Such data record can be linked to the photo ID table 6410. The table 6420 can include data record 6422. The data record 6422 can include user ID of the user that took the particular photo. Data records can be provided that contain the photo date and the photo time. The location data record 6425 can include photo location. The location data record 6425 can be linked to data structure 6450. The data structure 6450 can contain data regarding the photo location, in addition to the data contained in data record 6425. In this case, the photo location is illustratively Times Square in New York City. Data record 6426 can include the image data. For example, such data can be in the form of a JPEG file that represents the actual picture or photograph that was taken. The data record 6427 can include a variable indicating whether filtered following is enabled or not enabled for the particular photo, e.g. whether filtered following is enabled as to the particular photo. Such selection can control whether or not certain functionality is provided with regard to the particular photo. A liked data record 6428 can contain the user IDs of those users who "liked" the particular photo.

The photo data table 6420 can include various tag data records 6420'. One of these can be tag data record 6429. As described above, processing can include identifying a data record 6410' (in photo ID table 6410 of FIG. 64) that represents a photo that (1) has been tagged using a particular filtered following (FF) tag, and (2) has a first user as a "tagger" of such FF tag. For example, the processor can determine if the first user is listed in the data record 6429 in data table 6420, or associated with the data record 6429 by virtue of being included in data structure 6440. As described above, the "first user" has been described as a user that the "third user" chooses to select, to perform a filtered following. To explain further as noted at 6402 of FIG. 64, the tag data record 6429 can be linked to data structure 6440. The data structure 6440 can contain the list of users that tagged the particular photo with a particular tag. It is this list of users that can be searched in filtered following processing (step 5903 of FIG. 59). The data table 6420 can be expanded (to add more tag data records) as more tag data fields are needed to represent additional tags being associated with the particular photo. Accordingly, one or more users, i.e. first users, can be associated with a first filtered photo set or photo collection. An association can be constituted by a user tag associated with the one or more first users being determined to match a respective photo tag associated with each of the photos in a collection of photos. The photo tag can represent or reflect a group of users to which photos in the first filtered photo set are associated, and the user tag can provide an association between the one or more first users and the group (see FIG. 64 and data structure 6440 and tag data record 6429). The group of users can be in the form of an affinity group that represents an affinity to particular subject matter. The group can be in the form of a friends group that represents a group of friends. The photo tag can designate a preference, and the user tag represents such same preference, such that the photo tag and the user tag are deemed to match and/or the photo tag and the user tag can be determined to be linked to or associated with the same tag.

Accordingly, the data content of FIG. 64 provides storage and access to a variety of data used in filtered following processing. The data content of FIG. 64 can also be used in a wide variety of other processing as described herein.

An example of filtered following may be where the user desires to compare the top 10 photo locations of a selected geographical area such as New York City. In such comparison, the user may desire to compare of the entire Photer user population (i.e. the entire photo collection of the system) vis-à-vis the user's group of friends. Or, for example, the entire photo collection may be compared to a particular affinity group to which the user belongs. The system as described herein may be described as the "Photer" system.

First Set of Illustrative Embodiments

Embodiment 1. An apparatus to process digital photos, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and an electronic user device; (B) the database that includes the non-transitory computer medium, and the database including the instructions, and (C) the CP, and the CP performing processing including: (a) segmenting an area, into a framework, including advancing across the area to assign area identifiers, to remote areas, and respective boundaries that are associated with the area identifiers of each remote area, and the segmenting being performed in the form of a row in a given geo-area, and upon reaching an end of a given row, dropping down so as to segment a next row; (b) inputting a photo from a user device, and the photo including geo-data that represents a photo location at which the photo was generated; (c) determining that the photo location is within a first remote area, of the remote areas, (d) determining that there is not an existing patch area to which the photo can be assigned; and (e) building out the framework including adding a first patch area, associating the first photo with the first patch area, and orienting the first patch area within the first remote area, thereby orienting the first photo in the framework.

Embodiment 2. The apparatus of embodiment 1, the determining that the photo location is within the first remote area, of the remote areas, being performed using global positioning system (GPS) based on longitude and latitude of the first photo.

Embodiment 3. The apparatus of embodiment 1, the CP performing processing further including generating intermediate areas so as to orient the first patch area within the first remote area.

Embodiment 4. The apparatus of embodiment 3, the intermediate areas including territory, sector, quadrant, and local areas, and such intermediate areas disposed between the first remote area and the first patch.

Embodiment 5. The apparatus of embodiment 1, the CP performing processing further including generating a second patch area based on coordinates that are associated with the first patch.

Embodiment 6. The apparatus of embodiment 1, the first remote area represented by a first area identifier.

Embodiment 7. The apparatus of embodiment 6, the first area identifier including specific digits that represent the first remote area.

Embodiment 8. The apparatus of embodiment 7, the first area identifier including specific characters that represent the first patch.

Embodiment 9. The apparatus of embodiment 8, the first remote area further including a second patch, and the second patch being adjacent to the first patch, and the second patch represented by a second area identifier, and the second area identifier being sequential relative to the first area identifier.

Embodiment 10. The apparatus of embodiment 9, the first area identifier and the second area identifier are both respective integers that are sequential in numbering, so as to represent that the first patch is adjacent to the second patch.

Embodiment 11. The apparatus of embodiment 8, the area identifier including a plurality of digits, which respectively represent subareas within the first remote area.

Embodiment 12. The apparatus of embodiment 11, wherein there are 6 areas represented by the area identifier, and the 6 areas including the first remote area and the first patch area, and the area identifier includes at least 14 characters.

Embodiment 13. The apparatus of embodiment 1, the CP performing processing including: generating a photo count of photos in the first patch, including the first photo.

Embodiment 14. The apparatus of embodiment 1 the CP performing processing including: (a) interfacing with a second user device via the communication portion; (b) inputting user geolocation data from the second user device; (c) comparing the user geolocation data with location data of the first patch; (d) determining that the user geolocation data matches with the location data of the first patch; and (e) assigning a second photo, taken with the second user device, to the first patch based on the determining that the user geolocation data matches with the location data of the first patch.

Embodiment 15. The apparatus of embodiment 1, the given geo-area is the world so that the world is segmented into remote areas.

Embodiment 16. The apparatus of embodiment 1, the dropping down so as to segment a next row includes: advancing in the same direction in rows in conjunction with generating a plurality of remote areas in a given row, OR going back and forth in rows in conjunction with generating a plurality of remote areas in a given row.

Embodiment 17. An apparatus to process media items, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and an electronic user device; (B) the database that includes a non-transitory computer medium, and the database including the instructions, and (C) the CP, and the CP performing processing including: (a) segmenting an area, into a framework, including advancing around the area to assign area identifiers, to remote areas, and respective boundaries that are associated with the area identifiers of each remote area, and the segmenting being performed in the form of a row in a given geo-area, and upon reaching an end of a given row, dropping down so as to segment a next row; (b) inputting a media item from a user device, and the media item including geo-data that represents a media item location at which the media item was generated; (c) determining that the media item location is within a first remote area, of the remote areas, (d) determining that there is not an existing patch area to which the media item can be assigned; (e) building out the framework including adding a first patch area, associating the first media item with the first patch area, and orienting the first patch area within the first remote area, thereby orienting the first media item in the framework.

Embodiment 18. The apparatus of embodiment 17, the media item is a photo or an electronic message.

Second Set of Illustrative Embodiments

Embodiment 1. An apparatus to process digital photos, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and electronic user devices; (B) the database that includes the non-transitory computer medium, and the database including the instructions, and the database including a framework that includes a plurality of areas, and the plurality of areas includes a plurality of patches, and the plurality of patches includes a first patch; (C) the CP, and the CP performing processing including: (1) inputting a first photo from a first user, and the first photo including first photo data, and the first photo data including (a) image data, and (b) geo-data, in metadata, that represents a photo location at which the first photo was generated; (2) comparing the geo-data of the first photo with the framework; (3) determining, based on the comparing, that the photo location is in the first patch; (4) associating, based on the determining, the first photo with the first patch; (5) incrementing a photo count of the first patch based on the associating of the first photo with the first patch, and the photo count reflecting popularity of the first patch; and (6) outputting the photo count to a second user; and wherein (a) the first user includes a first electronic user device, and (b) the second user includes a second electronic user device.

Embodiment 2. The apparatus of embodiment 1, the CP performing processing including comparing the photo count of the first patch with a predetermined threshold; determining that the photo count of the first patch exceeds the predetermined threshold; and based, on such determining, designating the first patch as a first spot so as to enable recognition status of the first patch.

Embodiment 3. The apparatus of embodiment 2, the recognition status of the first patch includes identifying the first patch in search results, provided to a user, based on the designation of the first patch as a spot.

Embodiment 4. The apparatus of embodiment 1, the framework is a cascading framework, and the first patch is part of the cascading framework.

Embodiment 5. The apparatus of embodiment 4, the first patch, of the plurality of patches, is a lowest level of the cascading framework.

Embodiment 6. The apparatus of embodiment 1, the first patch, of the plurality of patches, is identified by a unique identifier.

Embodiment 7. The apparatus of embodiment 6, the framework is a cascading framework; and the unique identifier includes a plurality of digits and, of the plurality of digits, respective digits are designated to represent respective areas that are associated with the first patch in the cascading framework.

Embodiment 8. The apparatus of embodiment 1, the CP performing further processing including: (a) interfacing with a third user, which includes a third user device, via the communication portion; (b) inputting search request data from the third user; (c) comparing the search request data with photo data of photos in the plurality of areas in the framework; and (d) outputting, based on such comparing of the search request data with photo data, photo search results to the third user, and the photos includes the first photo, and the photo data includes the first photo data.

Embodiment 9. The apparatus of embodiment 8, the outputting the photo search results includes determining a viewport area being displayed on the third user device.

Embodiment 10. The apparatus of embodiment 9, the outputting the viewport area relating to a degree of zoom being displayed on the third user device.

Embodiment 11. The apparatus of embodiment 9, the outputting the photo search results includes performing pin placement processing, and the pin placement processing including: generating pins, for placement in the viewport area, based on density of photos in the viewport area.

Embodiment 12. The apparatus of embodiment 11, the generating pins, for placement in the viewport area, being further based on an expanded search bounds area that extends around the viewport area.

Embodiment 13. The apparatus of embodiment 12, the generating pins, for placement in the viewport area, further including: (a) identifying that photos in the expanded search bounds area support generation of a further pin in the expanded search bounds area; and (b) moving a representation of the further pin into the viewport area so as to viewable on the third user device.

Embodiment 14. The apparatus of embodiment 11, the generating pins, for placement in the viewport area, including generating a first pin, and the first pin based on photos in a first local area, and the first local area positioned at least in part in the viewport area.

Embodiment 15. The apparatus of embodiment 14, the first pin including indicia that conveys a number of photos in the first local area.

Embodiment 16. The apparatus of embodiment 14, the generating pins including placing the first pin in a center of the first local area.

Embodiment 17. The apparatus of embodiment 14, the first local area including a plurality of patches in the first local area, and the generating pins including placing the first pin based on respective photo density in the plurality of patches, such that the first pin is placed, in the first local area, so as to be positioned in a highest density patch, of the plurality of patches, and the highest density patch having highest photo density, of the parches, in the first local area.

Embodiment 18. The apparatus of embodiment 1, wherein a plurality of patches being the smallest area of the framework, and (a) patches are generated, by the CP, in the framework based on at least one selected from the group consisting of: a predetermined known area, a popular location, a venue, an attraction, a Zip code, and a voting ward; and (b) the first photo data includes a type of photo and other attributes of the first photo in the metadata of the first photo.

Embodiment 19. The apparatus of embodiment 1, the first patch being associated with a corresponding attraction, such that the popularity of the first patch corresponds to popularity of the corresponding attraction, such that the photo count of the first patch constitutes votes for the first patch, and the CP performing processing further includes comparing the photo count of the first patch with respective photo counts of other patches to determine relative popularity.

Embodiment 20. An apparatus to process digital media, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and electronic user devices; (B) the database that includes a non-transitory computer medium, and the database including the instructions, and the database including a framework that includes a plurality of areas, and the plurality of areas includes a plurality of patches, and the plurality of patches includes a first patch; (C) the CP, and the CP performing processing including: (1) inputting a first media from a first user, and the first media including first media data, and the first media data including (a) content data, and (b) geo-data, in metadata, that represents a media location at which the first media was generated, and the first media data can be text; (2) comparing the geo-data of the first media with the framework; (3) determining, based on the comparing, that the media location is in the first patch; (4) associating, based on the determining, the first media with the first patch; (5) incrementing a media count of the first patch based on the associating of the first media with the first patch, and the media count reflecting popularity of the first patch; and (6) outputting the media count to a second user; and wherein (a) the first user includes a first electronic user device, and (b) the second user includes a second electronic user device.

Third Set of Illustrative Embodiments

Embodiment 1. An apparatus to process digital photos, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and a plurality of user devices, the plurality of user devices including a first user device (UD) and a second UD; (B) the database that includes the non-transitory computer medium, and the database including the instructions, and (C) the CP, and the CP performing processing including: (I) storing a photo in the database; (II) outputting the photo to the first UD, i.e. first user device, for display on the first UD; (III) providing a flag selector to the first UD in conjunction with the outputting of the photo to the first UD, and the flag selector relating to treatment of the photo, and the flag selector including at least one flag option; (IV) inputting selection of a flag option, of the at least one flag option, from the first UD, such that the first UD constitutes a nominator UD, and the flag option is associated with an action; (V) performing, in response to selection of the flag option, ratification processing, and the ratification processing, performed by the CP, including: (1) interfacing with the second UD, i.e. second user device, to input a ratification of the action, such that the second UD constitutes a ratifier, and the input ratification constitutes an input disposition to the action that has been nominated; (2) incrementing an accumulated ratification number (ARN) based on the ratification, so as to provide a tally of ratifications that are accumulated; (3) comparing the ARN with a required ratification number (RRN) to determine if the RRN is satisfied; and (4) rendering a determination, based on the comparing, including: (a) if the RRN is satisfied by the ARN, performing the action, OR (b) if the RRN is NOT satisfied by the ARN, not performing the action and waiting for further ratifications; and (VI) wherein the first user device is associated with and representative of a first human user, and the second user device is associated with and representative of a second human user.

Embodiment 2. The apparatus of embodiment 1, the CP rendering the determination (b) based on that the RRN is not satisfied; and (A) the ratification processing further including interfacing with a third UD, i.e. third user device, to input a negation of the action, and such third UD constitutes a second ratifier; and (B) decrementing the accumulated ratification number (ARN) based on the negation, so as to update the tally of ratifications accumulated.

Embodiment 3. The apparatus of embodiment 2, the ratification processing further including (a) interfacing with a fourth UD to input a further ratification of the action, and such fourth UD constitutes a fourth ratifier; (b) incrementing the accumulated ratification number (ARN) based on the further ratification, so as to further update the tally of ratifications that is accumulated; (c) comparing the updated ARN with the required ratification number (RRN) to determine if the RRN is satisfied; (d) determining that the RRN is satisfied; and (e) performing, based on that the RRN is satisfied, the action.

Embodiment 4. The apparatus of embodiment 2, the ratification processing further including interfacing with a fourth UD to input a further input disposition of the action, and the further input disposition being one of: (a) a ratification of the nominated action; (b) a negation of the nominated action; and (c) an ignoring to the nominated action.

Embodiment 5. The apparatus of embodiment 2, the nominated action being one of censorship and quarantine.

Embodiment 6. The apparatus of embodiment 1, the RRN constituting a threshold number; and (a) the CP performing further processing including determining that a sufficient number of users have negated the input selection of the flag option so that the ARN has fallen below a predetermined threshold, and (b) terminating, based on such determining, the ratification processing.

Embodiment 7. The apparatus of embodiment 1, the flag option includes a photo removal option, and the action includes removing the photo, from an accessible collection of photos, once the RRN has been satisfied.

Embodiment 8. The apparatus of embodiment 1, the performing processing including inputting the photo from a third UD and, subsequently, storing the photo in the database.

Embodiment 9. The apparatus of embodiment 1, the inputting selection of the flag option is performed in conjunction with inputting text, and the text is displayed with the flag option.

Embodiment 10. The apparatus of embodiment 9, the flag option is proposed removal of the photo and the text is an explanation why the photo should be removed.

Embodiment 11. The apparatus of embodiment 1, the flag option is provided, to the first UD, as a menu option for display on the first UD.

Embodiment 12. The apparatus of embodiment 1, the first UD is a first smart phone, and the second UD is a second smart phone.

Embodiment 13. The apparatus of embodiment the photo including geographic data that represents a photo location at which the photo item was generated, and the photo is one of a collection of photos that are stored in the database.

Embodiment 14. The apparatus of embodiment 1, the ratification processing further including determining a censorship power rating (CPR) that is associated with the first UD, and the CPR being an adjuster that adjusts the RRN, such that number of ratifiers required to effect the action can be adjusted up or adjusted down, and (a) the RRN and/or the CPR is flag specific so as to be different for different flags.

Embodiment 15. The apparatus of embodiment 1, the flag selector is in the form of a button that is presented, by data output by the CP to the first UD, on a GUI of the first user device.

Embodiment 16. The apparatus of embodiment 1, the at least one flag option includes at least one selected from the group consisting of a correct photo option, a revise photo option, a remove photo option and a tag photo option.

Embodiment 17. An apparatus to process media items, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and a plurality of user devices, the plurality of user devices including a first user device (UD) and a second UD; (B) the database that includes a non-transitory computer medium, and the database including the instructions, and (C) the CP, and the CP performing processing including: (I) storing a media item in the database; (II) outputting the media item to the first UD for presentation on the first UD; (III) providing a flag selector to the first UD in conjunction with the outputting of the media item to the first UD, and the flag selector relating to treatment of the media item, and the flag selector including at least one flag option; (IV) inputting selection of a flag option, of the at least one flag option, from the first UD, such that the first UD constitutes a nominator UD, and the flag option is associated with an action; (V) performing, in response to selection of the flag option, ratification processing, and the ratification processing, performed by the CP, including: (1) interfacing with the second UD to input a ratification of the action, such that the second UD constitutes a ratifier, and the input ratification constitutes an input disposition to the action that has been nominated; (2) incrementing an accumulated ratification number (ARN) based on the ratification, so as to provide a tally of ratifications that are accumulated; (3) comparing the ARN with a required ratification number (RRN) to determine if the RRN is satisfied; and (4) rendering a determination, based on the comparing, including: (a) if the RRN is satisfied by the ARN, performing the action, OR (b) if the RRN is NOT satisfied by the ARN, not performing the action and waiting for further ratifications.

Embodiment 18. The apparatus of embodiment 15, the media item is a photo.

Fourth Set of Illustrative Embodiments

Embodiment 1. An apparatus to process digital photos, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and a plurality of user devices; (B) the database that includes the non-transitory computer medium, and the database including the instructions and a framework for storing a collection of photos, and (C) the CP, and the CP performing processing including: (1) storing the collection of photos, and each photo, in the collection of photos, including (a) image data and (b) metadata; (2) interfacing with one or more first users to identify a first association between the one or more first users and respective photos in a first collection of photos, and the first collection of photos constituting a first filtered photo set of photos; (3) interfacing with one or more second users to identify a second association between the one or more second users and respective photos in a second collection of photos, and the second collection of photos constituting a second filtered photo set of photos; and (4) interfacing with a third user to allow the third user to select the one or more first users, so as to view the first filtered photo set; (5) interfacing with the third user to allow the third user to select the one or more second users, so as to view the second filtered photo set; (6) whereby the third user is provided with access to different filtered photo sets that are representative of (a) a one or more first users perspective of the one or more first users as represented by the first filtered photo set, and (b) a one or more second users perspective of the one or more second users as represented by the second filtered photo set; and (D) wherein the one or more first users, the one or more second users, and the third user each include a respective user device; and the first and second collection of photos is of the collection of photos.

Embodiment 2. The apparatus of embodiment 1, the first association is constituted by that the one or more first users took each of the photos in the first collection of photos; and the second association is constituted by that the one or more second users took each of the photos in the second collection of photos.

Embodiment 3. The apparatus of embodiment 2, the first filtered photo set and the second filtered photo set are from a same geographical area.

Embodiment 4. The apparatus of embodiment 1, the first association is constituted by that the one or more first users liked each of the photos in the first collection of photos; and the second association is constituted by that the one or more second users liked each of the photos in the second collection of photos.

Embodiment 5. The apparatus of embodiment 4, the first filtered photo set and the second filtered photo set are from a same geographical area.

Embodiment 6. The apparatus of embodiment 1, the first association is constituted by a user tag associated with the one or more first users being determined to match a respective photo tag associated with each of the photos in the first collection of photos.

Embodiment 7. The apparatus of embodiment 6, the photo tag represents a group to which photos in the first filtered photo set are associated, and the user tag provides an association between the one or more first users and the group.

Embodiment 8. The apparatus of embodiment 7, the group of users is in the form of an affinity group that represents an affinity to particular subject matter.

Embodiment 9. The apparatus of embodiment 7, the group is in the form of a friends group that represents a group of friends.

Embodiment 10. The apparatus of embodiment 6, the photo tag designates a preference, and the user tag represents such same preference, such that the photo tag and the user tag are deemed to match.

Embodiment 11. The apparatus of embodiment 6, each photo tag represents a geographical location.

Embodiment 12. The apparatus of embodiment 6, each photo tag represents an attribute of the photo, and the attribute including at least one selected from the group consisting of lens type, time of day, location, scene type, and season of the year.

Embodiment 13. The apparatus of embodiment 1, the CP performing processing includes: (a) determining that a first photo (a) is in the first filtered photo set of photos and (b) IS in the second filtered photo set of photos; (b) determining that a second photo (a) is in the first filtered photo set of photos and (b) IS NOT in the second filtered photo set of photos; (c) deeming that a following strength of the first photo is greater that a following strength of the second photo based on (a) and (b).

Embodiment 14. The apparatus of embodiment 1, the first filtered photo set and the second filtered photo set are from a first geographical area; and the third user being provided with access to the first filtered photo set and the second filtered photo allows the user to perform validation of information regarding the first geographical area.

Embodiment 15. The apparatus of embodiment 14, the validation of information regarding the first geographical area relates to popularity of the first geographical area.

Embodiment 16. The apparatus of embodiment 1, the one or more first users is a single user, and the one or more second users is a further single user.

Embodiment 17. An apparatus to process digital photos, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and a plurality of user devices; (B) the database that includes a non-transitory computer medium, and the database including the instructions and a framework for storing a collection of photos, and (C) the CP, and the CP performing processing including: (1) storing the collection of photos, and each photo, in the collection of photos, including (a) image data and (b) metadata; (2) interfacing with one or more first users to identify a first association between the one or more first users and respective photos in a first collection of photos, and the first collection of photos constituting a first filtered photo set of photos; (3) identifying a second collection of photos that have been input into the system, and the second collection of photos constituting a second filtered photo set of photos; and (4) interfacing with a third user to allow the third user to select the one or more first users, so as to view the first filtered photo set; (5) interfacing with the third user to allow the third user to view the second filtered photo set; (6) whereby the third user is provided with access to different filtered photo sets that are representative of (a) a one or more first users perspective of the one or more first users as represented by the first filtered photo set, and (b) a one or more second users perspective of one or more second users as represented by the second filtered photo set; and (D) the one or more first users, the one or more second users, and the third user each include a respective user device; and (E) the first and second collection of photos is of the collection of photos.

Embodiment 18. The apparatus of embodiment 17, the second collection of photos is constituted by one of: (a) photos, which possess a first attribute, (b) photos, which possess a second attribute, that are accessible by the third user, and (c) photos, which possess a third attribute, that are accessible by the third user, and wherein: (1) the first attribute is accessibility by the third user; (2) the second attribute reflects that each photo, in the second collection of photos, were each taken in a same geographical area, and (3) the third attribute reflects that each photo, in the second collection of photos, were each taken by a same user; and (4) wherein, the one or more first users includes at least one selected from the group consisting of: an individual, group of users, trusted critics group, an affinity group, followed users, friends, groups of friends, trusted specialty groups, persons, and groups.

Embodiment 19. An apparatus to process digital media, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and a plurality of user devices; (B) the database that includes a non-transitory computer medium, and the database including the instructions and a framework for storing a collection of media, and (C) the CP, and the CP performing processing including: (1) storing the collection of media, and each media, in the collection of media, including (a) content data and (b) metadata; (2) interfacing with one or more first users to identify a first association between the one or more first users and respective media in a first collection of media, and the first collection of media constituting a first filtered media set of media; (3) identifying a second collection of media that have been input into the system, and the second collection of media constituting a second filtered media set of media; and (4) interfacing with a third user to allow the third user to select the one or more first users, so as to view the first filtered media set; (5) interfacing with the third user to allow the third user to view the second filtered media set; (6) whereby the third user is provided with access to different filtered media sets that are representative of (a) a one or more first users perspective of the one or more first users as represented by the first filtered media set, and (b) a one or more second users perspective of one or more second users as represented by the second filtered media set; and (D) the one or more first users, the one or more second users, and the third user each include a respective user device; and the first and second collection of media is of the collection of media.

Embodiment 20. The apparatus of embodiment 19, the media includes photos, and the content data for each photo includes data representing a photograph.

Hereinafter, further aspects of the disclosure will be described.

[ ]

As used herein, any term in the singular may be interpreted to be in the plural, and alternatively, any term in the plural may be interpreted to be in the singular.

It is appreciated that one or more features of one embodiment of the disclosure as described herein may be used in conjunction with features of one or more other embodiments as may be desired.

Hereinafter, further aspects of implementation of the systems and methods of the disclosure will be described.

Various processing is described herein in the context of and/or as being performed upon photos.

However, the processing as described herein is not limited to photos. That is, censorship processing, filtered following processing, segmentation processing and other processing as described herein can be applied to any media, which can be described as a "media item" or as "media", as desired including photos, comments, content, video, sound media, text content, posts and/or other media, for example.

As described herein, a "user" can include a human user and/or an electronic user device, such as a cell phone or a smart phone, absent context to the contrary. Relatedly, interfacing with a "user", as described herein, can include interfacing with a human user and/or interfacing with an electronic user device, such as a cell phone or a smart phone, absent context to the contrary.

Various naming or nomenclature is used herein for purposes of explanation and discussion. It is appreciated that such naming or nomenclature, as set forth in this disclosure, can be varied as desired.

For example, the particular names of the areas or designations described herein, such as "local" and "patch" and "spot" can be varied as desired.

Various processing is described herein so as to generate patches and other areas. Once such an area is generated, such area can be designated as a "spot", or in some other manner designated with elevated status, once the particular area has attained a certain density of media, for example. For example, once a patch has attained a predetermined number of photos, e.g. 10 photos, the patch can be designated as a spot. Various processing can be accorded to such spot, as described herein. Such processing can include providing enhanced user access to such patch/spot and the media associated therewith.

As described herein, various processing is described as being performed in the context of a particular "area" or "geographical area". However, as desired and as suitable, it is appreciated that such processing can also be applied in other contexts such as a popular location, a landmark, a venue, an attraction, a Zip code, a restaurant, a store, and/or a voting ward, for example. For example, an attraction could be linked or associated with a particular patch (or other area). Pictures or photos associated with such particular patch could effectively be "votes" for such attraction. Different areas, associated with respective attractions, could be compared or "voted" on using pictures.

Various processing is described herein as being performed on or with regard to a "spot", wherein the spot is an area that has a predetermined density of photos, for example. Such described processing can be performed on other areas or points of interest, for example, as may be desired.

Various processing associated with segmentation of an area and the world is described herein. It is appreciated that an area may be broken into multiple areas and may be segmented as desired. The size of the areas, the number of areas in a higher level area (e.g. number of patch areas in local areas) may be varied as desired. Also, the number of levels of areas can be varied.

As described herein, at least some embodiments of the system of the disclosure and various processes, of embodiments, are described as being performed by one or more computer processors. Such one or more computer processors may be in the form of a "processing machine," i.e. a tangibly embodied machine or an "apparatus". As used herein, the term "processing machine" can be understood to include at least one processor that uses at least one memory. The at least one memory can store a set of instructions. The instructions may be either permanently or temporarily stored in the memory or memories of the processing machine. The processor can execute the instructions that are stored in the memory or memories in order to process data. The set of instructions may include various instructions that perform a particular task or tasks, such as any of the processing as described herein. Such a set of instructions for performing a particular task may be characterized as a program, software program, code or simply software. Various processing is described herein as performed by a computer processor (CP). Such computer processor can be constituted by or include the processing machine described herein. Such computer processor (CP) can be described as a computer processor portion (CPP), a computer processing portion, a processor, and/or similar constructs, for example.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the machine used to implement the disclosure may be in the form of a processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that can be capable of implementing the steps of the processes of the disclosure.

The processing machine used to implement the disclosure may utilize a suitable operating system. Thus, embodiments of the disclosure may include a processing machine running the Windows 10 operating system, the Windows 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the disclosure as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above can be performed by various components and various memories. However, it is appreciated that the processing performed by two distinct components as described above may, in accordance with a further embodiment of the disclosure, be performed by a single component. Further, the processing performed by one distinct component as described above may be performed by two distinct components. For example, processing as described herein might be performed in part by the system 100 or other system or server, in part by some third party resource 30, and in part by a user device 20, with reference to FIG. 1. In a similar manner, the memory storage performed by two distinct memory portions as described above may, in accordance with a further embodiment of the disclosure, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the disclosure to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions can be used in the processing of the disclosure on the processing machine, for example. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the disclosure may be in a suitable form such that the processing machine may read the instructions. For example, the instructions that form a program may be in the form of a suitable programming language, which can be converted to machine language or object code to allow the processor or processors to read the instructions. That is, written lines of programming code or source code, in a particular programming language, can be converted to machine language using a compiler, assembler or interpreter. The machine language can be binary coded machine instructions that are specific to a particular type of processing machine, i.e., to a particular type of computer, for example. The computer understands the machine language.

A suitable programming language may be used in accordance with the various embodiments of the disclosure. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the disclosure. Rather, any number of different programming languages may be utilized as can be necessary or desirable.

Also, the instructions and/or data used in the practice of the disclosure may utilize any compression or encryption technique or algorithm, as may be desired. An encryption module might be used to encrypt data. Further, files or other data may be decrypted using a suitable decryption module, for example.

As described above, the disclosure may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that can be processed by the set of instructions might also be contained on any of a wide variety of media or medium. That is, the particular medium, i.e., the memory in the processing machine, utilized to hold the set of instructions and/or the data used in the disclosure may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the disclosure.

Further, the memory or memories used in the processing machine that implements the disclosure may be in any of a wide variety of forms to allow the memory to hold instructions, data, or other information, as can be desired. Thus, the memory might be in the form of a database to hold data. The database might use any desired arrangement of files such as a flat file arrangement or a relational database arrangement, for example.

In the system and method of the disclosure, a variety of "user interfaces" may be utilized to allow a user to interface with the processing machine or machines that are used to implement the disclosure. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface can be any device that provides communication between a user and a processing machine. The information provided by the user to the processing machine through the user interface may be in the form of a command, a selection of data, or some other input, for example.

As discussed above, a user interface can be utilized by the processing machine that performs a set of instructions such that the processing machine processes data for a user. The user interface can be typically used by the processing machine for interacting with a user either to convey information or receive information from the user. However, it should be appreciated that in accordance with some embodiments of the system and method of the disclosure, it is not necessary that a human user actually interact with a user interface used by the processing machine of the disclosure. Rather, it is also contemplated that the user interface of the disclosure might interact, i.e., convey and receive information, with another processing machine, rather than a human user. Accordingly, the other processing machine might be characterized as a user. Further, it is contemplated that a user interface utilized in the system and method of the disclosure may interact partially with another processing machine or processing machines, while also interacting partially with a human user.

In this disclosure, quotation marks, such as with the language "spot", have been used to enhance readability and/or to parse out a term or phrase for clarity.

It will be appreciated that features, elements and/or characteristics described with respect to one embodiment of the disclosure may be variously used with other embodiments of the disclosure as may be desired.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, process step, region, layer or section from another region, layer or section. Thus, a first element, component, process step, region, layer or section could be termed a second element, component, process step, region, layer or section without departing from the teachings of the present disclosure.

Spatially and organizationally relative terms, such as "lower", "upper", "top", "bottom", "left", "right", "north", "south", "east", "west", "up", "down", "right", "left", "upper threshold", "lower threshold" and the like, may be used herein for ease of description to describe the relationship of one element or feature to another element(s) or feature(s) as illustrated in the drawing figures. It will be understood that spatially and organizationally relative terms are intended to encompass different orientations of or organizational aspects of components in use or in operation, in addition to the orientation or particular organization depicted in the drawing figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, process steps, operations, elements, and/or components, but do not preclude the presence or addition of one or more other features, integers, process steps, operations, elements, components, and/or groups thereof.

Embodiments of the disclosure are described herein with reference to diagrams, flowcharts and/or other illustrations, for example, that are schematic illustrations of idealized embodiments (and intermediate components) of the disclosure. As such, variations from the illustrations are to be expected. Thus, embodiments of the disclosure should not be construed as limited to the particular organizational depiction of components and/or processing illustrated herein but are to include deviations in organization of components and/or processing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, as otherwise noted herein, when a particular feature, structure, or characteristic is described in connection with any embodiment, it is submitted that it is within the purview of one skilled in the art to effect and/or use such feature, structure, or characteristic in connection with other ones of the embodiments.

While the subject matter has been described in detail with reference to exemplary embodiments thereof, it will be apparent to one skilled in the art that various changes can be made, and equivalents employed, without departing from the scope of the disclosure.

All references and/or documents referenced herein are hereby incorporated by reference in their entirety.

It will be readily understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described here in detail in relation to its exemplary embodiments, it is to be understood that this disclosure is only illustrative and exemplary of the present disclosure and is made to provide an enabling disclosure of the disclosure. Accordingly, the foregoing disclosure is not intended to be construed or to limit the present disclosure or otherwise to exclude any other such embodiments, adaptations, variations, modifications and equivalent arrangements.

What is claimed is:

1. An apparatus to process digital photos, the apparatus including a tangibly embodied computer processor (CP) and a tangibly embodied database, the CP implementing instructions on a non-transitory computer medium disposed in the database, and the database in communication with the CP, the apparatus comprising:
   a communication portion for providing communication between the CP and an electronic user device;
   the database that includes the non-transitory computer medium, and the database including the instructions, and
   the CP, and the CP performing processing including:
   segmenting an area, into a framework, including advancing across the area to assign area identifiers, to remote areas, and respective boundaries that are associated with the area identifiers of each remote area, and
   the segmenting being performed in the form of a row in a given geo-area, and
   upon reaching an end of a given row, dropping down so as to segment a next row;
   inputting a photo from a user device, and the photo including geo-data that represents a photo location at which the photo was generated;
   determining that the photo location is within a first remote area, of the remote areas,
   determining that there is not an existing patch area to which the photo can be assigned, the photo constituting a first photo; and
   building out the framework including adding a first patch area, associating the first photo with the first patch area, and orienting the first patch area within the first remote area, thereby orienting the first photo in the framework.

2. The apparatus of claim 1, the determining that the photo location is within the first remote area, of the remote areas, being performed using global positioning system (GPS) based on longitude and latitude of the first photo.

3. The apparatus of claim 1, the CP performing processing further including generating intermediate areas so as to orient the first patch area within the first remote area.

4. The apparatus of claim 3, the intermediate areas including territory, sector, quadrant, and local areas, and such intermediate areas disposed between the first remote area and the first patch area.

5. The apparatus of claim 1, the CP performing processing further including generating a second patch area based on coordinates that are associated with the first patch area.

6. The apparatus of claim 1, the first remote area represented by a first area identifier.

7. The apparatus of claim 6, the first area identifier including specific digits that represent the first remote area.

8. The apparatus of claim 7, the first area identifier including specific characters that represent the first patch area.

9. The apparatus of claim 8, the first remote area further including a second patch area, and the second patch area being adjacent to the first patch area, and
   the second patch area represented by a second area identifier, and the second area identifier being sequential relative to the first area identifier.

10. The apparatus of claim 9, the first area identifier and the second area identifier are both respective integers that are sequential in numbering, so as to represent that the first patch area is adjacent to the second patch area.

11. The apparatus of claim 8, the first area identifier including a plurality of digits, which respectively represent subareas within the first remote area.

12. The apparatus of claim 11, wherein there are 6 areas represented by the first area identifier, and the 6 areas including the first remote area and the first patch area, and the first area identifier includes at least 14 characters.

13. The apparatus of claim 1, the CP performing processing including:
 generating a photo count of photos in the first patch area, including the first photo.

14. The apparatus of claim 1 the CP performing processing including:
 interfacing with a second user device via the communication portion;
 inputting user geolocation data from the second user device;
 comparing the user geolocation data with location data of the first patch area;
 determining that the user geolocation data matches with the location data of the first patch area; and
 assigning a second photo, taken with the second user device, to the first patch area based on the determining that the user geolocation data matches with the location data of the first patch area.

15. The apparatus of claim 1, the given geo-area is the world so that the world is segmented into remote areas.

16. The apparatus of claim 1, the dropping down so as to segment a next row includes:
 advancing in the same direction in rows in conjunction with generating a plurality of remote areas in a given row, OR
 going back and forth in rows in conjunction with generating a plurality of remote areas in a given row.

17. An apparatus to process media items, the apparatus including a tangibly embodied computer processor (CP) and a tangibly embodied database, the CP implementing instructions on a non-transitory computer medium disposed in the database, and the database in communication with the CP, the apparatus comprising:
 a communication portion for providing communication between the CP and an electronic user device;
 the database that includes the non-transitory computer medium, and the database including the instructions, and
 the CP, and the CP performing processing including:
  segmenting an area, into a framework, including advancing around the area to assign area identifiers, to remote areas, and respective boundaries that are associated with the area identifiers of each remote area, and
   the segmenting being performed in the form of a row in a given geo-area, and
  upon reaching an end of a given row, dropping down so as to segment a next row;
  inputting a media item from a user device, and the media item including geo-data that represents a media item location at which the media item was generated;
  determining that the media item location is within a first remote area, of the remote areas,
  determining that there is not an existing patch area to which the media item can be assigned, the media item constituting a first media item;
  building out the framework including adding a first patch area, associating the first media item with the first patch area, and orienting the first patch area within the first remote area, thereby orienting the first media item in the framework.

18. The apparatus of claim 17, the media item is a photo or an electronic message.

\* \* \* \* \*